US011054973B1

(12) United States Patent
Manzari et al.

(10) Patent No.: US 11,054,973 B1
(45) Date of Patent: Jul. 6, 2021

(54) USER INTERFACES FOR MANAGING MEDIA

(71) Applicant: Apple Inc., Cupertino, CA (US)

(72) Inventors: Behkish J. Manzari, San Francisco, CA (US); Graham R. Clarke, Mountain View, CA (US); Andre Souza Dos Santos, San Jose, CA (US); Mani Amini, San Francisco, CA (US); Alan C. Dye, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/027,484

(22) Filed: Sep. 21, 2020

Related U.S. Application Data

(60) Provisional application No. 63/032,871, filed on Jun. 1, 2020.

(51) Int. Cl.
  *G06F 3/0484* (2013.01)
  *H04N 5/247* (2006.01)
  *H04N 5/232* (2006.01)

(52) U.S. Cl.
  CPC ...... *G06F 3/04842* (2013.01); *G06F 3/04847* (2013.01); *H04N 5/232933* (2018.08); *H04N 5/232939* (2018.08); *H04N 5/247* (2013.01)

(58) Field of Classification Search
  CPC .................................................. G06F 3/04842
  See application file for complete search history.

(56) References Cited

U.S. PATENT DOCUMENTS

| | | | |
|---|---|---|---|
| 4,933,702 | A | 6/1990 | Komatsuzaki et al. |
| 5,463,443 | A | 10/1995 | Tanaka et al. |
| 5,557,358 | A | 9/1996 | Mukai et al. |
| 5,615,384 | A | 3/1997 | Allard et al. |
| 5,825,353 | A | 10/1998 | Will |
| 6,359,837 | B1 | 3/2002 | Tsukamoto |
| 6,429,896 | B1 | 8/2002 | Aruga et al. |
| 6,522,347 | B1 | 2/2003 | Sakai et al. |
| 6,621,524 | B1 | 9/2003 | Iijima et al. |
| 6,809,724 | B1 | 10/2004 | Shiraishi et al. |
| 6,809,759 | B1 | 10/2004 | Chiang |
| 6,819,867 | B2 | 11/2004 | Mayer et al. |
| 6,900,840 | B1 | 5/2005 | Schinner et al. |
| 6,901,561 | B1 | 5/2005 | Kirkpatrick et al. |
| 7,463,304 | B2 | 12/2008 | Murray |
| 7,515,178 | B1 | 4/2009 | Fleischman et al. |
| 8,189,087 | B2 | 5/2012 | Misawa et al. |

(Continued)

FOREIGN PATENT DOCUMENTS

| | | |
|---|---|---|
| AU | 2017100683 B4 | 1/2018 |
| AU | 2015297035 B2 | 6/2018 |

(Continued)

OTHER PUBLICATIONS

Notice of Allowance received for Chinese Patent Application No. 202010287961.0, dated Mar. 9, 2021, 8 pages (4 pages of English Translation and 4 pages of Official Copy).

(Continued)

*Primary Examiner* — Roland J Casillas
(74) *Attorney, Agent, or Firm* — Dentons US LLP

(57) ABSTRACT

The present disclosure generally relates to user interfaces for displaying a status indicator (e.g., status indicator indicating that media is and/or has been captured).

54 Claims, 43 Drawing Sheets

(56) References Cited

U.S. PATENT DOCUMENTS

| | | |
|---|---|---|
| 8,295,546 B2 | 10/2012 | Craig et al. |
| 8,379,098 B2 | 2/2013 | Rottler et al. |
| 8,405,680 B1 | 3/2013 | Gomes et al. |
| 8,423,089 B2 | 4/2013 | Song et al. |
| 8,624,836 B1 | 1/2014 | Miller et al. |
| 8,675,084 B2 | 3/2014 | Bolton et al. |
| 8,736,704 B2 | 5/2014 | Jasinski et al. |
| 8,736,716 B2 | 5/2014 | Prentice |
| 8,742,890 B2 | 6/2014 | Gocho et al. |
| 8,762,895 B2 | 6/2014 | Mehta et al. |
| 8,885,978 B2 | 11/2014 | Cote et al. |
| 8,896,652 B2 | 11/2014 | Ralston |
| 9,094,576 B1 | 7/2015 | Karakotsios |
| 9,153,031 B2 | 10/2015 | El-Saban et al. |
| 9,172,866 B2 | 10/2015 | Ito et al. |
| 9,207,837 B2 | 12/2015 | Paretti et al. |
| 9,230,241 B1 | 1/2016 | Singh et al. |
| 9,230,355 B1 | 1/2016 | Ahuja et al. |
| 9,245,177 B2 | 1/2016 | Perez |
| 9,246,961 B2 | 1/2016 | Walkin et al. |
| 9,250,797 B2 | 2/2016 | Roberts et al. |
| 9,264,660 B1 | 2/2016 | Petterson et al. |
| 9,298,263 B2 | 3/2016 | Geisner et al. |
| 9,313,401 B2 | 4/2016 | Frey et al. |
| 9,349,414 B1 | 5/2016 | Furment et al. |
| 9,360,671 B1 | 6/2016 | Zhou |
| 9,423,868 B2 | 8/2016 | Iwasaki |
| 9,448,708 B1 | 9/2016 | Bennett et al. |
| 9,451,144 B2 | 9/2016 | Dye |
| 9,544,563 B1 | 1/2017 | Cheng et al. |
| 9,602,559 B1 | 3/2017 | Barros et al. |
| 9,628,416 B2 | 4/2017 | Henderson |
| 9,686,497 B1 | 6/2017 | Terry |
| 9,704,250 B1 | 7/2017 | Gilmour et al. |
| 9,716,825 B1 | 7/2017 | Manzari et al. |
| 9,767,613 B1 | 9/2017 | Bedikian et al. |
| 9,817,484 B2 | 11/2017 | Geng et al. |
| 9,942,463 B2 | 4/2018 | Kuo et al. |
| 9,948,589 B2 | 4/2018 | Gonnen et al. |
| 9,973,674 B2 | 5/2018 | Dye et al. |
| 10,095,385 B2 | 10/2018 | Walkin et al. |
| 10,122,958 B2 | 11/2018 | Kim et al. |
| 10,187,587 B2 | 1/2019 | Hasinoff et al. |
| 10,270,983 B1 | 4/2019 | Van Os et al. |
| 10,289,265 B2 | 5/2019 | Kulkarni |
| 10,297,034 B2 | 5/2019 | Nash et al. |
| 10,304,231 B2 | 5/2019 | Saito |
| 10,326,942 B2 | 6/2019 | Shabtay et al. |
| 10,375,313 B1 | 8/2019 | Van Os et al. |
| 10,379,719 B2 | 8/2019 | Scapel et al. |
| 10,397,500 B1 | 8/2019 | Xu et al. |
| 10,447,908 B2 | 10/2019 | Lee et al. |
| 10,467,729 B1 | 11/2019 | Perera et al. |
| 10,521,091 B2 | 12/2019 | Anzures et al. |
| 10,521,948 B2 | 12/2019 | Rickwald et al. |
| 10,523,879 B2 | 12/2019 | Dye et al. |
| 10,645,294 B1 | 5/2020 | Manzari et al. |
| 10,652,470 B1 | 5/2020 | Manzari et al. |
| 10,657,695 B2 | 5/2020 | Chand et al. |
| 10,659,405 B1 | 5/2020 | Chang et al. |
| 10,674,072 B1 | 6/2020 | Manzari et al. |
| 10,681,282 B1 | 6/2020 | Manzari et al. |
| 10,698,575 B2 | 6/2020 | Walkin et al. |
| 10,798,035 B2 | 10/2020 | Lewis et al. |
| 10,845,968 B2 | 11/2020 | Scapel et al. |
| 2001/0039552 A1 | 11/2001 | Killi et al. |
| 2002/0140803 A1 | 10/2002 | Gutta et al. |
| 2002/0171737 A1 | 11/2002 | Tullis et al. |
| 2003/0001827 A1 | 1/2003 | Gould et al. |
| 2003/0025802 A1 | 2/2003 | Mayer, Jr. et al. |
| 2003/0025812 A1 | 2/2003 | Slatter et al. |
| 2003/0107664 A1 | 6/2003 | Suzuki |
| 2003/0174216 A1 | 9/2003 | Iguchi et al. |
| 2004/0041924 A1 | 3/2004 | White et al. |
| 2004/0061796 A1 | 4/2004 | Honda et al. |
| 2004/0189861 A1 | 9/2004 | Tom et al. |
| 2004/0201699 A1 | 10/2004 | Parulski et al. |
| 2005/0134695 A1 | 6/2005 | Deshpande et al. |
| 2005/0189419 A1 | 9/2005 | Igarashi et al. |
| 2005/0237383 A1 | 10/2005 | Soga et al. |
| 2005/0248660 A1 | 11/2005 | Stavely et al. |
| 2005/0270397 A1 | 12/2005 | Battles |
| 2006/0158730 A1 | 7/2006 | Kira |
| 2006/0170791 A1 | 8/2006 | Porter et al. |
| 2006/0187322 A1 | 8/2006 | Janson et al. |
| 2006/0228040 A1 | 10/2006 | Simon et al. |
| 2007/0024614 A1 | 2/2007 | Tam et al. |
| 2007/0025711 A1 | 2/2007 | Marcus et al. |
| 2007/0040810 A1 | 2/2007 | Dowe et al. |
| 2007/0097088 A1 | 5/2007 | Battles |
| 2007/0109417 A1 | 5/2007 | Hyttfors et al. |
| 2007/0113099 A1 | 5/2007 | Takikawa et al. |
| 2007/0140675 A1 | 6/2007 | Yanagi et al. |
| 2007/0165103 A1 | 7/2007 | Arima et al. |
| 2007/0228259 A1 | 10/2007 | Hohenberger |
| 2007/0254640 A1 | 11/2007 | Bliss |
| 2007/0257992 A1 | 11/2007 | Kato |
| 2007/0273769 A1 | 11/2007 | Takahashi |
| 2007/0291152 A1 | 12/2007 | Suekane et al. |
| 2008/0030592 A1 | 2/2008 | Border et al. |
| 2008/0084484 A1 | 4/2008 | Ochi et al. |
| 2008/0106601 A1 | 5/2008 | Matsuda |
| 2008/0119286 A1 | 5/2008 | Brunstetter et al. |
| 2008/0129759 A1 | 6/2008 | Jeon et al. |
| 2008/0129825 A1 | 6/2008 | Deangelis et al. |
| 2008/0143840 A1 | 6/2008 | Corkum et al. |
| 2008/0192020 A1 | 8/2008 | Kang et al. |
| 2008/0218611 A1 | 9/2008 | Parulski et al. |
| 2008/0222558 A1 | 9/2008 | Cho et al. |
| 2008/0284855 A1 | 11/2008 | Umeyama et al. |
| 2008/0298571 A1 | 12/2008 | Kurtz et al. |
| 2009/0021600 A1 | 1/2009 | Watanabe |
| 2009/0027539 A1 | 1/2009 | Kunou |
| 2009/0040332 A1 | 2/2009 | Yoshino et al. |
| 2009/0066817 A1 | 3/2009 | Sakamaki |
| 2009/0073285 A1 | 3/2009 | Terashima |
| 2009/0102933 A1 | 4/2009 | Harris et al. |
| 2009/0144639 A1 | 6/2009 | Nims et al. |
| 2009/0167890 A1 | 7/2009 | Nakagomi et al. |
| 2009/0244318 A1 | 10/2009 | Makii |
| 2009/0251484 A1 | 10/2009 | Zhao et al. |
| 2009/0315671 A1 | 12/2009 | Gocho et al. |
| 2010/0020221 A1 | 1/2010 | Tupman et al. |
| 2010/0020222 A1 | 1/2010 | Jones et al. |
| 2010/0033615 A1 | 2/2010 | Mori |
| 2010/0039522 A1 | 2/2010 | Huang |
| 2010/0093400 A1 | 4/2010 | Ju et al. |
| 2010/0124941 A1 | 5/2010 | Cho |
| 2010/0141786 A1 | 6/2010 | Bigioi et al. |
| 2010/0141787 A1 | 6/2010 | Bigioi et al. |
| 2010/0153847 A1 | 6/2010 | Fama |
| 2010/0162160 A1 | 6/2010 | Stallings et al. |
| 2010/0167809 A1 | 7/2010 | Perlman et al. |
| 2010/0188426 A1 | 7/2010 | Ohmori et al. |
| 2010/0194931 A1 | 8/2010 | Kawaguchi et al. |
| 2010/0208122 A1 | 8/2010 | Yumiki |
| 2010/0231735 A1 | 9/2010 | Burian et al. |
| 2010/0231777 A1 | 9/2010 | Shintani et al. |
| 2010/0232703 A1 | 9/2010 | Aiso |
| 2010/0238327 A1 | 9/2010 | Griffith et al. |
| 2010/0277470 A1 | 11/2010 | Margolis |
| 2010/0283743 A1 | 11/2010 | Coddington |
| 2010/0289825 A1 | 11/2010 | Shin et al. |
| 2010/0289910 A1 | 11/2010 | Kamshilin et al. |
| 2010/0317410 A1 | 12/2010 | Song et al. |
| 2011/0008033 A1 | 1/2011 | Ichimiya et al. |
| 2011/0018970 A1 | 1/2011 | Wakabayashi |
| 2011/0019058 A1 | 1/2011 | Sakai |
| 2011/0058052 A1 | 3/2011 | Bolton et al. |
| 2011/0072394 A1 | 3/2011 | Victor et al. |
| 2011/0074710 A1 | 3/2011 | Weeldreyer et al. |
| 2011/0074830 A1 | 3/2011 | Rapp et al. |
| 2011/0090155 A1 | 4/2011 | Caskey et al. |
| 2011/0115932 A1 | 5/2011 | Shin et al. |

(56) References Cited

U.S. PATENT DOCUMENTS

| | | |
|---|---|---|
| 2011/0138332 A1 | 6/2011 | Miyagawa |
| 2011/0157379 A1 | 6/2011 | Kimura |
| 2011/0187879 A1 | 8/2011 | Ochiai |
| 2011/0221755 A1 | 9/2011 | Geisner et al. |
| 2011/0242369 A1 | 10/2011 | Misawa et al. |
| 2011/0249073 A1 | 10/2011 | Cranfill et al. |
| 2011/0249078 A1 | 10/2011 | Abuan et al. |
| 2011/0252381 A1 | 10/2011 | Chaudhri |
| 2011/0258537 A1 | 10/2011 | Rives et al. |
| 2011/0262103 A1 | 10/2011 | Ramachandran et al. |
| 2011/0296163 A1 | 12/2011 | Abernethy et al. |
| 2011/0304632 A1 | 12/2011 | Evertt et al. |
| 2012/0002898 A1 | 1/2012 | Côté et al. |
| 2012/0026378 A1 | 2/2012 | Pang et al. |
| 2012/0056997 A1 | 3/2012 | Jang |
| 2012/0057064 A1 | 3/2012 | Gardiner et al. |
| 2012/0069028 A1 | 3/2012 | Bouguerra |
| 2012/0069206 A1 | 3/2012 | Hsieh |
| 2012/0106790 A1 | 5/2012 | Sultana et al. |
| 2012/0120277 A1 | 5/2012 | Tsai et al. |
| 2012/0133797 A1 | 5/2012 | Sato et al. |
| 2012/0162242 A1 | 6/2012 | Amano et al. |
| 2012/0169776 A1 | 7/2012 | Rissa et al. |
| 2012/0188394 A1 | 7/2012 | Park et al. |
| 2012/0194559 A1 | 8/2012 | Lim |
| 2012/0206452 A1 | 8/2012 | Geisner et al. |
| 2012/0243802 A1 | 9/2012 | Fintel et al. |
| 2012/0293619 A1 | 11/2012 | Newton et al. |
| 2012/0309520 A1 | 12/2012 | Evert et al. |
| 2012/0320141 A1 | 12/2012 | Bowen et al. |
| 2012/0324359 A1 | 12/2012 | Lee et al. |
| 2013/0009858 A1 | 1/2013 | Lacey |
| 2013/0038546 A1 | 2/2013 | Mineo |
| 2013/0038771 A1 | 2/2013 | Brunner et al. |
| 2013/0055119 A1 | 2/2013 | Luong |
| 2013/0057472 A1 | 3/2013 | Dizac et al. |
| 2013/0076908 A1 | 3/2013 | Bratton et al. |
| 2013/0083222 A1 | 4/2013 | Matsuzawa et al. |
| 2013/0088413 A1 | 4/2013 | Raffle et al. |
| 2013/0091298 A1 | 4/2013 | Ozzie et al. |
| 2013/0093904 A1 | 4/2013 | Wagner et al. |
| 2013/0101164 A1 | 4/2013 | Leclerc et al. |
| 2013/0135315 A1 | 5/2013 | Bares et al. |
| 2013/0141362 A1 | 6/2013 | Asanuma et al. |
| 2013/0141513 A1 | 6/2013 | Setton et al. |
| 2013/0147933 A1 | 6/2013 | Kulas et al. |
| 2013/0155308 A1 | 6/2013 | Wu et al. |
| 2013/0159900 A1 | 6/2013 | Pendharkar |
| 2013/0165186 A1 | 6/2013 | Choi |
| 2013/0179831 A1 | 7/2013 | Izaki |
| 2013/0194378 A1 | 8/2013 | Brown |
| 2013/0201104 A1 | 8/2013 | Ptucha et al. |
| 2013/0222663 A1 | 8/2013 | Rydenhag et al. |
| 2013/0246948 A1 | 9/2013 | Chen et al. |
| 2013/0265467 A1 | 10/2013 | Matsuzawa et al. |
| 2013/0278576 A1 | 10/2013 | Lee et al. |
| 2013/0286251 A1 | 10/2013 | Wood et al. |
| 2013/0290905 A1 | 10/2013 | Luvogt et al. |
| 2013/0318476 A1 | 11/2013 | Sauve et al. |
| 2013/0329074 A1 | 12/2013 | Zhang et al. |
| 2014/0007021 A1 | 1/2014 | Akiyama et al. |
| 2014/0022399 A1 | 1/2014 | Rashid et al. |
| 2014/0028872 A1 | 1/2014 | Lee et al. |
| 2014/0028885 A1 | 1/2014 | Ma et al. |
| 2014/0033043 A1 | 1/2014 | Kashima |
| 2014/0033100 A1 | 1/2014 | Noda et al. |
| 2014/0037178 A1 | 2/2014 | Park |
| 2014/0043368 A1 | 2/2014 | Yu |
| 2014/0047389 A1 | 2/2014 | Aarabi |
| 2014/0055554 A1 | 2/2014 | Du et al. |
| 2014/0063175 A1 | 3/2014 | Jafry et al. |
| 2014/0063313 A1 | 3/2014 | Choi et al. |
| 2014/0071061 A1 | 3/2014 | Lin et al. |
| 2014/0071325 A1 | 3/2014 | Kawahara et al. |
| 2014/0073298 A1 | 3/2014 | Rossmann |
| 2014/0078371 A1 | 3/2014 | Kinoshita |
| 2014/0095122 A1 | 4/2014 | Appleman et al. |
| 2014/0099994 A1 | 4/2014 | Bishop et al. |
| 2014/0104449 A1 | 4/2014 | Masarik et al. |
| 2014/0108928 A1 | 4/2014 | Mumick |
| 2014/0118563 A1 | 5/2014 | Mehta et al. |
| 2014/0143678 A1 | 5/2014 | Mistry et al. |
| 2014/0152886 A1 | 6/2014 | Morgan-Mar et al. |
| 2014/0160304 A1 | 6/2014 | Galor et al. |
| 2014/0176565 A1 | 6/2014 | Adeyoola et al. |
| 2014/0179428 A1 | 6/2014 | Miura et al. |
| 2014/0184524 A1 | 7/2014 | Schiefer et al. |
| 2014/0192233 A1 | 7/2014 | Kakkori et al. |
| 2014/0204229 A1 | 7/2014 | Leung et al. |
| 2014/0205259 A1 | 7/2014 | Kamity et al. |
| 2014/0218371 A1 | 8/2014 | Du et al. |
| 2014/0218599 A1 | 8/2014 | Nakamura et al. |
| 2014/0232838 A1 | 8/2014 | Jorgensen et al. |
| 2014/0240531 A1 | 8/2014 | Nakai et al. |
| 2014/0240577 A1 | 8/2014 | Masugi |
| 2014/0267126 A1 | 9/2014 | Åberg et al. |
| 2014/0267867 A1 | 9/2014 | Lee et al. |
| 2014/0300635 A1 | 10/2014 | Suzuki |
| 2014/0310598 A1 | 10/2014 | Sprague et al. |
| 2014/0327639 A1 | 11/2014 | Papakipos et al. |
| 2014/0333671 A1 | 11/2014 | Phang et al. |
| 2014/0343703 A1 | 11/2014 | Topchy et al. |
| 2014/0351753 A1 | 11/2014 | Shin et al. |
| 2014/0359438 A1 | 12/2014 | Matsuki |
| 2014/0359766 A1 | 12/2014 | Klein et al. |
| 2014/0362091 A1 | 12/2014 | Bouaziz et al. |
| 2014/0368601 A1* | 12/2014 | deCharms ............... H04L 67/26 348/14.02 |
| 2014/0368719 A1 | 12/2014 | Kaneko et al. |
| 2015/0022674 A1 | 1/2015 | Koss et al. |
| 2015/0033192 A1 | 1/2015 | Bohannon et al. |
| 2015/0035825 A1 | 2/2015 | Zhou et al. |
| 2015/0043806 A1 | 2/2015 | Sunkavalli et al. |
| 2015/0049233 A1 | 2/2015 | Choi |
| 2015/0058754 A1 | 2/2015 | Rauh |
| 2015/0067513 A1 | 3/2015 | Zambetti et al. |
| 2015/0078621 A1 | 3/2015 | Choi et al. |
| 2015/0085174 A1 | 3/2015 | Shabtay et al. |
| 2015/0087414 A1 | 3/2015 | Chen et al. |
| 2015/0092077 A1 | 4/2015 | Feder et al. |
| 2015/0109417 A1 | 4/2015 | Zirnheld |
| 2015/0116353 A1 | 4/2015 | Miura et al. |
| 2015/0116448 A1 | 4/2015 | Gottlieb |
| 2015/0135108 A1 | 5/2015 | Pope et al. |
| 2015/0135234 A1 | 5/2015 | Hall |
| 2015/0138079 A1 | 5/2015 | Lannsjö |
| 2015/0145950 A1 | 5/2015 | Murphy et al. |
| 2015/0146079 A1 | 5/2015 | Kim |
| 2015/0149927 A1 | 5/2015 | Walkin et al. |
| 2015/0150141 A1 | 5/2015 | Szymanski et al. |
| 2015/0154448 A1 | 6/2015 | Murayama et al. |
| 2015/0172534 A1 | 6/2015 | Miyakawa et al. |
| 2015/0181135 A1 | 6/2015 | Shimosato |
| 2015/0189138 A1 | 7/2015 | Xie et al. |
| 2015/0189162 A1 | 7/2015 | Kuo et al. |
| 2015/0208001 A1 | 7/2015 | Nonaka et al. |
| 2015/0212723 A1 | 7/2015 | Lim et al. |
| 2015/0220249 A1 | 8/2015 | Snibbe et al. |
| 2015/0248198 A1 | 9/2015 | Somlai-Fisher et al. |
| 2015/0248583 A1 | 9/2015 | Sekine et al. |
| 2015/0249775 A1 | 9/2015 | Jacumet |
| 2015/0249785 A1 | 9/2015 | Mehta et al. |
| 2015/0251093 A1 | 9/2015 | Trombetta et al. |
| 2015/0254855 A1 | 9/2015 | Patankar et al. |
| 2015/0256749 A1 | 9/2015 | Frey et al. |
| 2015/0264202 A1 | 9/2015 | Pawlowski |
| 2015/0271389 A1 | 9/2015 | Huang et al. |
| 2015/0277686 A1 | 10/2015 | Laforge et al. |
| 2015/0286724 A1 | 10/2015 | Knaapen et al. |
| 2015/0297185 A1 | 10/2015 | Mccormack et al. |
| 2015/0312182 A1 | 10/2015 | Langholz |
| 2015/0312184 A1 | 10/2015 | Langholz et al. |
| 2015/0312185 A1* | 10/2015 | Langholz ............... G06F 3/0482 348/14.03 |

(56) References Cited

U.S. PATENT DOCUMENTS

| | | |
|---|---|---|
| 2015/0326655 A1 | 11/2015 | Quan et al. |
| 2015/0334075 A1 | 11/2015 | Wang et al. |
| 2015/0341536 A1 | 11/2015 | Huang et al. |
| 2015/0350141 A1 | 12/2015 | Yang et al. |
| 2015/0350533 A1 | 12/2015 | Harris et al. |
| 2015/0350535 A1 | 12/2015 | Voss |
| 2015/0362998 A1 | 12/2015 | Park et al. |
| 2015/0370458 A1 | 12/2015 | Chen |
| 2015/0381896 A1 | 12/2015 | Park et al. |
| 2016/0012567 A1 | 1/2016 | Siddiqui et al. |
| 2016/0026371 A1 | 1/2016 | Lu et al. |
| 2016/0044236 A1 | 2/2016 | Matsuzawa et al. |
| 2016/0048725 A1 | 2/2016 | Holz et al. |
| 2016/0050169 A1 | 2/2016 | Ben Atar et al. |
| 2016/0050351 A1 | 2/2016 | Lee et al. |
| 2016/0055246 A1 | 2/2016 | Marcin et al. |
| 2016/0065832 A1 | 3/2016 | Kim et al. |
| 2016/0065861 A1 | 3/2016 | Steinberg et al. |
| 2016/0077725 A1 | 3/2016 | Maeda |
| 2016/0080639 A1 | 3/2016 | Choi et al. |
| 2016/0088280 A1 | 3/2016 | Sadi et al. |
| 2016/0092035 A1 | 3/2016 | Crocker et al. |
| 2016/0117829 A1 | 4/2016 | Yoon et al. |
| 2016/0127636 A1 | 5/2016 | Ito et al. |
| 2016/0132200 A1 | 5/2016 | Walkin et al. |
| 2016/0142649 A1 | 5/2016 | Yim |
| 2016/0148384 A1 | 5/2016 | Bud et al. |
| 2016/0162039 A1 | 6/2016 | Eilat et al. |
| 2016/0163084 A1 | 6/2016 | Corazza et al. |
| 2016/0173869 A1 | 6/2016 | Srikanth et al. |
| 2016/0188181 A1 | 6/2016 | Smith |
| 2016/0210013 A1 | 7/2016 | Park et al. |
| 2016/0217601 A1 | 7/2016 | Tsuda et al. |
| 2016/0219217 A1 | 7/2016 | Williams et al. |
| 2016/0226926 A1 | 8/2016 | Singh et al. |
| 2016/0241777 A1 | 8/2016 | Rav-Acha et al. |
| 2016/0247309 A1 | 8/2016 | Li et al. |
| 2016/0259413 A1 | 9/2016 | Anzures et al. |
| 2016/0259497 A1 | 9/2016 | Bauer et al. |
| 2016/0259498 A1 | 9/2016 | Foss et al. |
| 2016/0259499 A1 | 9/2016 | Kocienda et al. |
| 2016/0259518 A1 | 9/2016 | King et al. |
| 2016/0259519 A1 | 9/2016 | Foss et al. |
| 2016/0259527 A1 | 9/2016 | Kocienda et al. |
| 2016/0259528 A1 | 9/2016 | Foss et al. |
| 2016/0267067 A1 | 9/2016 | Mays et al. |
| 2016/0283097 A1 | 9/2016 | Voss et al. |
| 2016/0284123 A1 | 9/2016 | Hare et al. |
| 2016/0307324 A1 | 10/2016 | Higuchi et al. |
| 2016/0337570 A1 | 11/2016 | Tan et al. |
| 2016/0337582 A1 | 11/2016 | Shimauchi et al. |
| 2016/0353030 A1 | 12/2016 | Tang et al. |
| 2016/0357353 A1 | 12/2016 | Miura et al. |
| 2016/0357387 A1 | 12/2016 | Bovet et al. |
| 2016/0360116 A1 | 12/2016 | Penha et al. |
| 2016/0360256 A1 | 12/2016 | Albert et al. |
| 2016/0366323 A1 | 12/2016 | Chen et al. |
| 2016/0370974 A1 | 12/2016 | Stenneth |
| 2016/0373631 A1 | 12/2016 | Titi et al. |
| 2016/0373650 A1 | 12/2016 | Kim et al. |
| 2017/0006210 A1 | 1/2017 | Dye et al. |
| 2017/0011773 A1 | 1/2017 | Lee |
| 2017/0013179 A1 | 1/2017 | Kang et al. |
| 2017/0018289 A1 | 1/2017 | Morgenstern |
| 2017/0024872 A1 | 1/2017 | Olsson et al. |
| 2017/0034449 A1 | 2/2017 | Eum et al. |
| 2017/0041549 A1 | 2/2017 | Kim et al. |
| 2017/0041677 A1 | 2/2017 | Anderson et al. |
| 2017/0046065 A1 | 2/2017 | Zeng et al. |
| 2017/0048450 A1 | 2/2017 | Lee et al. |
| 2017/0048461 A1 | 2/2017 | Lee et al. |
| 2017/0048494 A1 | 2/2017 | Boyle et al. |
| 2017/0061635 A1 | 3/2017 | Petrovich et al. |
| 2017/0094019 A1 | 3/2017 | Ahmed et al. |
| 2017/0109912 A1 | 4/2017 | Lee et al. |
| 2017/0111567 A1 | 4/2017 | Pila |
| 2017/0111616 A1 | 4/2017 | Li et al. |
| 2017/0139879 A1 | 5/2017 | Sharifi et al. |
| 2017/0178287 A1 | 6/2017 | Anderson |
| 2017/0186162 A1 | 6/2017 | Mihic et al. |
| 2017/0220212 A1 | 8/2017 | Yang et al. |
| 2017/0230585 A1 | 8/2017 | Nash et al. |
| 2017/0244896 A1 | 8/2017 | Chien et al. |
| 2017/0257559 A1 | 9/2017 | Stricker |
| 2017/0264817 A1 | 9/2017 | Yan et al. |
| 2017/0272654 A1 | 9/2017 | Poindexter, Jr. |
| 2017/0302840 A1 | 10/2017 | Hasinoff et al. |
| 2017/0324784 A1 | 11/2017 | Taine et al. |
| 2017/0336926 A1 | 11/2017 | Chaudhri et al. |
| 2017/0336928 A1 | 11/2017 | Chaudhri et al. |
| 2017/0352379 A1 | 12/2017 | Oh et al. |
| 2017/0359504 A1 | 12/2017 | Manzari et al. |
| 2017/0359505 A1 | 12/2017 | Manzari et al. |
| 2017/0359506 A1 | 12/2017 | Manzari et al. |
| 2017/0366729 A1 | 12/2017 | Itoh |
| 2018/0047200 A1 | 2/2018 | O'Hara et al. |
| 2018/0077332 A1 | 3/2018 | Shimura et al. |
| 2018/0091732 A1 | 3/2018 | Wilson et al. |
| 2018/0095649 A1 | 4/2018 | Valdivia et al. |
| 2018/0096487 A1 | 4/2018 | Nash et al. |
| 2018/0109722 A1 | 4/2018 | Laroia et al. |
| 2018/0113577 A1 | 4/2018 | Burns et al. |
| 2018/0114543 A1 | 4/2018 | Novikoff |
| 2018/0120661 A1 | 5/2018 | Kilgore et al. |
| 2018/0124299 A1 | 5/2018 | Brook |
| 2018/0129224 A1 | 5/2018 | Hur |
| 2018/0131878 A1 | 5/2018 | Charlton et al. |
| 2018/0146132 A1 | 5/2018 | Manzari et al. |
| 2018/0152611 A1 | 5/2018 | Li et al. |
| 2018/0191944 A1 | 7/2018 | Carbonell et al. |
| 2018/0227479 A1 | 8/2018 | Parameswaran et al. |
| 2018/0227482 A1 | 8/2018 | Holzer et al. |
| 2018/0227505 A1 | 8/2018 | Baltz et al. |
| 2018/0234608 A1 | 8/2018 | Sudo et al. |
| 2018/0262677 A1 | 9/2018 | Dye et al. |
| 2018/0267703 A1 | 9/2018 | Kamimaru et al. |
| 2018/0270420 A1 | 9/2018 | Lee et al. |
| 2018/0278823 A1 | 9/2018 | Horesh |
| 2018/0284979 A1 | 10/2018 | Choi et al. |
| 2018/0288310 A1 | 10/2018 | Goldenberg |
| 2018/0302551 A1 | 10/2018 | Yamajo et al. |
| 2018/0302568 A1 | 10/2018 | Kim et al. |
| 2018/0308282 A1 | 10/2018 | Yokoi |
| 2018/0335927 A1 | 11/2018 | Anzures et al. |
| 2018/0335929 A1 | 11/2018 | Scapel et al. |
| 2018/0335930 A1 | 11/2018 | Scapel et al. |
| 2018/0336715 A1 | 11/2018 | Rickwald et al. |
| 2018/0349008 A1 | 12/2018 | Manzari et al. |
| 2018/0352165 A1 | 12/2018 | Zhen et al. |
| 2018/0376122 A1 | 12/2018 | Park et al. |
| 2019/0028650 A1 | 1/2019 | Bernstein et al. |
| 2019/0029513 A1 | 1/2019 | Gunnerson et al. |
| 2019/0082097 A1 | 3/2019 | Manzari et al. |
| 2019/0121216 A1 | 4/2019 | Shabtay et al. |
| 2019/0149706 A1 | 5/2019 | Rivard et al. |
| 2019/0174054 A1 | 6/2019 | Srivastava et al. |
| 2019/0199926 A1 | 6/2019 | An et al. |
| 2019/0205861 A1 | 7/2019 | Bace |
| 2019/0206031 A1 | 7/2019 | Kim et al. |
| 2019/0230400 A1 | 7/2019 | Van Os et al. |
| 2019/0235743 A1 | 8/2019 | Ono |
| 2019/0250812 A1 | 8/2019 | Davydov et al. |
| 2019/0253619 A1 | 8/2019 | Davydov et al. |
| 2019/0289201 A1 | 9/2019 | Nishimura et al. |
| 2019/0342507 A1 | 11/2019 | Dye et al. |
| 2020/0045245 A1 | 2/2020 | Van Os et al. |
| 2020/0059605 A1 | 2/2020 | Liu et al. |
| 2020/0082599 A1 | 3/2020 | Manzari |
| 2020/0105003 A1 | 4/2020 | Stauber et al. |
| 2020/0106952 A1 | 4/2020 | Missig et al. |
| 2020/0128191 A1 | 4/2020 | Sun et al. |
| 2020/0142577 A1 | 5/2020 | Manzari et al. |
| 2020/0221020 A1 | 7/2020 | Manzari et al. |

(56) References Cited

U.S. PATENT DOCUMENTS

| | | |
|---|---|---|
| 2020/0234508 A1 | 7/2020 | Shaburov et al. |
| 2020/0285851 A1 | 9/2020 | Lin et al. |
| 2020/0358963 A1 | 11/2020 | Manzari et al. |

FOREIGN PATENT DOCUMENTS

| | | |
|---|---|---|
| CN | 1705346 A | 12/2005 |
| CN | 101068311 A | 11/2007 |
| CN | 101243383 A | 8/2008 |
| CN | 101282422 A | 10/2008 |
| CN | 101310519 A | 11/2008 |
| CN | 101364031 A | 2/2009 |
| CN | 101388965 A | 3/2009 |
| CN | 101427574 A | 5/2009 |
| CN | 101778220 A | 7/2010 |
| CN | 101883213 A | 11/2010 |
| CN | 102075727 A | 5/2011 |
| CN | 102088554 A | 6/2011 |
| CN | 102457661 A | 5/2012 |
| CN | 102567953 A | 7/2012 |
| CN | 202309894 U | 7/2012 |
| CN | 202330968 U | 7/2012 |
| CN | 103051837 A | 4/2013 |
| CN | 103051841 A | 4/2013 |
| CN | 103297719 A | 9/2013 |
| CN | 103309602 A | 9/2013 |
| CN | 103685925 A | 3/2014 |
| CN | 103702039 A | 4/2014 |
| CN | 103945275 A | 7/2014 |
| CN | 103947190 A | 7/2014 |
| CN | 103970472 A | 8/2014 |
| CN | 104159177 A | 11/2014 |
| CN | 104270597 A | 1/2015 |
| CN | 104346080 A | 2/2015 |
| CN | 104423946 A | 3/2015 |
| CN | 104461288 A | 3/2015 |
| CN | 104461894 A | 3/2015 |
| CN | 104754203 A | 7/2015 |
| CN | 104952063 A | 9/2015 |
| CN | 105190511 A | 12/2015 |
| CN | 105493138 A | 4/2016 |
| CN | 105611215 A | 5/2016 |
| CN | 105630290 A | 6/2016 |
| CN | 105653031 A | 6/2016 |
| CN | 105765967 A | 7/2016 |
| CN | 105991915 A | 10/2016 |
| CN | 106067947 A | 11/2016 |
| CN | 106161956 A | 11/2016 |
| CN | 106210184 A | 12/2016 |
| CN | 106210550 A | 12/2016 |
| CN | 106257909 A | 12/2016 |
| CN | 106303280 A | 1/2017 |
| CN | 106303690 A | 1/2017 |
| CN | 106341611 A | 1/2017 |
| CN | 106375662 A | 2/2017 |
| CN | 106412214 A | 2/2017 |
| CN | 106412412 A | 2/2017 |
| CN | 106412445 A | 2/2017 |
| CN | 106445219 A | 2/2017 |
| CN | 106791377 A | 5/2017 |
| CN | 107079141 A | 8/2017 |
| CN | 107533356 A | 1/2018 |
| CN | 107566721 A | 1/2018 |
| CN | 107580693 A | 1/2018 |
| CN | 107770448 A | 3/2018 |
| CN | 107800945 A | 3/2018 |
| CN | 107820011 A | 3/2018 |
| CN | 108353126 A | 7/2018 |
| CN | 108391053 A | 8/2018 |
| CN | 108513070 A | 9/2018 |
| CN | 108668083 A | 10/2018 |
| CN | 108848308 A | 11/2018 |
| CN | 108886569 A | 11/2018 |
| CN | 109496425 A | 3/2019 |
| CN | 109644229 A | 4/2019 |
| DK | 201670753 A1 | 1/2018 |
| DK | 201670755 A1 | 1/2018 |
| DK | 201670627 A1 | 2/2018 |
| EP | 1278099 A1 | 1/2003 |
| EP | 1592212 A1 | 11/2005 |
| EP | 1953663 A1 | 8/2008 |
| EP | 2482179 A2 | 8/2012 |
| EP | 2487613 A1 | 8/2012 |
| EP | 2487913 A2 | 8/2012 |
| EP | 2579572 A1 | 4/2013 |
| EP | 2640060 A1 | 9/2013 |
| EP | 2682855 A2 | 1/2014 |
| EP | 2950198 A1 | 12/2015 |
| EP | 2966855 A2 | 1/2016 |
| EP | 3012732 A1 | 4/2016 |
| EP | 3026636 A1 | 6/2016 |
| EP | 3051525 A1 | 8/2016 |
| EP | 3209012 A1 | 8/2017 |
| EP | 3211587 A1 | 8/2017 |
| EP | 2556665 B1 | 8/2018 |
| EP | 3393119 A1 | 10/2018 |
| EP | 3457680 A1 | 3/2019 |
| EP | 3633975 A1 | 4/2020 |
| GB | 2515797 A | 1/2015 |
| GB | 2523670 A | 9/2015 |
| JP | 2-179078 A | 7/1990 |
| JP | 9-116792 A | 5/1997 |
| JP | 11-355617 A | 12/1999 |
| JP | 2000-207549 A | 7/2000 |
| JP | 2000-244905 A | 9/2000 |
| JP | 2001-298649 A | 10/2001 |
| JP | 2003-8964 A | 1/2003 |
| JP | 2003-18438 A | 1/2003 |
| JP | 2003-241293 A | 8/2003 |
| JP | 2004-015595 A | 1/2004 |
| JP | 2004-135074 A | 4/2004 |
| JP | 2005-31466 A | 2/2005 |
| JP | 2005-191641 A | 7/2005 |
| JP | 3872041 B2 | 1/2007 |
| JP | 2007-028211 A | 2/2007 |
| JP | 2007-124398 A | 5/2007 |
| JP | 2008-66978 A | 3/2008 |
| JP | 2009-105919 A | 5/2009 |
| JP | 2009-212899 A | 9/2009 |
| JP | 2009-545256 A | 12/2009 |
| JP | 2010-119147 A | 5/2010 |
| JP | 2010-160581 A | 7/2010 |
| JP | 2010-182023 A | 8/2010 |
| JP | 2010-268052 A | 11/2010 |
| JP | 2011-91570 A | 5/2011 |
| JP | 2011-124864 A | 6/2011 |
| JP | 2011-211552 A | 10/2011 |
| JP | 2012-89973 A | 5/2012 |
| JP | 2012-124608 A | 6/2012 |
| JP | 2012-147379 A | 8/2012 |
| JP | 2013-70303 A | 4/2013 |
| JP | 2013-106289 A | 5/2013 |
| JP | 2013-546238 A | 12/2013 |
| JP | 2014-23083 A | 2/2014 |
| JP | 2014-212415 A | 11/2014 |
| JP | 2015-1716 A | 1/2015 |
| JP | 2015-22716 A | 2/2015 |
| JP | 2015-50713 A | 3/2015 |
| JP | 2015-146619 A | 8/2015 |
| JP | 2015-180987 A | 10/2015 |
| JP | 2016-72965 A | 5/2016 |
| KR | 10-2012-0025872 A | 3/2012 |
| KR | 10-2012-0048397 A | 5/2012 |
| KR | 10-2012-0057696 A | 6/2012 |
| KR | 10-2012-0093322 A | 8/2012 |
| KR | 10-2013-0033445 A | 4/2013 |
| KR | 10-2014-0049850 A | 4/2014 |
| KR | 10-2014-0062801 A | 5/2014 |
| KR | 10-2015-0014290 A | 2/2015 |
| KR | 10-2015-0024899 A | 3/2015 |
| KR | 10-2016-0016910 A | 2/2016 |
| KR | 10-2016-0019145 A | 2/2016 |
| KR | 10-2016-0020791 A | 2/2016 |
| KR | 10-2016-0075583 A | 6/2016 |

(56) References Cited

FOREIGN PATENT DOCUMENTS

| KR | 10-1674959 B1 | 11/2016 |
| KR | 10-2017-0123125 A | 11/2017 |
| KR | 10-2017-0135975 A | 12/2017 |
| KR | 10-2018-0017227 A | 2/2018 |
| KR | 10-2018-0037076 A | 4/2018 |
| KR | 10-2018-0095331 A | 8/2018 |
| KR | 10-2018-0108847 A | 10/2018 |
| KR | 10-2018-0137610 A | 12/2018 |
| KR | 10-2019-0034248 A | 4/2019 |
| WO | 1999/39307 A1 | 8/1999 |
| WO | 2005/043892 A1 | 5/2005 |
| WO | 2007/126707 A1 | 11/2007 |
| WO | 2008/014301 A2 | 1/2008 |
| WO | 2010/102678 A1 | 9/2010 |
| WO | 2012/001947 A1 | 1/2012 |
| WO | 2012/006251 A1 | 1/2012 |
| WO | 2012/051720 A2 | 4/2012 |
| WO | 2013/082325 A1 | 6/2013 |
| WO | 2013/152453 A1 | 10/2013 |
| WO | 2013/152454 A1 | 10/2013 |
| WO | 2013/189058 A1 | 12/2013 |
| WO | 2014/066115 A1 | 5/2014 |
| WO | 2014/105276 A1 | 7/2014 |
| WO | 2014/159779 A1 | 10/2014 |
| WO | 2014/160819 A1 | 10/2014 |
| WO | 2014/200734 A1 | 12/2014 |
| WO | 2015/027912 A1 | 3/2015 |
| WO | 2015/037211 A1 | 3/2015 |
| WO | 2015/080744 A1 | 6/2015 |
| WO | 2015/085042 A1 | 6/2015 |
| WO | 2015/112868 A1 | 7/2015 |
| WO | 2015/144209 A1 | 10/2015 |
| WO | 2015/183438 A1 | 12/2015 |
| WO | 2015/187494 A1 | 12/2015 |
| WO | 2015/190666 A1 | 12/2015 |
| WO | 2016/064435 A1 | 4/2016 |
| WO | 2016/145129 A1 | 9/2016 |
| WO | 2016/172619 A1 | 10/2016 |
| WO | 2016/204936 A1 | 12/2016 |
| WO | 2017/058834 A1 | 4/2017 |
| WO | 2017/153771 A1 | 9/2017 |
| WO | 2017/201326 A1 | 11/2017 |
| WO | 2017/218193 A1 | 12/2017 |
| WO | 2018/006053 A1 | 1/2018 |
| WO | 2018/048838 A1 | 3/2018 |
| WO | 2018/049430 A2 | 3/2018 |
| WO | 2018/057268 A1 | 3/2018 |
| WO | 2018/099037 A1 | 6/2018 |
| WO | 2018/159864 A1 | 9/2018 |
| WO | 2018/212802 A1 | 11/2018 |

OTHER PUBLICATIONS

Notice of Allowance received for Chinese Patent Application No. 202010287975.2, dated Mar. 1, 2021, 7 pages (3 pages of English Translation and 4 pages of Official Copy).
Office Action received for Chinese Patent Application No. 202010218168.5, dated Feb. 9, 2021, 21 pages (9 pages of English Translation and 12 pages of Official Copy).
Office Action received for Indian Patent Application No. 201814036470, dated Feb. 26, 2021, 7 pages.
Office Action received for Korean Patent Application No. 10-2021-0022053, dated Mar. 1, 2021, 11 pages (5 pages of English Translation and 6 pages of Official Copy).
Supplemental Notice of Allowance received for U.S. Appl. No. 16/733,718, dated Mar. 9, 2021, 21 pages.
Decision to Grant received for Danish Patent Application No. PA201970601, dated Feb. 3, 2021, 2 pages.
Decision to Grant received for Japanese Patent Application No. 2020-070418, dated Feb. 8, 2021, 3 pages (1 page of English Translation and 2 pages of Official Copy).

Notice of Allowance received for Chinese Patent Application No. 201910692978.1, dated Feb. 4, 2021, 6 pages (3 pages of English Translation and 3 pages of Official Copy).
Notice of Allowance received for Chinese Patent Application No. 201911202668.3, dated Feb. 4, 2021, 5 pages (2 pages of English Translation and 3 pages of Official Copy).
Notice of Allowance received for U.S. Appl. No. 16/733,718, dated Feb. 5, 2021, 14 pages.
Office Action received for Chinese Patent Application No. 202010287953.6, dated Jan. 14, 2021, 14 pages (7 pages of English Translation and 7 pages of Official Copy).
Office Action received for Danish Patent Application No. PA201970593, dated Feb. 2, 2021, 2 pages.
Office Action received for Korean Patent Application No. 10-2021-7000954, dated Jan. 28, 2021, 5 pages (2 pages of English Translation and 3 pages of Official Copy).
Pre-Appeal Review Report received for Japanese Patent Application No. 2018-182607, dated Jan. 21, 2021, 4 pages (2 pages of English Translation and 2 pages of Official Copy).
Summons to Attend Oral Proceedings received for European Patent Application No. 19724959.2, mailed on Feb. 1, 2021, 9 pages.
Certificate of Examination received for Australian Patent Application No. 2020104220, dated Apr. 1, 2021, 2 pages.
Decision on Appeal received for Japanese Patent Application No. 2018-225131, dated Mar. 11, 2021, 5 pages (4 pages of English Translation and 1 page of Official Copy).
Decision on Appeal received for Japanese Patent Application No. 2018-545502, dated Mar. 25, 2021, 3 pages (1 page of English Translation and 2 pages of Official Copy).
International Preliminary Report on Patentability received for PCT Patent Application No. PCT/US2019/049101, dated Mar. 25, 2021, 17 pages.
Non-Final Office Action received for U.S. Appl. No. 16/367,702, dated Mar. 19, 2021, 18 pages.
Notice of Acceptance received for Australian Patent Application No. 2021201167, dated Mar. 15, 2021, 3 pages.
Notice of Allowance received for Chinese Patent Application No. 202010287953.6, dated Mar. 18, 2021, 7 pages (3 pages of English Translation and 4 pages of Official Copy).
Notice of Allowance received for Korean Patent Application No. 10-2020-0052618, dated Mar. 23, 2021, 5 pages (2 page of English Translation and 3 pages of Official Copy).
Notice of Allowance received for Korean Patent Application No. 10-2020-7031855, dated Mar. 22, 2021, 5 pages (1 page of English Translation and 4 pages of Official Copy).
Office Action received for Chinese Patent Application No. 202010287950.2, dated Feb. 20, 2021, 22 pages (10 pages of English Translation and 12 pages of Official Copy).
Office Action received for Indian Patent Application No. 201917053025, dated Mar. 19, 2021, 7 pages.
Summons to Attend Oral Proceedings received for European Patent Application No. 19724959.2, mailed on Mar. 31, 2021, 3 pages.
Supplemental Notice of Allowance received for U.S. Appl. No. 16/733,718, dated Mar. 29, 2021, 2 pages.
"[B612] Addition of facial recognition bear/cat stamps and AR background function having moving sparkles or hearts", Available Online at: htpps://apptopi.jp/2017/01/22/b612, Jan. 22, 2017, 11 pages (Official Copy Only) {See Communication under Rule 37 CFR § 1.98(a) (3)}.
Advisory Action received for U.S. Appl. No. 16/144,629, dated Dec. 13, 2019, 9 pages.
Android Police, "Galaxy S9+ In-Depth Camera Review", See Especially 0:43-0:53; 1:13-1:25; 1:25-1:27; 5:11-5:38; 6:12-6:26, Available Online at <https://www.youtube.com/watch?v=GZHYCdMCv-w>, Apr. 19, 2018, 3 pages.
Applicant-Initiated Interview Summary received for U.S. Appl. No. 15/995,040, dated Dec. 23, 2019, 5 pages.
Applicant-Initiated Interview Summary received for U.S. Appl. No. 15/995,040, dated Jul. 27, 2020, 4 pages.
Applicant-Initiated Interview Summary received for U.S. Appl. No. 16/144,629, dated Jul. 2, 2020, 5 pages.
Applicant-Initiated Interview Summary received for U.S. Appl. No. 16/271,583 dated Mar. 2, 2020, 3 pages.

(56) References Cited

OTHER PUBLICATIONS

Applicant-Initiated Interview Summary received for U.S. Appl. No. 16/271,583, dated Jul. 14, 2020, 4 pages.
Applicant-Initiated Interview Summary received for U.S. Appl. No. 16/367,702, dated Jul. 28, 2020, 3 pages.
Applicant-Initiated Interview Summary received for U.S. Appl. No. 16/528,941, dated Jun. 19, 2020, 3 pages.
Applicant-Initiated Interview Summary received for U.S. Appl. No. 16/584,100, dated Feb. 19, 2020, 3 pages.
Applicant-Initiated Interview Summary received for U.S. Appl. No. 16/586,344, dated Feb. 27, 2020, 3 pages.
Astrovideo, "AstroVideo enables you to use a low-cost, low-light video camera to capture astronomical images", Available online at: https://www.coaa.co.uk/astrovideo.htm, Retrieved on: Nov. 18, 2019, 5 pages.
AZ Screen Recorder, "AZ Screen Recorder", Online Available at <https://www.youtube.com/watch?v=IIc9nKoL9JY>, Published on Jan. 15, 2015, 3 pages.
AZ Screen Recorder, "Full features—AZ Screen Recorder", Online Available at <https://www.youtube.com/watch?v=L6tAMO_Bu34>, Published on Feb. 13, 2015, 3 pages.
AZ Screen Recorder, "GIF converter—AZ Screen Recorder", Online Available at <https://www.youtube.com/watch?v=gA19pr1QOFM>, May 29, 2015, 2 pages.
Banaś IWO, "SCR Free Sample", Available online at: https://www.youtube.com/watch?v=ZfLDulGdcQM, Jun. 13, 2013, 1 page.
Brief Communication regarding Oral Proceedings received for European Patent Application No. 17184710.6, mailed on Feb. 19, 2020, 2 pages.
Brief Communication regarding Oral Proceedings received for European Patent Application No. 17184710.6, mailed on Mar. 9, 2020, 2 pages.
Certificate of Examination received for Australian Patent Application No. 2017100683, dated Jan. 16, 2018, 2 pages.
Certificate of Examination received for Australian Patent Application No. 2019100420, dated Jul. 3, 2019, 2 pages.
Certificate of Examination received for Australian Patent Application No. 2019100794, dated Dec. 19, 2019, 2 pages.
Certificate of Examination received for Australian Patent Application No. 2020100189, dated May 12, 2020, 2 pages.
Channel Highway, "Virtual Makeover in Real-time and in full 3D", Available online at:—https://www.youtube.com/watch?v=NgUbBzb5qZg, Feb. 16, 2016, 1 page.
Corrected Notice of Allowance received for U.S. Appl. No. 14/641,251, dated Jun. 17, 2016, 2 pages.
Corrected Notice of Allowance received for U.S. Appl. No. 15/268,115, dated Apr. 13, 2018, 11 pages.
Corrected Notice of Allowance received for U.S. Appl. No. 15/268,115, dated Mar. 21, 2018, 9 pages.
Corrected Notice of Allowance received for U.S. Appl. No. 15/273,453, dated Dec. 21, 2017, 3 pages.
Corrected Notice of Allowance received for U.S. Appl. No. 15/273,453, dated Feb. 8, 2018, 2 pages.
Corrected Notice of Allowance received for U.S. Appl. No. 15/273,453, dated Nov. 27, 2017, 2 pages.
Corrected Notice of Allowance received for U.S. Appl. No. 15/273,503, dated Nov. 2, 2017, 2 pages.
Corrected Notice of Allowance received for U.S. Appl. No. 15/273,503, dated Nov. 24, 2017, 2 pages.
Corrected Notice of Allowance received for U.S. Appl. No. 15/858,175, dated Sep. 21, 2018, 2 pages.
Corrected Notice of Allowance received for U.S. Appl. No. 16/143,097, dated Nov. 8, 2019, 3 pages.
Corrected Notice of Allowance received for U.S. Appl. No. 16/191,117, dated Dec. 9, 2019, 2 pages.
Corrected Notice of Allowance received for U.S. Appl. No. 16/191,117, dated Feb. 28, 2020, 2 pages.
Corrected Notice of Allowance received for U.S. Appl. No. 16/191,117, dated Nov. 20, 2019, 2 pages.
Corrected Notice of Allowance received for U.S. Appl. No. 16/582,595, dated Apr. 7, 2020, 5 pages.
Corrected Notice of Allowance received for U.S. Appl. No. 16/582,595, dated Apr. 22, 2020, 5 pages.
Corrected Notice of Allowance received for U.S. Appl. No. 16/583,020, dated Mar. 24, 2020, 2 pages.
Corrected Notice of Allowance received for U.S. Appl. No. 16/584,044, dated Apr. 16, 2020, 3 pages.
Corrected Notice of Allowance received for U.S. Appl. No. 16/584,044, dated Jan. 29, 2020, 3 pages.
Corrected Notice of Allowance received for U.S. Appl. No. 16/584,044, dated Mar. 4, 2020, 2 pages.
Corrected Notice of Allowance received for U.S. Appl. No. 16/584,100, dated Feb. 21, 2020, 9 pages.
Corrected Notice of Allowance received for U.S. Appl. No. 16/584,693, dated Feb. 21, 2020, 15 pages.
Corrected Notice of Allowance received for U.S. Appl. No. 16/584,693, dated Mar. 4, 2020, 2 pages.
Corrected Notice of Allowance received for U.S. Appl. No. 16/584,693, dated Mar. 20, 2020, 2 pages.
Corrected Notice of Allowance received for U.S. Appl. No. 16/586,314, dated Apr. 8, 2020, 5 pages.
Corrected Notice of Allowance received for U.S. Appl. No. 16/586,314, dated Mar. 4, 2020, 3 pages.
Corrected Notice of Allowance received for U.S. Appl. No. 16/586,344, dated Apr. 7, 2020, 4 pages.
Corrected Notice of Allowance received for U.S. Appl. No. 16/586,344, dated Jan. 23, 2020, 4 pages.
Corrected Notice of Allowance received for U.S. Appl. No. 16/586,344, dated Mar. 17, 2020, 4 pages.
Decision of Refusal received for Japanese Patent Application No. 2018-243463, dated Feb. 25, 2019, 8 pages (5 pages of English Translation and 3 pages of Official Copy).
Decision of Refusal received for Japanese Patent Application No. 2018-545502, dated Feb. 25, 2019, 11 pages (7 pages of English Translation and 4 pages of Official Copy).
Decision to Grant received for Danish Patent Application No. PA201570788, dated Jul. 10, 2017, 2 pages.
Decision to Grant received for Danish Patent Application No. PA201570791, dated Jun. 7, 2017, 2 pages.
Decision to Grant received for Danish Patent Application No. PA201670627, dated Nov. 29, 2018, 2 pages.
Decision to Grant received for Danish Patent Application No. PA201670753, dated Mar. 6, 2019, 2 pages.
Decision to Grant received for Danish Patent Application No. PA201670755, dated Mar. 6, 2019, 2 pages.
Decision to Grant received for European Patent Application No. 15712218.5, dated Jun. 7, 2018, 2 pages.
Decision to Grant received for European Patent Application No. 18176890.4, dated Jul. 9, 2020, 3 pages.
Decision to Grant received for European Patent Application No. 18214698.5, dated Sep. 10, 2020, 3 pages.
Decision to Grant received for Japanese Patent Application No. 2018-243463, dated Aug. 17, 2020, 2 pages (1 page of English Translation and 1 page of Official Copy).
Decision to Refuse received for European Patent Application No. 17184710.6, dated Jun. 16, 2020, 9 pages.
Decision to Refuse received for Japanese Patent Application No. 2018-225131, dated Jul. 8, 2019, 6 pages (4 pages of English Translation and 2 pages of Official Copy).
Decision to Refuse received for Japanese Patent Application No. 2018-243463, dated Jul. 8, 2019, 5 pages (3 pages of English Translation and 2 pages of Official Copy).
Decision to Refuse received for Japanese Patent Application No. 2018-545502, dated Jul. 8, 2019, 5 pages (3 pages of English Translation and 2 pages of Official Copy).
Digital Trends, "ModiFace Partners With Samsung to Bring AR Makeup to the Galaxy S9", Available online at:—https://www.digitaltrends.com/mobile/modiface-samsung-partnership-ar-makeup-galaxy-s9/, 2018, 16 pages.
European Search Report received for European Patent Application No. 18209460.7, dated Mar. 15, 2019, 4 pages.

(56) References Cited

OTHER PUBLICATIONS

European Search Report received for European Patent Application No. 18214698.5, dated Mar. 21, 2019, 5 pages.
Extended European Search Report received for European Patent Application No. 16808015.8, dated May 2, 2018, 13 pages.
Extended European Search Report received for European Patent Application No. 19204230.7, dated Feb. 21, 2020, 7 pages.
Extended European Search Report received for European Patent Application No. 20168009.7, dated Sep. 11, 2020, 12 pages.
Extended Search Report received for European Patent Application 17809168.2, dated Jun. 28, 2018, 9 pages.
Fedko Daria, "AR Hair Styles", Online Available at <https://www.youtube.com/watch?v=FrS6tHRbFE0>, Jan. 24, 2017, 2 pages.
Final Office Action received for U.S. Appl. No. 14/863,616, dated Apr. 24, 2017, 18 pages.
Final Office Action received for U.S. Appl. No. 14/863,616, dated Aug. 10, 2018, 16 pages.
Final Office Action received for U.S. Appl. No. 15/268,115, dated Oct. 11, 2017, 48 pages.
Final Office Action received for U.S. Appl. No. 15/728,147, dated Aug. 29, 2018, 39 pages.
Final Office Action received for U.S. Appl. No. 15/728,147, dated May 28, 2019, 45 pages.
Final Office Action received for U.S. Appl. No. 15/995,040, dated Oct. 17, 2019, 20 pages.
Final Office Action received for U.S. Appl. No. 15/995,040, dated Sep. 2, 2020, 21 pages.
Final Office Action received for U.S. Appl. No. 16/144,629, dated Sep. 11, 2020, 22 pages.
Final Office Action received for U.S. Appl. No. 16/144,629, dated Sep. 18, 2019, 22 pages.
Final Office Action received for U.S. Appl. No. 16/271,583, dated Aug. 26, 2020, 18 pages.
Final Office Action received for U.S. Appl. No. 16/367,702, dated Sep. 18, 2020, 18 pages.
Final Office Action received for U.S. Appl. No. 16/528,941, dated Jul. 13, 2020, 15 pages.
Franks Tech Help, "DSLR Camera Remote Control on Android Tablet, DSLR Dashboard, Nexus 10, Canon Camera, OTG Host Cable", Available online at : https://www.youtube.com/watch?v=DD4dCVinreU, Dec. 10, 2013, 1 page.
Fuji Film, "Taking Pictures Remotely : Free iPhone/Android App Fuji Film Camera Remote", Available at <http://app.fujifilm-dsc.com/en/camera_remote/guide05.html>, Apr. 22, 2014, 3 pages.
Gadgets Portal, "Galaxy J5 Prime Camera Review! (vs J7 Prime) 4K", Available Online at :—https://www.youtube.com/watch?v=Rf2Gy8QmDqc, Oct. 24, 2016, 3 pages.
Gavin's Gadgets, "Honor 10 Camera App Tutorial—How to use All Modes + 90 Photos Camera Showcase", See Especially 2:58-4:32, Available Online at <https://www.youtube.com/watch?v=M5XZwXJcK74>, May 26, 2018, 3 pages.
Gibson Andrews. , "Aspect Ratio: What it is and Why it Matters", Retrieved from <https://web.archive.org/web/20190331225429/https:/digital-photography-school.com/aspect-ratio-what-it-is-and-why-it-matters/>, Paragraphs: "Adjusting aspect ratio in-camera", "Cropping in post-processing", Mar. 31, 2019, 10 pages.
GSM Arena, "Honor 10 Review : Camera", Available Online at <https://web.archive.org/web/20180823142417/https://www.gsmarena.com/honor_10-review-1771p5.php>, Aug. 23, 2018, 11 pages.
Hall Brent, "Samsung Galaxy Phones Pro Mode (S7/S8/S9/Note 8/Note 9): When, why, & How to Use It", See Especially 3:18-5:57, Available Online at <https://www.youtube.com/watch?v=KwPxGUDRkTg>, Jun. 19, 2018, 3 pages.
Helpvideostv, "How to Use Snap Filters on Snapchat", Retrieved from <https://www.youtube.com/watch?v=oR-7cIWPszU&feature=youtu.be>, Mar. 22, 2017, pp. 1-2.
Hernández Carlos, "Lens Blur in the New Google Camera App", Available online at: https://research.googleblog.com/2014/04/lens-blur-in-new-google-camera-app.html, https://ai.googleblog.com/2014/04/lens-blur-in-new-google-camera-app.html, Apr. 16, 2014, 6 pages.
Huawei Mobile PH, "Huawei P10 Tips & Tricks: Compose Portraits With Wide Aperture (Bokeh)", Available Online at <https://www.youtube.com/watch?v=WM4yo5-hrrE>, Mar. 30, 2017, 2 pages.
Iluvtrading, "Galaxy S10 / S10+: How to Use Bright Night Mode for Photos (Super Night Mode)", Online Available at: https://www.youtube.com/watch?v=SfZ7Us1S1Mk, Mar. 11, 2019, 4 pages.
Iluvtrading, "Super Bright Night Mode: Samsung Galaxy S1O vs Huawei P30 Pro (Review/How to/Explained)", Online Available at: https://www.youtube.com/watch?v=d4r3PWioY4Y, Apr. 26, 2019, 4 pages.
Intention to Grant received for Danish Patent Application No. PA201570788, dated Mar. 27, 2017, 2 pages.
Intention to Grant received for Danish Patent Application No. PA201570791, dated Mar. 7, 2017, 2 pages.
Intention to Grant received for Danish Patent Application No. PA201670627, dated Jun. 11, 2018, 2 pages.
Intention to Grant received for Danish Patent Application No. PA201670753, dated Oct. 29, 2018, 2 pages.
Intention to Grant received for Danish Patent Application No. PA201670755, dated Nov. 13, 2018, 2 pages.
Intention to Grant received for Danish Patent Application No. PA201970601, dated Sep. 21, 2020, 2 pages.
Intention to Grant received for European Patent Application No. 15712218.5, dated Jan. 24, 2018, 7 pages.
Intention to Grant received for European Patent Application No. 18176890.4, dated Feb. 28, 2020, 8 pages.
Intention to Grant received for European Patent Application No. 18214698.5, dated Apr. 21, 2020, 8 pages.
International Preliminary Report on Patentability received for PCT Patent Application No. PCT/US2015/019298, dated Mar. 16, 2017, 12 pages.
International Preliminary Report on Patentability received for PCT Patent Application No. PCT/US2016/033946, dated Dec. 21, 2017, 11 pages.
International Preliminary Report on Patentability received for PCT Patent Application No. PCT/US2017/035321, dated Dec. 27, 2018, 11 pages.
International Preliminary Report on Patentability received for PCT Patent Application No. PCT/US2018/015591, dated Dec. 19, 2019, 10 pages.
International Preliminary Report on Patentability received for PCT Patent Application No. PCT/US2019/017363, dated Aug. 20, 2020, 9 pages.
International Search Report and Written Opinion received for PCT Patent Application No. PCT/US2015/019298, dated Jul. 13, 2015, 17 pages.
International Search Report and Written Opinion received for PCT Patent Application No. PCT/US2016/033946, dated Oct. 18, 2016, 14 pages.
International Search Report and Written Opinion received for PCT Patent Application No. PCT/US2017/035321, dated Oct. 6, 2017, 15 pages.
International Search Report and Written Opinion received for PCT Patent Application No. PCT/US2018/015591, dated Jun. 14, 2018, 14 pages.
International Search Report and Written Opinion received for PCT Patent Application No. PCT/US2019/017363, dated Aug. 12, 2019, 12 pages.
International Search Report and Written Opinion received for PCT Patent Application No. PCT/US2019/024067, dated Oct. 9, 2019, 18 pages.
International Search Report and Written Opinion received for PCT Patent Application No. PCT/US2019/049101, dated Dec. 16, 2019, 26 pages.
Invitation to Pay Additional Fees and Partial International Search Report received for PCT Patent Application No. PCT/US2019/049101, dated Oct. 24, 2019, 17 pages.

(56) References Cited

OTHER PUBLICATIONS

Invitation to Pay Additional Fees received for PCT Patent Application No. PCT/US2016/033946, dated Aug. 2, 2016, 2 pages.
Invitation to Pay Additional Fees received for PCT Patent Application No. PCT/US2017/035321, dated Aug. 17, 2017, 3 pages.
Invitation to Pay Additional Fees received for PCT Patent Application No. PCT/US2019/017363, dated Jun. 17, 2019, 8 pages.
Invitation to Pay Additional Fees received for PCT Patent Application No. PCT/US2019/024067, dated Jul. 16, 2019, 13 pages.
Invitation to Pay Additional Fees received for PCT Patent Application No. PCT/US2020/031643, dated Sep. 9, 2020, 30 pages.
Invitation to Pay Search Fees received for European Patent Application No. 19724959.2, dated Feb. 25, 2020, 3 pages.
"IPhone User Guide for iOS 4.2 and 4.3 Software", Available at https://manuals.info.apple.com/MANUALS/1000/MA1539/en_US/iPhone_iOS4_User_Guide.pdf, 2011, 274 pages.
Iskandar et al., "Going Social with ReplayKit and Game Center What's new in social gaming", Available online at: http://devstreaming.apple.com/videos/wwdc/2015/6053hq2fz0ebo0lm/605/605_going_social_with_replaykit_and_game_center.pdf?dl=1, Jun. 8, 2015, 103 pages.
KK World, "Redmi Note 7 Pro Night Camera Test I Night Photography with Night Sight & Mode", Online Available at: https://www.youtube.com/watch?v=3EKjGBjX3PY, Mar. 26, 2019, 4 pages.
Kozak Tadeusz, "When You're Video Chatting on Snapchat, How Do You Use Face Filters?", Quora, Online Available at: https://www.quora.com/When-youre-video-chatting-on-Snapchat-how-do-you-use-face-filters, Apr. 29, 2018, 1 page.
Lang Brian, "How to Audio & Video Chat with Multiple Users at the Same Time in Groups", Snapchat 101, Online Available at: <https://smartphones.gadgethacks.com/how-to/snapchat-101-audio-video-chat-with-multiple-users-same-time-groups-0184113/>, Apr. 17, 2018, 4 pages.
Mobiscrub, "Galaxy S4 mini camera review", Available Online at :—https://www.youtube.com/watch?v=KYKOydw8QT8, Aug. 10, 2013, 3 pages.
Mobiscrub, "Samsung Galaxy S5 Camera Review—HD Video", Available Online on:—https://www.youtube.com/watch?v=BFgwDtNKMjg, Mar. 27, 2014, 3 pages.
Modifacechannel, "Sephora 3D Augmented Reality Mirror", Available Online at: https://www.youtube.com/watch?v=wwBO4PU9EXI, May 15, 2014, 1 page.
Murad—P1, "AZ Screen Recorder—No Root Needed—Including Lollipop Roms", Available online at: https://www.youtube.com/watch?v=EMvo0Fr-w5w, Feb. 27, 2015, 7 pages.
Non Final Office Action received for U.S. Appl. No. 14/863,616, dated Mar. 21, 2018, 17 pages.
Non-Final Office Action received for U.S. Appl. No. 12/764,360, dated May 3, 2012, 19 pages.
Non-Final Office Action received for U.S. Appl. No. 14/863,616, dated Nov. 21, 2016, 16 pages.
Non-Final Office Action received for U.S. Appl. No. 14/869,807, dated Dec. 2, 2016, 23 pages.
Non-Final Office Action received for U.S. Appl. No. 15/268,115, dated Apr. 13, 2017, 44 pages.
Non-Final Office Action received for U.S. Appl. No. 15/273,522, dated Nov. 30, 2016, 15 pages.
Non-Final Office Action received for U.S. Appl. No. 15/273,544, dated May 25, 2017, 18 pages.
Non-Final Office Action received for U.S. Appl. No. 15/728,147, dated Feb. 22, 2018, 20 pages.
Non-Final Office Action received for U.S. Appl. No. 15/728,147, dated Jan. 31, 2019, 41 pages.
Non-Final Office Action received for U.S. Appl. No. 15/995,040, dated Apr. 15, 2020, 19 pages.
Non-Final Office Action received for U.S. Appl. No. 15/995,040, dated May 16, 2019, 24 pages.
Non-Final Office Action received for U.S. Appl. No. 16/143,097, dated Feb. 28, 2019, 17 pages.
Non-Final Office Action received for U.S. Appl. No. 16/144,629, dated Mar. 13, 2020, 24 pages.
Non-Final Office Action received for U.S. Appl. No. 16/144,629, dated Mar. 29, 2019, 18 pages.
Non-Final Office Action received for U.S. Appl. No. 16/271,583, dated May 6, 2020, 24 pages.
Non-Final Office Action received for U.S. Appl. No. 16/271,583, dated Nov. 29, 2019, 18 pages.
Non-Final Office Action received for U.S. Appl. No. 16/367,702, dated Mar. 9, 2020, 17 pages.
Non-Final Office Action received for U.S. Appl. No. 16/528,941, dated Jan. 30, 2020, 14 pages.
Non-Final Office Action received for U.S. Appl. No. 16/582,595, dated Nov. 26, 2019, 17 pages.
Non-Final Office Action received for U.S. Appl. No. 16/583,020, dated Nov. 14, 2019, 9 pages.
Non-Final Office Action received for U.S. Appl. No. 16/733,718, dated Sep. 16, 2020, 25 pages.
Notice of Acceptance received for Australian Patent Application No. 2017286130, dated Apr. 26, 2019, 3 pages.
Notice of Acceptance received for Australian Patent Application No. 2018279787, dated Dec. 10, 2019, 3 pages.
Notice of Acceptance received for Australian Patent Application No. 2019213341, dated Aug. 25, 2020, 3 pages.
Notice of Allowance received for Brazilian Patent Application No. 112018074765-3, dated Oct. 8, 2019, 2 pages (1 page of English Translation and 1 page of Official Copy).
Notice of Allowance received for Chinese Patent Application No. 201580046237.6, dated Aug. 29, 2018, 4 pages (1 page of English Translation and 3 pages of Official Copy).
Notice of Allowance received for Chinese Patent Application No. 201680031372.8, dated Sep. 24, 2020, 2 pages (1 page of English Translation and 1 page of Official Copy).
Notice of Allowance received for Chinese Patent Application No. 201710657424.9, dated May 8, 2020, 2 pages (1 page of English Translation and 1 page of Official Copy).
Notice of Allowance received for Chinese Patent Application No. 201780002533.5, dated Apr. 14, 2020, 2 pages (1 page of English Translation and 1 page of Official Copy).
Notice of Allowance received for Chinese Patent Application No. 201810566134.8, dated Apr. 7, 2020, 3 pages (1 page of English Translation and 2 pages of Official Copy).
Notice of Allowance received for Chinese Patent Application No. 201810664927.3, dated Jul. 19, 2019, 2 pages (1 page of English Translation and 1 page of Official Copy).
Notice of Allowance received for Chinese Patent Application No. 201811512767.7, dated Jul. 27, 2020, 4 pages (1 page of English Translation and 3 pages of Official Copy).
Notice of Allowance received for Chinese Patent Application No. 201911219525.3, dated Sep. 29, 2020, 2 pages (1 page of English Translation and 1 page of Official Copy).
Notice of Allowance received for Japanese Patent Application No. 2018-171188, dated Jul. 16, 2019, 3 pages (1 page of English Translation and 2 pages of Official Copy).
Notice of Allowance received for Korean Patent Application No. 10-2018-7026743, dated Mar. 20, 2019, 7 pages (1 page of English Translation and 6 pages of Official Copy).
Notice of Allowance received for Korean Patent Application No. 10-2018-7028849, dated Feb. 1, 2019, 4 pages (1 page of English Translation and 3 pages of Official Copy).
Notice of Allowance received for Korean Patent Application No. 10-2018-7034780, dated Jun. 19, 2019, 4 pages (1 page of English Translation and 3 pages of Official Copy).
Notice of Allowance received for Korean Patent Application No. 10-2018-7036893, dated Jun. 12, 2019, 4 pages (1 page of English Translation and 3 pages of Official Copy).
Notice of Allowance received for Korean Patent Application No. 10-2019-7035478, dated Apr. 24, 2020, 4 pages (1 page of English Translation and 3 pages of Official Copy).
Notice of Allowance received for Taiwanese Patent Application No. 104107328, dated Jun. 12, 2017, 3 pages (Official Copy Only) {See Communication under Rule 37 CFR § 1.98(a) (3)}.

(56) References Cited

OTHER PUBLICATIONS

Notice of Allowance received for U.S. Appl. No. 12/764,360, dated Oct. 1, 2012, 13 pages.
Notice of Allowance received for U.S. Appl. No. 14/641,251, dated May 18, 2016, 13 pages.
Notice of Allowance received for U.S. Appl. No. 14/863,616, dated Dec. 11, 2018, 8 pages.
Notice of Allowance received for U.S. Appl. No. 14/869,807, dated Jun. 21, 2017, 9 pages.
Notice of Allowance received for U.S. Appl. No. 14/869,807, dated Oct. 10, 2017, 9 pages.
Notice of Allowance received for U.S. Appl. No. 15/268,115, dated Mar. 7, 2018, 15 pages.
Notice of Allowance received for U.S. Appl. No. 15/273,453, dated Oct. 12, 2017, 11 pages.
Notice of Allowance received for U.S. Appl. No. 15/273,503, dated Aug. 14, 2017, 9 pages.
Notice of Allowance received for U.S. Appl. No. 15/273,522, dated Mar. 28, 2017, 9 pages.
Notice of Allowance received for U.S. Appl. No. 15/273,522, dated May 19, 2017, 2 pages.
Notice of Allowance received for U.S. Appl. No. 15/273,522, dated May 23, 2017, 2 pages.
Notice of Allowance received for U.S. Appl. No. 15/273,544, dated Mar. 13, 2018, 8 pages.
Notice of Allowance received for U.S. Appl. No. 15/273,544, dated Oct. 27, 2017, 8 pages.
Notice of Allowance received for U.S. Appl. No. 15/728,147, dated Aug. 19, 2019, 13 pages.
Notice of Allowance received for U.S. Appl. No. 15/858,175, dated Jun. 1, 2018, 8 pages.
Notice of Allowance received for U.S. Appl. No. 15/858,175, dated Sep. 12, 2018, 8 pages.
Notice of Allowance received for U.S. Appl. No. 15/975,581, dated Oct. 3, 2018, 25 pages.
Notice of Allowance received for U.S. Appl. No. 16/110,514, dated Apr. 29, 2019, 9 pages.
Notice of Allowance received for U.S. Appl. No. 16/110,514, dated Mar. 13, 2019, 11 pages.
Notice of Allowance received for U.S. Appl. No. 16/143,097, dated Aug. 29, 2019, 23 pages.
Notice of Allowance received for U.S. Appl. No. 16/143,201, dated Feb. 8, 2019, 9 pages.
Notice of Allowance received for U.S. Appl. No. 16/143,201, dated Nov. 28, 2018, 14 pages.
Notice of Allowance received for U.S. Appl. No. 16/191,117, dated Oct. 29, 2019, 9 pages.
Notice of Allowance received for U.S. Appl. No. 16/582,595, dated Mar. 20, 2020, 9 pages.
Notice of Allowance received for U.S. Appl. No. 16/583,020, dated Apr. 1, 2020, 5 pages.
Notice of Allowance received for U.S. Appl. No. 16/583,020, dated Feb. 28, 2020, 5 pages.
Notice of Allowance received for U.S. Appl. No. 16/584,044, dated Dec. 11, 2019, 15 pages.
Notice of Allowance received for U.S. Appl. No. 16/584,044, dated Mar. 30, 2020, 16 pages.
Notice of Allowance received for U.S. Appl. No. 16/584,044, dated Nov. 14, 2019, 13 pages.
Notice of Allowance received for U.S. Appl. No. 16/584,100, dated Apr. 8, 2020, 12 pages.
Notice of Allowance received for U.S. Appl. No. 16/584,100, dated Jan. 14, 2020, 13 pages.
Notice of Allowance received for U.S. Appl. No. 16/584,693, dated Jan. 15, 2020, 15 pages.
Notice of Allowance received for U.S. Appl. No. 16/584,693, dated May 4, 2020, 12 pages.
Notice of Allowance received for U.S. Appl. No. 16/586,314, dated Apr. 1, 2020, 8 pages.
Notice of Allowance received for U.S. Appl. No. 16/586,314, dated Jan. 9, 2020, 10 pages.
Notice of Allowance received for U.S. Appl. No. 16/586,344, dated Dec. 16, 2019, 12 pages.
Notice of Allowance received for U.S. Appl. No. 16/586,344, dated Mar. 27, 2020, 12 pages.
Office Action received for Australian Patent Application No. 2017100683, dated Sep. 20, 2017, 3 pages.
Office Action received for Australian Patent Application No. 2017100684, dated Jan. 24, 2018, 4 pages.
Office Action received for Australian Patent Application No. 2017100684, dated Oct. 5, 2017, 4 pages.
Office Action received for Australian Patent Application No. 2017286130, dated Jan. 21, 2019, 4 pages.
Office Action received for Australian Patent Application No. 2019100794, dated Oct. 3, 2019, 4 pages.
Office Action received for Australian Patent Application No. 2019213341, dated Jun. 30, 2020, 6 pages.
Office Action received for Australian Patent Application No. 2020100189, dated Apr. 1, 2020, 3 pages.
Office Action received for Australian Patent Application No. 2020100720, dated Jul. 9, 2020, 7 pages.
Office Action received for Australian Patent Application No. 2020100720, dated Sep. 1, 2020, 5 pages.
Office Action received for Australian Patent Application No. 2020101043, dated Aug. 14, 2020, 5 pages.
Office Action received for Australian Patent Application No. 2020201969, dated Sep. 25, 2020, 5 pages.
Office Action received for Chinese Patent Application No. 201580046237.6, dated Feb. 6, 2018, 10 pages (5 pages of English Translation and 5 pages of Official Copy).
Office Action received for Chinese Patent Application No. 201680031372.8, dated Dec. 6, 2018, 15 pages (6 pages of English Translation and 9 pages of Official copy).
Office Action received for Chinese Patent Application No. 201680031372.8, dated Jun. 19, 2020, 6 pages (3 pages of English Translation and 3 pages of Official Copy).
Office Action received for Chinese Patent Application No. 201680031372.8, dated Sep. 29, 2019, 6 pages (3 pages of English Translation and 3 pages of Official Copy).
Office Action received for Chinese Patent Application No. 201710657424.9, dated Sep. 17, 2019, 23 pages (11 pages of English Translation and 12 pages of Official Copy).
Office Action received for Chinese Patent Application No. 201780002533.5, dated Apr. 25, 2019, 17 pages (7 pages of English Translation and 10 pages of Official Copy).
Office Action received for Chinese Patent Application No. 201780002533.5, dated Feb. 3, 2020, 6 pages (3 pages of English Translation and 3 pages of Official Copy).
Office Action received for Chinese Patent Application No. 201780002533.5, dated Sep. 26, 2019, 21 pages (9 pages of English Translation and 12 pages of Official Copy).
Office Action received for Chinese Patent Application No. 201810566134.8, dated Aug. 13, 2019, 14 pages (8 pages of English Translation and 6 pages of Official Copy).
Office Action received for Chinese Patent Application No. 201810664927.3, dated Mar. 28, 2019, 11 pages (5 pages of English Translation and 6 pages of Official Copy).
Office Action received for Chinese Patent Application No. 201811446867.4, dated Dec. 31, 2019, 12 pages (5 pages of English Translation and 7 pages of Official Copy).
Office Action received for Chinese Patent Application No. 201811446867.4, dated May 6, 2020, 10 pages (5 pages of English Translation and 5 pages of Official Copy).
Office Action received for Chinese Patent Application No. 201811446867.4, dated Sep. 8, 2020, 9 pages (4 pages of English Translation and 5 pages of Official Copy).
Office Action received for Chinese Patent Application No. 201811512767.7, dated Dec. 20, 2019, 14 pages (7 pages of English Translation and 7 pages of Official Copy).
Office Action received for Chinese Patent Application No. 201811512767.7, dated Jun. 4, 2020, 6 pages (3 pages of English Translation and 3 pages of Official Copy).

(56) References Cited

OTHER PUBLICATIONS

Office Action received for Chinese Patent Application No. 201910692978.1, dated Apr. 3, 2020, 19 pages (8 pages of English Translation and 11 pages of Official Copy).
Office Action received for Chinese Patent Application No. 201911202668.3, dated Aug. 4, 2020, 13 pages (7 pages of English Translation and 6 pages of Official Copy).
Office Action received for Chinese Patent Application No. 201911219525.3, dated Jul. 10, 2020, 7 pages (1 page of English Translation and 6 pages of Official Copy).
Office Action received for Danish Patent Application No. PA201570788, dated Apr. 8, 2016, 11 pages.
Office Action received for Danish Patent Application No. PA201570788, dated Sep. 13, 2016, 3 pages.
Office action received for Danish Patent Application No. PA201570791, dated Apr. 6, 2016, 12 pages.
Office action received for Danish Patent Application No. PA201570791, dated Sep. 6, 2016, 4 pages.
Office Action received for Danish Patent Application No. PA201670627, dated Apr. 5, 2017, 3 pages.
Office Action received for Danish Patent Application No. PA201670627, dated Nov. 6, 2017, 2 pages.
Office Action received for Danish Patent Application No. PA201670627, dated Oct. 11, 2016, 8 pages.
Office Action received for Danish Patent Application No. PA201670753, dated Dec. 20, 2016, 7 pages.
Office Action received for Danish Patent Application No. PA201670753, dated Jul. 5, 2017, 4 pages.
Office Action received for Danish Patent Application No. PA201670753, dated Mar. 23, 2018, 5 pages.
Office Action received for Danish Patent Application No. PA201670755, dated Apr. 6, 2017, 5 pages.
Office Action received for Danish Patent Application No. PA201670755, dated Apr. 20, 2018, 2 pages.
Office Action received for Danish Patent Application No. PA201670755, dated Dec. 22, 2016, 6 pages.
Office Action received for Danish Patent Application No. PA201670755, dated Oct. 20, 2017, 4 pages.
Office Action received for Danish Patent Application No. PA201770563, dated Aug. 13, 2018, 5 pages.
Office Action received for Danish Patent Application No. PA201770563, dated Jan. 28, 2020, 3 pages.
Office Action received for Danish Patent Application No. PA201770563, dated Jun. 28, 2019, 5 pages.
Office Action received for Danish Patent Application No. PA201770719, dated Aug. 14, 2018, 6 pages.
Office Action received for Danish Patent Application No. PA201770719, dated Feb. 19, 2019, 4 pages.
Office Action received for Danish Patent Application No. PA201770719, dated Jan. 17, 2020, 4 pages.
Office Action received for Danish Patent Application No. PA201870366, dated Aug. 22, 2019, 3 pages.
Office Action received for Danish Patent Application No. PA201870366, dated Dec. 12, 2018, 3 pages.
Office Action received for Danish Patent Application No. PA201870367, dated Dec. 20, 2018, 5 pages.
Office Action received for Danish Patent Application No. PA201870368, dated Dec. 20, 2018, 5 pages.
Office Action received for Danish Patent Application No. PA201870368, dated Oct. 1, 2019, 6 pages.
Office Action received for Danish Patent Application No. PA201870623, dated Jan. 30, 2020, 2 pages.
Office Action received for Danish Patent Application No. PA201870623, dated Jul. 12, 2019, 4 pages.
Office Action received for Danish Patent Application No. PA201970592, dated Mar. 2, 2020, 5 pages.
Office Action received for Danish Patent Application No. PA201970593, dated Apr. 16, 2020, 2 pages.
Office Action received for Danish Patent Application No. PA201970593, dated Mar. 10, 2020, 4 pages.
Office Action received for Danish Patent Application No. PA201970595, dated Mar. 10, 2020, 4 pages.
Office Action received for Danish Patent Application No. PA201970600, dated Mar. 9, 2020, 5 pages.
Office Action received for Danish Patent Application No. PA201970601, dated Aug. 13, 2020, 3 pages.
Office Action received for Danish Patent Application No. PA201970601, dated Jan. 31, 2020, 3 pages.
Office Action received for Danish Patent Application No. PA201970601, dated Nov. 11, 2019, 8 pages.
Office Action received for Danish Patent Application No. PA201970605, dated Mar. 10, 2020, 5 pages.
Office Action received for European Patent Application No. 15712218.5, dated Aug. 3, 2017, 4 pages.
Office Action received for European Patent Application No. 17184710.6, dated Dec. 21, 2018, 7 pages.
Office Action received for European Patent Application No. 17809168.2, dated Jan. 7, 2020, 5 pages.
Office Action received for European Patent Application No. 18176890.4, dated Oct. 16, 2018, 8 pages.
Office Action received for European Patent Application No. 18183054.8, dated Feb. 24, 2020, 6 pages.
Office Action received for European Patent Application No. 18183054.8, dated Nov. 16, 2018, 8 pages.
Office Action received for European Patent Application No. 18209460.7, dated Apr. 10, 2019, 7 pages.
Office Action received for European Patent Application No. 18209460.7, dated Apr. 21, 2020, 5 pages.
Office Action received for European Patent Application No. 18214698.5, dated Apr. 2, 2019, 8 pages.
Office Action received for European Patent Application No. 19204230.7, dated Sep. 28, 2020, 6 pages.
Office Action received for European Patent Application No. 19724959.2, dated Apr. 23, 2020, 10 pages.
Office Action received for Japanese Patent Application No. 2018-182607, dated Apr. 6, 2020, 6 pages (3 pages of English Translation and 3 pages of Official Copy).
Office Action received for Japanese Patent Application No. 2018-182607, dated Jul. 20, 2020, 5 pages (2 pages of English Translation and 3 pages of Official Copy).
Office Action received for Japanese Patent Application No. 2018-225131, dated Aug. 17, 2020, 21 pages (6 pages of English Translation and 15 pages of Official Copy).
Office Action received for Japanese Patent Application No. 2018-225131, dated Mar. 4, 2019, 10 pages (6 pages of English Translation and 4 pages of Official Copy).
Office Action received for Japanese Patent Application No. 2018-545502, dated Aug. 17, 2020, 14 pages (6 pages of English Translation and 8 pages of Official Copy).
Office Action received for Japanese Patent Application No. 2020-070418, dated Aug. 3, 2020, 22 pages (14 pages of English Translation and 8 pages of Official Copy).
Office Action received for Korean Patent Application No. 10-2018-7026743, dated Jan. 17, 2019, 5 pages (2 pages of English Translation and 3 pages of Official Copy).
Office Action received for Korean Patent Application No. 10-2018-7034780, dated Apr. 4, 2019, 11 pages (5 pages of English Translation and 6 pages of Official Copy).
Office Action received for Korean Patent Application No. 10-2018-7036893, dated Apr. 9, 2019, 6 pages (2 pages of English Translation and 4 pages of Official Copy).
Office Action received for Korean Patent Application No. 10-2019-7027042, dated May 13, 2020, 6 pages (2 pages of English Translation and 4 pages of Official Copy).
Office Action received for Korean Patent Application No. 10-2019-7035478, dated Jan. 17, 2020, 17 pages (9 pages of English Translation and 8 pages of Official Copy).
Office Action received for Korean Patent Application No. 10-2020-0052618, dated Aug. 18, 2020, 11 pages (5 pages of English Translation and 6 pages of Official Copy).
Office Action received for Taiwanese Patent Application No. 104107328, dated Dec. 28, 2016, 4 pages (1 page of English Translation and 3 pages of Official Copy).

(56) References Cited

OTHER PUBLICATIONS

Onescreen Solutions, "Screen Skill: Screen Recorder", Available online at: https://www.youtube.com/watch?v=I1NAXh_ZkkU, Oct. 22, 2013, 3 pages.
Osxdaily, "How to Zoom the Camera on iPhone", Available Online at: https://osxdaily.com/2012/04/18/zoom-camera-iphone/, Apr. 18, 2012, 6 pages.
Paine Steve, "Samsung Galaxy Camera Detailed Overview—User Interface", Retrieved from: <https://www.youtube.com/watch?v=td8UYSySulo&feature=youtu.be>, Sep. 18, 2012, pp. 1-2.
PC World, "How to make AR Emojis on the Samsung Galaxy S9", You Tube, Available Online: https://www.youtube.com/watch?v=8wQICfulkz0, Feb. 25, 2018, 2 pages.
Phonearena, "Sony Xperia Z5 camera app and UI overview", Retrieved from <https://www.youtube.com/watch?v=UtDzdTsmkfU&feature=youtu.be>, Sep. 8, 2015, pp. 1-3.
Playmemories Camera Apps, "PlayMemories Camera Apps Help Guide", available at <https://www.playmemoriescameraapps.com/portal/manual/IS9104-NPIA09014_00-F00002/en/index.html>, 2012, 3 pages.
PreAppeal Review Report received for Japanese Patent Application No. 2018-225131, dated Jan. 24, 2020, 8 pages (4 pages of English Translation and 4 pages of Official Copy).
PreAppeal Review Report received for Japanese Patent Application No. 2018-545502, dated Jan. 24, 2020, 8 pages (3 pages of English Translation and 5 pages of Official Copy).
"Remote Shot for SmartWatch 2", Available online at:—https://play.google.com/store/apps/details?id=net.watea.sw2.rshot&hl=en, Nov. 21, 2017, 3 pages.
Result of Consultation received for European Patent Application No. 17184710.6, mailed on Feb. 21, 2020, 6 pages.
Result of Consultation received for European Patent Application No. 17184710.6, mailed on Feb. 28, 2020, 3 pages.
Result of Consultation received for European Patent Application No. 19204230.7, mailed on Sep. 24, 2020, 5 pages.
Result of Consultation received for European Patent Application No. 19724959.2, mailed on Sep. 4, 2020, 3 pages.
Russell Kyle, "Kamcord Launches on Android With a Streamlined Video Capture Experience", Available Online at: https://techcrunch.com/2015/06/02/kamcord-launches-on-android-with-a-streamlined-video-capture-experience/, Jun. 2, 2015, 2 pages.
Russell Kyle, "Kamcord Now Lets Users Upload Edited Videos of Their Mobile Gaming Sessions", Available online at: https://techcrunch.com/2015/03/31/kamcord-now-lets-users-upload-edited-videos-of-their-mobile-gaming-sessions/, Mar. 31, 2015, 2 pages.
Schiffhauer Alexander, "See the Light with Night Sight", Available online at: https://www.blog.google/products/pixel/see-light-night-sight, Nov. 14, 2018, 6 pages.
Search Report and Opinion received for Danish Patent Application No. PA201770563, dated Oct. 10, 2017, 9 pages.
Search Report and Opinion received for Danish Patent Application No. PA201870366, dated Aug. 27, 2018, 9 pages.
Search Report and Opinion received for Danish Patent Application No. PA201870367, dated Aug. 27, 2018, 9 pages.
Search Report and Opinion received for Danish Patent Application No. PA201870368, dated Sep. 6, 2018, 7 pages.
Search Report and Opinion received for Danish Patent Application No. PA201870623, dated Dec. 20, 2018, 8 pages.
Search Report and Opinion received for Danish Patent Application No. PA201970592, dated Nov. 7, 2019, 8 pages.
Search Report and Opinion received for Danish Patent Application No. PA201970593, dated Oct. 29, 2019, 10 pages.
Search Report and Opinion received for Danish Patent Application No. PA201970595, dated Nov. 8, 2019, 16 pages.
Search Report and Opinion received for Danish Patent Application No. PA201970600, dated Nov. 5, 2019, 11 pages.
Search Report and Opinion received for Danish Patent Application No. PA201970603, dated Nov. 15, 2019, 9 pages.
Search Report and Opinion received for Danish Patent Application No. PA201970605, dated Nov. 12, 2019, 10 pages.
Search Report received for Danish Patent Application No. PA201770719, dated Oct. 17, 2017, 9 pages.
Shaw et al., "Skills for Closeups Photography", Watson-Guptill Publications, Nov. 1999, 5 pages (Official Copy Only) {See Communication under Rule 37 CFR § 1.98(a) (3)}.
shiftdelete.net, "Oppo Reno 10x Zoom Ön Inceleme—Huawei P30 Pro'ya rakip mi geliyor?", Available online at <https://www.youtube.com/watch?v=ev2wIUztdrg>, See especially 5:34-6:05., Apr. 24, 2019, 2 pages.
Smart Reviews, "Honor10 AI Camera's In Depth Review", See Especially 2:37-2:48; 6:39-6:49, Available Online at <https://www.youtube.com/watch?v=oKFqRvxeDBQ>, May 31, 2018, 2 pages.
Snapchat Lenses, "How to Get All Snapchat Lenses Face Effect Filter on Android", Retrieved from: <https://www.youtube.com/watch?v=0PfnF1RInfw&feature=youtu.be>, Sep. 21, 2015, pp. 1-2.
"Sony Xperia XZ3 Camera Review—The Colors, Duke, The Colors!", Android Headlines—Android News & Tech News, Available online at <https://www.youtube.com/watch?v=mwpYXzWVOgw>, See especially 1:02-1:27, 2:282:30, Nov. 3, 2018, 3 pages.
Sony, "User Guide, Xperia XZ3, H8416/H9436/H9493", Sony Mobile Communications Inc., Retrieved from <https://www-support-downloads.sonymobile.com/h8416/userguide_EN_H8416-H9436-H9493_2_Android9.0.pdf>, See pp. 86-102, 2018, 121 pages.
Summons to Attend Oral Proceedings received for European Patent Application No. 17184710.6, mailed on Sep. 17, 2019, 7 pages.
Supplemental Notice of Allowance received for U.S. Appl. No. 16/143,201, dated Dec. 13, 2018, 2 pages.
Supplemental Notice of Allowance received for U.S. Appl. No. 16/143,201, dated Dec. 19, 2018, 2 pages.
Supplemental Notice of Allowance received for U.S. Appl. No. 16/143,201, dated Jan. 10, 2019, 2 pages.
Supplementary European Search Report received for European Patent Application No. 18176890.4, dated Sep. 20, 2018, 4 pages.
Supplementary European Search Report received for European Patent Application No. 18183054.8, dated Oct. 11, 2018, 4 pages.
Tech Smith, "Snagit 11 Snagit 11.4 Help", Available at: http://assets.techsmith.com/Downloads/ua-tutorials-snagit-11/Snagtt_11.pdf, Jan. 2014, 2 pages.
Tech With Brett, "How to Create Your AR Emoji on the Galaxy S9 and S9+", Available online at: <https://www.youtube.com/watch?v=HHMdcBpC8MQ>, Mar. 16, 2018, 5 pages.
Techsmith, "Snagit® 11 Snagit 11.4 Help", available at <http://assets.techsmith.com/Downloads/ua-tutorials-snagit-11/Snagit_11.pdf>, Jan. 2014, 146 pages.
Techtag, "Samsung J5 Prime Camera Review | True Review", Available online at :—https://www.youtube.com/watch?v=a_p906ai6PQ, Oct. 26, 2016, 3 pages.
Techtag, "Samsung J7 Prime Camera Review (Technical Camera)", Available Online at :—https://www.youtube.com/watch?v=AJPcLP8GpFQ, Oct. 4, 2016, 3 pages.
Telleen et al., "Synthetic Shutter Speed Imaging", University of California, Santa Cruz, vol. 26, No. 3, 2007, 8 pages.
The Nitpicker, "Sony Xperia XZ3 | in-depth Preview", Available online at <https://www.youtube.com/watch?v=TGCKxBuiO5c>, See especially 12:40-17:25, Oct. 7, 2018, 3 pages.
Tico et al., "Robust method of digital image stabilization", Nokia Research Center, ISCCSP, Malta, Mar. 12-14, 2008, pp. 316-321.
Travel Tech Sports Channel, "New Whatsapp update-voice message recording made easy—Want to record long voice messages", Available Online at: https://www.youtube.com/watch?v=SEviqgsAdUk, Nov. 30, 2017, 13 pages.
Vickgeek, "Canon 80D Live View Tutorial | Enhance your image quality", Available online at:—https://www.youtube.com/watch?v=JGNCiy6Wt9c, Sep. 27, 2016, 3 pages.
Vivo India, "Bokeh Mode | Vivo V9", Available Online at <https://www.youtube.com/watch?v=B5AIHhH5Rxs>, Mar. 25, 2018, 3 pages.
Wan Adrian, "Game recording service Kamcord 'investing heavily' as China's mobile gaming market overtakes US", Available online at: http://www.scmp.com/tech/apps-gaming/article/1814442/game-recording-service-kamcord-investing-heavily-chinas-mobile, Jun. 4, 2015, 4 pages.

(56) References Cited

OTHER PUBLICATIONS

Wong Richard, "Huawei Smartphone (P20/P10/P9, Mate 10/9) Wide Aperture Mode Demo", Available Online at <https://www.youtube.com/watch?v=eLY3LsZGDPA>, May 7, 2017, 2 pages.
Xeetechcare, "Samsung Galaxy S10—Super Night Mode & Ultra Fast Charging!", Online Available at: https://www.youtube.com/watch?v=3bguV4FX6aA, Mar. 28, 2019, 4 pages.
Xiao et al., "Expanding the Input Expressivity of Smartwatches with Mechanical Pan, Twist, Tilt and Click", 14th Proceedings of the SIGCHI Conference on Human Factors in Computing Systems, Apr. 26, 2014, pp. 193-196.
Xperia Blog, "Action Camera Extension Gives Smartwatch/Smartband Owners Ability to Control Sony Wireless Cameras", Available at <http://www.xperiablog.net/2014/06/13/action-camera-extension-gives-smartwatchsmartband-owners-ability-to-control-sony-wireless-cameras/>, Jun. 13, 2014, 10 pages.
X-Tech, "Test Make up via Slick Augmented Reality Mirror Without Putting It on", Available Online at: http://x-tech.am/test-make-up-via-slick-augmented-reality-mirror-without-putting-it-on/, Nov. 29, 2014, 5 pages.
Applicant-Initiated Interview Summary received for U.S. Appl. No. 15/995,040, dated Nov. 24, 2020, 4 pages.
Applicant-Initiated Interview Summary received for U.S. Appl. No. 16/144,629, dated Nov. 23, 2020, 3 pages.
Certificate of Examination received for Australian Patent Application No. 2020100720, dated Nov. 11, 2020, 2 pages.
International Preliminary Report on Patentability received for PCT Patent Application No. PCT/US2019/024067, dated Nov. 19, 2020, 12 pages.
International Search Report and Written Opinion received for PCT Patent Application No. PCT/US2020/031643, dated Nov. 2, 2020, 34 pages.
Non-Final Office Action received for U.S. Appl. No. 17/027,317, dated Nov. 17, 2020, 17 pages.
Notice of Allowance received for Korean Patent Application No. 10-2020-0143726, dated Nov. 10, 2020, 5 pages (2 pages of English Translation and 3 pages of Official Copy).
Office Action received for Australian Patent Application No. 2020101043, dated Oct. 30, 2020, 4 pages.
Office Action received for Danish Patent Application No. PA201770719, dated Nov. 16, 2020, 5 pages.
Office Action received for Danish Patent Application No. PA201970603, dated Nov. 4, 2020, 3 pages.
Result of Consultation received for European Patent Application No. 19204230.7, mailed on Nov. 16, 2020, 3 pages.
Certificate of Examination received for Australian Patent Application No. 2020101043, dated Dec. 22, 2020, 2 pages.
Decision to Grant received for European Patent Application No. 18183054.8, dated Jan. 21, 2021, 3 pages.
Non-Final Office Action received for U.S. Appl. No. 16/599,433, dated Jan. 28, 2021, 16 pages.
Office Action received for Chinese Patent Application No. 202010287958.9, dated Jan. 5, 2021, 16 pages (8 pages of English Translation and 8 pages of Official Copy).
Neurotechnology, "Sentimask SDK", Available at: https://www.neurotechnology.com/sentimask.html, Apr. 22, 2018, 5 pages.
International Search Report and Written Opinion received for PCT Patent Application No. PCT/US2020/031643, dated Dec. 2, 2020, 33 pages.
Office Action received for Australian Patent Application No. 2020277216, dated Dec. 17, 2020, 5 pages.
Office Action received for Danish Patent Application No. PA202070611, dated Dec. 22, 2020, 7 pages.
Advisory Action received for U.S. Appl. No. 16/144,629, dated Jan. 6, 2021, 10 pages.
Intention to Grant received for Danish Patent Application No. PA201970603, dated Jan. 13, 2021, 2 pages.
Intention to Grant received for European Patent Application No. 18209460.7, dated Jan. 15, 2021, 8 pages.
Notice of Allowance received for U.S. Appl. No. 17/027,317, dated Jan. 13, 2021, 10 pages.
Office Action received for Chinese Patent Application No. 202010287961.0, dated Dec. 30, 2020, 16 pages (8 pages of English Translation and 8 pages of Official Copy).
Office Action received for Chinese Patent Application No. 202010287975.2, dated Dec. 30, 2020, 17 pages (9 pages of English Translation and 8 pages of Official Copy).
Office Action received for European Patent Application No. 20206196.6, dated Jan. 13, 2021, 10 pages
Office Action received for European Patent Application No. 20206197.4, dated Jan. 12, 2021, 9 pages
Applicant-Initiated Interview Summary received for U.S. Appl. No. 16/367,702, dated Nov. 30, 2020, 3 pages.
European Search Report received for European Patent Application No. 20206197.4, dated Nov. 30, 2020, 4 pages.
Examiner Initiated-Interview Summary received for U.S. Appl. No. 16/528,941, dated Dec. 1, 2020, 2 pages.
Non-Final Office Action received for U.S. Appl. No. 16/528,941, dated Dec. 7, 2020, 15 pages.
Notice of Acceptance received for Australian Patent Application No. 2019266049, dated Nov. 24, 2020, 3 pages.
Notice of Allowance received for Korean Patent Application No. 10-2019-7027042, dated Nov. 26, 2020, 4 pages (1 page of English Translation and 3 pages of Official Copy).
Notice of Allowance received for Korean Patent Application No. 10-2020-0155924, dated Nov. 23, 2020, 7 pages (2 pages of English Translation and 5 pages of Official Copy).
Notice of Allowance received for U.S. Appl. No. 16/271,583, dated Dec. 9, 2020, 6 pages.
Office Action received for Chinese Patent Application No. 201910692978.1, dated Nov. 4, 2020, 4 pages (1 page of English Translation and 3 pages of Official Copy).
Office Action received for Korean Patent Application No. 10-2020-7021870, dated Nov. 11, 2020, 11 pages (5 pages of English Translation and 6 pages of Official Copy).
Office Action received for Korean Patent Application No. 10-2020-7031855, dated Nov. 24, 2020, 6 pages (2 pages of English Translation and 4 pages of Official Copy).
Applicant-Initiated Interview Summary received for U.S. Appl. No. 16/528,941, dated Nov. 10, 2020, 2 pages.
Applicant-Initiated Interview Summary received for U.S. Appl. No. 16/733,718, dated Nov. 2, 2020, 4 pages.
Intention to Grant received for European Patent Application No. 18183054.8, dated Nov. 5, 2020, 6 pages.
Office Action received for Danish Patent Application No. PA201970592, dated Oct. 26, 2020, 5 pages.
Office Action received for European Patent Application 17809168.2, dated Oct. 8, 2020, 4 pages.
Applicant-Initiated Interview Summary received for U.S. Appl. No. 16/599,433, dated Apr. 20, 2021, 7 pages.
Decision to Grant received for European Patent Application No. 18209460.7, dated Apr. 9, 2021, 2 pages.
European Search Report received for European Patent Application No. 20210373.5, dated Apr. 13, 2021, 4 pages.
European Search Report received for European Patent Application No. 21157252.4, dated Apr. 16, 2021, 4 pages.
Intention to Grant received for Danish Patent Application No. PA201970593, dated Apr. 13, 2021, 2 pages.
Notice of Acceptance received for Australian Patent Application No. 2020201969, dated Mar. 26, 2021, 3 pages.
Notice of Allowance received for U.S. Appl. No. 16/271,583, dated Apr. 14, 2021, 6 pages.
Notice of Allowance received for U.S. Appl. No. 17/027,317, dated Apr. 12, 2021, 7 pages.
Office Action received for Australian Patent Application No. 2019218241, dated Apr. 1, 2021, 3 pages.

* cited by examiner

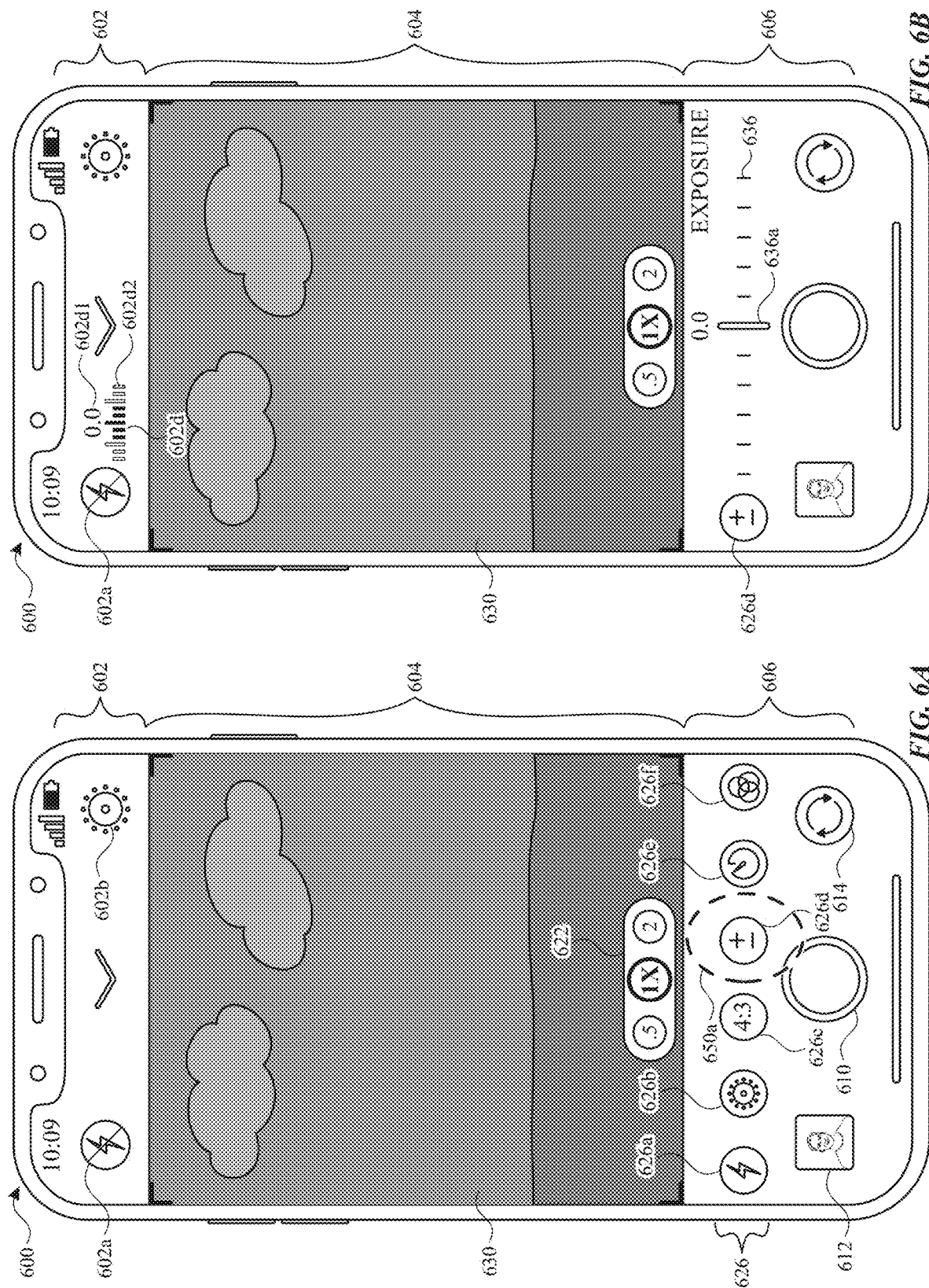

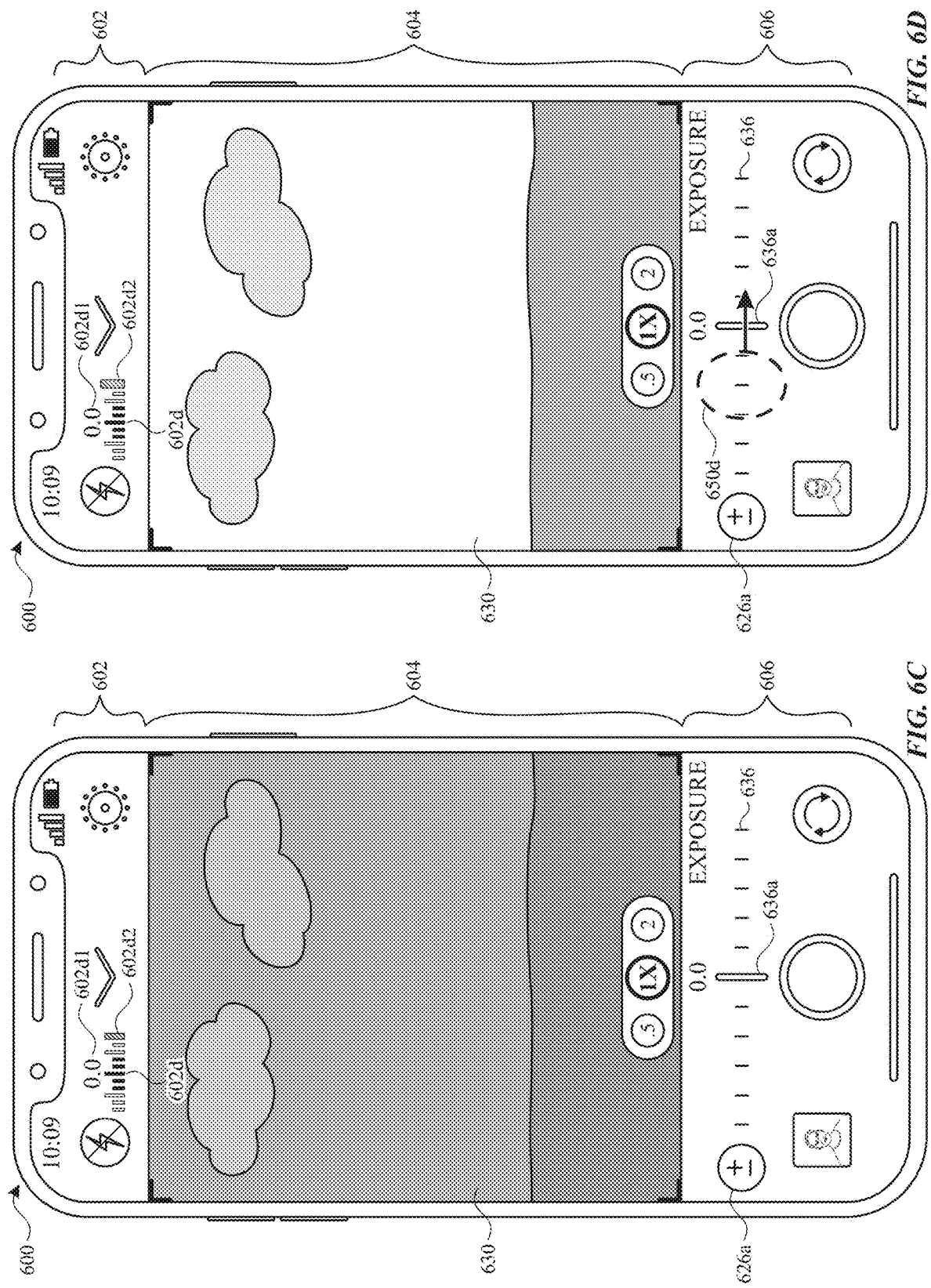

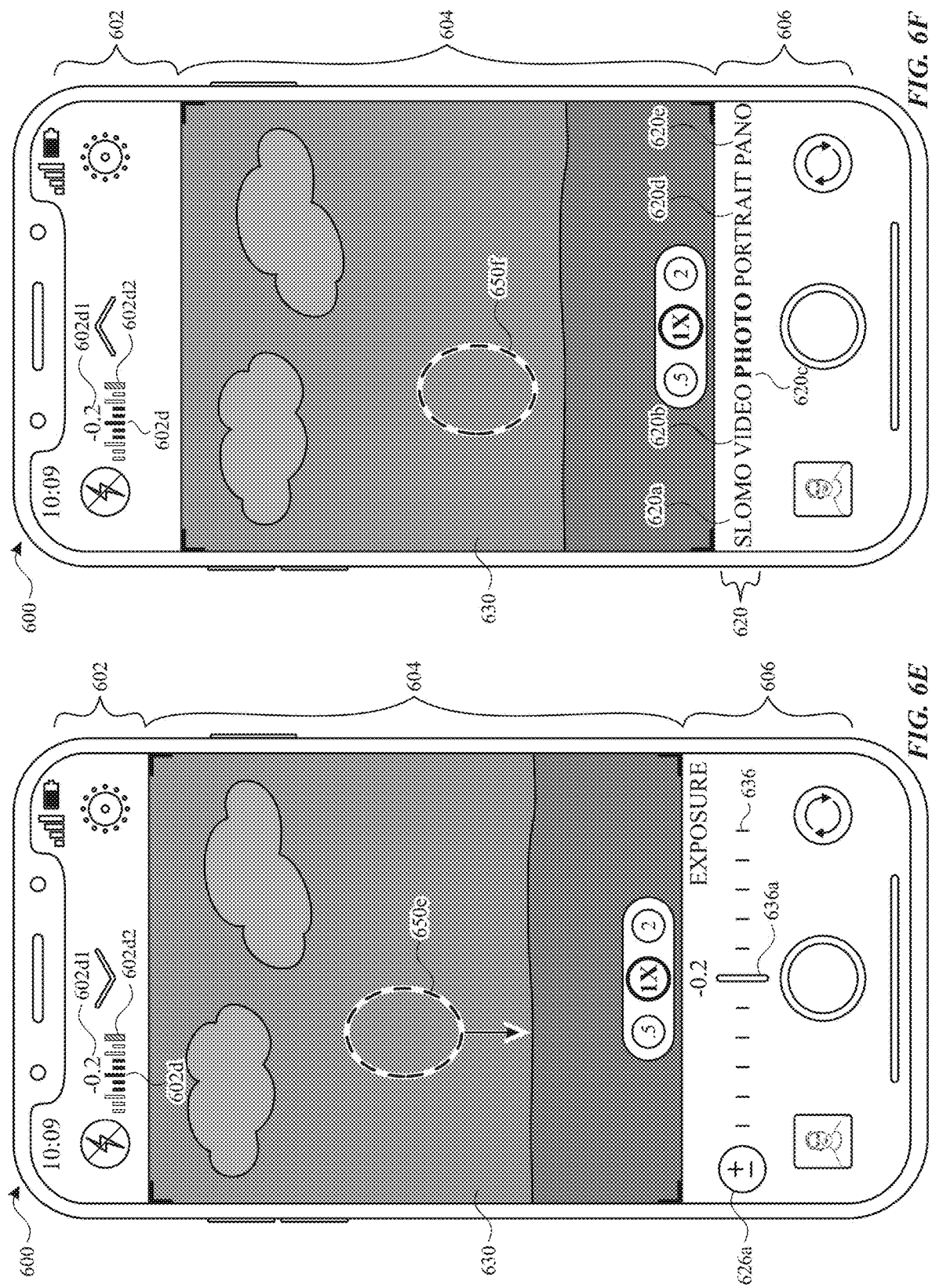

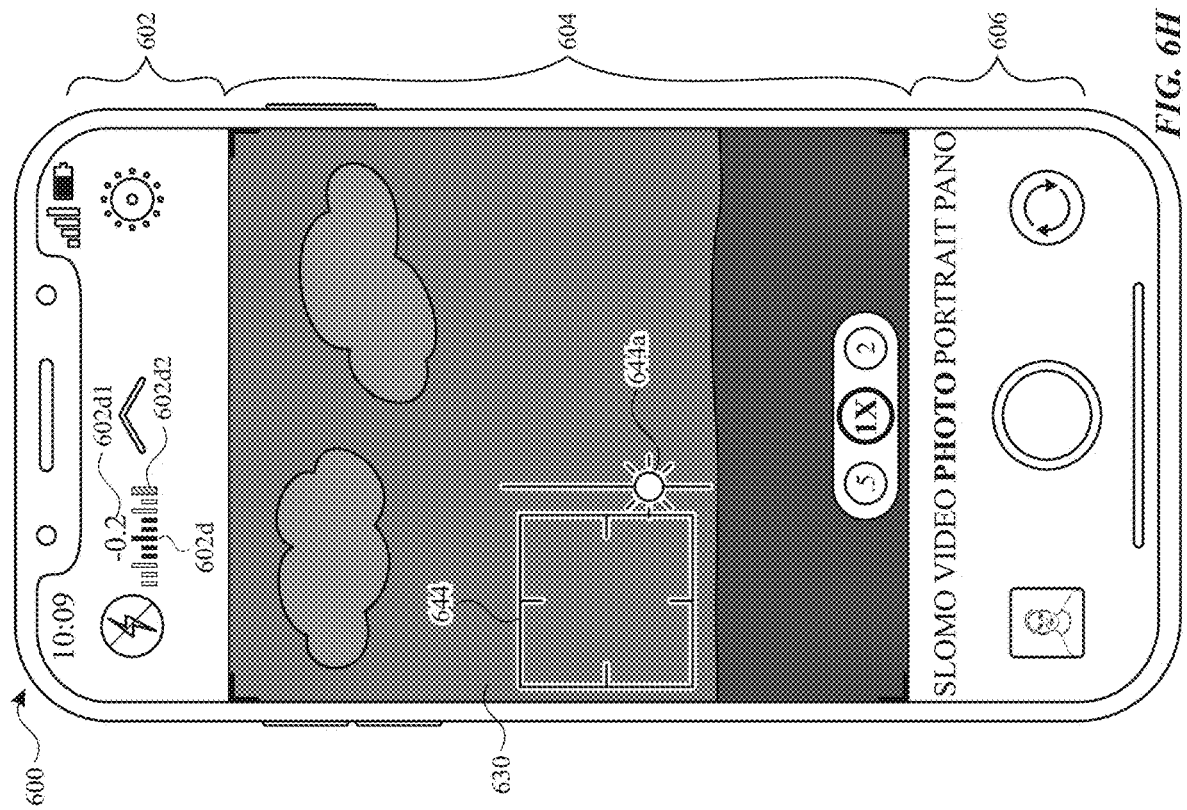
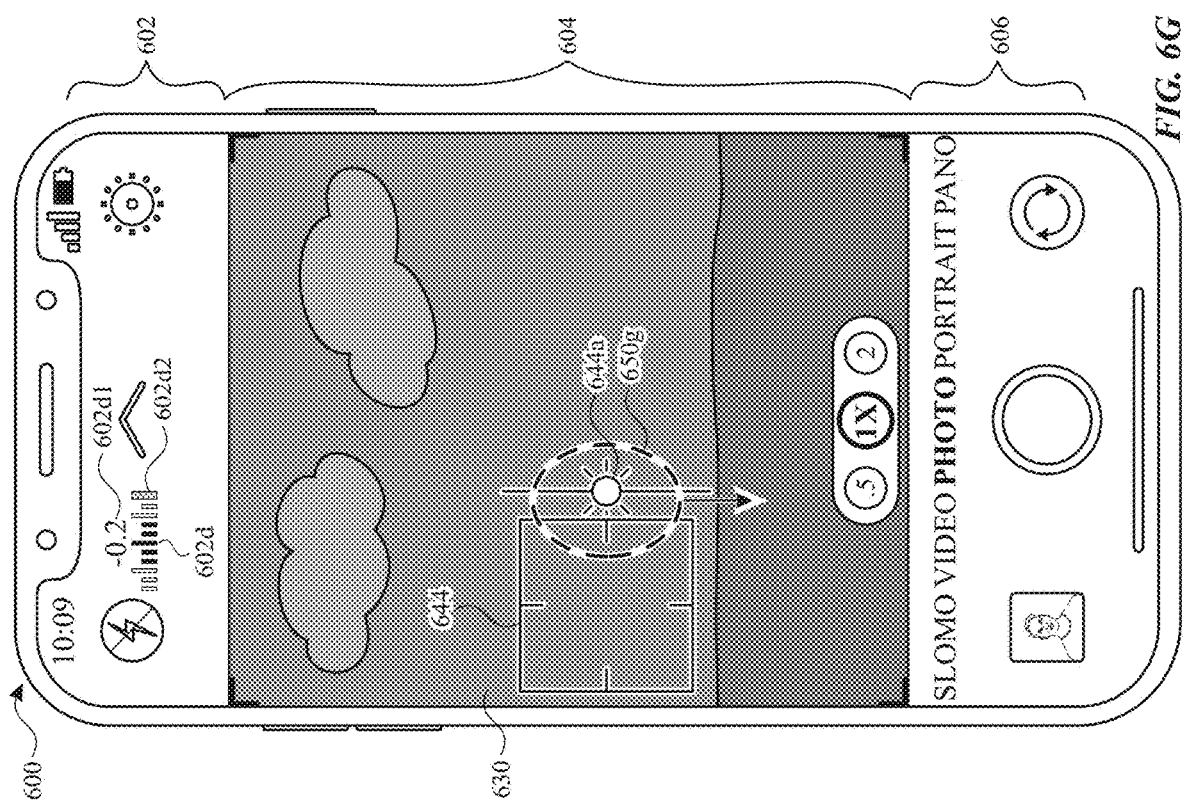

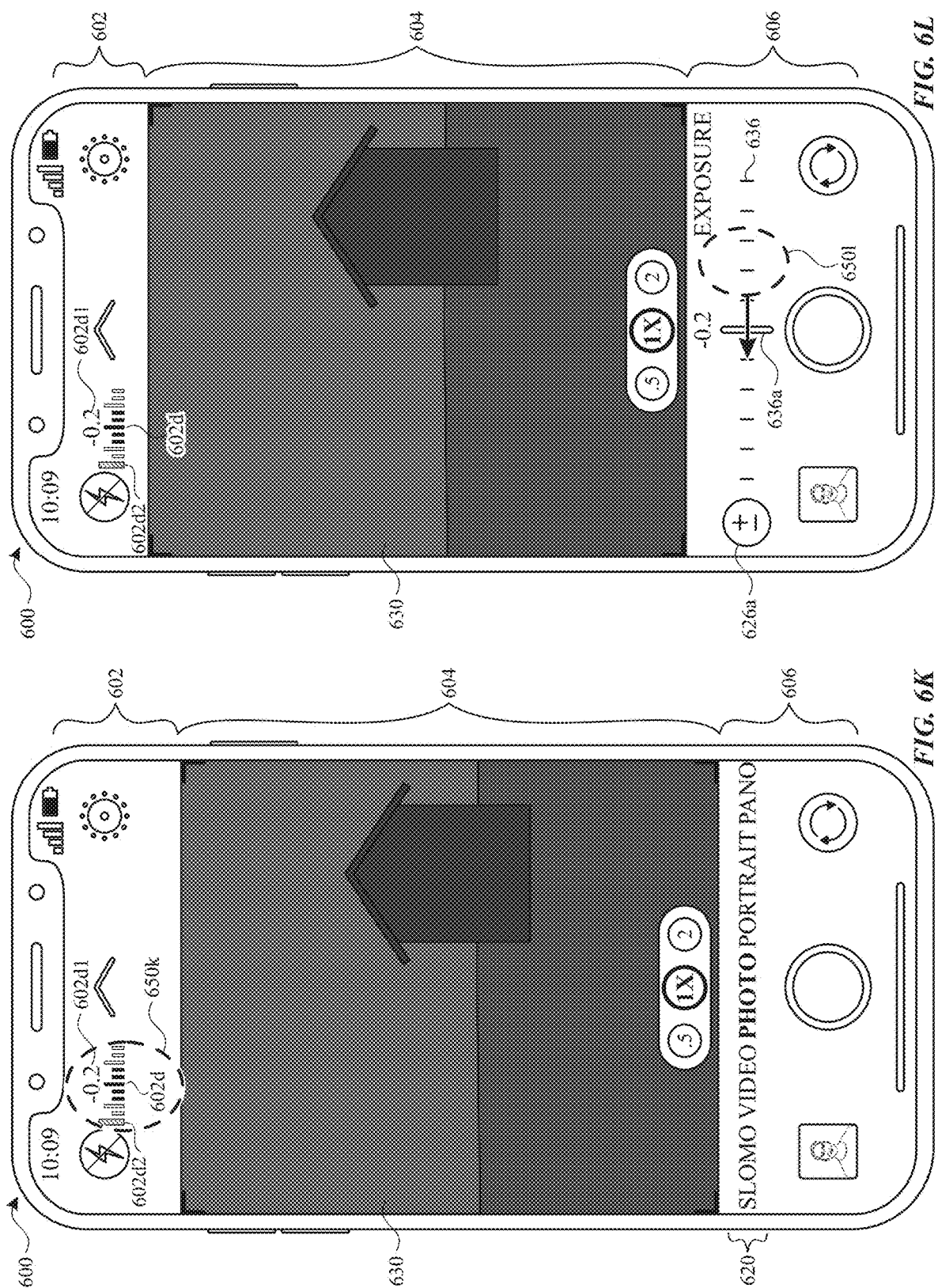

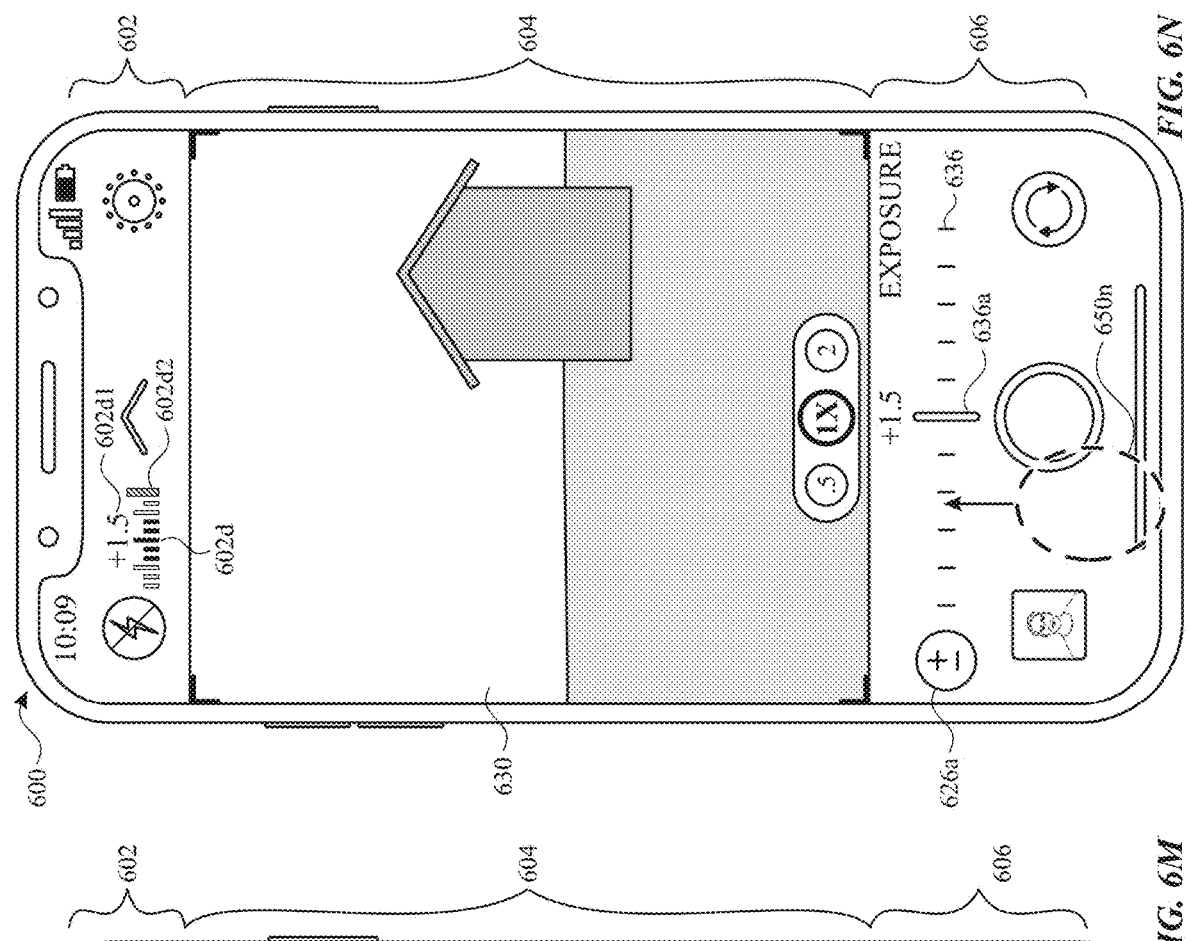
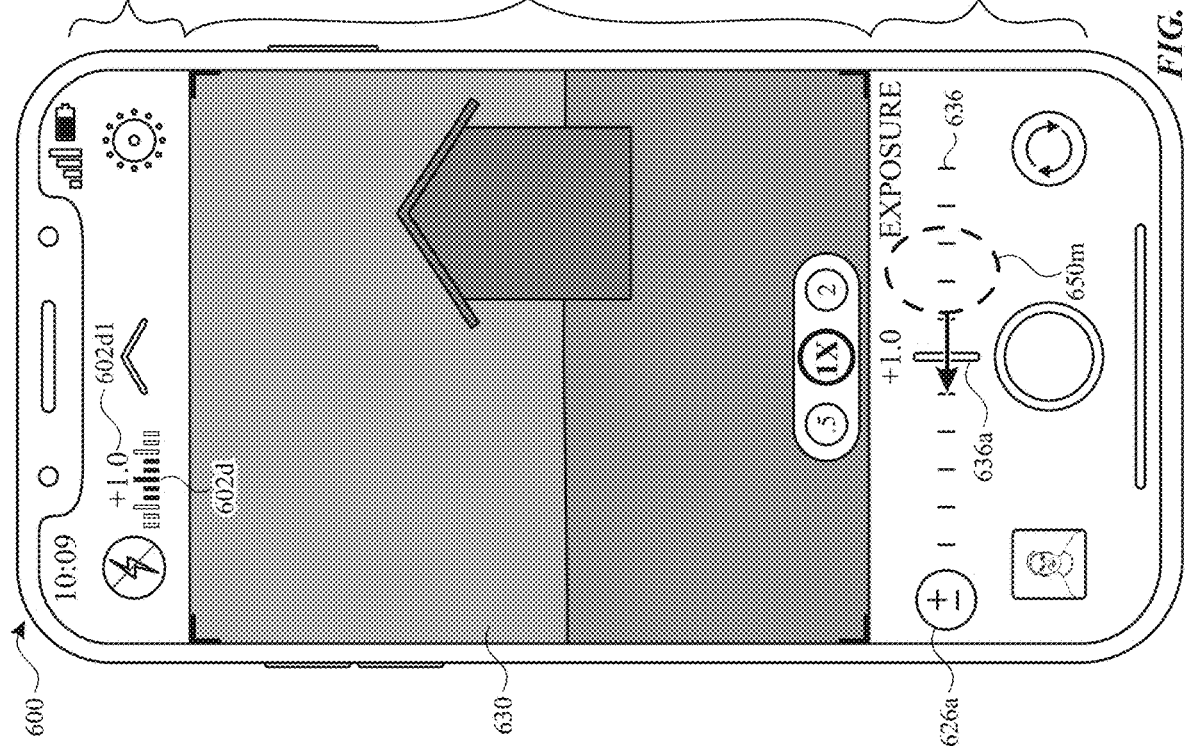

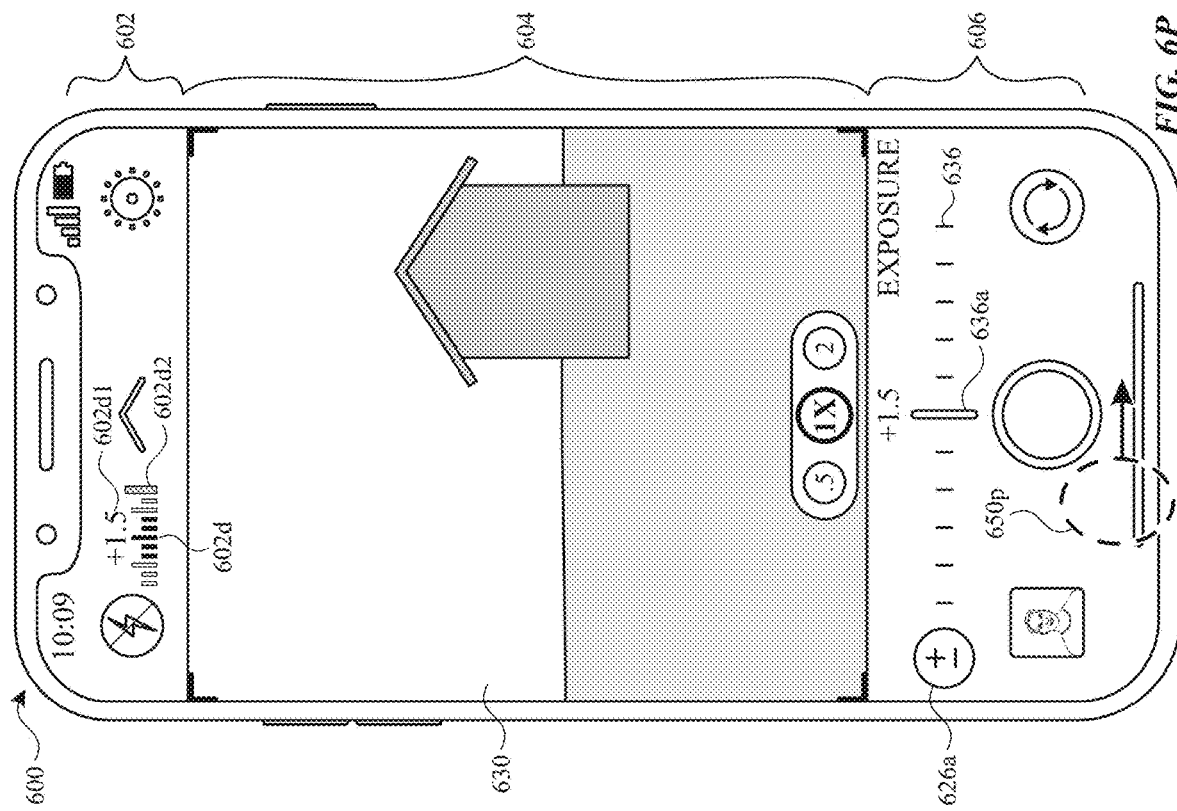
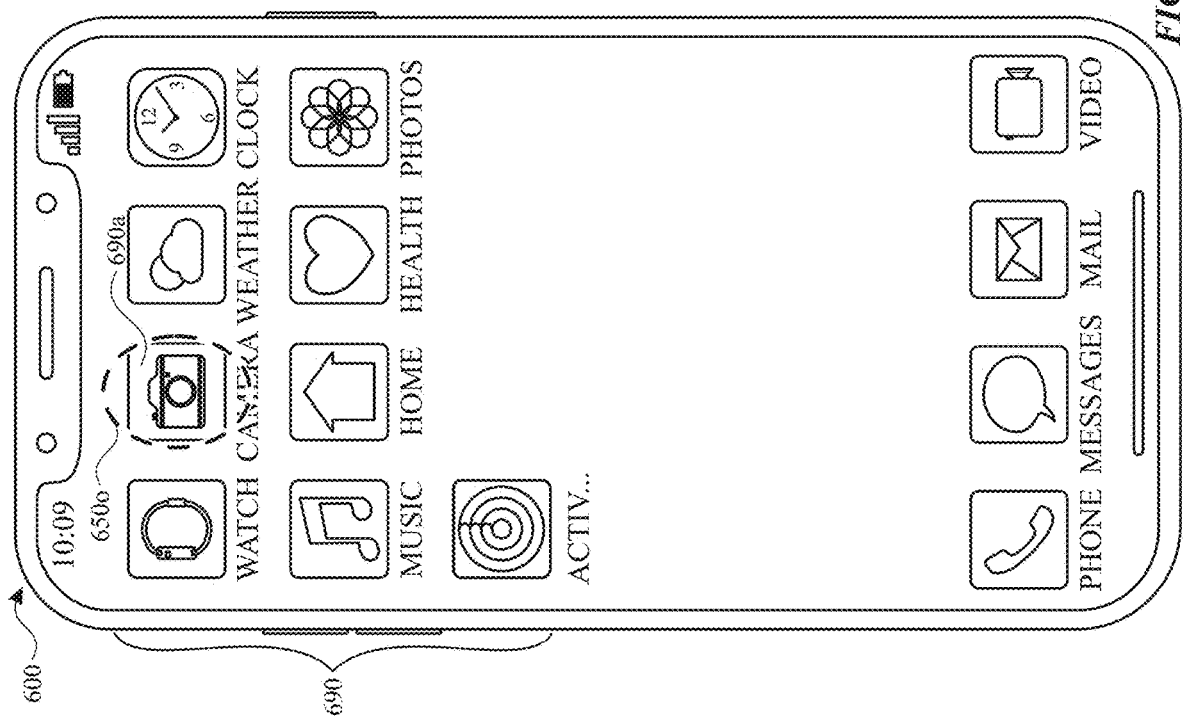

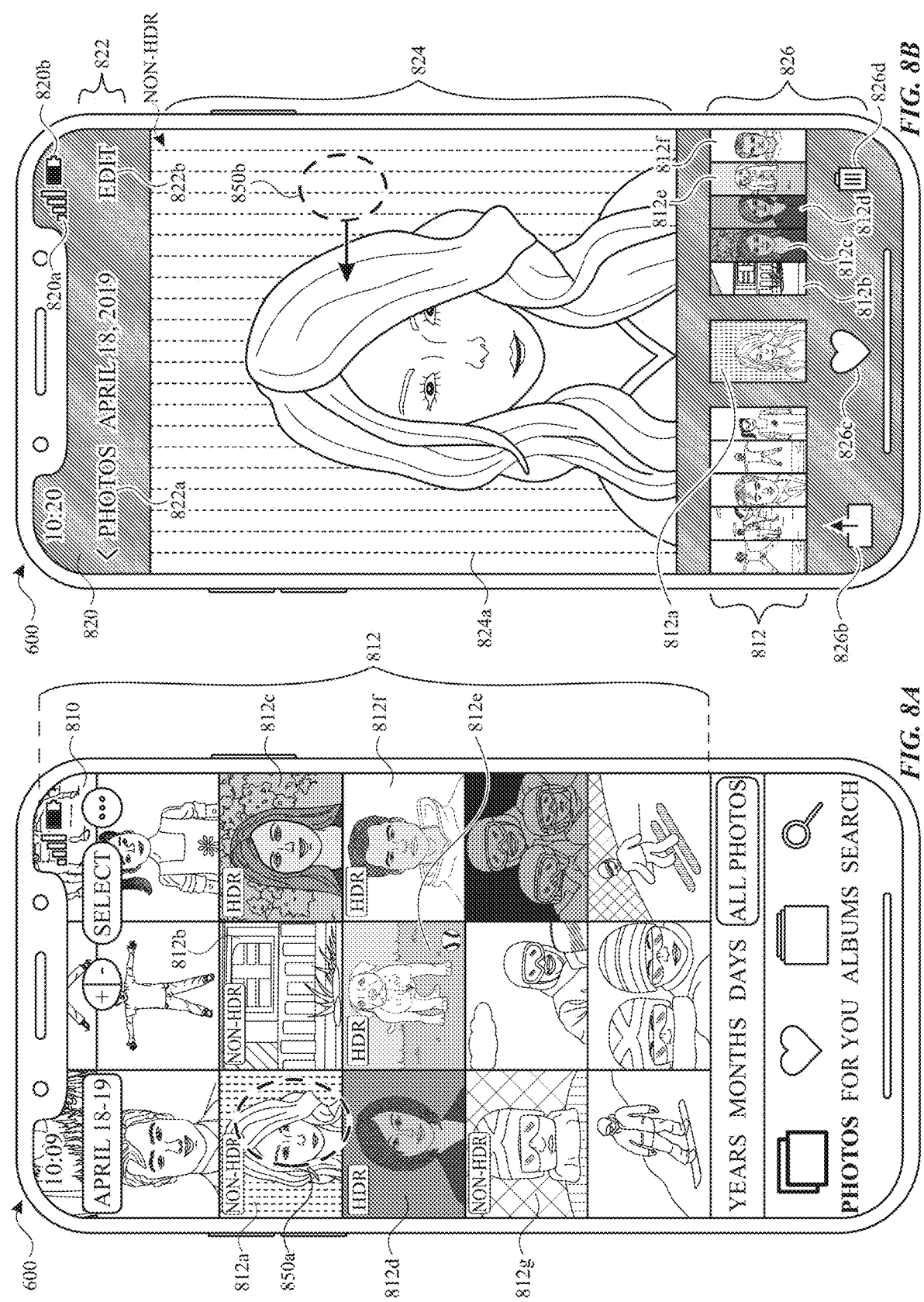

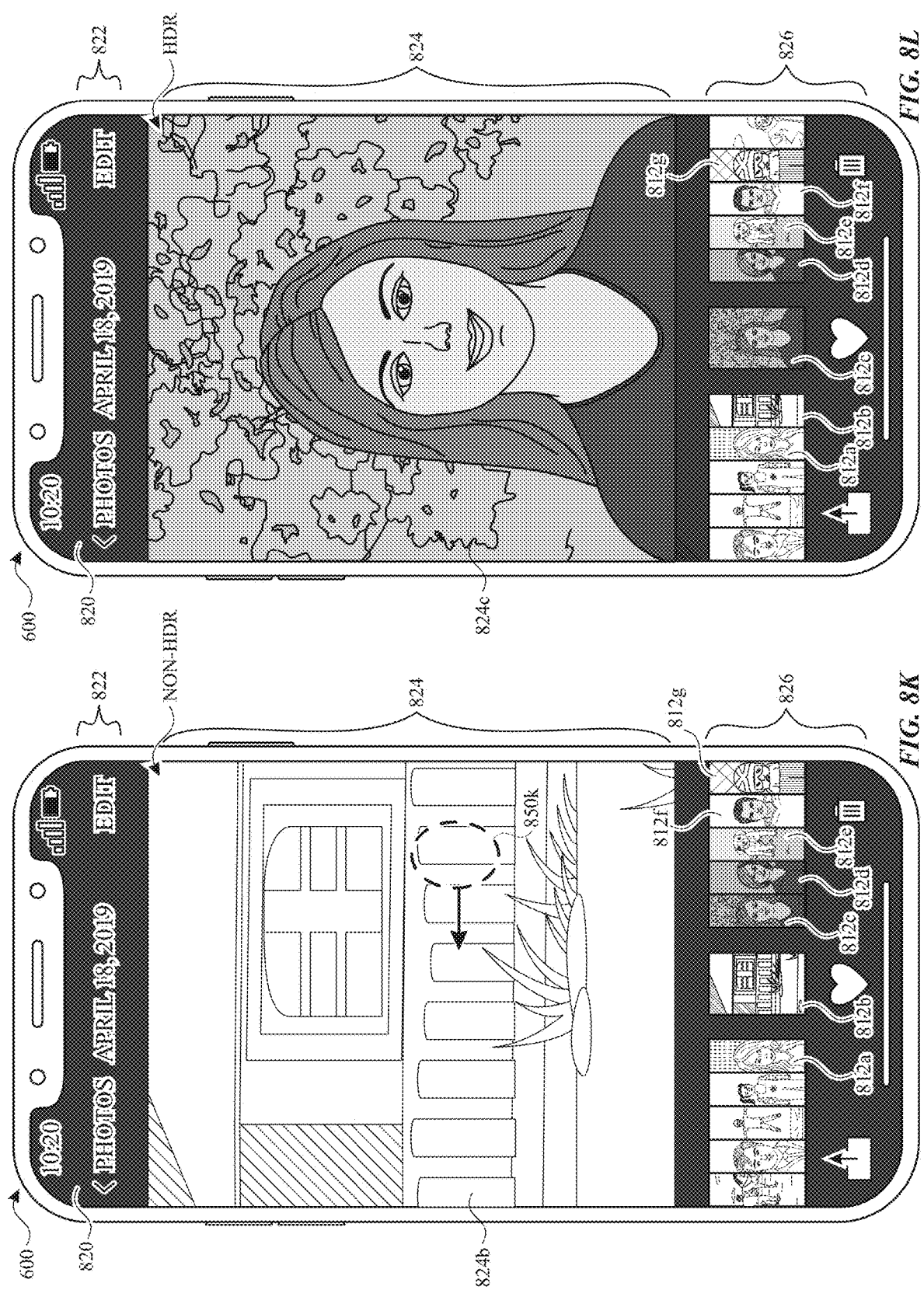

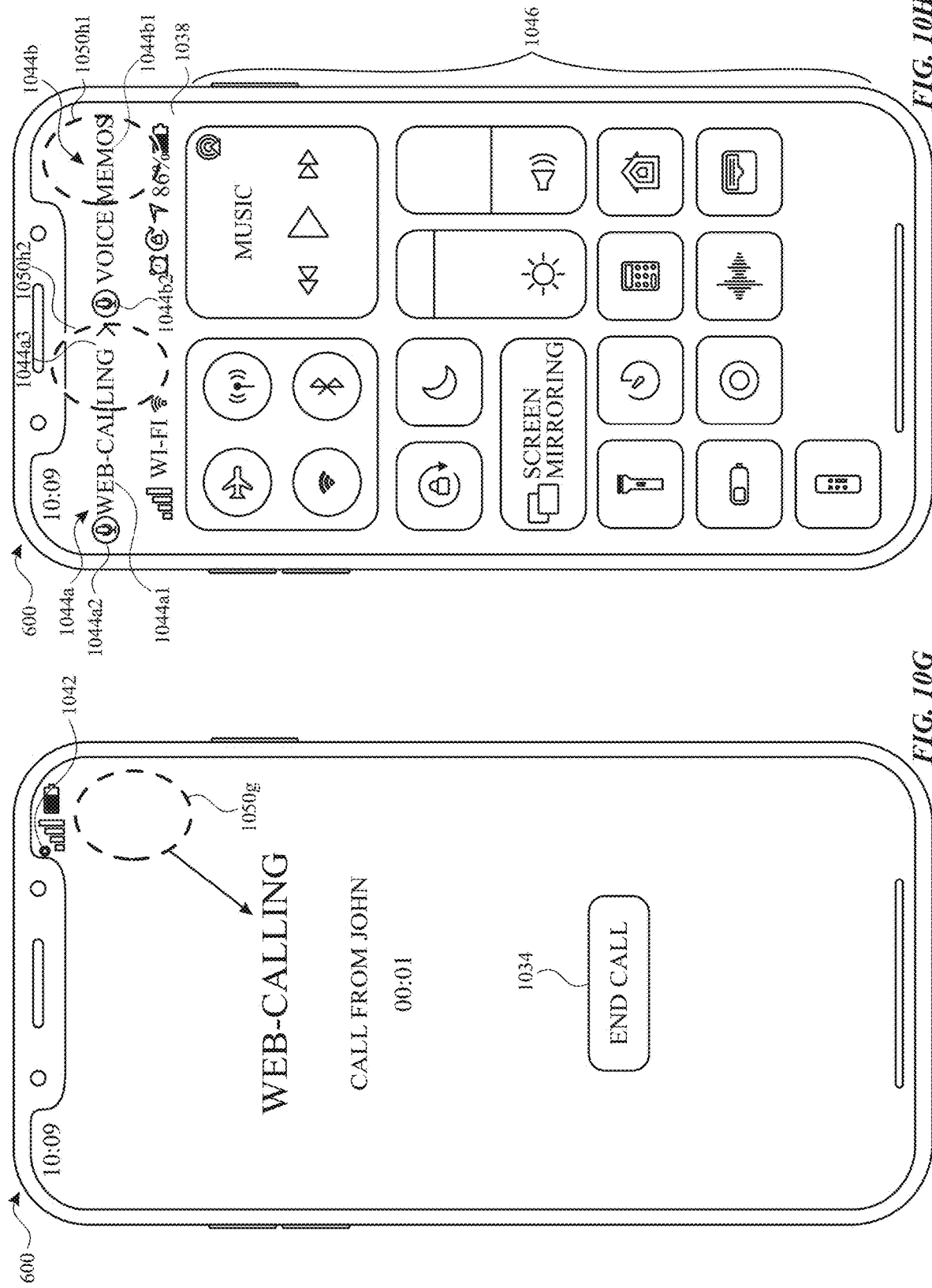

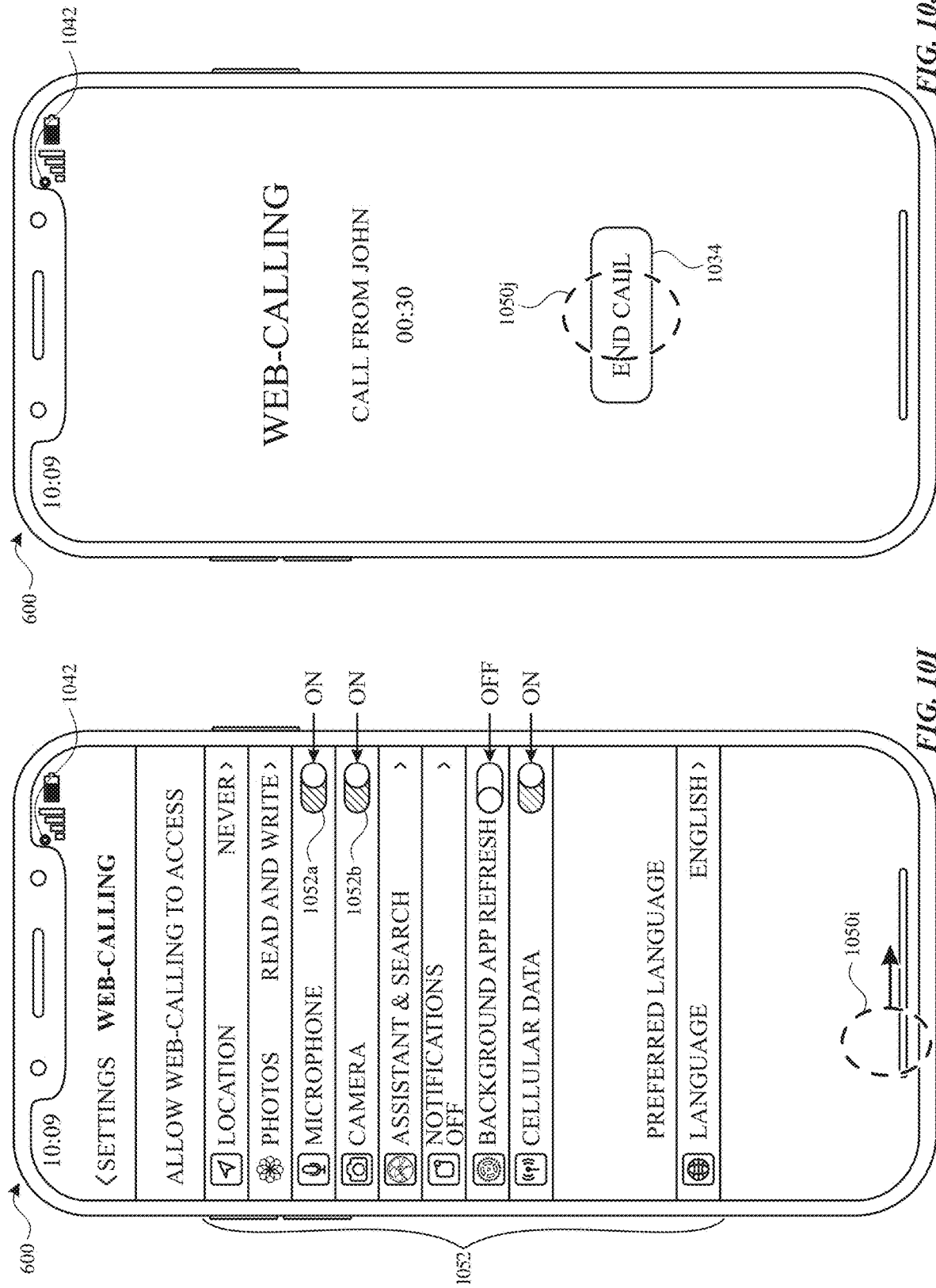

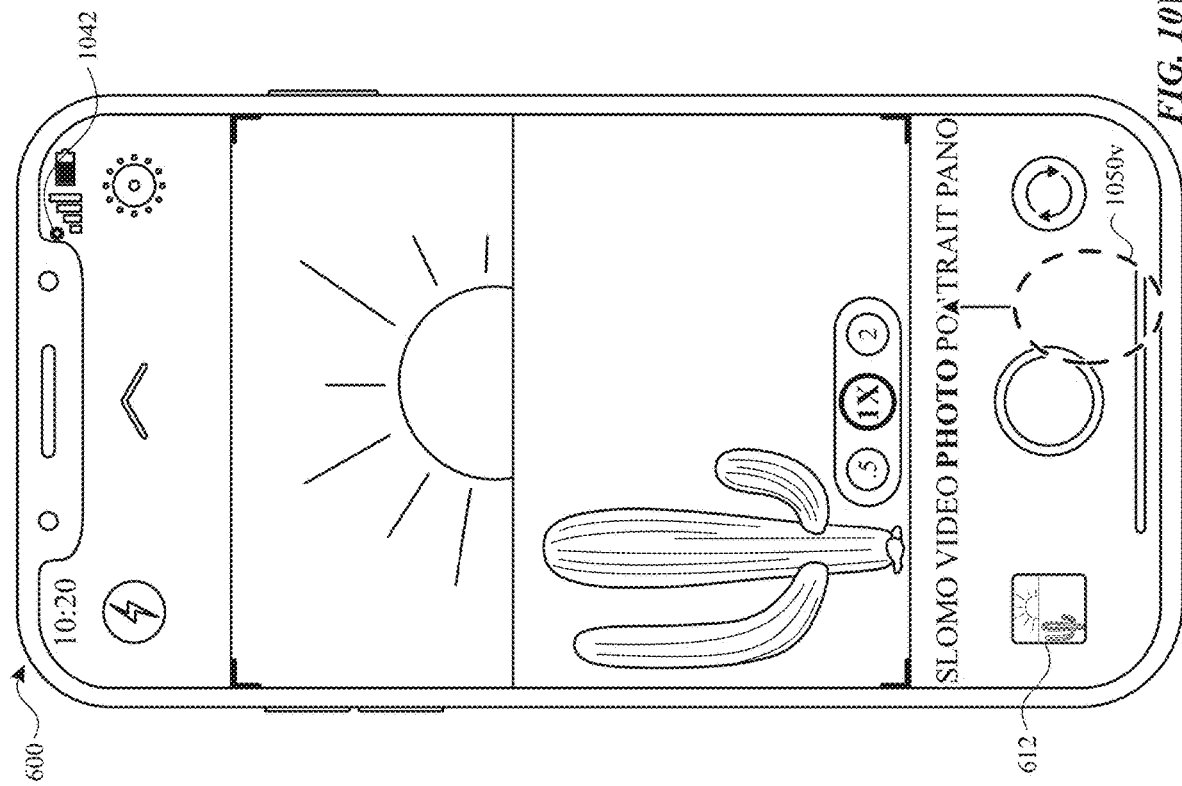
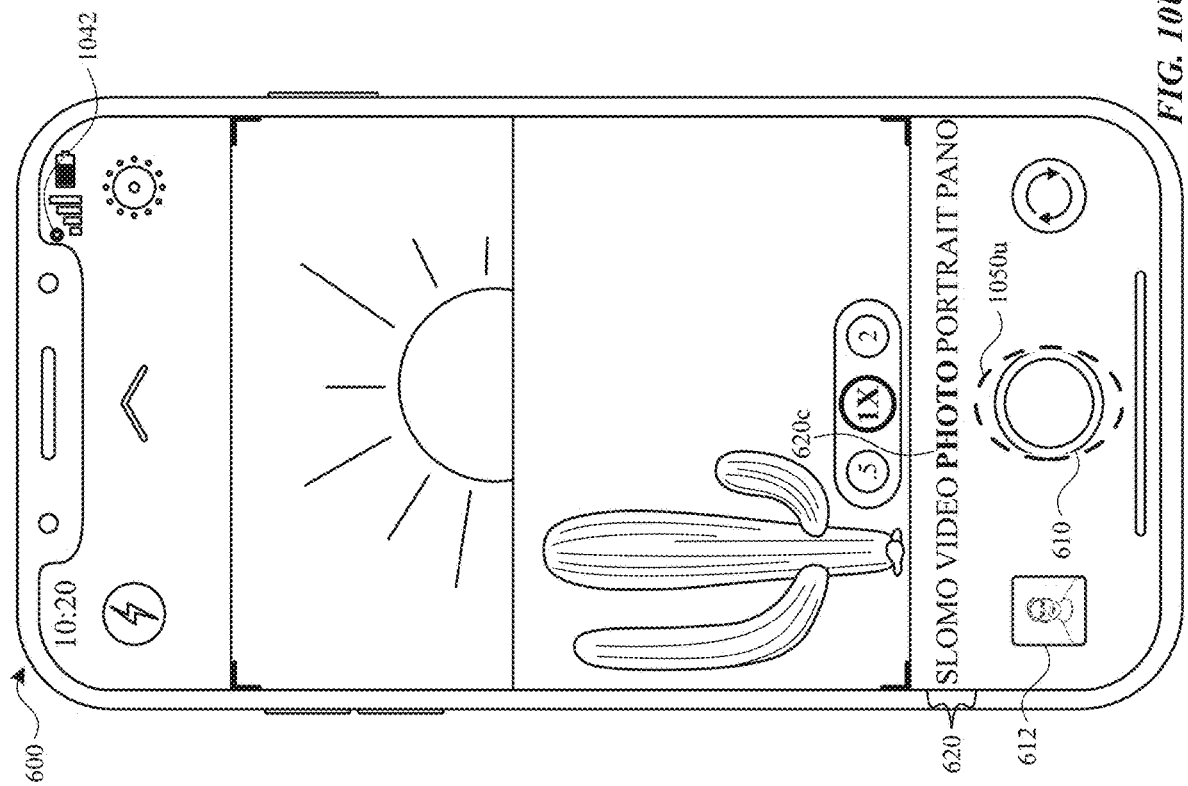

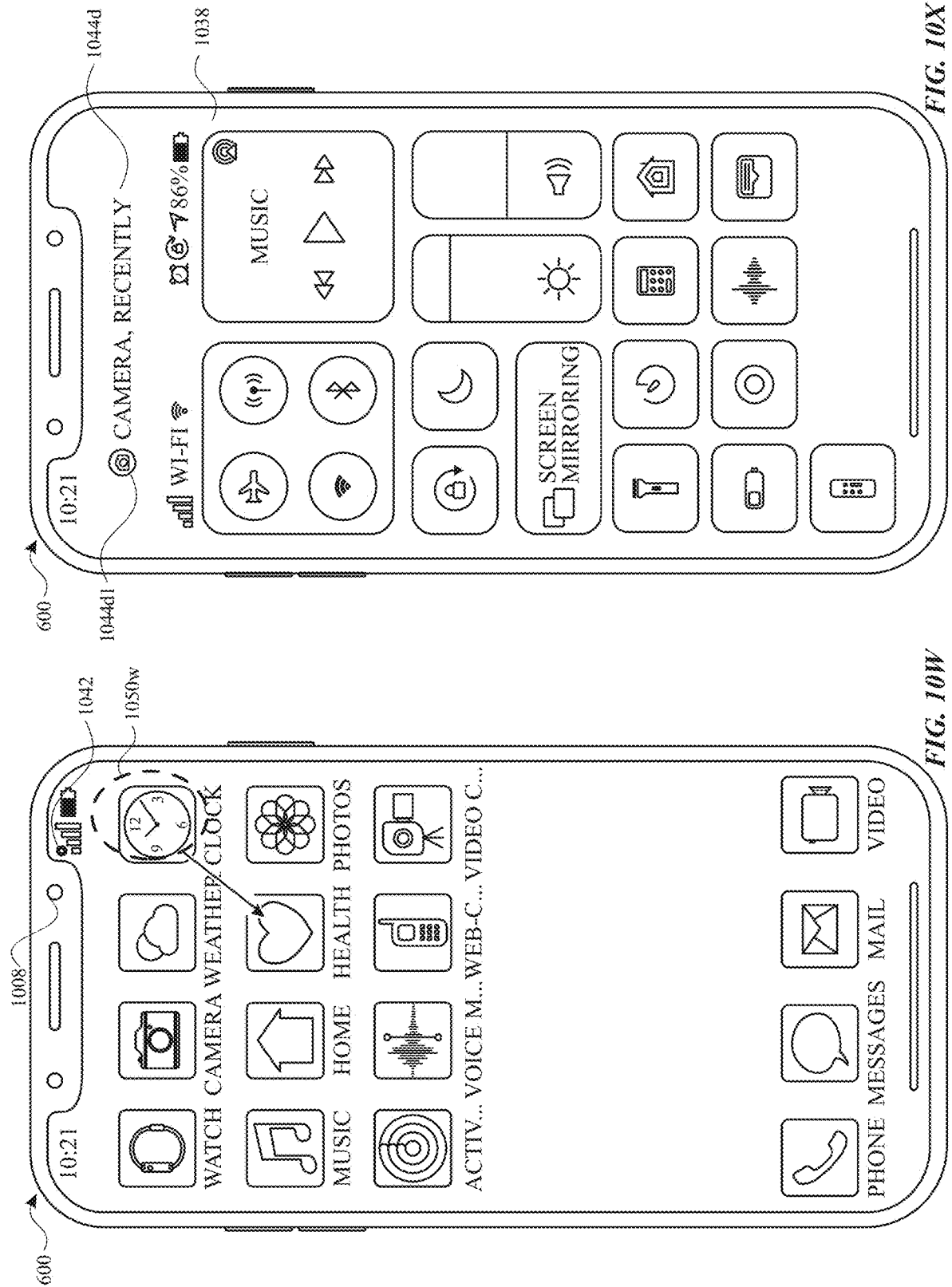

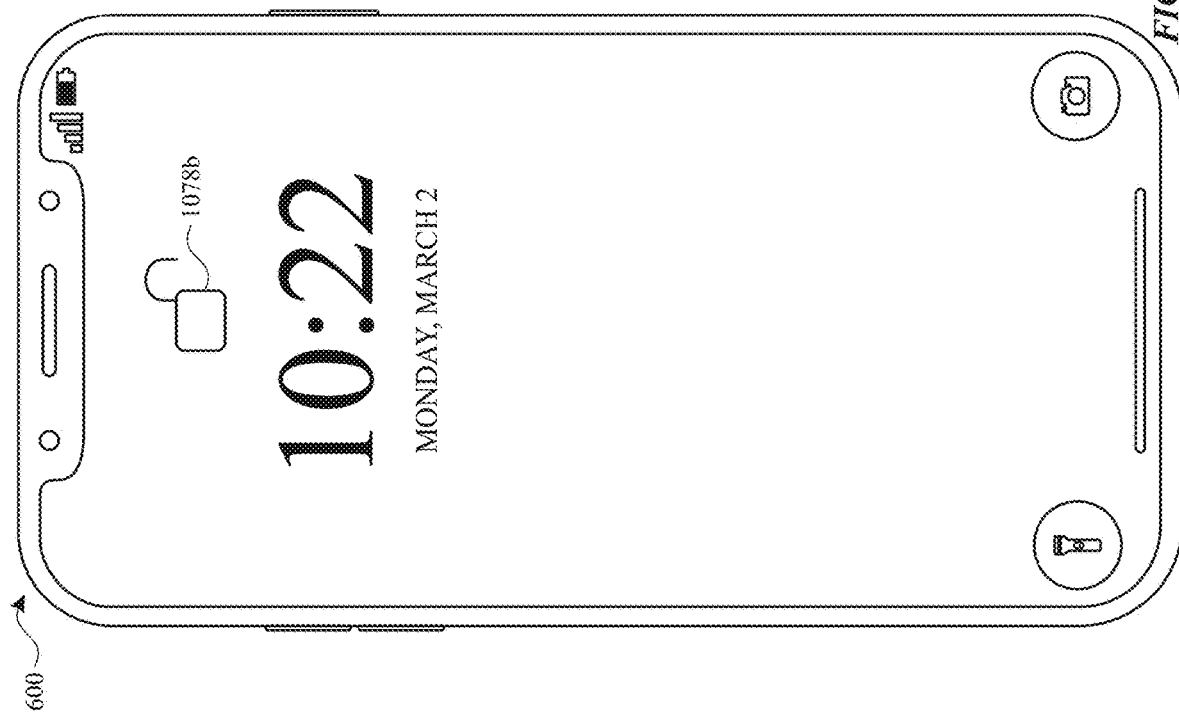

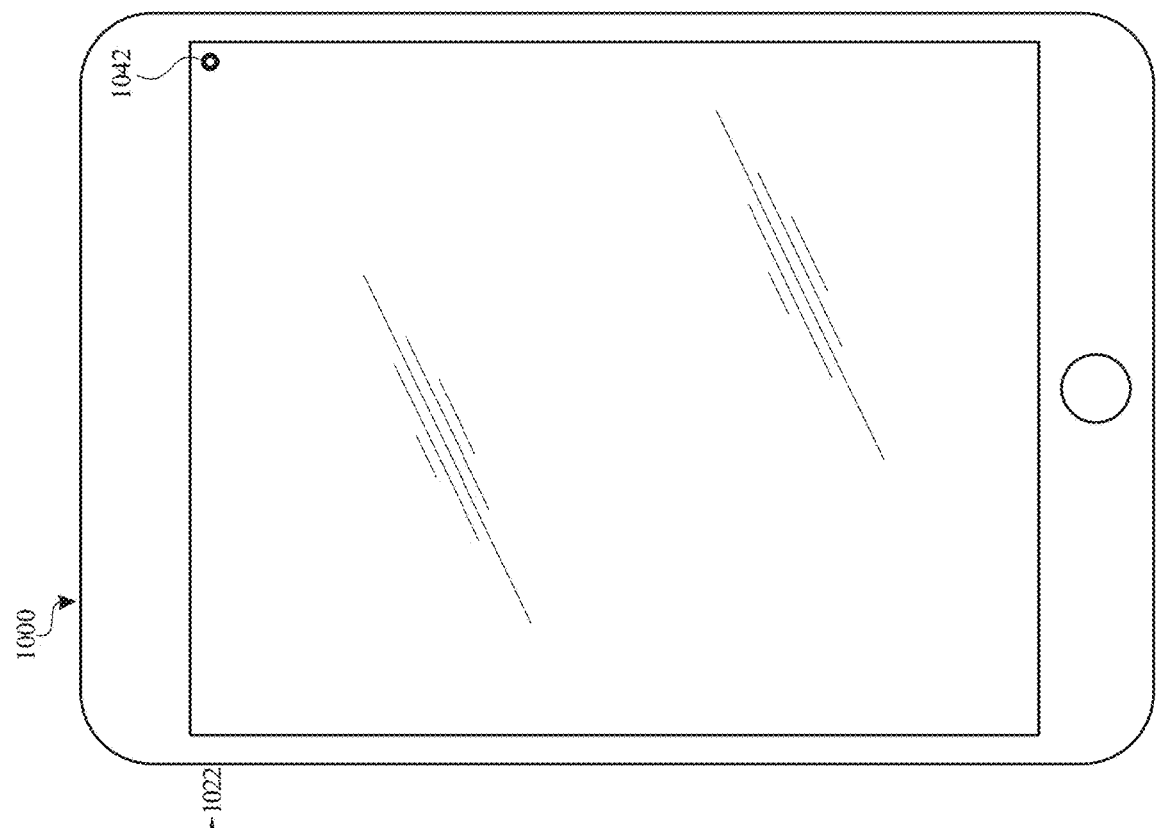
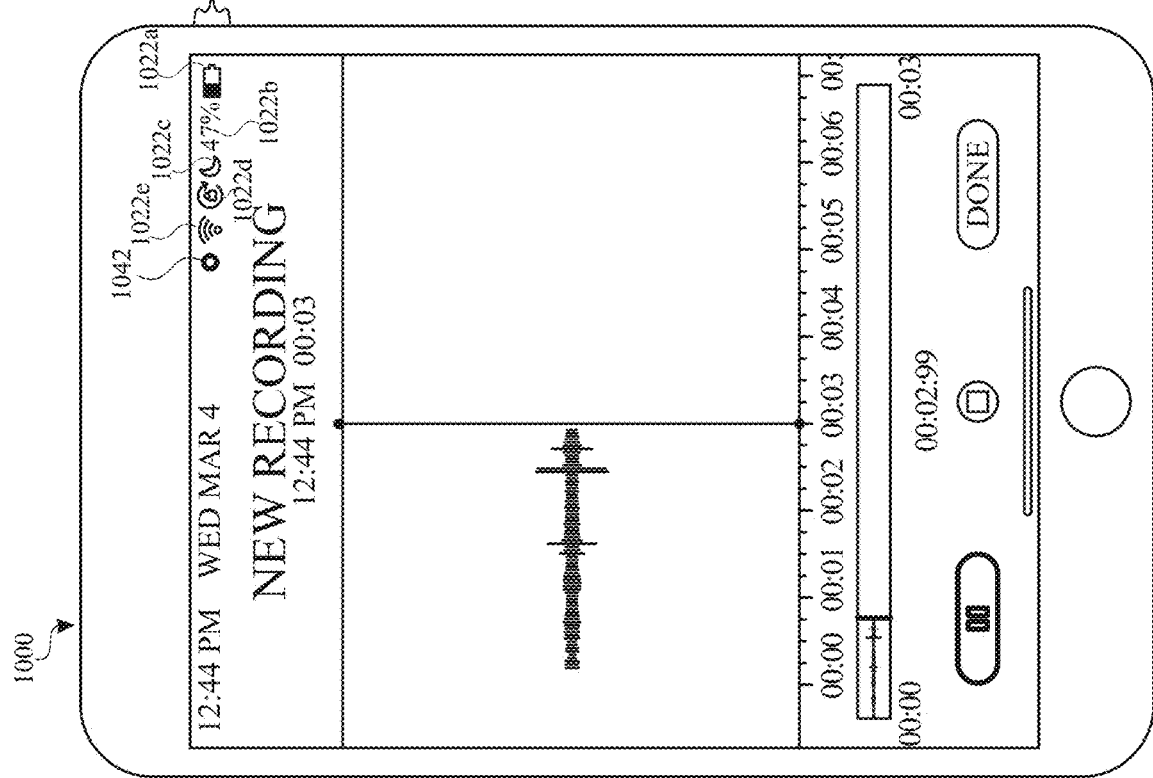
FIG. 10A
FIG. 10B

USER INTERFACES FOR MANAGING MEDIA

CROSS-REFERENCE TO RELATED APPLICATIONS

This application claims priority to U.S. Provisional Patent Application Ser. No. 63/032,871, filed on Jun. 1, 2020, titled "USER INTERFACES FOR MANAGING MEDIA," the content of which is hereby incorporated by reference in its entirety.

FIELD

The present disclosure relates generally to computer user interfaces, and more specifically to techniques for managing media.

BACKGROUND

Users of smartphones and other personal electronic devices are frequently capture, store, and edit media for safekeeping memories and sharing with friends. Some existing techniques allowed users to capture media, such as images, audio, and/or videos. Users can manage such media by, for example, capturing, storing, and editing the media.

BRIEF SUMMARY

Some user interfaces for managing media using electronic devices, however, are generally cumbersome and inefficient. For example, some existing techniques use a complex and time-consuming user interface, which may include multiple key presses or keystrokes. Existing techniques require more time than necessary, wasting user time and device energy. This latter consideration is particularly important in battery-operated devices.

Accordingly, the present technique provides electronic devices with faster, more efficient methods and interfaces for managing media. Such methods and interfaces optionally complement or replace other methods for managing media. Such methods and interfaces reduce the cognitive burden on a user and produce a more efficient human-machine interface. For battery-operated computing systems, such methods and interfaces conserve power and increase the time between battery charges.

In some examples, the present technique enables users of computer systems to capture and display media in a time-efficient and input-efficient manner, thereby reducing the amount of processing the device needs to do. In some examples, the present technique manages the brightness of regions of the user interface, thereby saving battery life.

In accordance with some embodiments, a method is described. The method is performed at a computer system having one or more cameras, wherein the computer system is in communication with a display generation component and one or more input devices. The method comprises: receiving a request to display a camera user interface; and in response to receiving the request to display the camera user interface and while the one or more cameras are configured to capture images based on a first exposure compensation value, displaying, via the display generation component, a camera user interface that includes: displaying, via the display generation component, a first representation of a field-of-view of the one or more cameras; and in accordance with a determination that a set of exposure compensation criteria is met, wherein the set of exposure compensation criteria includes a criterion that is met when an exposure compensation mode is enabled, displaying, concurrently with the representation of the field-of-view of the one or more cameras, an exposure compensation indicator that includes: a representation of the first exposure compensation value; and a visual indication that the computer system has determined that clipping is predicted to occur in response to receiving a request to capture media that corresponds to the representation of the field-of-view of the one or more cameras.

In accordance with some embodiments, a non-transitory computer-readable storage medium is described. The non-transitory computer-readable storage medium stores one or more programs configured to be executed by one or more processors of a computer system having one or more cameras, wherein the computer system is in communication with a display generation component and one or more input devices, the one or more programs including instructions for: receiving a request to display a camera user interface; and in response to receiving the request to display the camera user interface and while the one or more cameras are configured to capture images based on a first exposure compensation value, displaying, via the display generation component, a camera user interface that includes: displaying, via the display generation component, a first representation of a field-of-view of the one or more cameras; and in accordance with a determination that a set of exposure compensation criteria is met, wherein the set of exposure compensation criteria includes a criterion that is met when an exposure compensation mode is enabled, displaying, concurrently with the representation of the field-of-view of the one or more cameras, an exposure compensation indicator that includes: a representation of the first exposure compensation value; and a visual indication that the computer system has determined that clipping is predicted to occur in response to receiving a request to capture media that corresponds to the representation of the field-of-view of the one or more cameras.

In accordance with some embodiments, a transitory computer-readable storage medium is described. The transitory computer-readable storage medium stores one or more programs configured to be executed by one or more processors of a computer system having one or more cameras, wherein the computer system is in communication with a display generation component and one or more input devices, the one or more programs including instructions for: receiving a request to display a camera user interface; and in response to receiving the request to display the camera user interface and while the one or more cameras are configured to capture images based on a first exposure compensation value, displaying, via the display generation component, a camera user interface that includes: displaying, via the display generation component, a first representation of a field-of-view of the one or more cameras; and in accordance with a determination that a set of exposure compensation criteria is met, wherein the set of exposure compensation criteria includes a criterion that is met when an exposure compensation mode is enabled, displaying, concurrently with the representation of the field-of-view of the one or more cameras, an exposure compensation indicator that includes: a representation of the first exposure compensation value; and a visual indication that the computer system has determined that clipping is predicted to occur in response to receiving a request to capture media that corresponds to the representation of the field-of-view of the one or more cameras.

In accordance with some embodiments, a computer system is described. The computer system comprises: one or more cameras; one or more processors, wherein the computer system is in communication with a display generation component and one or more input devices; and memory storing one or more programs configured to be executed by the one or more processors, the one or more programs including instructions for: receiving a request to display a camera user interface; and in response to receiving the request to display the camera user interface and while the one or more cameras are configured to capture images based on a first exposure compensation value, displaying, via the display generation component, a camera user interface that includes: displaying, via the display generation component, a first representation of a field-of-view of the one or more cameras; and in accordance with a determination that a set of exposure compensation criteria is met, wherein the set of exposure compensation criteria includes a criterion that is met when an exposure compensation mode is enabled, displaying, concurrently with the representation of the field-of-view of the one or more cameras, an exposure compensation indicator that includes: a representation of the first exposure compensation value; and a visual indication that the computer system has determined that clipping is predicted to occur in response to receiving a request to capture media that corresponds to the representation of the field-of-view of the one or more cameras.

In accordance with some embodiments, a computer system is described. The computer system comprises: means for receiving a request to display a camera user interface; and means, responsive to receiving the request to display the camera user interface and while the one or more cameras are configured to capture images based on a first exposure compensation value, for displaying, via the display generation component, a camera user interface that includes: means for displaying, via the display generation component, a first representation of a field-of-view of the one or more cameras; and means, in accordance with a determination that a set of exposure compensation criteria is met, wherein the set of exposure compensation criteria includes a criterion that is met when an exposure compensation mode is enabled, for displaying, concurrently with the representation of the field-of-view of the one or more cameras, an exposure compensation indicator that includes: a representation of the first exposure compensation value; and a visual indication that the computer system has determined that clipping is predicted to occur in response to receiving a request to capture media that corresponds to the representation of the field-of-view of the one or more cameras.

In accordance with some embodiments, a method is described. The method is performed at a computer system that is in communication with a display generation component and one or more input devices. The method comprises: displaying, via the display generation component, a media viewer user interface that includes: a first portion that includes a representation of a first previously captured media item; and a second portion that has a first visual appearance and that is different from the first portion of the media viewer user interface; while displaying, via the display generation component, the media viewer user interface that includes the second portion of the media viewer user interface that has the first visual appearance, receiving a request to display a representation of a second previously captured media item that is different from the first previously captured media item; and in response to receiving the request to display the representation of the second previously captured media item: in accordance with a determination that a first set of criteria is met, wherein the first set of criteria includes a criterion that is met when the representation of the second previously captured media item is a high-dynamic-range (HDR) media item: displaying the representation of the second previously captured media item; and updating the second portion of the media viewer user interface to have a second visual appearance that is different from the first visual appearance.

In accordance with some embodiments, a non-transitory computer-readable storage medium is described. The non-transitory computer-readable storage medium storing one or more programs configured to be executed by one or more processors of a computer system, wherein the computer system is in communication with a display generation component and one or more input devices, the one or more programs including instructions for: displaying, via the display generation component, a media viewer user interface that includes: a first portion that includes a representation of a first previously captured media item; and a second portion that has a first visual appearance and that is different from the first portion of the media viewer user interface; while displaying, via the display generation component, the media viewer user interface that includes the second portion of the media viewer user interface that has the first visual appearance, receiving a request to display a representation of a second previously captured media item that is different from the first previously captured media item; and in response to receiving the request to display the representation of the second previously captured media item: in accordance with a determination that a first set of criteria is met, wherein the first set of criteria includes a criterion that is met when the representation of the second previously captured media item is a high-dynamic-range (HDR) media item: displaying the representation of the second previously captured media item; and updating the second portion of the media viewer user interface to have a second visual appearance that is different from the first visual appearance.

In accordance with some embodiments, a transitory computer-readable storage medium is described. The transitory computer-readable storage medium stores one or more programs configured to be executed by one or more processors of a computer system, wherein the computer system is in communication with a display generation component and one or more input devices, the one or more programs including instructions for: displaying, via the display generation component, a media viewer user interface that includes: a first portion that includes a representation of a first previously captured media item; and a second portion that has a first visual appearance and that is different from the first portion of the media viewer user interface; while displaying, via the display generation component, the media viewer user interface that includes the second portion of the media viewer user interface that has the first visual appearance, receiving a request to display a representation of a second previously captured media item that is different from the first previously captured media item; and in response to receiving the request to display the representation of the second previously captured media item: in accordance with a determination that a first set of criteria is met, wherein the first set of criteria includes a criterion that is met when the representation of the second previously captured media item is a high-dynamic-range (HDR) media item: displaying the representation of the second previously captured media item; and updating the second portion of the media viewer user interface to have a second visual appearance that is different from the first visual appearance.

In accordance with some embodiments, a computer system is described. The computer system comprises: one or more processors, wherein the computer system is in communication with a display generation component and one or more input devices; and memory storing one or more programs configured to be executed by the one or more processors, the one or more programs including instructions for: displaying, via the display generation component, a media viewer user interface that includes: a first portion that includes a representation of a first previously captured media item; and a second portion that has a first visual appearance and that is different from the first portion of the media viewer user interface; while displaying, via the display generation component, the media viewer user interface that includes the second portion of the media viewer user interface that has the first visual appearance, receiving a request to display a representation of a second previously captured media item that is different from the first previously captured media item; and in response to receiving the request to display the representation of the second previously captured media item: in accordance with a determination that a first set of criteria is met, wherein the first set of criteria includes a criterion that is met when the representation of the second previously captured media item is a high-dynamic-range (HDR) media item: displaying the representation of the second previously captured media item; and updating the second portion of the media viewer user interface to have a second visual appearance that is different from the first visual appearance.

In accordance with some embodiments, a computer system is described. The computer system comprises: means for displaying, via the display generation component, a media viewer user interface that includes: a first portion that includes a representation of a first previously captured media item; and a second portion that has a first visual appearance and that is different from the first portion of the media viewer user interface; means, while displaying, via the display generation component, the media viewer user interface that includes the second portion of the media viewer user interface that has the first visual appearance, for receiving a request to display a representation of a second previously captured media item that is different from the first previously captured media item; and in response to receiving the request to display the representation of the second previously captured media item: means, in accordance with a determination that a first set of criteria is met, wherein the first set of criteria includes a criterion that is met when the representation of the second previously captured media item is a high-dynamic-range (HDR) media item: for displaying the representation of the second previously captured media item; and updating the second portion of the media viewer user interface to have a second visual appearance that is different from the first visual appearance.

In accordance with some embodiments, a method is described. The method is performed at a computer system having a first media-capturing device, wherein the computer system is in communication with a display generation component and one or more input devices. The method comprises: receiving an indication that the first media-capturing device has been activated; and in response to receiving the indication that the first media-capturing device has been activated: in accordance with a determination that, while activated, the first media-capturing device recorded data of a first type, displaying, via the display generation component, a graphical indicator that indicates activation of the first media-capturing device; and in accordance with a determination that, while activated, the first media-capturing device recorded data of a second type without recording data of the first type, forgoing display of the graphical indicator that indicates activation of the first media-capturing device.

In accordance with some embodiments, a non-transitory computer-readable storage medium is described. The non-transitory computer-readable storage medium stores one or more programs configured to be executed by one or more processors of a computer system having a first media-capturing device, wherein the computer system is in communication with a display generation component and one or more input devices, the one or more programs including instructions for: receiving an indication that the first media-capturing device has been activated; and in response to receiving the indication that the first media-capturing device has been activated: in accordance with a determination that, while activated, the first media-capturing device recorded data of a first type, displaying, via the display generation component, a graphical indicator that indicates activation of the first media-capturing device; and in accordance with a determination that, while activated, the first media-capturing device recorded data of a second type without recording data of the first type, forgoing display of the graphical indicator that indicates activation of the first media-capturing device.

In accordance with some embodiments, a transitory computer-readable storage medium is described. The transitory computer-readable storage medium stores one or more programs configured to be executed by one or more processors of a computer system having a first media-capturing device, wherein the computer system is in communication with a display generation component and one or more input devices, the one or more programs including instructions for: receiving an indication that the first media-capturing device has been activated; and in response to receiving the indication that the first media-capturing device has been activated: in accordance with a determination that, while activated, the first media-capturing device recorded data of a first type, displaying, via the display generation component, a graphical indicator that indicates activation of the first media-capturing device; and in accordance with a determination that, while activated, the first media-capturing device recorded data of a second type without recording data of the first type, forgoing display of the graphical indicator that indicates activation of the first media-capturing device.

In accordance with some embodiments, a computer system is described. The computer system comprises: a first media-capturing device, wherein the computer system is in communication with a display generation component and one or more input devices; one or more processors; memory storing one or more programs configured to be executed by the one or more processors, the one or more programs including instructions for: receiving an indication that the first media-capturing device has been activated; and in response to receiving the indication that the first media-capturing device has been activated: in accordance with a determination that, while activated, the first media-capturing device recorded data of a first type, displaying, via the display generation component, a graphical indicator that indicates activation of the first media-capturing device; and in accordance with a determination that, while activated, the first media-capturing device recorded data of a second type without recording data of the first type, forgoing display of the graphical indicator that indicates activation of the first media-capturing device.

In accordance with some embodiments, a computer system is described. The computer system comprises: a first media-capturing device means for receiving an indication that the first media-capturing device has been activated; and means, responsive to receiving the indication that the first media-capturing device has been activated, for: in accordance with a determination that, while activated, the first media-capturing device recorded data of a first type, displaying, via the display generation component, a graphical indicator that indicates activation of the first media-capturing device; and in accordance with a determination that, while activated, the first media-capturing device recorded data of a second type without recording data of the first type, forgoing display of the graphical indicator that indicates activation of the first media-capturing device.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing media, thereby increasing the effectiveness, efficiency, and user satisfaction with such devices. Such methods and interfaces may complement or replace other methods for managing media.

DESCRIPTION OF THE FIGURES

For a better understanding of the various described embodiments, reference should be made to the Description of Embodiments below, in conjunction with the following drawings in which like reference numerals refer to corresponding parts throughout the figures.

FIGS. 8A-8L illustrate exemplary user interfaces for displaying media in accordance with some embodiments.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing media, such as the methods described herein to capture media using exposure compensation, display media, and display an indicator of the status of media. Such techniques can reduce the cognitive burden on a user who manages media, thereby enhancing productivity. Further, such techniques can reduce processor and battery power otherwise wasted on redundant user inputs.

Below, FIGS. 1A-1B, 2, 3, 4A-4B, and 5A-5B provide a description of exemplary devices for performing the techniques for managing media.

Figure 6J:
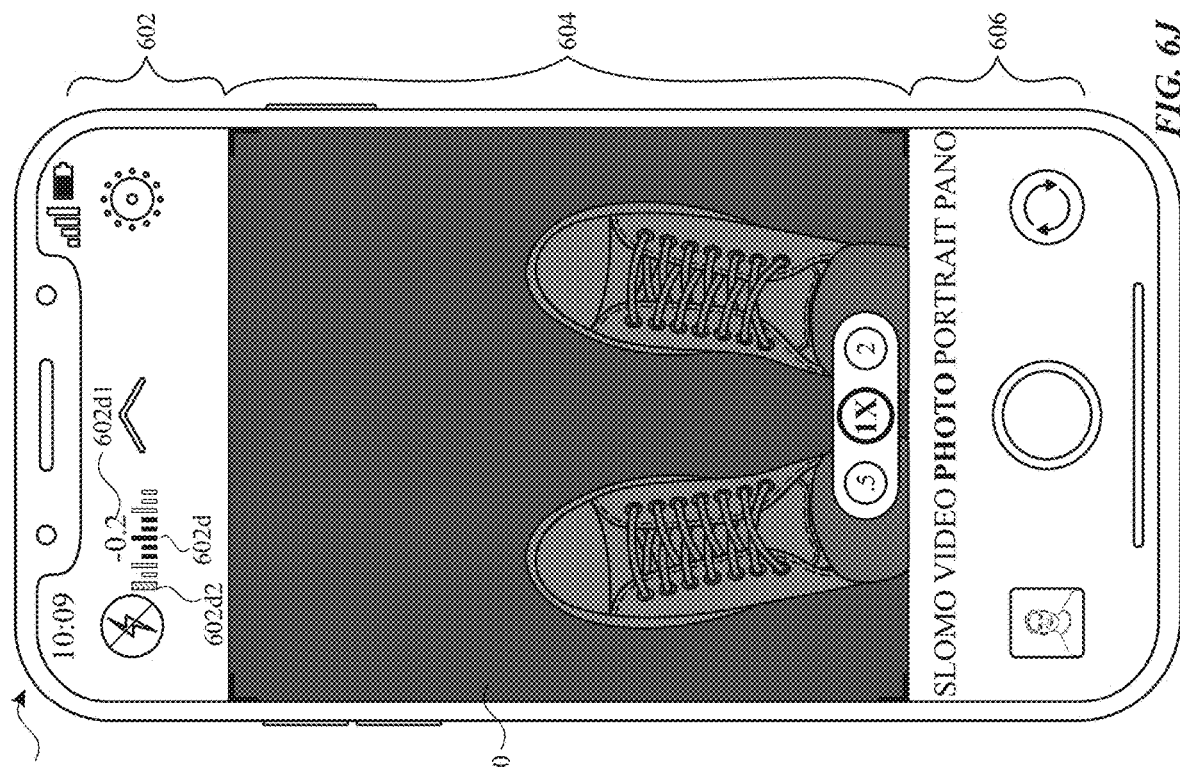
FIGS. 6A-6V illustrate exemplary user interfaces for managing exposure compensation in accordance with some embodiments.
Figure 6I:
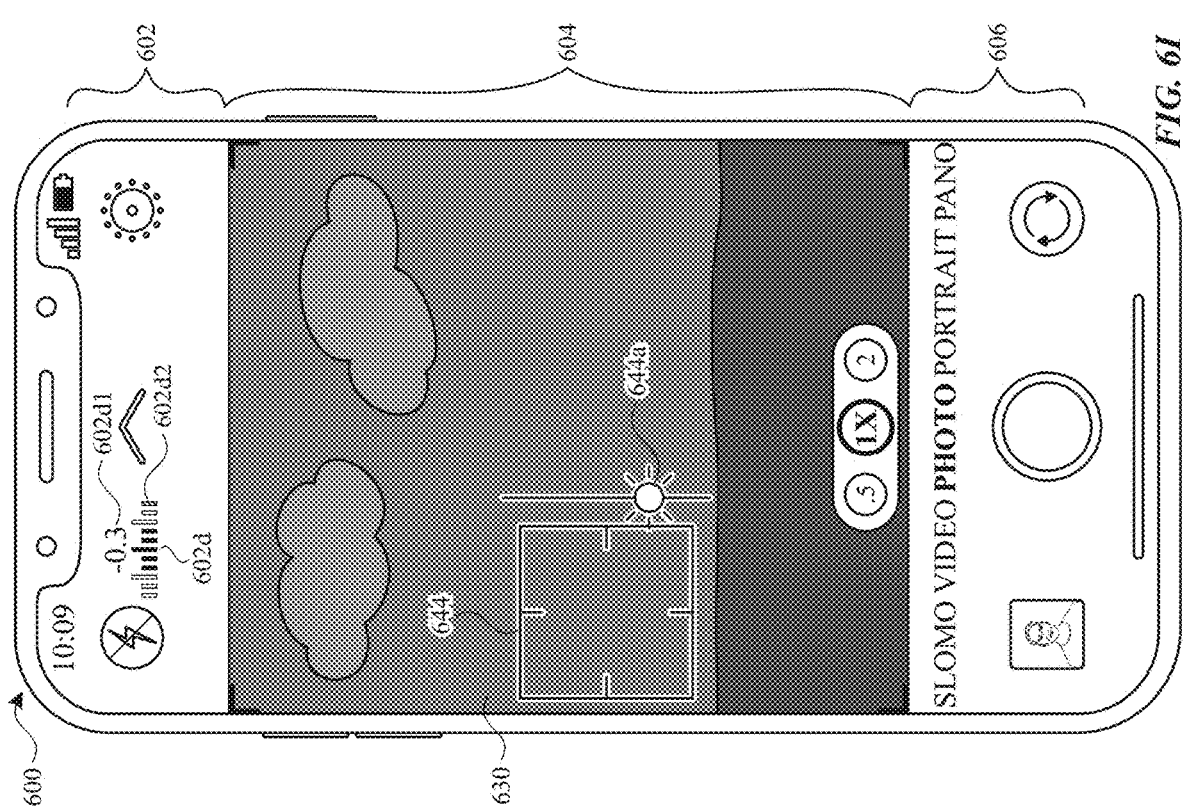
Figures 6Q, 6R:
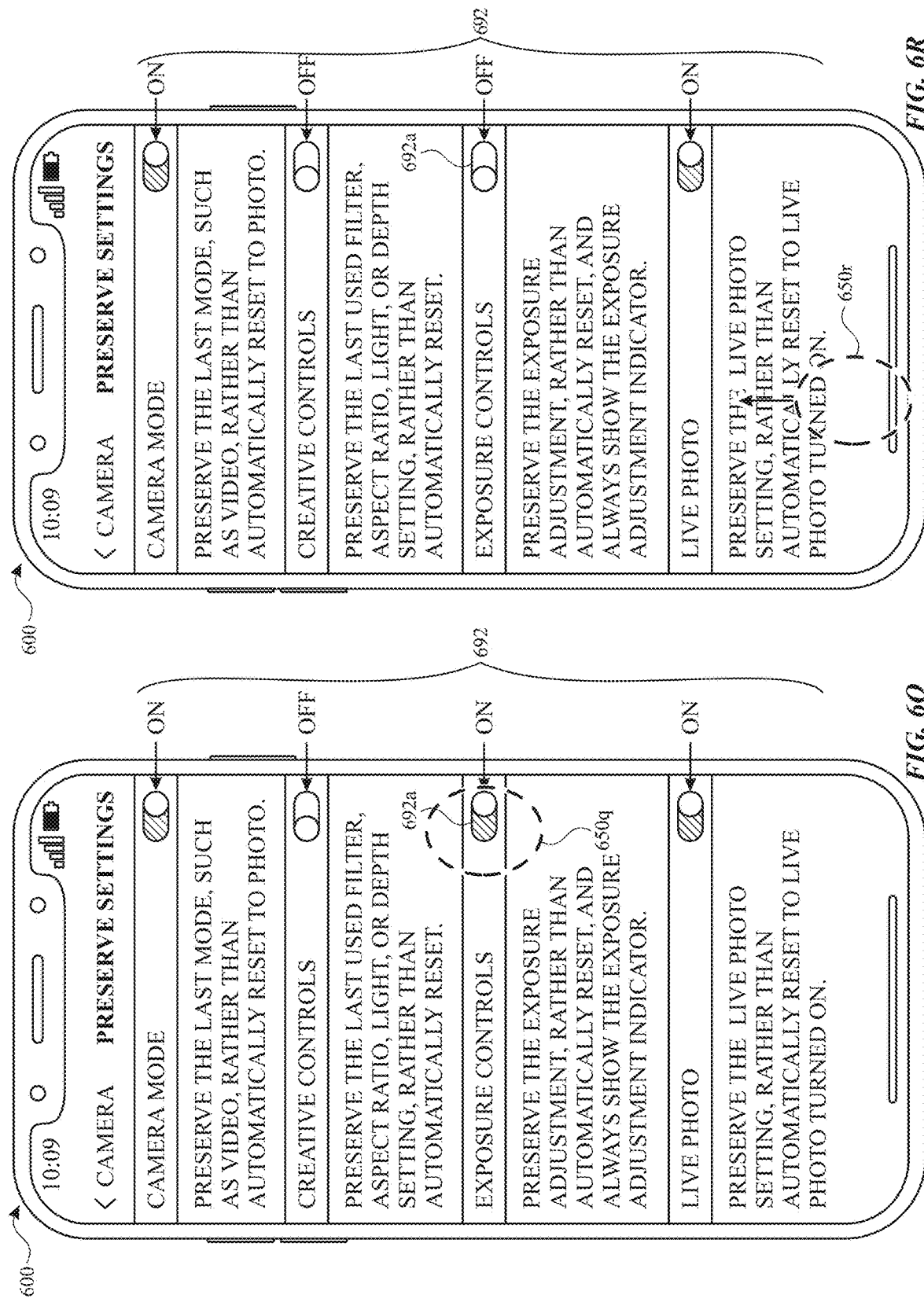
Figure 6T:
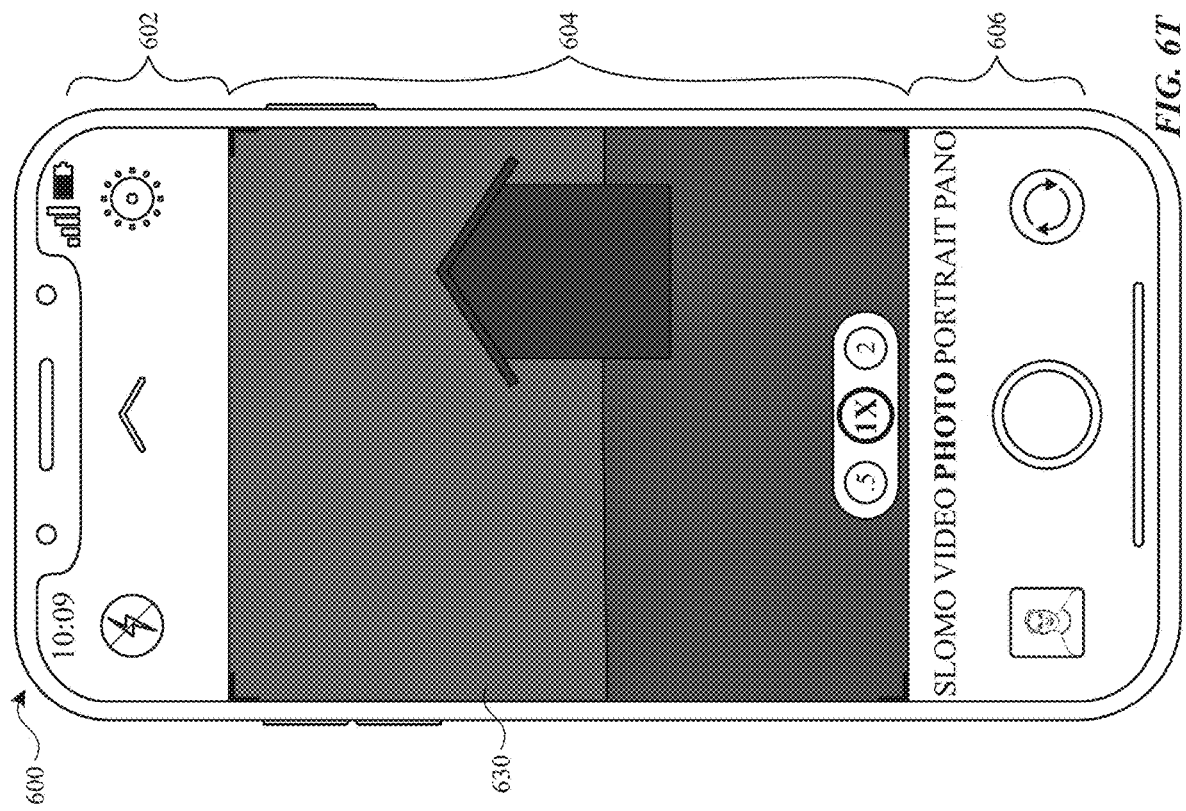
Figure 6S:
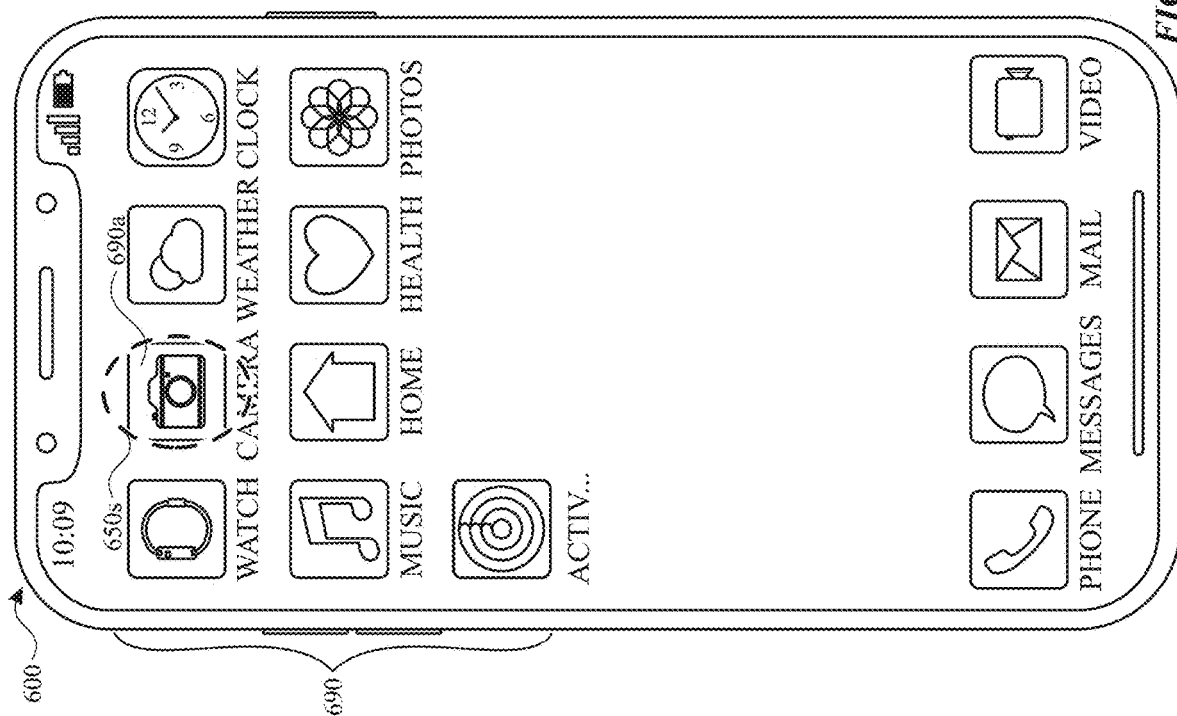
Figure 6V:
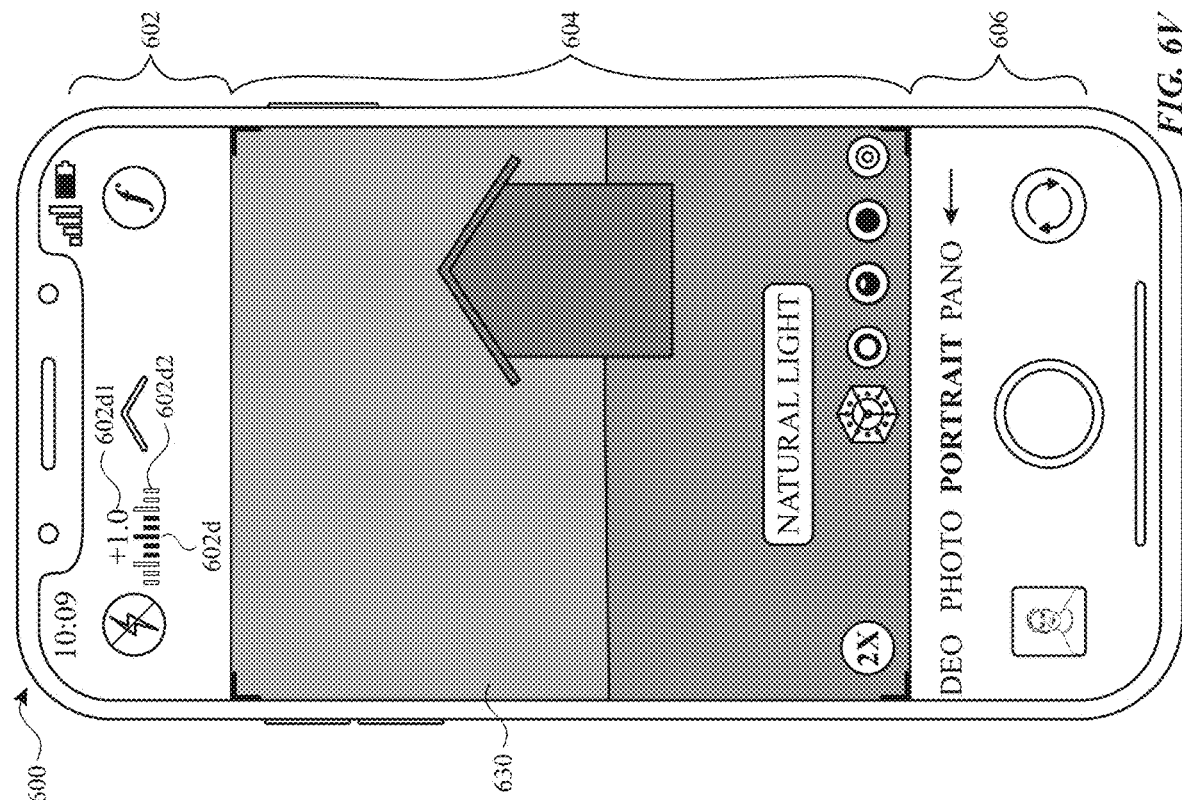
Figure 7:
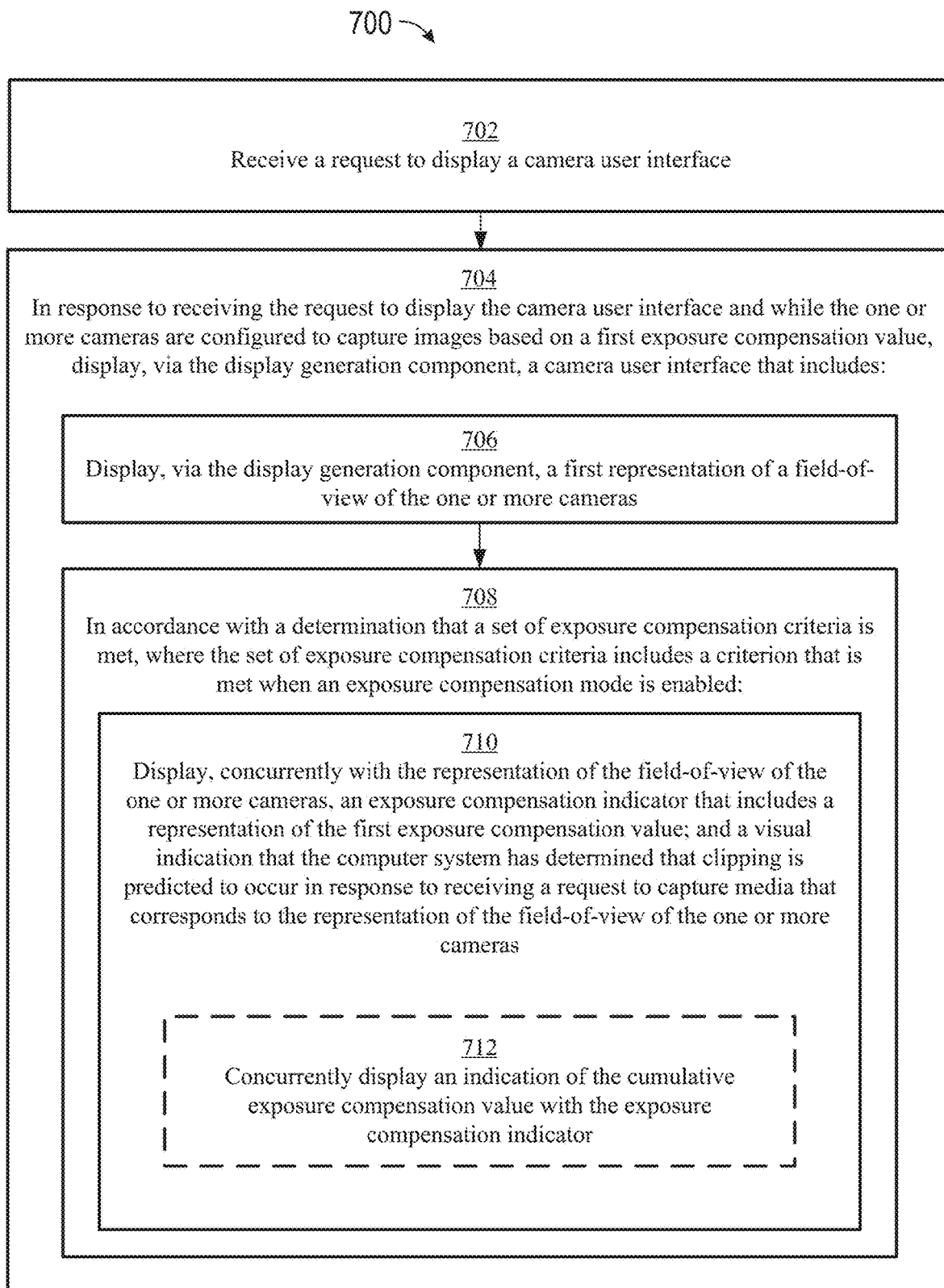
FIG. 7 is a flow diagram illustrating exemplary methods for managing exposure compensation in accordance with some embodiments.

FIGS. 6A-6V illustrate exemplary user interfaces for managing exposure compensation in accordance with some embodiments. FIG. 7 is a flow diagram illustrating exemplary methods for managing exposure compensation in accordance with some embodiments. The user interfaces in FIGS. 6A-6V are used to illustrate the processes described below, including the processes in FIG. 7.

FIGS. 8A-8L illustrate exemplary user interfaces for displaying media in accordance with some embodiments. FIG. 9 is a flow diagram illustrating exemplary methods for displaying media in accordance with some embodiments. The user interfaces in FIGS. 8A-8L are used to illustrate the processes described below, including the processes in FIG. 9.

Figure 10B:
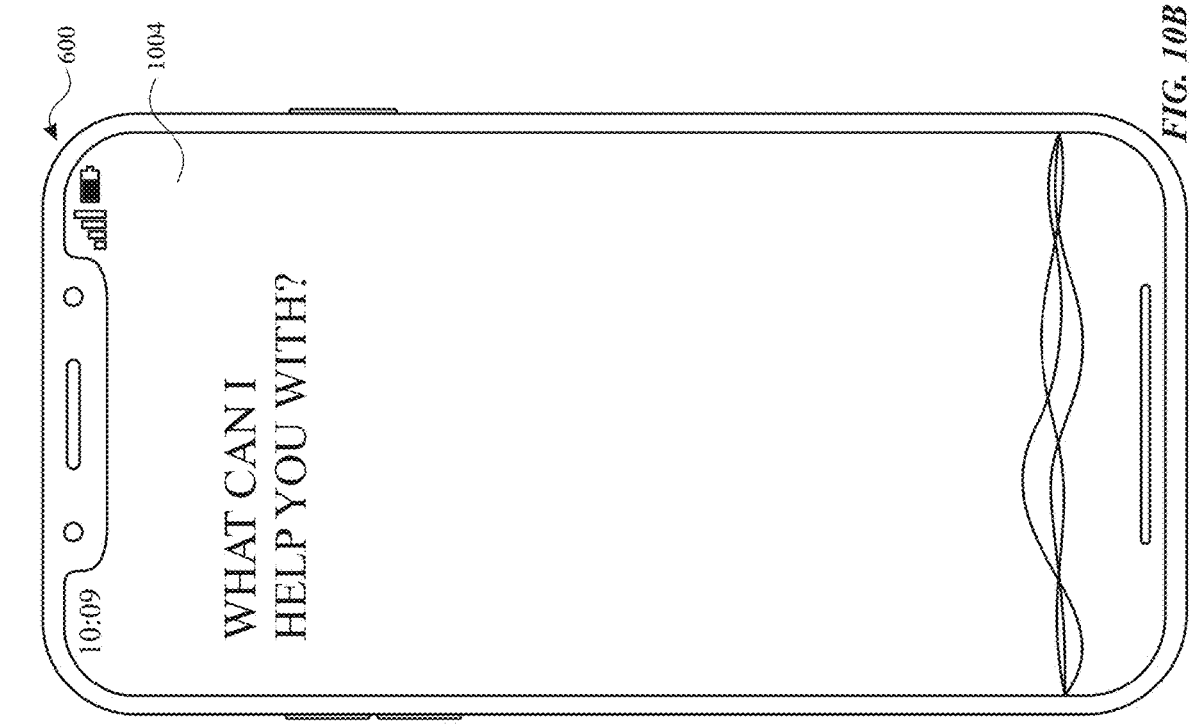
FIG. 10A-10AC illustrate exemplary user interfaces for displaying a status indicator in accordance with some embodiments.
Figure 10A:
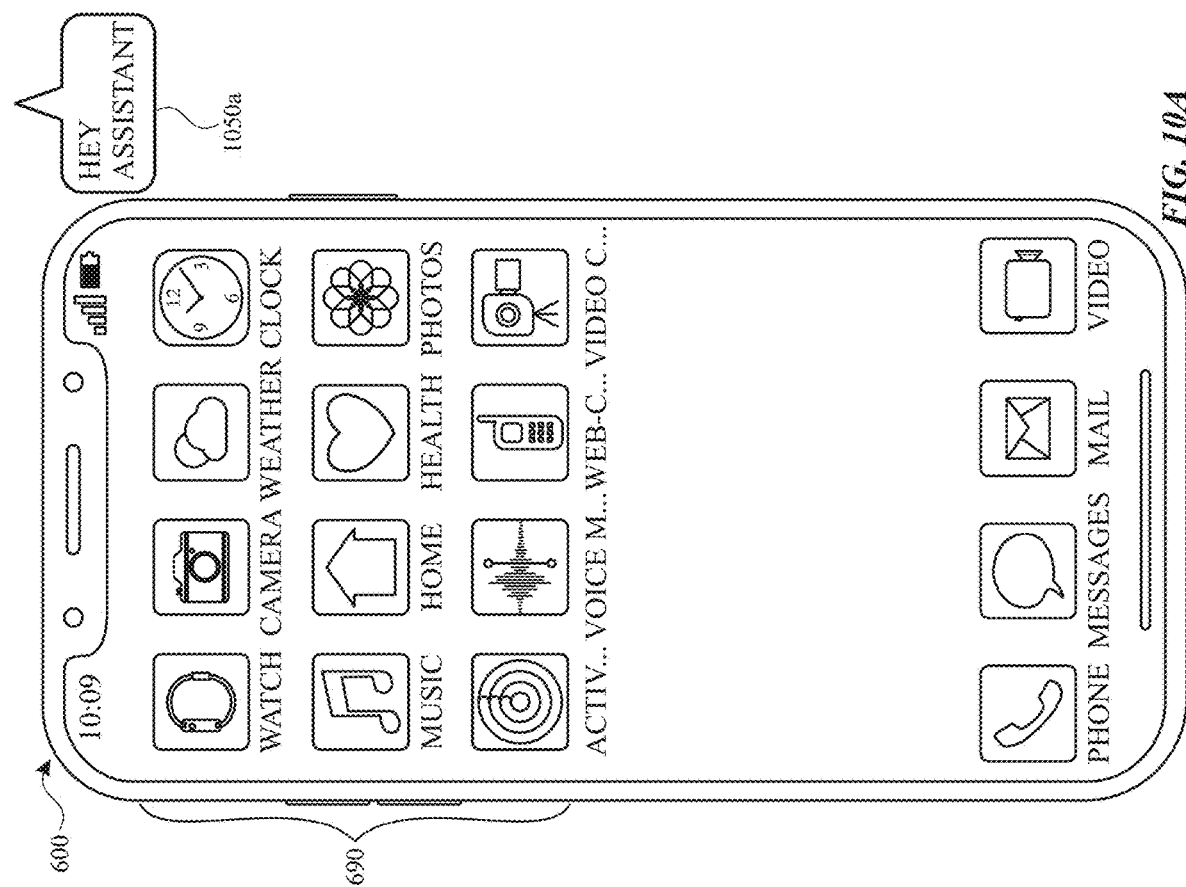
Figure 11:
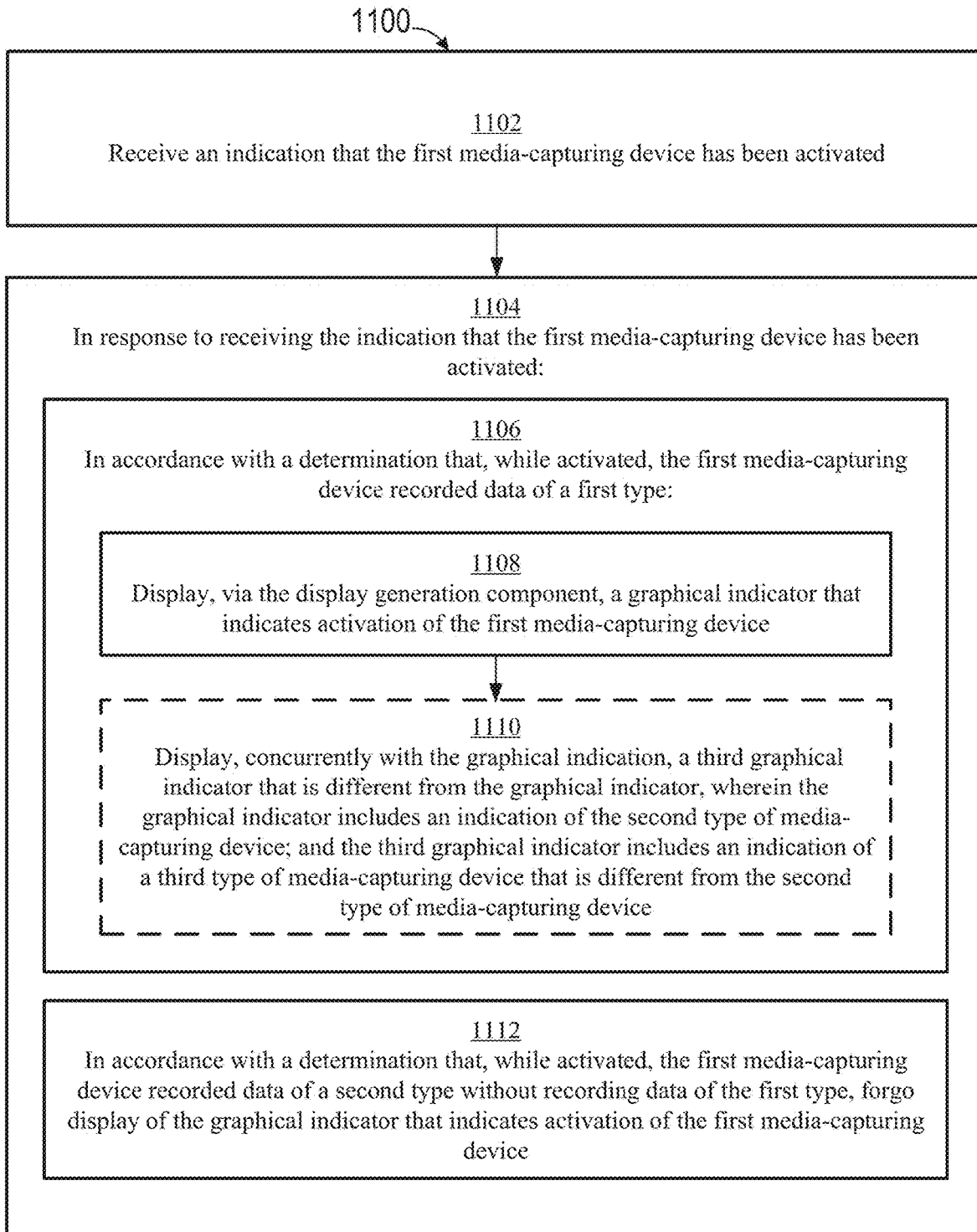
FIG. 11 is a flow diagram illustrating exemplary methods for displaying a status indicator in accordance with some embodiments.

FIGS. 10A-10AC illustrate an exemplary user interfaces for displaying a status indicator in accordance with some embodiments. FIG. 11 is a flow diagram illustrating exemplary methods for displaying a status indicator in accordance with some embodiments. The user interfaces in FIGS. 10A-10AC are used to illustrate the processes described below, including the processes in FIG. 11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
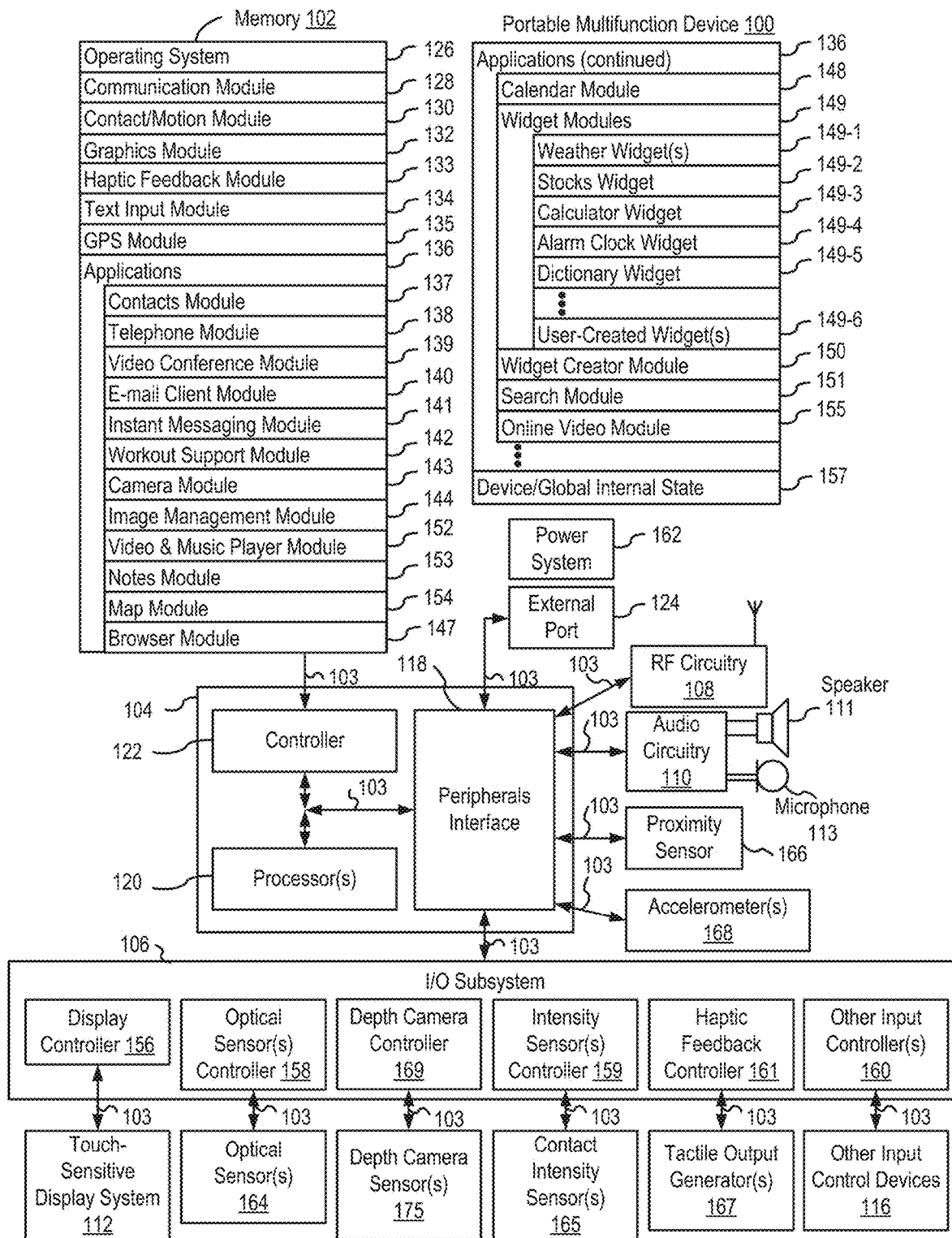
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

In some embodiments, a depth map (e.g., depth map image) contains information (e.g., values) that relates to the distance of objects in a scene from a viewpoint (e.g., a camera, an optical sensor, a depth camera sensor). In one embodiment of a depth map, each depth pixel defines the position in the viewpoint's Z-axis where its corresponding two-dimensional pixel is located. In some embodiments, a depth map is composed of pixels wherein each pixel is defined by a value (e.g., 0-255). For example, the "0" value represents pixels that are located at the most distant place in a "three dimensional" scene and the "255" value represents pixels that are located closest to a viewpoint (e.g., a camera, an optical sensor, a depth camera sensor) in the "three dimensional" scene. In other embodiments, a depth map represents the distance between an object in a scene and the plane of the viewpoint. In some embodiments, the depth map includes information about the relative depth of various features of an object of interest in view of the depth camera (e.g., the relative depth of eyes, nose, mouth, ears of a user's face). In some embodiments, the depth map includes information that enables the device to determine contours of the object of interest in a z direction.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
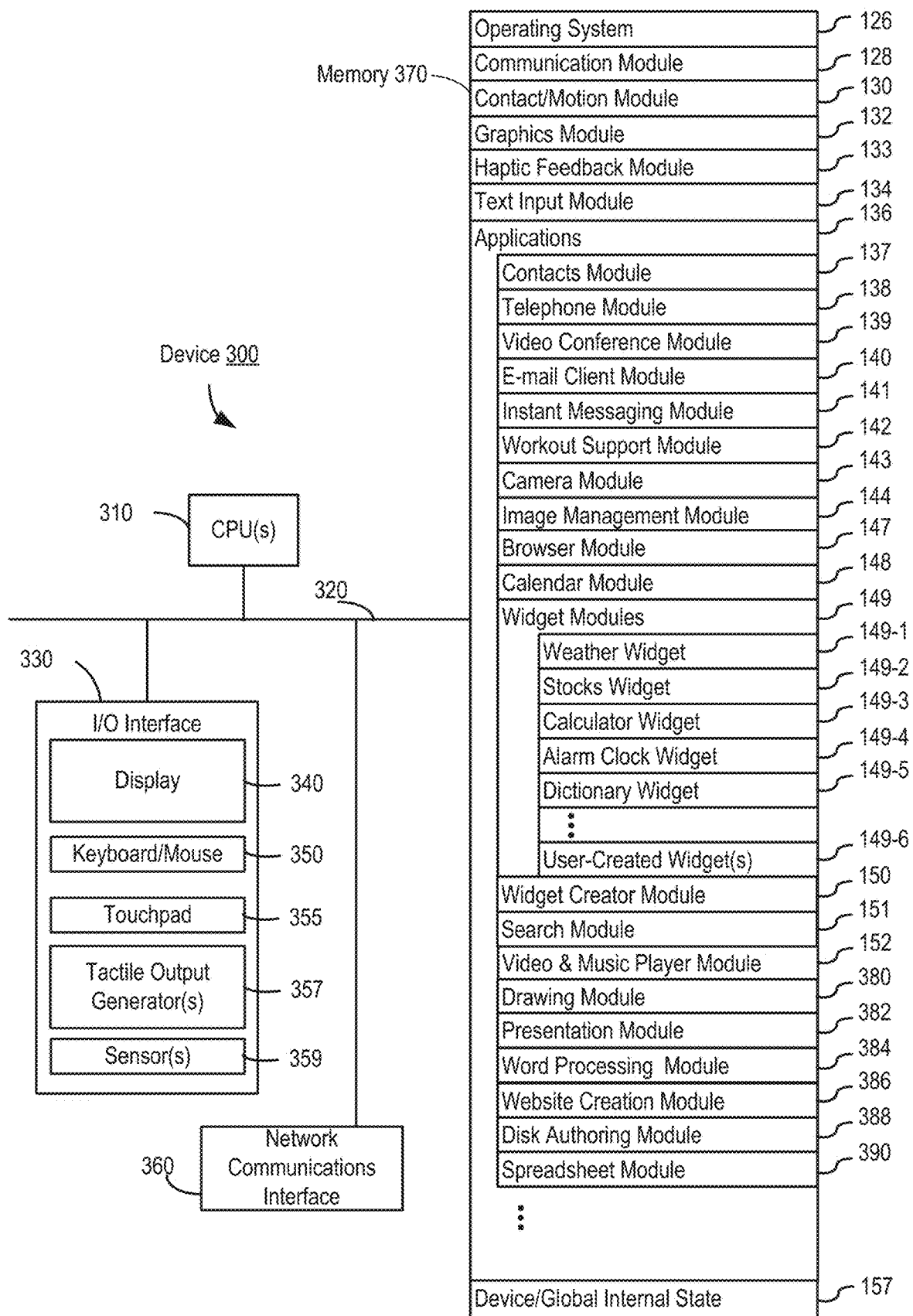
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:
Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
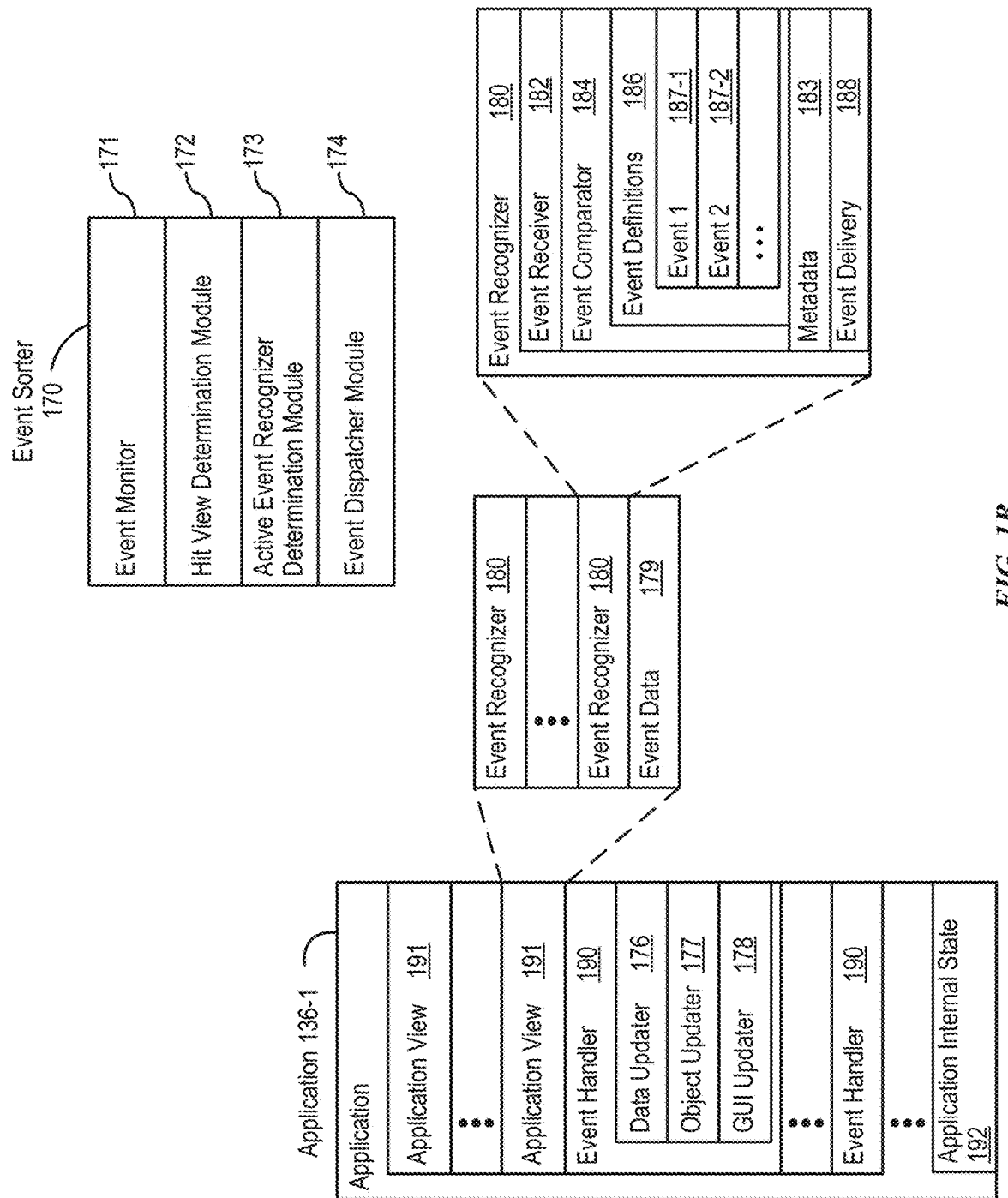
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
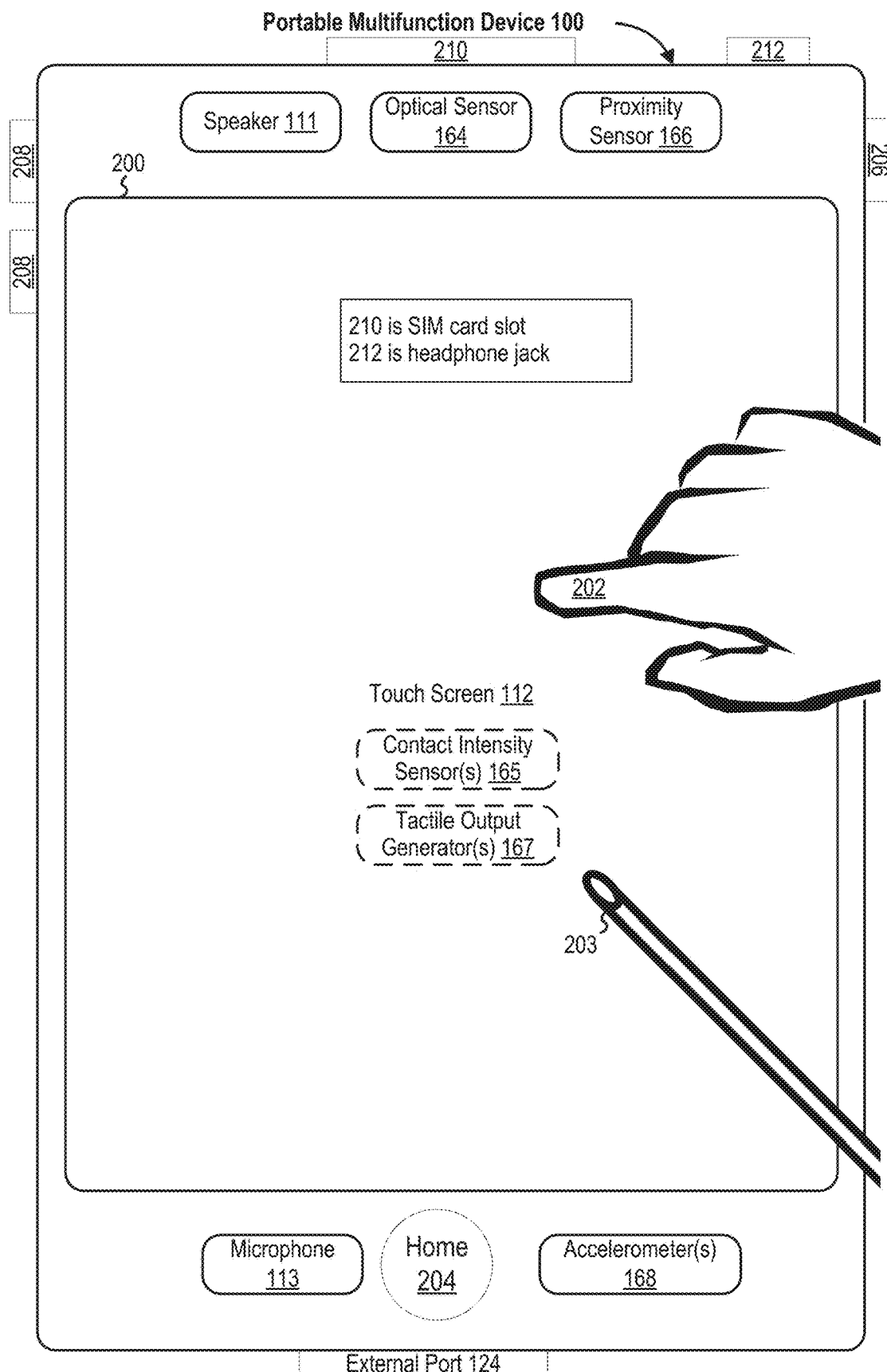
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
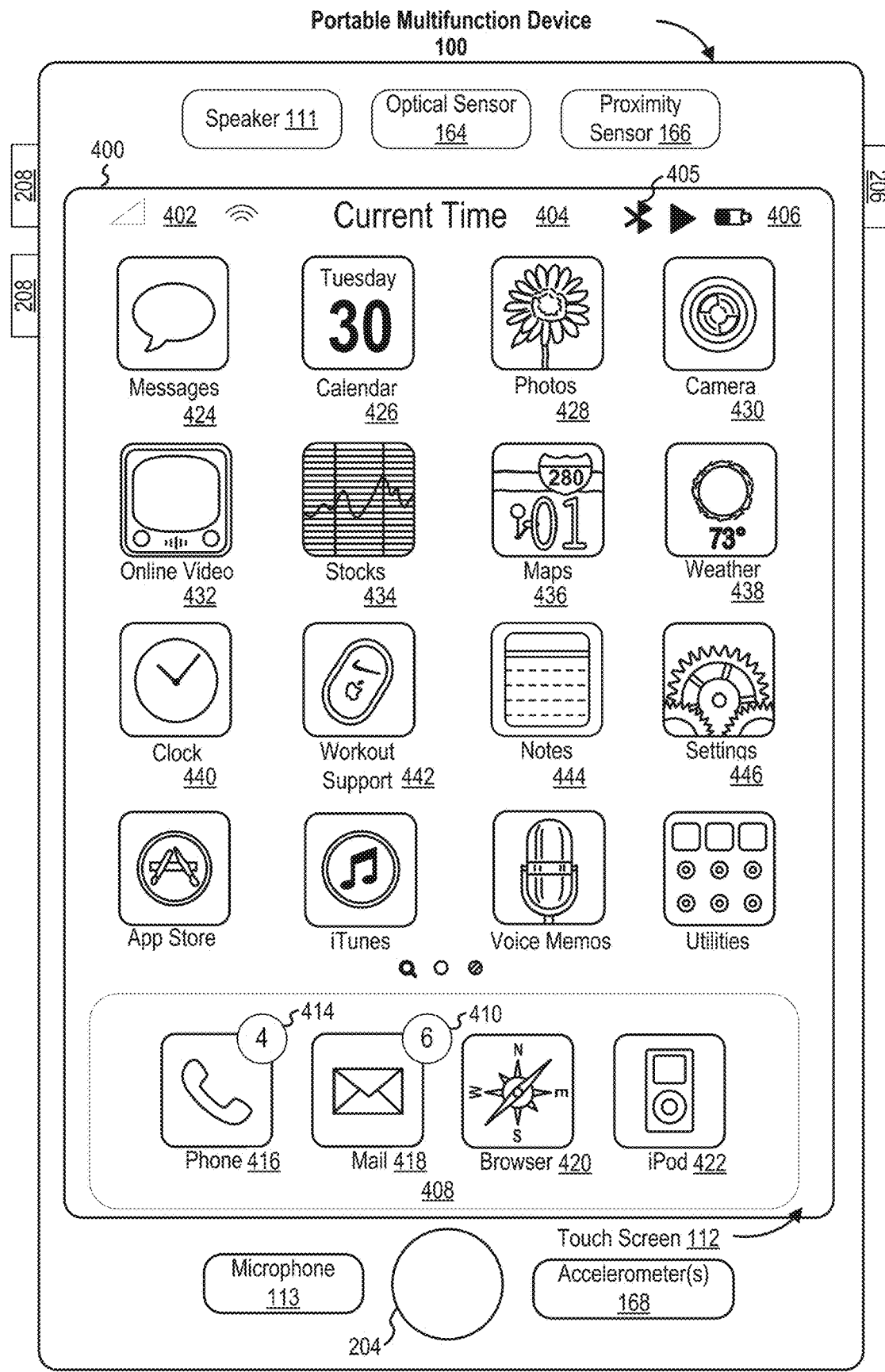
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
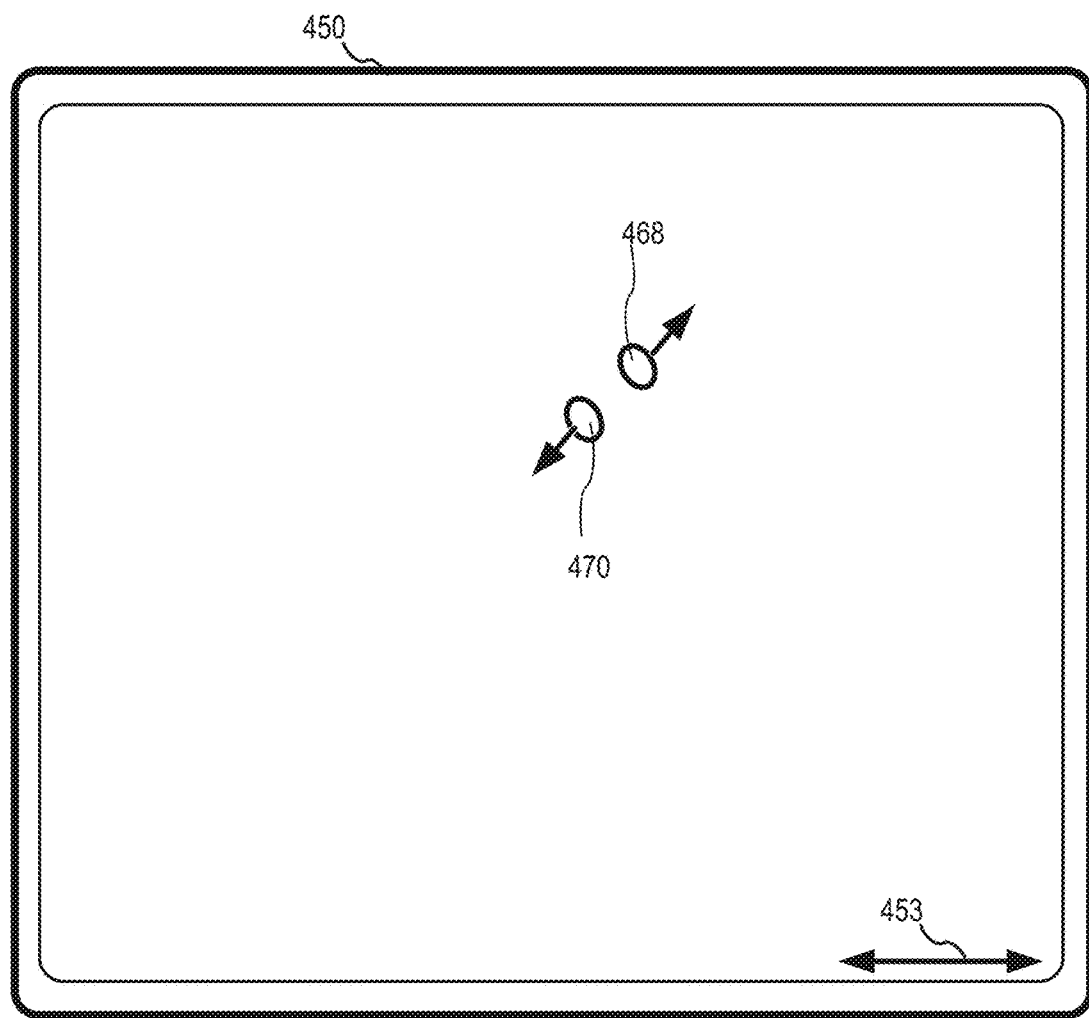
FIG. 4B illustrates an exemplary user interface for a multifunction device with a touch-sensitive surface that is separate from the display in accordance with some embodiments.
Figure 4B:
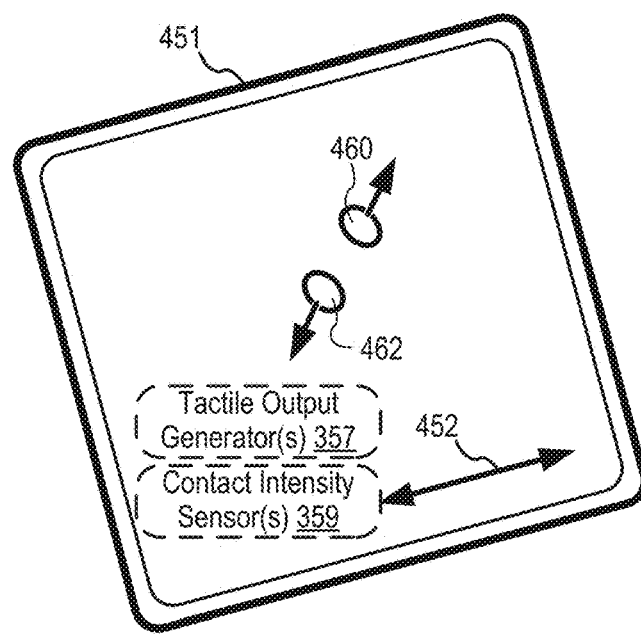

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
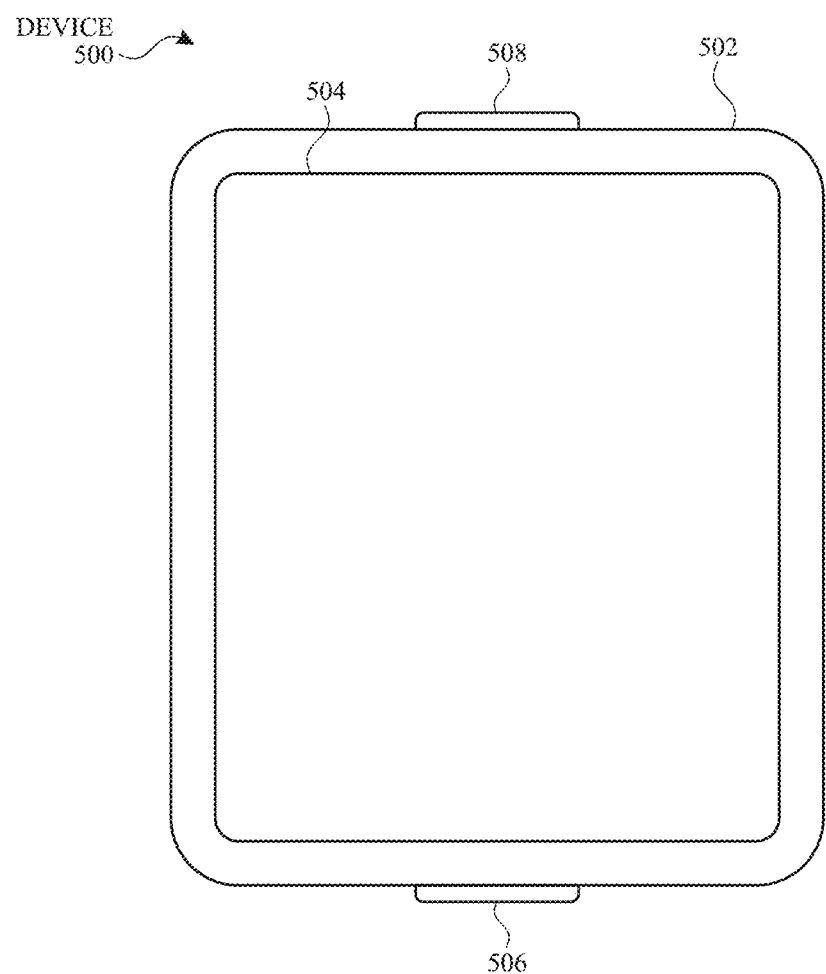
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
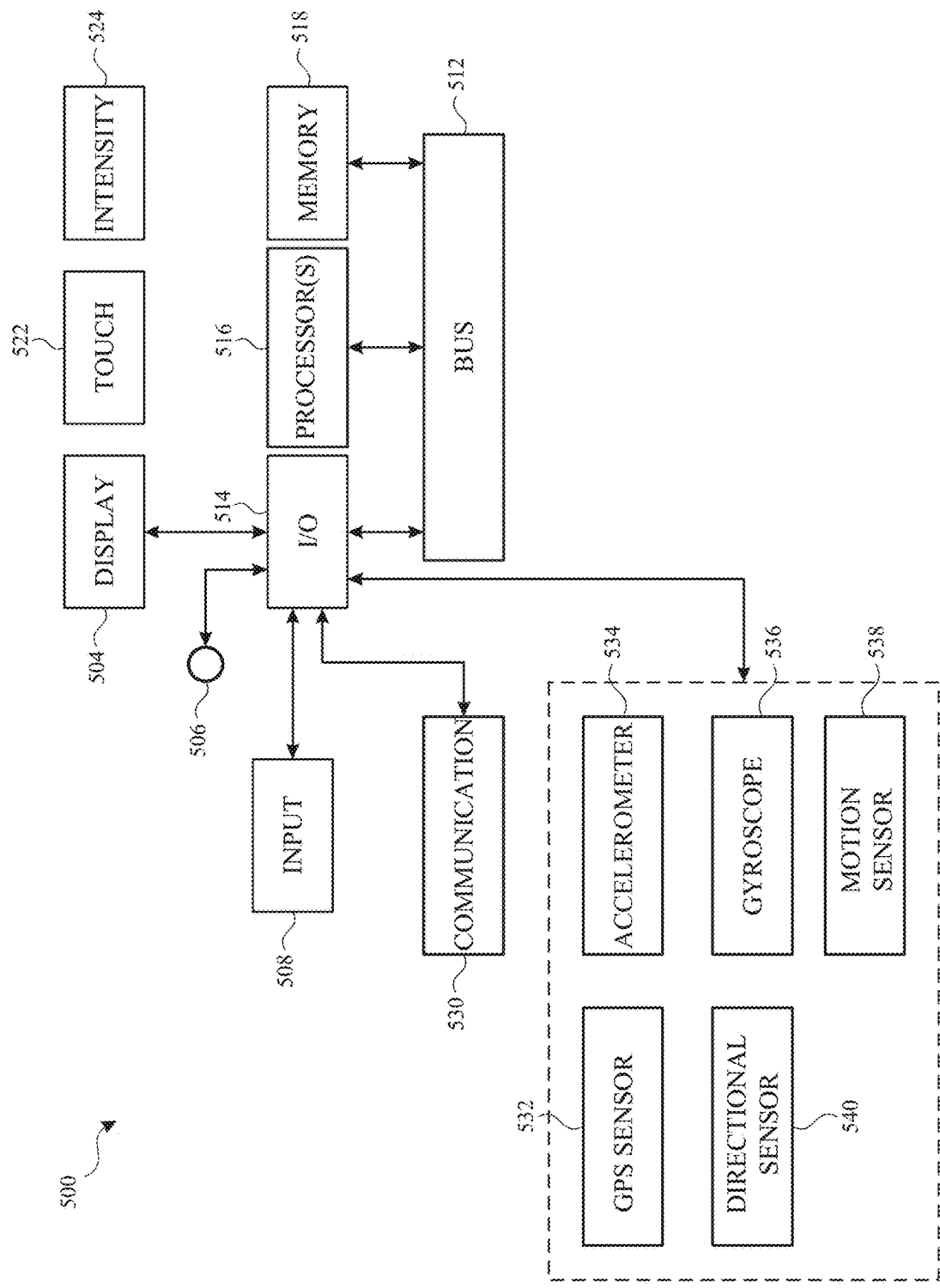
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7, 9, and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

- an active application, which is currently displayed on a display screen of the device that the application is being used on;
- a background application (or background processes), which is not currently displayed, but one or more processes for the application are being processed by one or more processors; and
- a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

FIGS. 6A-6V illustrate exemplary user interfaces for managing exposure compensation using an electronic device in accordance with some embodiments. The user interfaces in these figures are used to illustrate the processes described below, including the processes in FIG. 7.

FIG. 6A illustrates electronic device 600 displaying a camera user interface, which includes a live preview 630 that optionally extends from the top of the display to the bottom of the display. Device 600 optionally includes one or more features of device 100, device 300, or device 500.

Live preview 630 shows a particular scene (e.g., sky in FIG. 6A) that is in the field-of-view of one or more cameras. Live preview 630 is a representation of a (e.g., partial) field-of-view of one or more cameras of device 600 ("the FOV"). Live preview 630 is based on images detected in the FOV. In some embodiments, device 600 captures images using a plurality of camera sensors and combines them to display live preview 630. In some embodiments, device 600 captures images using a single camera sensor to display live preview 630.

The camera user interface of FIG. 6A includes indicator region 602 and control region 606. Indicator region 602 and control region 606 are overlaid on live preview 630 such that indicators and controls can be displayed concurrently with live preview 630. Camera display region 604 is sandwiched between indicator region 602 and control region 606 and is substantially not overlaid with indicators or controls.

As illustrated in FIG. 6A, indicator region 602 includes indicators, such as flash indicator 602a and animated image indicator 602b. Flash indicator 602a indicates whether the flash is on, off, or in another mode (e.g., automatic mode). In FIG. 6A, flash indicator 602a indicates to the user that the flash is off. Moreover, animated image indicator 602b indicates whether the camera is configured to capture a single image or a plurality of images (e.g., in response to detecting a request to capture media). In some embodiments, indicator region 602 is overlaid onto live preview 630 and optionally includes a colored (e.g., gray; translucent) overlay.

As illustrated in FIG. 6A, camera display region 604 includes live preview 630 and zoom affordances 622. Here, a "1×" zoom affordance is selected, which indicates that live preview 630 is being displayed at a 1× zoom level.

As illustrated in FIG. 6A, control region 606 includes shutter affordance 610, camera switcher affordance 614, a representation of media collection 612, and camera setting affordances 626. Shutter affordance 610, when activated, causes device 600 to capture media (e.g., a photo), using the one or more camera sensors, based on the current state of live preview 630 and the current state of the camera application. The captured media is stored locally at electronic device 600 and/or transmitted to a remote server for storage. Camera switcher affordance 614, when activated, causes device 600 to switch to showing the field-of-view of a different camera in live preview 630, such as by switching between a rear-facing camera sensor and a front-facing camera sensor. The representation of media collection 612 illustrated in FIG. 6A is a representation of media (an image, a video) that was most recently captured by device 600. In some embodiments, in response to detecting a gesture on media collection 612, device 600 displays a similar user interface to the user interface illustrated in FIG. 8A (discussed below). As illustrated in FIG. 6A, camera setting affordances 626 include flash setting affordance 626a, animated image capture setting affordance 626b, aspect ratio setting affordance 626c, exposure compensation setting affordance 626d, timer setting affordance 626e, and filter setting affordance 626f. Camera setting affordances 626, when selected (e.g., via a gesture detected on a particular camera setting affordance), causes device 600 to change (or initiated processes for changing) camera settings that associated with a particular camera mode. For example, flash setting affordance 626a, when activated, causes device 600 to turn on/off a flash mode, and timer affordance 626d, when selected, causes device to initiate a process for setting a self-delay timer. In some embodiments, control region 606 is overlaid onto live preview 630 and optionally includes a colored (e.g., gray; translucent) overlay. At FIG. 6A, device 600 detects tap gesture 650a on (e.g., at a location corresponding to) exposure compensation setting affordance 626d.

As illustrated in FIG. 6B, in response to detecting tap gesture 650a, device 600 displays exposure compensation indicator 602d in indicator region 602 concurrently with live preview 630. In some embodiments, device 600 displays exposure compensation indicator 602d in indicator region 602 because device 600 activated an exposure compensation mode in response to detecting tap gesture 650a.

Exposure compensation indicator 602d includes exposure compensation value representation 602d1 and clipping indication 602d2. Each of exposure compensation value representation 602d1 and clipping indication 602d2 is displayed outside of camera display region 604. In some embodiments, when live preview 630 extends into indicator region 602 and/or control region 606 and in response to receiving a request to display capture media representative of live preview 630, device 600 displays a representation of the portion of live preview 630 that is shown in camera display region 604 without displaying the representation of the portions of live preview 630 in indicator region 602 and control region 606. Thus, in some embodiments, exposure compensation value representation 602d1 and clipping indication 602d2 are displayed outside of camera display region 604 so that the portion of live preview 630 (e.g., in camera display region 604) that is shown in response to the receiving the request to display captured media representative of live preview 630 is not obstructed.

As illustrated in FIG. 6B, exposure compensation value representation 602d1 is a numerical value ("0" in FIG. 6B) that indicates a level of exposure that device 600 will use to capture media in response to receiving a request to capture media (e.g., such as in response to detecting a gesture on shutter affordance 610). In some embodiments, the level of exposure indicated by exposure compensation value representation 602d1 can be combined with one or more other exposure compensation values (e.g., an exposure compensation bias value). In some embodiments, device 600 will be configured to capture media using a total compensation value (e.g., a combination of the level of exposure compensation indicated by exposure compensation value representation 602d1 combined with other exposure compensation value(s)) in response to receiving a request to capture media, as discussed below (e.g., in FIGS. 6F-6I).

In FIG. 6B, clipping indication 602d2 indicates a magnitude and a type of predicted clipping that is predicted to occur in response to detecting a request to capture current media. As used herein, "current media" is (1) media that is representative of live preview 630 and (2) media that is (or is to be) captured in response to detecting a request to capture media while device 600 is configured to capture media at the level of exposure indicated by exposure compensation value representation 602d1 and/or a total level of exposure compensation. As described in further detail below, the magnitude of the predicted clipping is represented by the size (e.g., length, width), boldness, and/or opacity of clipping indication 602d2. Moreover, the type of predicted clipping is represented by the position of clipping indication 602d2. As illustrated in FIGS. 6B and 6J, clipping indication 602d2 can indicate the predicted occurrence of two types of clipping, highlight clipping and shadow clipping. In some embodiments, highlight clipping is predicted to occur when a determination is made that a set of brightness intensity values (e.g., white values or highlights of an image (e.g., to be captured)) of within the FOV (or current media) are above a range of brightness intensity values (e.g., a non-zero range) that can be accurately captured and/or represented in current media. In other words, the set of brightness intensity values are too bright and cannot accurately be captured and/or represented (e.g., in current media) by device 600. In some embodiments, shadow clipping is predicted to occur when a determination is made that brightness intensity values (e.g., black values or shadows of an image (e.g., to be captured)) of the FOV (or current media) are below the range of brightness intensity values that can be accurately captured and/or represented in current media. In other words, the set of brightness intensity values are too dark and cannot accurately be captured and/or represented (e.g., in current media) by device 600. In FIG. 6B, clipping indication 602d2 indicates that highlight clipping is predicted to occur because clipping indication 602d2 is positioned to be the rightmost tick mark of exposure compensation indicator 602d. However, clipping indication 602d2 of FIG. 6J indicates that shadow clipping is predicted to occur because clipping indication 602d2 is positioned to be the leftmost tick mark (or on the opposite side of where clipping indication 602d2 is illustrated in FIG. 6A) of exposure compensation indicator 602d in FIG. 6J.

As illustrated in FIG. 6B, in response to detecting tap gesture 650a, device 600 also replaces camera setting affordances 626 with exposure compensation control 636 in control region 606. Exposure compensation control 636 is a slider that is displayed with value indication 636a positioned at a tick mark on the slider. The positioning of value indication 636a represents a value (e.g., 0) of the current level of exposure compensation, which matches the exposure compensation value indicated by exposure compensation value representation 602d1. During the transition between FIGS. 6B and 6C, the environment gets brighter and device 600 detects changes in the FOV that indicate that the environment of the scene in the FOV is brighter.

At FIG. 6C, in response to detecting the change in the FOV, a determination is made that a second amount (or level) of highlight clipping is predicted to occur. At FIG. 6C, the second amount of highlight clipping that is predicted to occur is greater than the amount of highlight clipping that was predicted to occur in FIG. 6B. At FIG. 6C, the second amount is greater than the amount of highlight clipping that was predicted to occur in FIG. 6B because the level of brightness in the environment (e.g., as seen when comparing live preview 630 illustrated in FIGS. 6B-6C) has increased and the current level of exposure compensation has remained the same (e.g., as shown by exposure compensation value representation 602d1). Thus, at FIG. 6C, device 600 is detecting more brightness intensity values that are above the range of brightness intensity values than device 600 was detecting in FIG. 6B (e.g., to display live preview 630).

As illustrated in FIG. 6C, in response to detecting the change in the FOV and because the determination was made that the second amount of highlight clipping is predicted to occur, device 600 increases the size of clipping indication 602d2, which indicates that more highlight clipping is predicted to occur in FIG. 6C than the highlight that was predicted to occur in FIG. 6B. Thus, in FIG. 6C, clipping indication 602d2 indicates the type and amount of clipping that is predicted to occur. In particular, clipping indication 602d2 of FIG. 6C is longer and wider than clipping indication 602d2 of FIG. 6B. During the transition between FIGS. 6C and 6D, the environment gets brighter and device 600 detects more changes in the FOV that indicate that the environment of the scene in the FOV is brighter.

At FIG. 6D, a determination is made that a third amount of highlight clipping is predicted to occur. At FIG. 6D, the third amount of highlight clipping that is predicted to occur is greater than the second amount of highlight that was predicted to occur in FIG. 6C. Here, the third amount of highlight clipping is greater than the second amount of highlight clipping because the level of brightness in the environment (e.g., as seen when comparing live preview 630 illustrated in FIGS. 6C-6D) has increased, and the current level of exposure compensation has remained the same (e.g., as shown by exposure compensation value representation 602d1). At FIG. 6D, the determination is made that the third amount of highlight clipping is predicted to occur using one or more similar techniques as described above in relation to FIG. 6C.

As illustrated in FIG. 6D, in response to detecting the change in the FOV (e.g., at FIG. 6C) and because the determination was made that the third amount of highlight clipping is predicted to occur, device 600 increases the size of clipping indication 602d2, which indicates that the third amount of highlight clipping that is predicted to occur is greater than the second amount of highlight that was predicted to occur in FIG. 6C (e.g., using one or more similar techniques as described above in relation to FIG. 6C). Thus, in FIG. 6D, clipping indication 602d2 indicates the type and amount of clipping that is predicted to occur. In some embodiments, device 600 displays an animation of clipping indication 602d2 growing in size from the size of clipping indication 602d2 of FIG. 6B to the size of clipping indication 602d2 of FIG. 6D. At FIG. 6D, device 600 detects rightward swipe gesture 650d on exposure compensation control 636.

As illustrated in FIG. 6E, in response to detecting rightward swipe gesture 650d, device 600 updates exposure compensation control 636 such that value indication 636a is positioned at a value (e.g., −0.2) that is representative of an updated level of exposure compensation. Moreover, device 600 also updates exposure compensation value representation 602d1 to reflect the value (e.g., −0.2) that is representative of the updated level of exposure compensation. The value of the updated level of exposure compensation has decreased in FIG. 6E when compared to FIG. 6D.

In FIG. 6E, because the current level of exposure compensation has changed (e.g., from 0 to −0.2), a determination is made that a fourth amount of highlight clipping is predicted to occur. At FIG. 6E, the fourth amount of highlight clipping that is predicted to occur is less than the third amount of highlight clipping that was predicted to occur in FIG. 6D. At FIG. 6E, the fourth amount is less than the third amount because the level of the exposure compensation that device 600 will use to capture current media has decreased (e.g., from 0 to −0.2). When device 600 uses a lower exposure compensation value to capture current media, device 600 is configured to capture lower brightness intensity values (e.g., fewer whites) in response to receiving a request to capture media. Capturing lower brightness values in effect leads to device 600 capturing less brightness intensity values that are above the range of brightness intensity values. As illustrated in FIG. 6E, because the determination is made that the fourth amount of clipping is predicted to occur, device 600 shrinks the size of clipping indication 602d2, which indicates that the fourth amount of clipping that is predicted to occur is less than the third amount of clipping that is predicted to occur. Thus, in FIG. 6E, clipping indication 602d2 indicates the type and amount of clipping that is predicted to occur.

As shown FIG. 6E, device 600 also darkens live preview 630 to reflect the media that will be captured based on the updated level of exposure compensation. Here, live preview 630 is darker (as compared to live preview 630 of FIG. 6D) because device 600 is configured to capture lower brightness intensity values in response to receiving a request to capture media (e.g., based on the lower exposure compensation value). At FIG. 6E, device 600 detects downward swipe gesture 650e in camera display region 604.

As illustrated in FIG. 6F, in response to detecting downward swipe gesture 650e, device 600 replaces exposure compensation control 636 with camera mode affordances 620 in control region 606. Camera mode affordances 620 indicate which camera mode is currently selected and enables the user to change the camera mode. In FIG. 6F, camera modes affordances 620a-620e are displayed. Camera mode affordances 620 indicate that a photo camera mode is active as indicated by photo camera mode affordance 620c and "Photo" being bolded. As shown in FIG. 6F, device 600 also continues to display exposure compensation indicator 602d, although exposure compensation control 636 has ceased to be displayed. In FIG. 6F, continuing to display exposure compensation indicator 602d includes maintaining exposure compensation value representation 602d1 at the same exposure compensation value (e.g., −0.2) and clipping indication 602d2 at the same size in which they were displayed in FIG. 6E. Thus, in FIG. 6F, ceasing to display compensation control 636 had no impact on the current value of exposure compensation (e.g., indicated by exposure compensation value representation 602d1) or the determination of the predicted clipping (e.g., as indicated by clipping indication 602d2). At FIG. 6F, device 600 detects press-and-hold gesture 650f in (e.g., at a location corresponding to) camera display region 604.

As illustrated in FIG. 6G, in response to detecting press-and-hold gesture 650f, device 600 locks an autofocus setting on device 600, such that device 600 focuses one or more of its cameras at a particular focus distance (e.g., location) in the FOV. In FIG. 6G, the location corresponds to the area of the box of compensation bias control 644, which is displayed in camera display region 604 in FIG. 6G. Compensation bias control 644 is displayed with value indication 644a, which is positioned at a location on compensation bias control 644 that corresponds to the current exposure compensation bias value with which device 600 is currently configured to capture current media (e.g., in response to receiving a request to capture media).

At FIG. 6G, device 600 detects downward swipe gesture 650g in camera display region 604. FIGS. 6H-6I show alternative user interfaces that can be displayed in response to detecting downward swipe gesture 650g.

As illustrated in FIG. 6H, in response to detecting downward swipe gesture 650g, device 600 updates compensation bias control 644, such that value indication 644a is displayed at a new position on compensation bias control 644 to indicate that an updated exposure compensation bias value has been updated. The updated exposure compensation bias value of FIG. 6H is lower than the exposure compensation bias value of 6G. Thus, as illustrated in FIG. 6H, live preview 630 is darkened because the compensation bias value is lower. At FIG. 6H, device 600 is configured to capture media based on a total compensation value (e.g., the sum of exposure compensation value that is represented by exposure compensation value representation 602d1 and the updated exposure compensation bias value). However, as illustrated in FIG. 6H, device 600 does not update the exposure compensation indicator 602d to reflect the change in the total exposure compensation. In some embodiments, at FIG. 6H, device 600 displays a representation of the total exposure compensation concurrently with exposure compensation indicator 602d (e.g., as the compensation indicator is displayed with the same exposure compensation value representation (e.g., −0.2) and clipping indication 602d2 is the same size). In some embodiments, the representation of the total exposure compensation is displayed in camera display region 604, while exposure compensation indicator 602d remains displayed in indicator region 602.

Alternatively to FIG. 6H, as illustrated in FIG. 6I, device 600 updates compensation bias control 644 and live preview 630 in response to detecting downward gesture 650g, using similar techniques to those described above in FIG. 6H. However, in FIG. 6I, device 600 updates exposure compensation indicator 602d (e.g., which was not updated in FIG. 6H) to reflect the change in the total exposure compensation. For example, device 600 updates exposure compensation value representation 602d1 to reflect that the total exposure compensation is −0.3 and updates clipping indication 602d2 to reflect that less predicted clipping is predicted to occur (e.g., because of the lower total exposure compensation value using techniques as described above) in response to a request to capture current media. At FIG. 6H or 6I, device 600 detects a change in the FOV.

At FIG. 6J, in response to detecting the change in the FOV (e.g., at FIG. 6H or 6I), a determination is made that the scene in the FOV has changed. As illustrated in FIG. 6J, live preview 630 shows a pair of shoes on a dark surface while live preview 630 of 6I showed a sky. When compared to live preview 630 of FIG. 6I, live preview 630 of FIG. 6J is considerably darker because the scene in the FOV is considerably darker.

At FIG. 6J, because the determination is made that the scene has changed in the FOV, device 600 resets the exposure compensation bias value to a default exposure compensation bias value (e.g., the compensation bias value that was set before detecting gestures 650f in FIG. 6F or 650g in FIG. 6G). As illustrated in FIG. 6J, device 600 also ceases to display compensation bias indicator 644 because of this scene change determination. Notably, at FIG. 6J, device 600 remains configured to capture the current media via the level of exposure compensation (e.g., −0.2) that was indicated by exposure compensation value indication 602d2 in FIG. 6F (e.g., before the compensation bias value was displayed and/or adjusted (e.g., in FIGS. 6F-6G)). Thus, a compensation bias value that is set goes away (e.g., is set back to the default value) when the scene in the FOV changes, but an exposure compensation value (e.g., via exposure compensation control 636) that is set is maintained irrespective of a determination that the scene has changed in the FOV.

At FIG. 6J, a determination is also made that shadow clipping is predicted to occur because the level of brightness in the environment in the new scene (e.g., shoes on a dark surface) has considerably decreased. In particular, the determination is made that shadow clipping is predicted to occur because a determination is made that the set of brightness intensity values (e.g., black values or shadows of an image (e.g., to be captured)) in the FOV (or current media) are below the range of brightness intensity values that can be accurately represented or captured. The determination that shadow clipping is predicted to occur is based on the level of brightness in the environment and the current level of exposure compensation (e.g., −0.2, as shown by exposure compensation value representation 602*d*1).

As illustrated FIG. 6J, because the determination is made that shadow clipping is predicted to occur, device 600 displays clipping indication 602*d*2 as the leftmost tick mark of exposure compensation indicator 602*d* (e.g., instead of being displayed as the rightmost tick mark of exposure compensation indication 602 when highlight clipping was predicted to occur in FIG. 6F). In FIG. 6J, the size of clipping indication 602*d*2 has also changed to reflect the magnitude (e.g., amount or level) of the shadow clipping that is predicted to occur when device 600 is configured to capture media at the current level of exposure compensation (e.g., −0.2). At FIG. 6J, device 600 detects a change in the FOV.

At FIG. 6K, in response to detecting the change in the FOV, a determination is made that the scene has changed in the FOV. When compared to live preview 630 of FIG. 6J, live preview 630 of FIG. 6K is considerably darker because the scene in the FOV of FIG. 6K is considerably darker. At FIG. 6K, a determination is also made that a second amount of shadow clipping is predicted to occur, using one or more techniques as described above (e.g., in FIGS. 6B-6J). At FIG. 6K, the second amount of shadow clipping is greater than the amount of shadow clipping that was predicted to occur in FIG. 6J because a darker scene is in the FOV of the one or more cameras and the current level of exposure compensation has remained the same.

As illustrated in FIG. 6K, because the determination is made that the second amount of shadow clipping is predicted to occur, device 600 increases the size of clipping indication 602*d*2 while maintaining display of clipping indication 602*d*2 on the left side of exposure compensation indicator 602*d*. Thus, in FIG. 6K, clipping indication 602*d*2 indicates the type and amount of clipping that is predicted to occur. In addition, live preview 630 is updated to show the new scene. At FIG. 6K, device 600 detects tap gesture 650*k* on exposure compensation indicator 602*d*.

As illustrated in FIG. 6L, in response to detecting tap gesture 650*k*, device 600 replaces display of camera affordances 620 with display of exposure compensation control 636 that includes value indication 636*a*. At FIG. 6L, device 600 detects leftward swipe gesture 650*l* on exposure compensation control 636.

As illustrated in FIG. 6M, in response to detecting leftward swipe gesture 650*l*, device 600 updates the level of the exposure compensation, which is indicated via the new value (e.g., 1.0) represented by exposure compensation value representation 602*d*1 and is also displayed above value indication 636*a* on exposure compensation control 636. The new level of exposure compensation (e.g., 1.0 in FIG. 6M) is higher than the previous level of exposure compensation (e.g., −0.2 in FIG. 6L).

At FIG. 6M, a determination is made that minimal (or no clipping) is predicted to occur (or clipping less than a (e.g., non-zero) threshold level of clipping is predicted to occur), using one or more similar techniques to those described above. Thus, in other words, a determination is made that device 600 will be able to accurately represent or capture current media with an amount of clipping that is below the (e.g., non-zero) threshold amount of clipping. As illustrated in FIG. 6M, because the determination that minimal or no clipping is predicted to occur (e.g., or clipping less than the (e.g., non-zero) threshold level of clipping is predicted to occur), device 600 ceases to display clipping indication 602*d*2. At FIG. 6M, device 600 detects leftward swipe gesture 650*m* on exposure compensation control 636*a*.

As illustrated in FIG. 6N, in response to detecting leftward swipe gesture 650*m*, device 600 updates the level of the exposure compensation, which is indicated via the new value (e.g., 1.5) represented by exposure compensation value representation 602*d*1 and is displayed above value indication 636*a* on exposure compensation control 636. The new level of exposure compensation (e.g., 1.5 in FIG. 6M) is higher than the previous level of exposure compensation (e.g., 1.0 in FIG. 6L). At FIG. 6N, a determination is made that a fifth amount of highlight clipping is predicted to occur (e.g., the level of exposure compensation has been adjusted far enough that highlight clipping is predicted to occur), using one or more similar techniques discussed above. As illustrated in FIG. 6N, because the determination is made that the fifth amount of highlight (and not shadow) clipping is predicted to occur, device 600 displays clipping indication 602*d*2 on the right side of exposure compensation indicator 602*d*. Thus, in FIG. 6N, clipping indication 602*d*2 indicates the type and amount of clipping that is predicted to occur. At FIG. 6N, device 600 detects upward swipe gesture 650*n* from the bottom of control region 606.

At FIG. 6O, in response to detecting upward swipe gesture 650*n*, a determination is made that a session associated with the use of the camera application (e.g., the application that corresponds to the camera user interface) has ended because, for example, device 600 has ceased to display (or closed out of) the camera application. In some embodiments, the session associated with the use of the camera application ends when device 600 has ceased to display or closed out of the camera application for a predetermined period of time. In some embodiments, the session associated with the use of the camera applications ends when a determination is made that the camera application has stopped running on device 600. In some embodiments, the session associated with the use of the camera application ends at a particular time (e.g., at the end of the day (a specific time of the day) when the camera application is not in use or when the camera application was interacted with by a user). In some embodiments, the session associated with the use of the camera application ends after device 600 has been in a locked state for a predetermined period of time. In addition, as illustrated in FIG. 6O, device 600 ceases to display the camera user interface and displays a user interface with application icons 690. Application icons 690 includes application icons, such as camera application icon 690*a*. At FIG. 6O, device 600 detects tap gesture 650*o* on camera application icon 690*a*.

As illustrated in FIG. 6P, in response to detecting tap gesture 650*o*, device 600 ceases to display the user interface with the application icons and displays the camera user interface. As illustrated in FIG. 6P, exposure compensation indicator 602*d* is in the same state in which it was displayed in FIG. 6N. For example, in FIG. 6P, exposure compensation value representation 602*d*1 indicates that the current level of exposure 1.5, which is the same as the level as exposure when the camera user interface was last displayed in FIG. 6N. At FIG. 6P, device 600 detects leftward swipe gesture 650*p* at the bottom of control region 606.

As illustrated in FIG. 6Q, in response to detecting leftward swipe gesture 650*p*, device 600 displays a camera user interface that includes settings 692, such as exposure control setting 692a. At FIG. 6Q, exposure control setting 692a is set to on, which indicates that the current level of exposure will be maintained and not automatically reset. In addition, exposure control setting 692a indicates that exposure compensation indicator 602d will continue to be displayed (e.g., after the exposure compensation is initially set via exposure compensation control 644). In some embodiments, control setting 692a indicates that exposure compensation indicator 602d will always be displayed (e.g., irrespective of whether the exposure compensation is initially set). Looking back at FIGS. 6N-6P, device 600 maintained exposure compensation indicator 602d in the same state in FIG. 6P (e.g., after the determination that the session associated with the use of the camera application ended) because control setting 692a is set to on. At FIG. 6Q, device 600 detects tap gesture 650q on exposure control setting 692a.

As illustrated in FIG. 6R, in response to detecting tap gesture 650q, device 600 toggles exposure control setting 692a from an on state to an off state. At FIG. 6R, device 600 detects upward swipe gesture 650r at the bottom of control region 606.

As illustrated in FIG. 6S, in response to detecting upward swipe gesture 650r, device 600 re-displays the user interface with camera application icon 690a. At FIG. 6S, in response to detecting upward swipe gesture 650r, a determination is made that a session associated with the use of the camera application has ended, using similar techniques to those described above in relation to FIG. 6O. At FIG. 6S, device 600 detects tap gesture 650s on camera application icon 690a.

As illustrated in FIG. 6T, in response to detecting tap gesture 650s, device 600 displays the camera user interface without exposure compensation indicator 602d because exposure control setting 692a is set to on (as opposed to displaying exposure compensation indicator 602d when exposure control setting 692a was set to off, as described above).

Figure 6U:
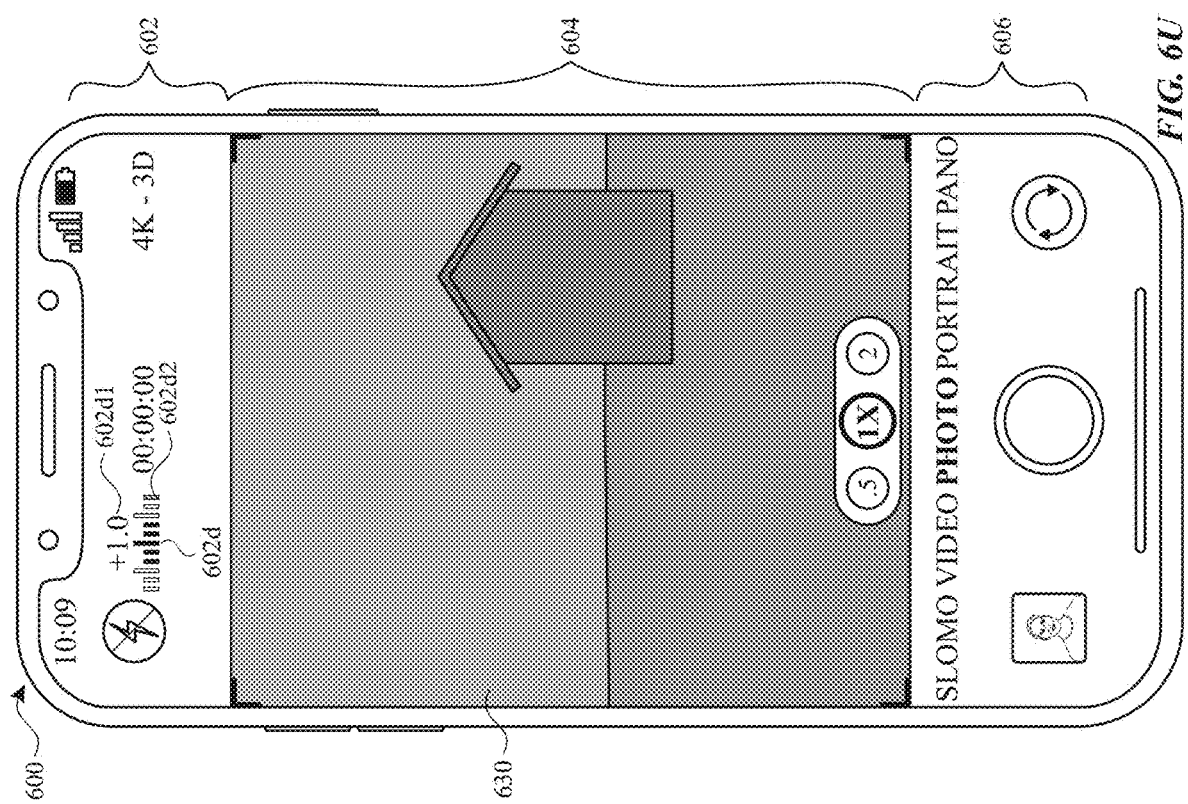

FIG. 6U illustrates a camera user interface with exposure compensation indicator 602d being displayed while device 600 is operating in a video mode, as indicated by video camera mode affordance 602b and "Video" being bold in FIG. 6U.

FIG. 6V illustrates a camera user interface with exposure compensation indicator 602d being displayed while device 600 is operating in a portrait mode, as indicated by portrait camera mode affordance 602e and "Portrait" being bold in FIG. 6V.

FIG. 7 is a flow diagram illustrating a method for managing exposure compensation using a computer system in accordance with some embodiments. Method 700 is performed at a computer system (e.g., 100, 300, 500, 600). The computer has one or more cameras (e.g., one or more cameras (e.g., dual cameras, triple camera, quad cameras, etc.) on the same side or different sides of the computer system (e.g., a front camera, a back camera)) and is in communication with a display generation component (e.g., a display controller, a touch-sensitive display system) and one or more input devices (e.g., a touch-sensitive surface). Some operations in method 700 are, optionally, combined, the orders of some operations are, optionally, changed, and some operations are, optionally, omitted.

As described below, method 700 provides an intuitive way for managing exposure compensation. The method reduces the cognitive burden on a user for managing exposure compensation, thereby creating a more efficient human-machine interface. For battery-operated computing systems, enabling a user to manage exposure compensation faster and more efficiently conserves power and increases the time between battery charges.

The computer system receives (702) a request to display a camera user interface (e.g., user interface in FIG. 6B) (e.g., a request to display the camera application or a request to switch to a media capture mode within the camera application).

In response to receiving the request to display the camera user interface and while the one or more cameras are configured to capture images (e.g., video, photos) based on a first exposure compensation value (e.g., as indicated by 602d1) (e.g., a value that represents an amount of exposure that will be used to capture media that corresponds to the representation of the field-of-view of the one or more cameras), the computer system displays (704), via the display generation component, a camera user interface (e.g., user interface in FIG. 6B).

As a part of displaying, via the display generation component, the camera user interface, the computer system displays (706), via the display generation component, a first representation (e.g., 630) (e.g., a representation over-time, a live preview feed of data from the camera) of a field-of-view of the one or more cameras (e.g., an open observable area that is visible to a camera, the horizontal (or vertical or diagonal) length of an image at a given distance from the camera lens). In some embodiments, the value is a default exposure compensation value that is used to capture media irrespective of whether an exposure compensation mode is enabled or not enabled. In some embodiments, the representation of the field-of-view of the one or more cameras is displayed in a camera display region.

As a part of displaying the camera user and in accordance with (708) a determination that a set of exposure compensation criteria is met, where the set of exposure compensation criteria includes a criterion that is met when an exposure compensation mode is enabled (e.g., 692a in FIG. 6Q) (e.g., active), the computer system displays (710), concurrently with the representation (e.g., 630) of the field-of-view of the one or more cameras, an exposure compensation indicator (e.g., 602d) that includes: a representation of the first exposure compensation value (e.g., as indicated by 602d1) (e.g., a numerical representation (e.g., 1.5, −1.5), a symbolic retransition); and a visual indication (e.g., 602d2) that the computer system has determined that clipping (e.g., one or more areas of the captured media that loses detail as a result of the exposure compensation setting) is predicted to occur in response to receiving a request to capture media (e.g., receiving an input on 610) that corresponds to the representation (e.g., 630) of the field-of-view of the one or more cameras. In some embodiments, while the one or more cameras are configured to capture images based on a first exposure compensation value, the representation of the first exposure compensation value is (or, alternatively, not) displayed (e.g., displayed concurrently with, adjacent to, and/or on the representation of the field-of-view of the one or more cameras). In some embodiments, the exposure compensation mode is enabled when the computer system is configured to preserve the exposure adjustment when displaying different representations (e.g., representations that are captured over-time or representations of different scenes) of the field-of-view of the one or more cameras and/or when the computer system is configured to show an exposure adjustment indicator. In some embodiments, the exposure compensation mode is enabled when a selection is made on an exposure compensation indicator and/or when a new exposure compensation is set (e.g., via an exposure adjustment control). In some embodiments, when clipping occurs, a clipped area can be represented by a minimum or maximum brightness in a representation of the captured media. In some embodiments, the clipped area in the representation of the captured media has a different level of brightness, highlights, shadows, and/or a different level of detail (e.g., less detail) than the area that corresponds to the clipped area in the representation of the field-of-view of the one or more cameras. In some embodiments, the representation of the exposure compensation and the visual indication (e.g., that the computer system has determined that clipping is predicted to occur) are concurrently displayed. In some embodiments, the exposure compensation indicator is displayed in a camera indicator region. In some embodiments, the camera indicator region includes a plurality of indicators (e.g., affordances, selectable user interface objects) that configure the computer system to capture media based one or more camera settings (e.g., exposure settings, flash settings, low-light mode settings, timer settings, etc.). In some embodiments, a representation of the exposure compensation value is above the visual indication. In some embodiments, in accordance with a determination that the set of exposure compensation criteria is not met, the computer system forgoes display of the exposure compensation indicator. In some embodiments, in accordance with a determination that the set of exposure compensation criteria is not met, the first representation is displayed at a default exposure compensation value (e.g., a zero value), where the computer system is configured to capture media using the default exposure compensation value when the exposure compensation mode is not enabled. In some embodiments, the computer system determines that clipping is predicted to occur in response to receiving the request to capture media that corresponds to the representation of the field-of-view of the one or more cameras by receiving one or more indications or based on one or more determinations that clipping is predicted to occur in response to receiving the request to capture media that corresponds to the representation of the field-of-view of the one or more cameras that is made by one or more external devices. Displaying an exposure compensation indicator that includes an exposure compensation value and an indicator of predicted clipping provides the user with feedback about the relationship between the current exposure compensation value, the current scene that is in the field-of-view of the camera of the system, and the predicted clipping that can occur when media that corresponds to the current scene is captured. Thus, displaying the exposure compensation indicator allows for a user to visually ascertain how the adjustment of the current exposure compensation value and/or the change in scene in the field-of-view of the at least one camera will impact the predicted clipping. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying an exposure compensation indicator that includes an exposure compensation value and an indicator of predicted clipping provides the user with feedback about the relationship between the current exposure compensation value, the current scene that is in the field-of-view of the camera of the system, and the predicted clipping that can occur when media that corresponds to the current scene is captured, which reduces the number of times media needs to be captured to obtain an image with reduced (e.g., or little) clipping. Reducing the number of times an operation needs to be performed enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the exposure compensation indicator (e.g., 602d) and in accordance with a determination that the clipping that is predicted to occur is a first type of clipping, the visual indication is displayed at a first position (e.g., 602d2 in FIG. 6B) (e.g., on the display generation component (e.g., a position on, adjacent to the exposure compensation indicator)). In some embodiments, while displaying the exposure compensation indicator and in accordance with a determination that the clipping that is predicted to occur is a second type of clipping that is different from the first type of clipping, the visual indication is displayed at a second position (e.g., 602d2 in FIG. 6J) (e.g., on the display generation component (e.g., a position on, adjacent to the exposure compensation indicator)) that is different from the first position. In some embodiments, the first type of clipping is clipping that is based on a value of a parameter of the media (e.g., brightness intensity) being above a range ((e.g., a capturable range (e.g., a range where brightness intensity values can be captured by the computer system), a representable range (e.g., a range where brightness intensity values can be represented by the computer system)) of brightness intensity values (e.g., clipping of highlights, clipping of brighter/white areas)) of values for the parameter (e.g., that is predicted to occur in response to receiving the request to capture the media (e.g., (e.g., clipping (e.g., that is predicted to) that occurs when brighter areas (e.g., white areas) of the scene are represented with less detail than other areas of the scene))). In some embodiments, the second type of clipping is clipping based on the value of the parameter of the media (e.g., a brightness intensity) being below the range ((e.g., a capturable range (e.g., a range where brightness intensity values can be captured by the computer system), a representable range (e.g., a range where brightness intensity values can be represented by the computer system)) of brightness intensity values (e.g., crushing of blacks, clipping of darker/black areas)) of values for the parameter (e.g., in response to receiving the request to the capture media (e.g., show clipping (e.g., clipping (e.g., that is predicted to) that occurs when darker areas (e.g., black areas) of the scene are represented with less detail than other areas of the scene))). In some embodiments, while displaying the visual indication that is displayed at the first position and in accordance with a determination that second (e.g., new, subsequent) clipping is predicted to occur in response to receiving a request to capture media that corresponds to the representation of the field-of-view of the one or more cameras and the second clipping is the first type of clipping, the computer system displays the visual indication at the first position; and while displaying the visual indication at the first position and in accordance with a determination that second (e.g., new, subsequent) clipping is predicted to occur in response to receiving a request to capture media that corresponds to the representation of the field-of-view of the one or more cameras and the second clipping is the second type of clipping, the computer system displays the visual indication at the second position. In some embodiments, the visual indication moves from the first position to the second position, or vice-versa. In some embodiments, the first position is on one side of the exposure compensation indicator (e.g., right/left/top/bottom) and the second position is located on the side that is opposite of the side (e.g., left/right/bottom/top) that the first position is on. Displaying an indicator of predicted clipping at different positions on the exposure compensation indicator, where each position corresponds to the type of clipping that is predicted to occur, provides the user with feedback on how to adjust the current exposure compensation value and/or the change in scene in the field-of-view of the camera to impact (e.g., reduce) the predicted clipping. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying an indicator of predicted clipping at one position when highlight clipping is predicted to occur and shadow clipping is predicted to occur provides the user with feedback on how to adjust the current exposure compensation value and/or the change in scene in the field-of-view of the camera to impact (e.g., reduce) the predicted clipping. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, prior to a first time (e.g., while displaying the exposure compensation indicator), the visual indication is displayed with a first visual appearance (e.g., 602d2 in FIG. 6B) (e.g., thickness, size, length, color, boldness, and/or opacity). In some embodiments, at a first time while displaying the exposure compensation indicator and in accordance with a determination that the clipping that is predicted to occur has changed (e.g., the amount of clipping has changed, the type of clipping has changed), the computer system displays the visual indication (e.g., 602d2 in FIG. 6C) with a second visual appearance that is different from the first visual appearance (e.g., 602d2 in FIG. 6B) (e.g., thickness, size, length, color, boldness, and/or opacity). In some embodiments, in accordance with a determination that the clipping that is predicted to occur has increased (or, alternatively, decreased), the visual indicator has a thicker (e.g., bolder, higher opacity) (e.g., in width) and/or longer (e.g., in height) (or, alternatively, thinner (e.g., in width) and/or shorter (e.g., in height)) appearance (e.g., second appearance) than the visual indicator previously had (e.g., first appearance). In some embodiments, displaying the visual indication with a second appearance that is different from the first visual appearance includes animating (e.g., animating gradually) the visual indication changes (e.g., thickening or thinning) from the first visual appearance to the second visual appearance. In some embodiments, the determination that the clipping that is predicted to occur changes when the field-of-view of the one or more cameras and/or objects in the field-of-view of the one or more cameras changes. In some embodiments, the clipping that is predicted to occur changes in response to the first compensation value being changed to a second exposure compensation value (e.g., via a selectable exposure compensation control (e.g., a slider)). In some embodiments, the clipping that is predicted to occur changes in response to changes in the field-of-view of the one or more cameras (e.g., a change in the scene of the field-of-view of the one or more cameras). Displaying an indicator of predicted clipping based on the magnitude of the predicted clipping provides the user with feedback on how to adjust the current exposure compensation value and/or the change in scene in the field-of-view of the camera to impact (e.g., reduce) the predicted clipping. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the visual indication (e.g., 602d2) is displayed, via the display generation component, at a position that is outside of (e.g., away from, not on, not overlapping with) the first representation. In some embodiments, the exposure compensation indicator is at a position that is outside of the first representation. Displaying an indicator of predicted clipping away from a representation of the scene provides the user with feedback about the relationship between the current exposure compensation value, the current scene that is in the field-of-view of the camera of the system, and the predicted clipping that can occur when media that corresponds to the current scene is captured while allowing for viewing of the representation of the scene that is in the field-of-view of at least one camera of the computer system with fewer visual elements overlaid on the representation of the scene, which can reduce the number of time it takes to capture an intended scene. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the exposure compensation indicator (e.g., 602d) that includes the representation of the first exposure compensation value (e.g., as indicated by 602d1 in FIG. 6B), the computer system detects changes in the field-of-view of the one or more cameras. In some embodiments, in response to detecting changes in the field-of-view of the one or more cameras, the computer system continues to display the first exposure compensation value (e.g., as indicated by 602d1 in FIG. 6C) (e.g., the exposure compensation value is maintained irrespective of the detected changes in the field-of-view of the one or more cameras (and/or a change in scene)). In some embodiments, in accordance with a determination that the changes in the field-of-view of the one or more cameras are above a threshold (e.g., non-zero threshold) (a threshold that is indicative of the amount of changes in the field-of-view amount to a change in a scene), the computer system continues to display the exposure compensation indicator that includes the first exposure compensation value. In some embodiments, in accordance with a determination that the changes in the field-of-view of the one or more cameras are above a threshold, the computer system continues to display the exposure compensation indicator that includes the first exposure compensation value. Maintaining the exposure compensation value when a scene changes reduces the number of inputs (or eliminates inputs) that it takes to reset the compensation value each time the scene changes and also reduces a number of times that the exposure compensation is reset when a scene temporarily changes in the field-of-view of the one or more cameras. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the one or more cameras are configured to capture images based on a cumulative exposure compensation value that is based on a sum of the first exposure compensation value (e.g., as indicated by 602d1) and a compensation bias value (e.g., 644a in FIG. 6H).

In some embodiments, in accordance with a determination that the set of exposure compensation criteria is met, the computer system concurrently displays (712) an indication of the cumulative exposure compensation value (e.g., as indicated by 602d1 in FIG. 6I) (e.g., displaying the value, displaying a graphical representation corresponding to the value) with the exposure compensation indicator (e.g., 602d) (e.g., that includes the representation of the first compensation value at a first time while the one or more cameras are configured to capture images based on the first exposure compensation value). In some embodiments, while displaying the exposure compensation indicator (e.g., that includes representation of the first exposure compensation value), the computer system receives one or more user inputs (e.g., a tap input followed by a drag input) and, in response to receiving the one or more user inputs, the computer system displays the cumulative exposure compensation value concurrently with the exposure compensation indicator that includes the representation of the first compensation value. Displaying an indication of the cumulative exposure compensation values provides the user with feedback about how the exposure compensation value and the bias compensation value has impacted the commutative amount of exposure that will be used to capture media in response to a request to capture media. Providing improved feedback enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the exposure compensation indicator (e.g., 602d) that includes the representation of the first exposure compensation value (e.g., as indicated by 602d1 in FIG. 6G), the computer system detects, via the one or more input devices, one or more user inputs (e.g., 650f, 650g, 650h) (e.g., a tap input followed by a drag input, such as on a viewfinder of the field-of-view of the one or more cameras). In some embodiments, in response to detecting the one or more inputs the computer system changes a compensation bias value from a default compensation bias value (e.g., 644a in FIG. 6G) (e.g., a default compensation value (e.g., a value of zero)) to a new compensation bias value (e.g., 644a in FIG. 6H) (e.g., a non-zero value, a new compensation value). In some embodiments, the computer system is configured to capture images based on a cumulative compensation that is based on a sum of the first exposure compensation value and the bias compensation value and continues to display the representation of the first exposure compensation value. In some embodiments, while displaying exposure compensation indicator that includes the representation of the first exposure compensation value and the compensation bias value is changed to the new compensation value, the computer system detects changes in the field-of-view of the one or more cameras (e.g., a scene change). In some embodiments, in response to detecting changes in the field-of-view of the one or more cameras and in accordance with a determination the changes in the field-of-view of the one or more cameras are above a threshold (e.g., non-zero threshold) (a threshold that is indicative of the amount of changes in the field-of-view amount to a change in a scene) the computer system updates (e.g., resetting) the compensation bias value to the default compensation bias value and continues to display the representation of the first exposure compensation value (e.g., 602d2 in FIG. 6J). In some embodiments, in response to detecting changes in the field-of-view of the one or more cameras and in accordance with a determination that the changes in the field-of-view of the one or more cameras are above a threshold, the computer system continues to display the exposure compensation indicator that includes the indication of the first exposure compensation value (e.g., the exposure compensation value does not change) and foregoes the update of (e.g., reset of) the compensation value to the default bias compensation value and/or maintain the bias compensation value (e.g., the bias compensation value does not change). Maintaining the exposure compensation value when a scene changes and updating the bias value reduces the number of inputs that it takes to reset the compensation value each time the scene changes and also reduces a number of times that the exposure compensation is reset when a scene temporarily changes in the field-of-view of the one or more cameras. Reducing the number of inputs needed to perform an operation enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that a set of reset criteria are met, the computer system sets the first exposure compensation value to a default compensation value (e.g., as indicated by 602d1 in FIG. 6T). In some embodiments, the set of reset criteria include a first criterion that is met when a media-capturing session ends and a second criterion that is met when an exposure-compensation-preservation mode is not enabled (e.g., 692a in FIG. 6R). In some embodiments, in accordance with a determination the set of reset criteria are not met, the computer system foregoes setting the first exposure compensation value to the first (e.g., default) compensation value (e.g., as indicated by 602d1 in FIG. 6P). In some embodiments, the computer system maintains the first exposure compensation value as the value that the first exposure compensation value was previous to the media-capturing session ending.

In some embodiments, the set of exposure compensation criteria includes a criterion that is met when an exposure-compensation-preservation mode is enabled (e.g., 692a in FIG. 6Q). In some embodiments, the set of exposure compensation criteria includes a criterion that is met when the first exposure compensation value is not equal to a default compensation value. In some embodiments, the set of exposure compensation criteria includes a criterion that is met when exposure-compensation-preservation mode is enabled and the exposure compensation is a default value. In some embodiments, the set of exposure compensation criteria includes a criterion that is met when the first exposure compensation value is not equal to a default compensation value and exposure-compensation-preservation mode is enabled and the exposure compensation is a default value. Automatically displaying the exposure compensation indicator only when prescribed conditions are met allows display of the indictor without requiring additional user input. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in accordance with a determination that the set of exposure compensation criteria are not met, the computer system forgoes display of the exposure compensation indicator (e.g., 602 in FIG. 6M). In some embodiments, after displaying the exposure compensation indication, the computer system receives one or more inputs to inactive the exposure compensation mode (e.g., receiving a input one a selectable user interface object for configuring the exposure compensation mode), and in response to receiving the one or more inputs, the computer system ceases to display the exposure compensation indicator (e.g., that was previously displayed). Automatically displaying the exposure compensation indicator when prescribed conditions are met allows display of the indictor without requiring additional user input. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, at a second time while displaying the exposure compensation indicator and in accordance with a determination that the clipping that is predicted to occur has changed, the computer system displays an animation (e.g., 602 in FIGS. 6B-6D) of the exposure compensation indication transitioning from a first visual state (e.g., a first position and/or visual appearance (e.g., a thickness, size, color, boldness, opacity) of the indication, a visual state of the first compensation value) to a second visual state (e.g., a first position and/or visual appearance (e.g., a thickness, size, color, boldness, opacity) of the indication, a visual state of the second compensation value) that is different from the first visual state. In some embodiments, the animation includes moving the visual indication in a different position, thinning/thickening the visual indication, and/or displaying the first compensation value changing to a second compensation value. Displaying an animation of the exposure compensation indicator changing when the predicted clipping that is predicted to occur changes provides the user with feedback on the adjustment of the current exposure compensation value and/or the change in scene in the field-of-view of the at least one camera impacted (e.g., reduced) the predicted clipping. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the exposure compensation indicator (e.g., 602*d*), the computer system receives a selection (e.g., 650*k*) (e.g., tap on exposure compensation indicator) of the exposure compensation indicator (e.g., 602*d*) (e.g., selectable user interface object). In some embodiments, in response to receiving the selection (e.g., 650*k*) of the exposure compensation indicator, the computer system displays a control (e.g., 636) (e.g., an adjustable control, a slider) for adjusting the exposure compensation that, when selected (e.g., 650*l*), causes the exposure compensation indicator (e.g., as indicated by 602*d*1 in FIG. 6M) to be updated. In some embodiments, the adjustable control includes tick marks, where each tick mark is representative of a value on the adjustable control. In some embodiments, while displaying the control for adjusting the exposure compensation, the computer system displays a first indication (e.g., number, slider knob (e.g., bar) on slider track) of a current exposure compensation value; and, in response to receiving a request (e.g., a dragging gesture (e.g., dragging an indication (e.g., slider bar) from one respective location (e.g., tick mark) on the adjustable control to another respectable location on the adjustable control)) to adjust the control for adjusting the exposure compensation (and while displaying the control for adjusting the exposure compensation), the computer system replaces display of the first indication of the first exposure compensation value with display of a second indication of the second exposure compensation value and/or captures media based on the second exposure compensation value (e.g., without capturing media based on the first exposure compensation value). In some embodiments, updating the exposure compensation indicator includes displaying a representation of a second exposure compensation value that is different from the representation of the first exposure compensation value (and ceasing to display the representation of the first exposure compensation value). In some embodiments, updating the exposure compensation indicator includes displaying the visual indication (e.g., of the predicted clipping) with a different visual appearance and/or at a different position.

In some embodiments, while displaying the exposure compensation indicator (e.g., 602*d*) and in accordance with a determination that clipping is not predicted to occur (e.g., not likely to occur) in response to receiving a request to capture media that corresponds to the representation of the field-of-view of the one or more cameras, the computer system ceases to display the visual indication (e.g., 602*d*2 in FIG. 6M) (e.g., while continuing to display the exposure compensation indicator that includes a representation of the exposure compensation value). In some embodiments, clipping is not predicted to occur after the first compensation value has been changed to a second compensation value. In some embodiments, the clipping is not predicted to occur after changes in the field-of-view of the one or more cameras are detected (e.g., after the scene in the field-of-view of the one or more cameras has changed). In some embodiments, while displaying the exposure compensation indicator and in accordance with a determination that clipping is predicted to occur in response to receiving a request to capture media that corresponds to the representation of the field-of-view of the one or more cameras, the computer system continues to display the visual indication. Ceasing to display the indication of the predicted clipping when prescribed conditions are met provides the user with feedback on the adjustment of the current exposure compensation value and/or the change in scene in the field-of-view of the at least one camera impacted (e.g., reduced) the predicted clipping. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

Note that details of the processes described above with respect to method 700 (e.g., FIG. 7) are also applicable in an analogous manner to the methods described below. For example, method 900 optionally includes one or more of the characteristics of the various methods described above with reference to method 700. For example, method 700 described above may be used to configure a computer system to capture media with a respective amount of exposure compensation that can be displayed using the methods described below with respect to method 900. For brevity, these details are not repeated below.

FIGS. 8A-8L illustrate exemplary user interfaces for displaying media using an electronic device in accordance with some embodiments. The user interfaces in these figures are used to illustrate the processes described below, including the processes in FIG. 9.

FIG. 8A illustrates electronic device 600 displaying media gallery user interface 810 that includes thumbnail media representations 812. Thumbnail media representations 812 include thumbnail media representations 812a-812g, where each of thumbnail media representations 812a-812g is representative of a different media item (e.g., a media item that was captured at a different instance in time). In FIG. 8A, media representations 812 include thumbnail media representations that are representative of at least two types of media items. For example, thumbnail media representations 812a, 812b, and 812g are representative of media items that do not include high-dynamic-range ("HDR") content, and thumbnail media representations 812c-812h are representative of media items that include HDR content. At FIG. 8A, thumbnail media representations 812c-812h are displayed without HDR content in media gallery user interface 810, although they are representative of media items that include HDR content.

As illustrated in FIG. 8A, thumbnail media representations 812a-812g are each displayed with a "NON-HDR" or "HDR" label. It should be understood that the "NON-HDR" and "HDR" labels are included to allow a reader of the subject matter herein to quickly identify whether a particular thumbnail media representation represents a media item that does not include HDR content ("non-HDR media item") or a media item that includes HDR content ("HDR media item"). Thus, the "NON-HDR" and "HDR" labels should not be considered as being displayed as a part of the user interface, thumbnail media representations 812a-812g, and/or a part of the particular media item that is represented by a particular thumbnail media representation. At FIG. 8A, device 600 detects tap gesture 850a on thumbnail media representation 812a.

As illustrated in FIG. 8B, in response to detecting tap gesture 850a, device 600 displays media viewer user interface 820 and ceases to display media gallery user interface 810. Media viewer user interface 820 includes media viewer region 824 positioned between application control region 822 and application control region 826. Media viewer region 824 includes enlarged media representation 824a, which is representative of the same media item as thumbnail media representation 812a. Thus, enlarged media representation 824a is representative of a non-HDR media item, which is indicated by the "NON-HDR" label in FIG. 8B. Media viewer user interface 820 is not substantially overlaid with controls while application control region 822 and application control region 826 are substantially overlaid with controls.

Application control region 822 optionally includes an indicator of a current time (e.g., "10:20 in FIG. 8B), a current date ("Apr. 18, 2019" in FIG. 8B), a cellular signal status indicator 820a that shows the state of a cellular signal, and battery level status indicator 820b that shows the state of the remaining battery life of device 600. Application control region 822 also includes back affordance 822a (e.g., that, when selected, causes device 600 to re-display media gallery user interface 810) and edit affordance 824b (e.g., that, when selected, causes device 600 to display a media editing user interface that includes one or more controls for editing a representation of the media item represented by the currently displayed enlarged media representation).

Application control region 826 includes some of thumbnail media representations 812 (e.g., 812a-812f) that are displayed in a single row. Because enlarged media representation 824a is displayed, thumbnail media representation 812a is displayed as being selected. In particular, thumbnail media representation 812a is displayed as being selected in FIG. 8B by being the only thumbnail media representation that is displayed with spacing (e.g., space between thumbnail media representation 812a and thumbnail media presentation 812b). In addition, application control region 826 includes send affordance 826b (e.g., that, when selected, causes device 600 to initiate a process for transmitting a media item represented by the enlarged media representation), favorite affordance 826c (e.g., that, when selected, causes device 600 to mark/unmark the media item represented by the enlarged representation as a favorite media), and trash affordance 826d (e.g., that, when selected, causes device 600 to delete (or initiate a process for deleting) the media item represented by the enlarged media representation).

As illustrated in FIG. 8B, application control region 822 and application control region 826 ("the application control regions") is the background portion of a region of media viewer user interface 820. At FIG. 8B, the application controls are at the edge of media viewer user interface 820. Application control region 822 is a header of the media viewer user interface and application control region 826 is the footer of media viewer user interface 820.

Figure 8D:
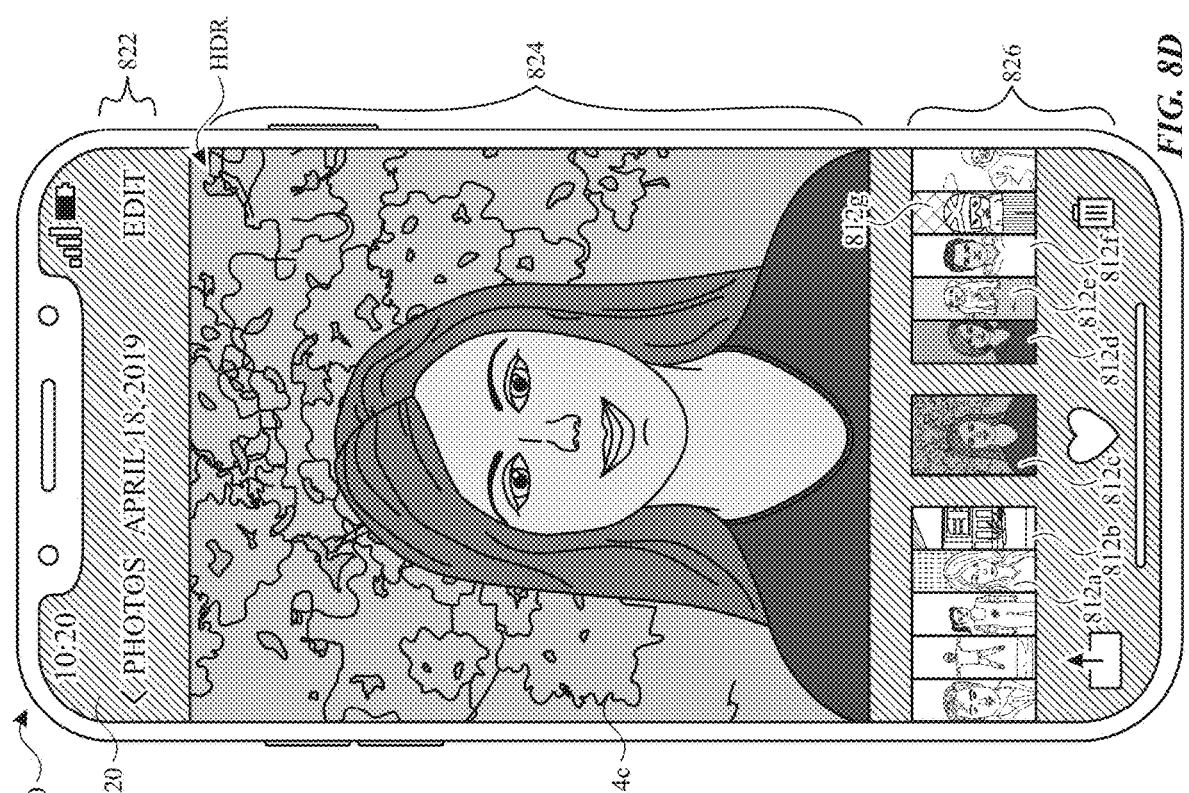

As illustrated in FIG. 8B, the application control regions include a light-colored (e.g., light gray, a bright color) overlay. The light-colored overlay indicates that the device 600 is not operating in a dark mode. In some embodiments, when device 600 is operating in a dark mode, the application control regions include a dark-colored overlay (e.g., dark gray, black), as discussed below in relation to FIGS. 8K-8L. For illustrative purposes, the application control regions include hatching that is indicative of how dark the application control regions are shaded. For example, an application control region that is illustrated with a higher density of lines (e.g., lines closer to each other) has a visual appearance that is darker than the visual appearance of an application control region that is illustrated with a lower density of lines (e.g., lines less close to each other). Thus, the hatching depicted in the application control regions in FIGS. 8B-8K are indicative of the darkness/brightness or color of the corresponding part of media viewer user interface 820.

As illustrated in FIG. 8B, the application control regions are displayed with a default color (e.g., level of shading of a color), as indicated by the hatching displayed in FIG. 8B. In FIG. 8B, device 600 is displaying the application control regions with a default color (and/or a default level of brightness) because enlarged media representation 824a is representative of a non-HDR media item. At FIG. 8B, device 600 detects leftward swipe gesture 850b in media viewer region 824.

Figure 8C:
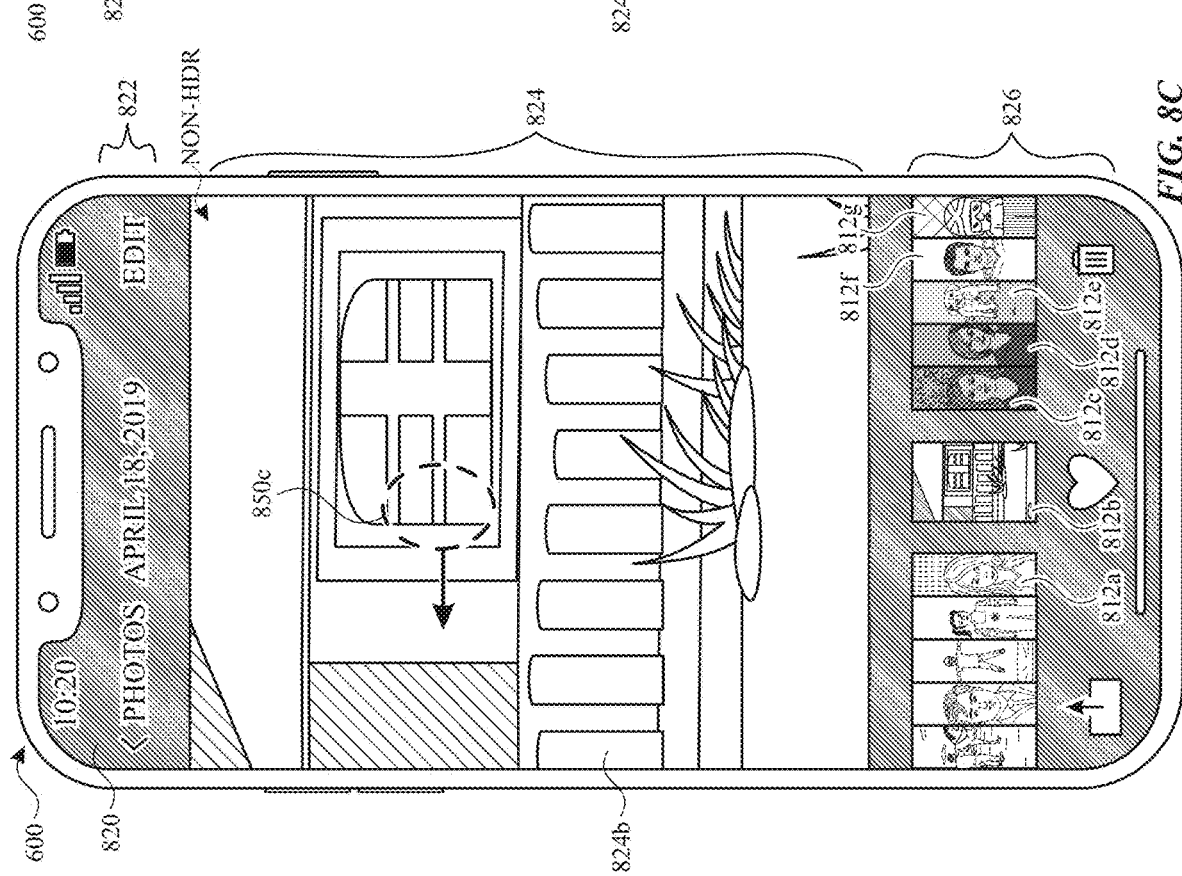
Figure 9:
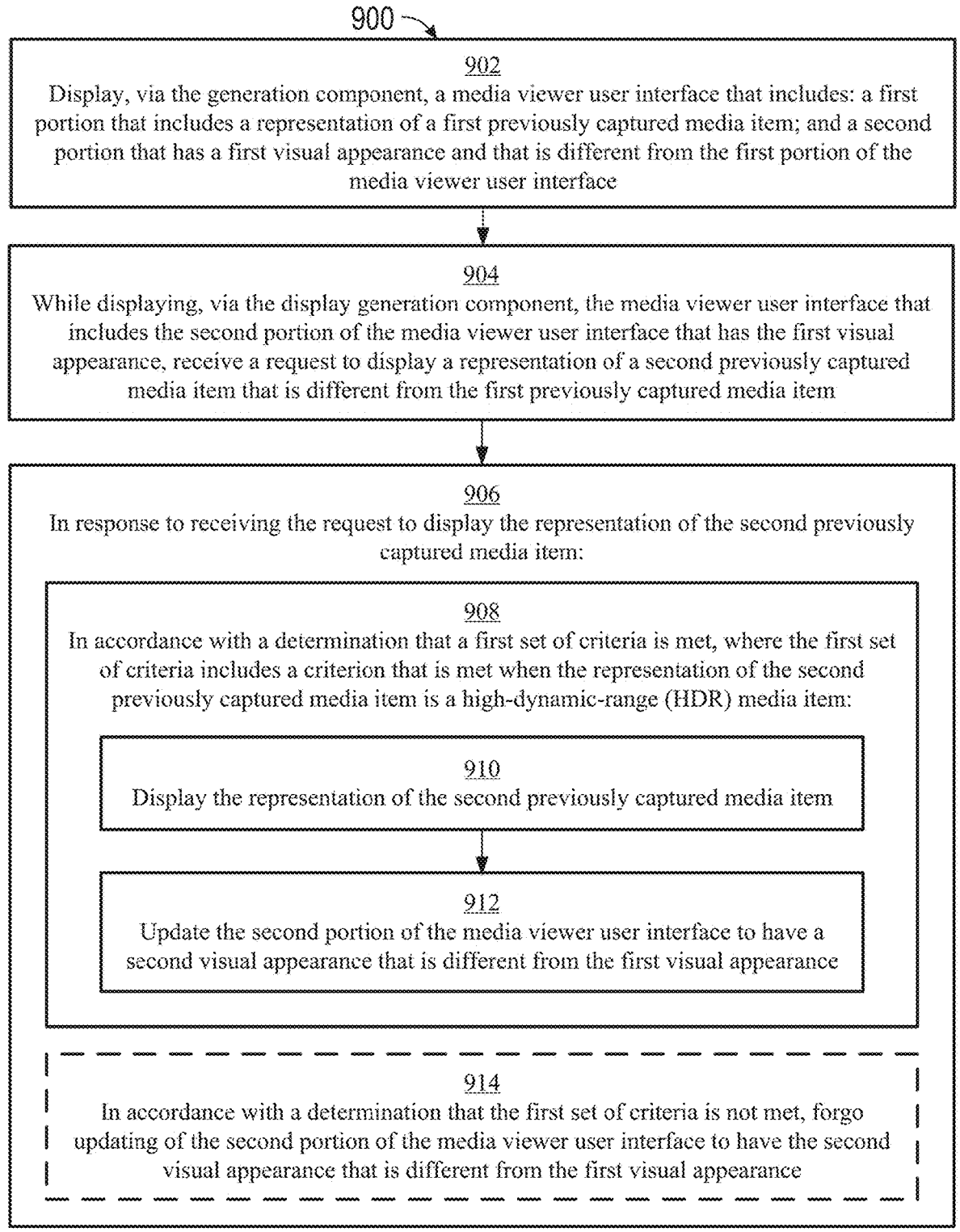
FIG. 9 is a flow diagram illustrating exemplary methods for displaying media in accordance with some embodiments.

As illustrated in FIG. 8C, in response to detecting leftward swipe gesture 850b, device 600 replaces enlarged media representation 824a with enlarged media representation 824b. Enlarged media representation 824b is representative of the same media item as thumbnail media representation 812b. Thus, enlarged media representation 812b is representative of a non-HDR media item (e.g., as discussed above in relation to thumbnail media representation 812b in FIG. 8A), which is indicated by the "NON-HDR" label in FIG. 8C. In response to detecting leftward swipe gesture 850b, device 600 updates thumbnail media representation 812 to show that the media item that corresponds to thumbnail media representation 812b is being displayed as the enlarged media representation in media viewer region 824.

As illustrated in FIG. 8C, in response to detecting leftward swipe gesture 850b, device 600 continues to display the application control regions with the default color, as indicated by the hatching displayed in FIG. 8C having the same density as the hatching in FIG. 8B. In FIG. 8C, device 600 continues to display the application control regions with the default color because enlarged media representation 824a is representative of a non-HDR media item. At FIG. 8C, device 600 detects leftward swipe gesture 850c in media viewer region 824.

As illustrated in FIG. 8D, in response to detecting leftward swipe gesture 850c, device 600 replaces enlarged media representation 824b with enlarged media representation 824c. Enlarged media representation 824c is representative of the same media item as thumbnail media representation 812c. Thus, enlarged media representation 812c is representative of an HDR media item (e.g., as discussed above in relation to thumbnail media representation 812c in FIG. 8A), which is indicated by the "HDR" label in FIG. 8D. Notably, while thumbnail media representation 812c of FIG. 8A did not include visually displayed HDR content, enlarged media representation 824b of FIG. 8D includes visually displayed HDR content. As illustrated in FIG. 8D, device 600 also updates thumbnail media representations 812 to show that thumbnail 812c, using similar techniques and for similar reasons as those described above (e.g., in FIGS. 8B-8C).

As illustrated in FIG. 8D, in response to detecting leftward swipe gesture 850c, device 600 updates the application control regions to have a brighter color (e.g., a lighter color, a color with more white) (e.g., as indicated by the hatching of FIG. 8D having a lower level of density as the hatching of FIG. 8C) than the color of application control regions in FIG. 8C. In FIG. 8D, device 600 updates the application control regions to have the color displayed in FIG. 8D based on the brightness of HDR content in the respective media item (e.g., the media item represented by the currently displayed enlarged media representation).

Figure 8F:
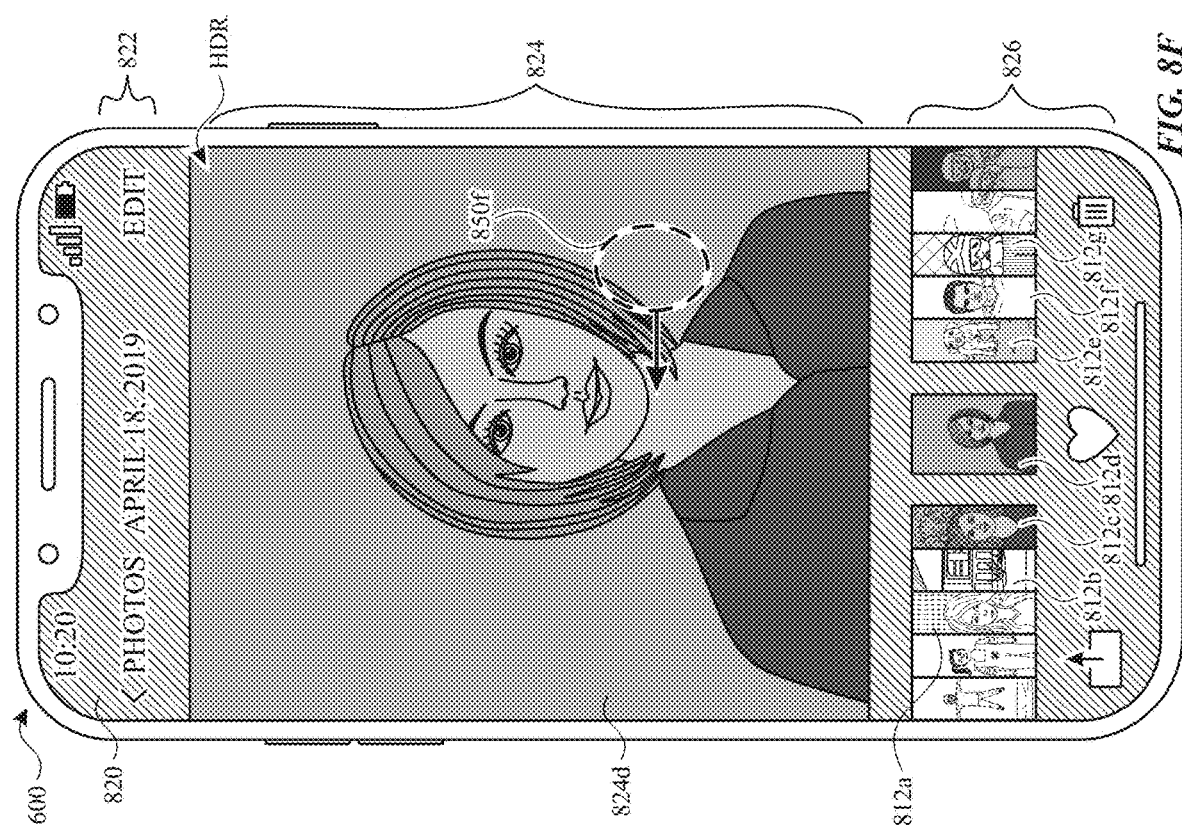
Figure 8E:
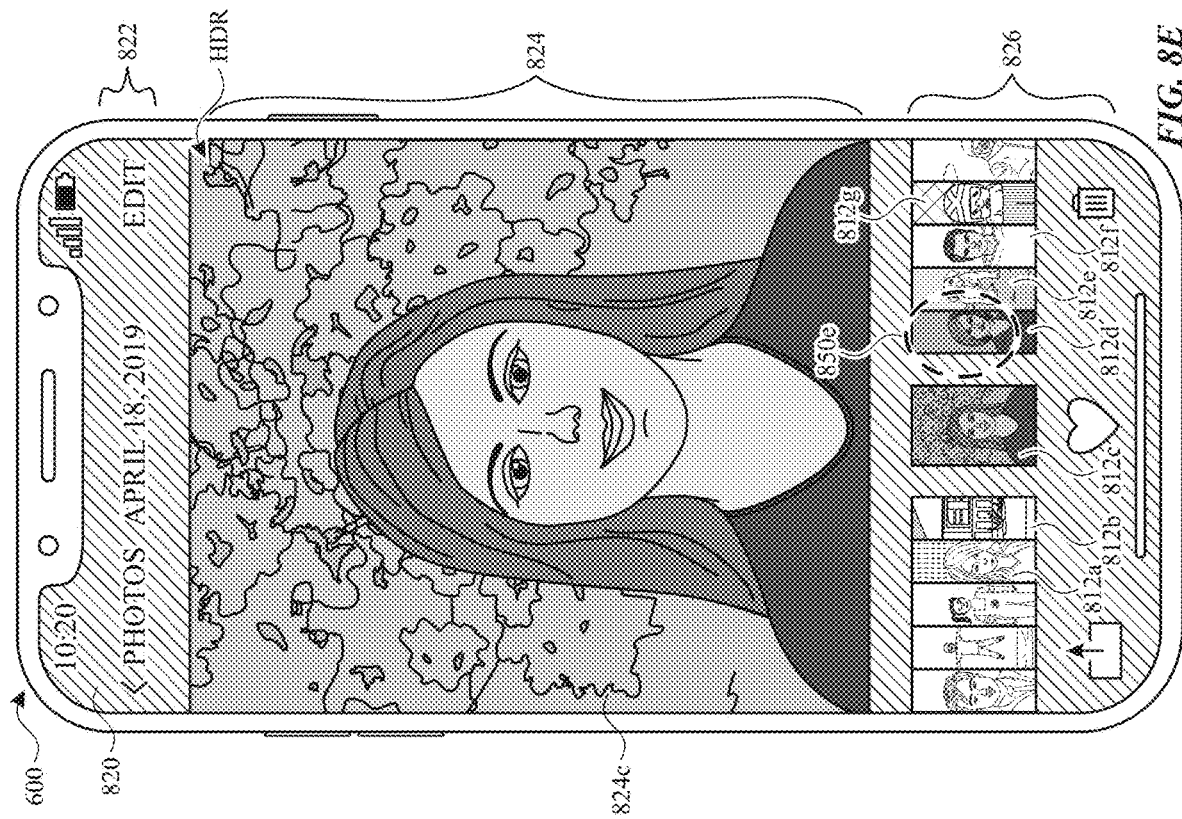

At FIG. 8E, device 600 continues to display enlarged media representation 824c. As the device continues to display enlarged media representation 824c (e.g., at FIG. 8E), a determination is made that enlarged media representation 824c has been displayed for longer than a predetermined period of time. As illustrated in FIG. 8E, because the determination is made that enlarged media representation 824c has been displayed for longer than the predetermined period time, device 600 updates the application control regions to have a brighter color (e.g., as indicated by the hatching of FIG. 8E having a lower level of density as the hatching of FIG. 8D) than the color of the application control regions displayed in FIG. 8D. The brighter color of the application control regions in FIG. 8D are based on the brightness of HDR content in the respective media item (e.g., the media item represented by the currently displayed enlarged media representation). Thus, at FIG. 8E, device 600 brightens the color of the application control regions based on the amount of time that enlarged media representation 824c has been displayed. In some embodiments, device 600 does not brighten the color of the application control regions any further than the color of the application control regions displayed in FIG. 8E irrespective of the amount of time that enlarged media representation 824c is displayed. In some embodiments, device 600 does not brighten the color of the application control regions any further because a determination is made that the color has reached a maximum level of brightness that is based on the level of HDR content in the HDR media represented by enlarged media representation 824c. In some embodiments, with reference to FIGS. 8C-8E, device 600 displays an animation of the application control regions gradually brightening from the color of application control regions of FIG. 8C to the color of application control regions of FIG. 8E after enlarged media representation 824c is displayed.

In some embodiments, device 600 brightens (or darkens) the color of the application control regions based on the rate of the gesture (e.g., swipe gesture 850c, or the time to transitioning the enlarged media representation to be displayed) that was received before the enlarged media representation was displayed (e.g., in addition, or alternative to, based on the time that the enlarged media representation was displayed). In some embodiments, device 600 brightens (or darkens) the color of the application control regions more when the gesture is detected for a longer duration of time and brightens (or darkens) the color of the application control regions less when the gesture is detected for a shorter duration of time. In some embodiments, device 600 brightness (or darkens) the color of the application control regions based on the average rate of the gestures (e.g., gestures 850b and 850c) that were received before the enlarged media representation was displayed. In some embodiments, device 600 brightens (or darkens) the color of the application control regions more when the average rate of the gestures is lower and brightens (or darkens) the color of the application control regions less when the average rate of the gestures is higher. At FIG. 8E, device 600 detects tap gesture 850e on thumbnail representation 812d.

As illustrated in FIG. 8F, in response to detecting tap gesture 850e, device 600 replaces enlarged media representation 824c with enlarged media representation 824d. Enlarged media representation 824d is representative of the same media item as thumbnail media representation 812d (e.g., an HDR media item), which is indicated by the "HDR" label in FIG. 8F. In response to detecting tap gesture 850e, device 600 also updates thumbnail media representation 812 to show that the media item that corresponds to thumbnail media representation 812d is being displayed as the enlarged media representation in media viewer region 824. When comparing enlarged media representation 824c (e.g., in FIGS. 8D-8E) and enlarged media representation 824d (e.g., in FIG. 8F), enlarged media representation 824d is visually darker than enlarged media representation 824c. At FIG. 8F, a determination is made that the media item represented by enlarged media representation 824d includes HDR content that has a second amount of brightness. The second amount of brightness of the HDR content in media item represented by enlarged media representation 824d is darker than the amount of brightness of the HDR content in the media item represented by enlarged media representation 824c of FIGS. 8D-8E.

As illustrated in FIG. 8F, in response to detecting tap gesture 850e and because the determination is made that the media item represented by enlarged media representation 824d includes content that has the second amount of brightness, device 600 updates the color of the application control regions. In particular, device 600 updates the color of the application control regions, such that the application control regions of FIG. 8F is darker than the application control regions of FIG. 8E. At FIG. 8F, device 600 updates the color of the application control regions of FIG. 8F to be visually darker than the application control regions of FIG. 8E because the second amount of brightness of the HDR content in the media item represented by enlarged media representation 824d (e.g., shown in FIG. 8F) is darker than the amount of brightness of the HDR content in the media item represented by enlarged media representation 824c (e.g., shown in FIG. 8E). Thus, device 600 updates the color of the application control regions based on the brightness of the HDR content in a media item that is currently displayed (e.g., via enlarged media representation) on device 600. In some embodiments, the level of brightness of HDR content in the media item is based on a number of bright portions in the media item, the overall brightness of the media item, the brightest portion of the media item, and/or the brightness of certain portions of the media item. In some embodiments, device 600 uses one or more techniques, as discussed above, to determine how much to darken the color of the application control regions. At FIG. 8F, device 600 detects leftward swipe gesture 850f in media viewer region 824.

Figure 8H:
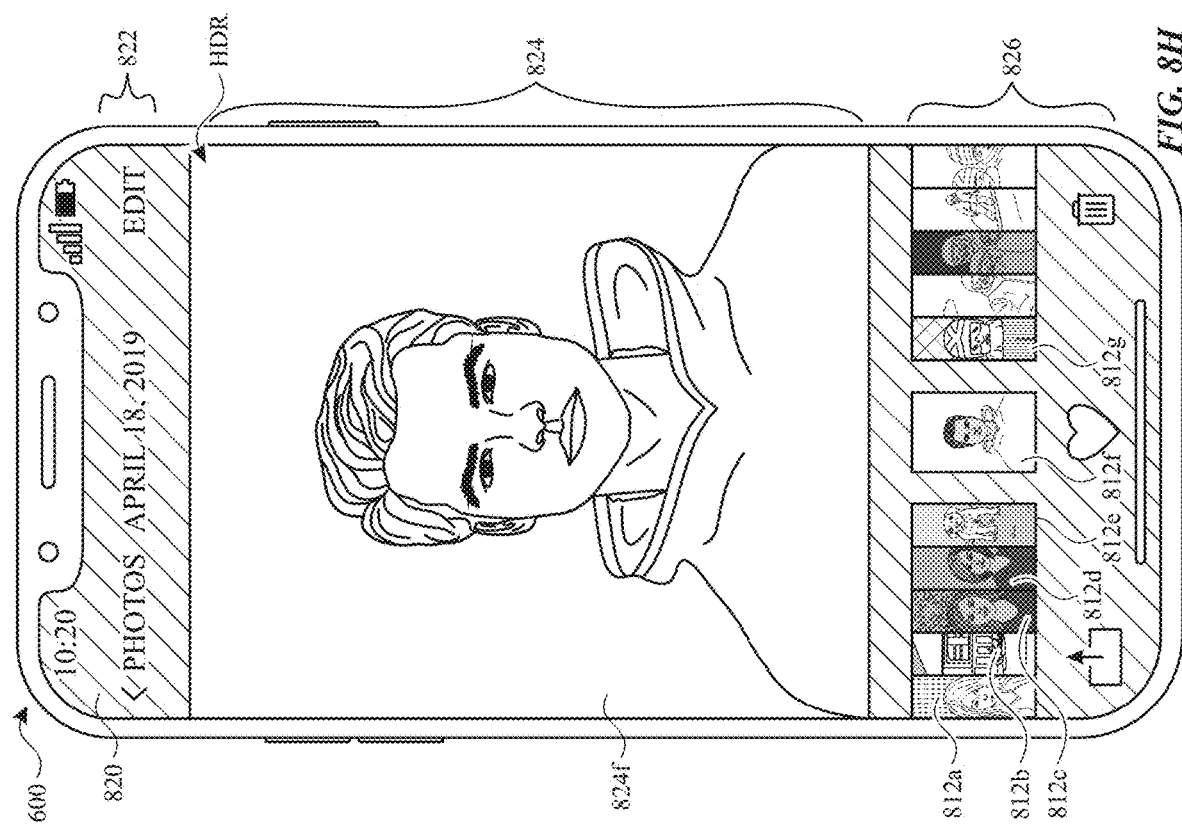
Figure 8G:
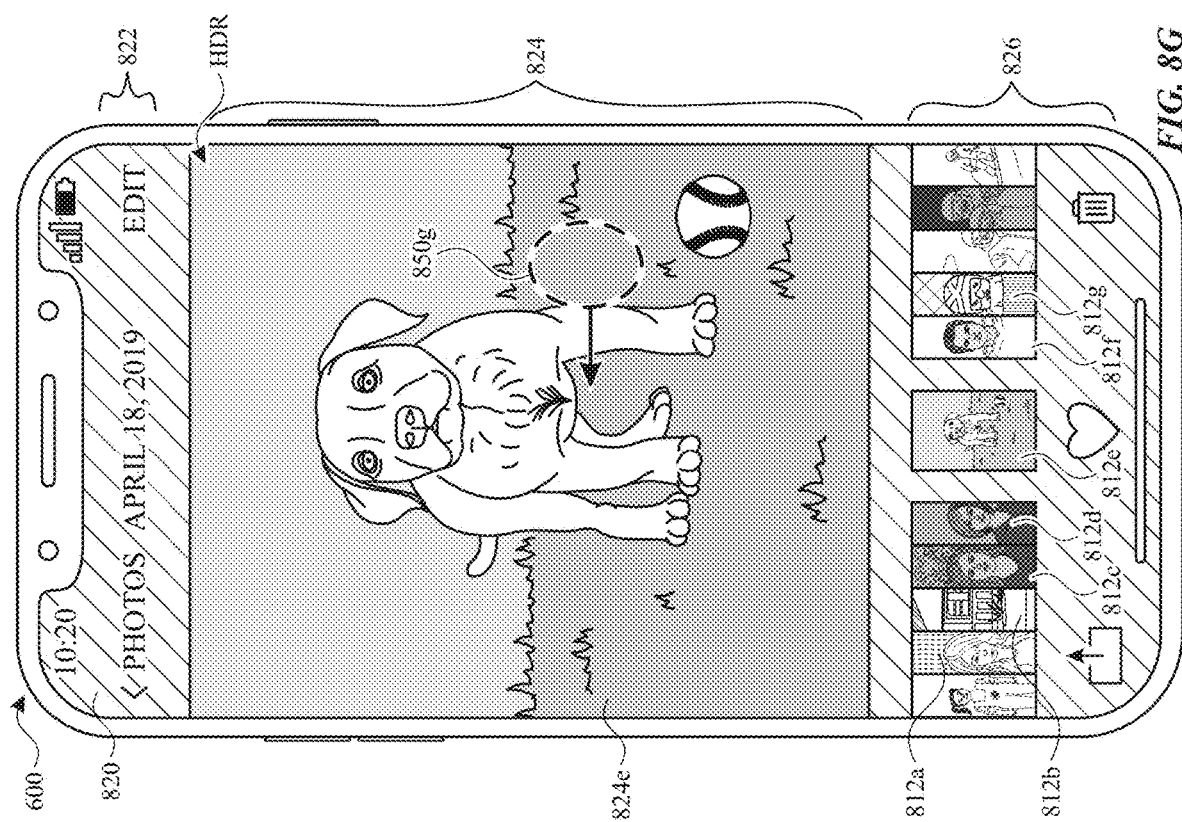

As illustrated in FIG. 8G, in response to detecting leftward swipe gesture 850f, device 600 replaces enlarged media representation 824d with enlarged media representation 824e. Enlarged media representation 824e is representative of the same media item as thumbnail media representation 812e (e.g., an HDR media item), which is indicated by the "HDR" label in FIG. 8G. In response to detecting leftward swipe gesture 850f, device 600 also updates thumbnail media representation 812 to show that the media item that corresponds to thumbnail media representation 812e is being displayed as the enlarged media representation in media viewer region 824. When comparing enlarged media representation 824d (e.g., in FIG. 8F) and enlarged media representation 824e (e.g., in FIG. 8F), enlarged media representation 824e is visually darker than enlarged media representation 824d (e.g., and enlarged media representation 824c, as described above). At FIG. 8G, a determination is made that the media item represented by enlarged media representation 824e includes HDR content that has a third amount of brightness, using one or more techniques discussed above. The third amount of brightness of the HDR content in the media item represented by representation 824e is brighter than the second amount of brightness of the HDR content in the media item representation by representation 824d.

As illustrated in FIG. 8G, in response to detecting leftward swipe gesture 850f and because of the determination that the media item represented by enlarged media representation 824e includes HDR content that has the third amount of brightness, device 600 updates the color of the application control regions. At FIG. 8G, device 600 updates the color of the application control regions, such that the application control regions of FIG. 8G is brighter than the application control regions of FIGS. 8E-8D (e.g., because the third amount of brightness (e.g., FIG. 8G) is greater than the second amount of brightness (e.g., FIG. 8D)). Device 600 updates the color of application regions of FIG. 8G, using one or more techniques, as discussed above. At FIG. 8G, device 600 detects leftward swipe gesture 850g in media viewer region 824.

Figure 8I:
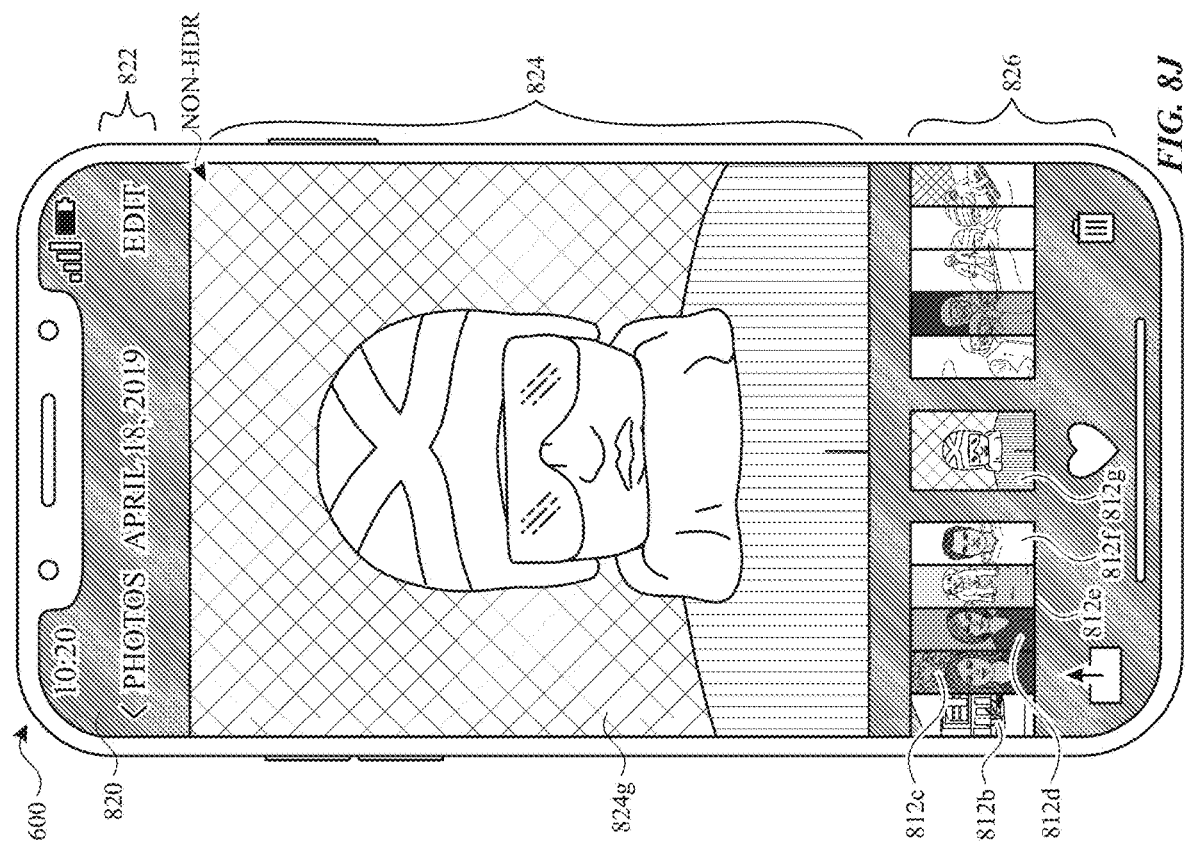

FIGS. 8H-8I illustrate media viewer user interface 820 that can be displayed in response to device 600 detecting leftward swipe gesture 850g. In some embodiments, media viewer user interface 820 of FIG. 8H is displayed in response to device 600 detecting leftward swipe gesture 850g, and media viewer user interface 820 of FIG. 8I is displayed after the media viewer user interface 820 is displayed for a predetermined period of time (e.g., using techniques discussed above in relation to FIGS. 8D-8E). In some embodiments, media viewer user interface 820 of FIG. 8H is not displayed in response to detecting leftward swipe gesture 850g, and media viewer user interface 820 of FIG. 8I is displayed in response to detecting leftward swipe gesture 850g.

As illustrated in FIG. 8H (and FIG. 8I), in response to detecting tap gesture 850g, device 600 replaces enlarged media representation 824e with enlarged media representation 824f. Enlarged media representation 824f is representative of the same media item as thumbnail media representation 812f (e.g., an HDR media item), which is indicated by the "HDR" label in FIG. 8H (and FIG. 8I). In response to detecting tap gesture 850g, device 600 also updates thumbnail media representation 812 to show that the media item that corresponds to thumbnail media representation 812f is being displayed as the enlarged media representation in media viewer region 824. When comparing enlarged media representation 824e (e.g., in FIG. 8G) and enlarged media representation 824f (e.g., in FIG. 8H), enlarged media representation 824f is visually brighter than enlarged media representation 824e. At FIG. 8H (or FIG. 8I), a determination is made that the media item represented by enlarged media representation 824f has HDR content that exceeds a brightness threshold.

As illustrated in FIG. 8I, because the determination is made that the media item (e.g., represented by enlarged media representation 824f) exceeds the brightness threshold (e.g., and in response to detecting swipe gesture 850g), device 600 darkens the HDR content of enlarged media representation 824f (as shown by enlarged media representation 824f of FIG. 8I having lines that are darker than the lines of enlarged media representation 824f of FIG. 8H). In addition, device 600 updates the color of the application control regions, such that the application control regions of FIG. 8I is brighter than the application control regions of FIG. 8G. Device 600 updates the color of application regions of FIG. 8I, using one or more techniques, as discussed above. Thus, at FIG. 8I, when a determination is made that a media item exceeds a brightness threshold, device 600 modifies both the enlarged media representation of the media item and the application control regions, such that the brightness of the enlarged media representation is closer to the brightness of the application control regions. In some embodiments, device 600 displays a less visually distracting media user interface by displaying an application control region that has a brightness that is closer to the brightness of the enlarged representation. At FIG. 8I, device 600 detects leftward swipe gesture 850i in media viewer region 824.

Figure 8J:
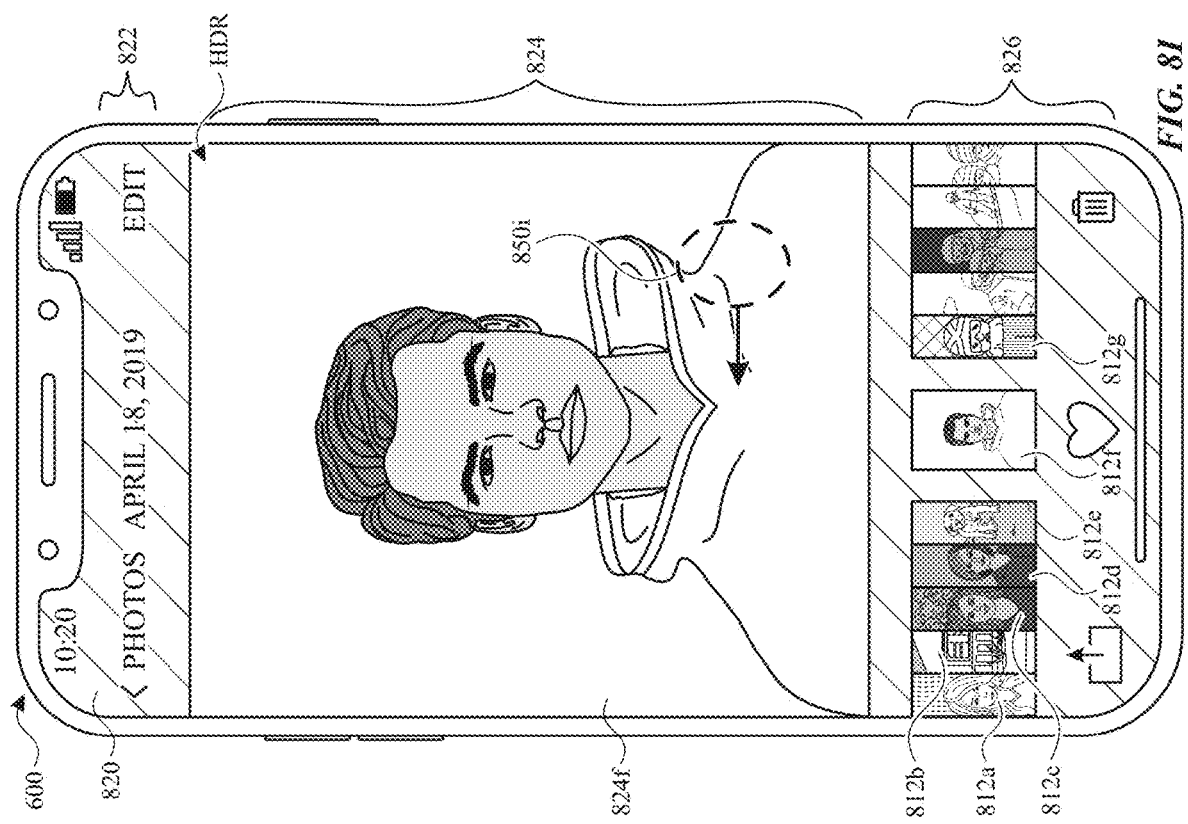

As illustrated in FIG. 8J, in response to detecting leftward swipe gesture 850i, device 600 replaces enlarged media representation 824f with enlarged media representation 824g. Enlarged media representation 824g is representative of the same media item as thumbnail media representation 812g (e.g., a non-HDR media item), which is indicated by the "NON-HDR" label in FIG. 8J. As illustrated in FIG. 8J, in response to detecting leftward swipe gesture 850i and because the respective media item is a non-HDR media item, device 600 updates the color of application control region to be the default color (e.g., by the hatching displayed in FIG. 8J having the same density as the hatching in FIG. 8B).

FIGS. 8K-8L illustrate device 600 operating in a dark mode and/or operating while displaying a dark-colored overlay in the application regions. As illustrated in FIG. 8K, device 600 displays the application control regions with a dark-colored overlay (e.g., dark gray, black; non-translucent) and enlarged media representation 824b displayed in media viewer region 824. At FIG. 8K, device 600 detects leftward swipe gesture 850k in media viewer region 824.

As illustrated in FIG. 8L, in response to detecting leftward swipe gesture 850k, device 600 replaces enlarged media representation 824b with enlarged media representation 824c. Enlarged media representation 824c is representative of the same media item as thumbnail media representation 812c. Thus, enlarged media representation 812c is representative of an HDR media item (e.g., as discussed above in relation to thumbnail media representation 812c in FIG. 8A), which is indicated by the "HDR" label in FIG. 8D. As illustrated in FIG. 8K, device 600 continues to display the application control regions with the same visual appearance as the application control regions were displayed in FIG. 8K, although enlarged media representation 812c is representative of an HDR media item. Thus, when device 600 displays the application regions with the dark-colored overly, device 600 does not update the visual appearance of the application control regions based on the brightness of the HDR content in the media item (e.g., as opposed to when device 600 updates the visual appearance of the application control regions in FIGS. 8C-8D when device 600 displayed the application control region with the light-colored overlay).

FIG. 9 is a flow diagram illustrating a method for displaying media using a computer system in accordance with some embodiments. Method 900 is performed at a computer system (e.g., 100, 300, 500, 600) that is in communication with a display generation component (e.g., a display controller, a touch-sensitive display system) and one or more input devices (e.g., a touch-sensitive surface). Some operations in method 900 are, optionally, combined, the orders of some operations are, optionally, changed, and some operations are, optionally, omitted.

As described below, method 900 provides an intuitive way for displaying media. The method reduces the cognitive burden on a user for displaying media, thereby creating a more efficient human-machine interface. For battery-operated computing systems, enabling a user to view media faster and more efficiently conserves power and increases the time between battery charges.

The computer system (e.g., 600) (e.g., a smartphone, a smartwatch) displays (902), via the display generation component, a media viewer user interface (e.g., 820) (e.g., an interface for displaying one or more representations (e.g., enlarged representations or non-thumbnail representations) of previously captured media) that includes: a first portion (e.g., 824) that includes a representation (e.g., 824a-824f) of a first previously captured media item (e.g., an image, a video); and a second portion (e.g., 822 and/or 826) (e.g., the chrome portion (e.g., a header, a footer, a menu section of the user interface) of the user interface, the portion of the user interface that partially or fully surrounds the visual content (e.g., first portion) of the user interface) that has a first visual appearance and that is different (e.g., distinct, independent) from the first portion (e.g., 824) of the media viewer user interface (e.g., 820). In some embodiments, the representation of the previously captured media has been captured by one or more cameras of the computer system. In some embodiments, the first previously captured media is high-dynamic-range (HDR) media. In some embodiments, the first previously captured media is not high-dynamic-range media. In some embodiments, the second portion of the media viewer user interface is outside of the first portion of the media viewer user interface. In some embodiments, the second portion of the media viewer user interface is above and/or below the first portion of the media viewer user interface. In some embodiments, the second portion includes a third portion of the media user interface and a fourth portion of the media user interface that are separated by the first portion of the media user interface. In some embodiments, the second portion includes a plurality of affordances (e.g., an affordance that, when selected, causes the computer system to share a representation of the previously captured media via one or more applications, an affordance that, when selected, causes the computer system to display a user interface for editing a representation of the previously captured media, an affordance that, when selected, causes the computer system to delete the displayed representation of the previously captured media, an affordance that, when selective, causes the computer system to include a representation of the previously captured media in a particular group of representations (e.g., favorite representations, "liked" representations, etc.), an affordance that, when selected, causes the computer system to concurrently show a plurality of representations (e.g., a media gallery with a plurality of photos in a grid), and an affordances that, when selected, causes the computer system to cease to display the media viewer user interface and to display a user interface that is different from the media viewer user interface). In some embodiments, the representation of the previously captured media has been captured by one or more cameras of the computer system. In some embodiments, the first previously captured media is high-dynamic-range media. In some embodiments, the first previously captured media is not high-dynamic-range media.

While displaying, via the display generation component, the media viewer user interface that includes the second portion (e.g., 822 and/or 826) of the media viewer user interface (e.g., 820) (e.g., 820) that has the first visual appearance (e.g., 822 and/or 826 in FIG. 8F) (and the first portion that includes a representation of a first previously captured media item), the computer system receives (904) (e.g., 850f) a request (e.g., a swipe gesture on the media viewer user interface (e.g., 820)) to display a representation (e.g., 824e) of a second previously captured media item (e.g., still images, video) that is different from the first previously captured media item (e.g., 824d) (e.g., to replace display of the representation of the first previously captured media item with the representation of the second previously captured media item).

In response to (906) receiving the request to display the representation of the second previously captured media item and in accordance with (908) a determination that a first set of criteria is met, where the first set of criteria includes a criterion that is met when the representation of the second previously captured media item (e.g., 824e) (or a different media item) is a high-dynamic-range (HDR) media item, the computer system displays (910) the representation of the second previously captured media item (e.g., replacing display of the representation of the first previously captured media item with a representation of a second previously captured media item) and updates (912) the second portion (e.g., 822 and/or 826) of the media viewer user interface (e.g., 820) to have a second visual appearance (e.g., 822 and/or 826 in FIG. 8G) that is different from the first visual appearance (e.g., 822 and/or 826 in FIG. 8F). In some embodiments, in accordance with a determination that a first set of criteria is met, the first previously captured media item ceases to be displayed. In some embodiments, the second visual appearance is more/less bright (or white) than the first visual appearance. In some embodiments, the second visual appearance is based on the level of brightness of the representation of the second previously captured media item. In some embodiments, the level of brightness can include the respective brightness of certain elements in a representation of previously captured media and/or can be based on a number of bright elements in a representation of previously captured media, and/or can be based on overall brightness of a representation of previously captured media. Updating a portion of the media viewer user interface (e.g., 820) (e.g., a border of an image, a chrome) when prescribed conditions are met (e.g., when displaying an HDR photo) makes the user interface less visually distracting when HDR photos are displayed because the portion of media portion that is updated more closely matches elements in the HDR photo. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, as a part of updating the second portion (e.g., 822 and 826) of the media viewer user interface (e.g., 820) to have the second visual appearance that is different from the first visual appearance and in accordance with a determination that a portion of the media item (e.g., 824d in FIG. 8F) (e.g., HDR content) has a first level of brightness, the computer system displays the second portion (e.g., 822 and/or 826 in FIG. 8F) of the media viewer user interface (e.g., 820) with a first amount of a visual characteristic (e.g., level of brightness, opacity, color (e.g., whiteness)). In some embodiments, as a part of updating the second portion of the media viewer user interface (e.g., 820) to have the second visual appearance that is different from the first visual appearance and in accordance with a determination that the portion of the media item has a second level of brightness (e.g., 824e in FIG. 8G) that is different from the first level of brightness, the computer system displays the second portion (e.g., 822 and/or 826 in FIG. 8G) of the media viewer user interface (e.g., 820) with a second amount of the visual characteristic (e.g., level of brightness, opacity, color (e.g., whiteness)) that is different from the first amount of the visual characteristic. In some embodiments, the second portion of the media viewer user interface is updated to have the second visual appearance based on a brightness of content (e.g., HDR content) in the media item. In some embodiments, when the second level of brightness is higher (or, alternatively, lower) than the first level of brightness, the second amount is higher than the first amount. In some embodiments, when the media item is HDR content and portion of the media item is configured to be displayed with a brightness above the first level of brightness, the second portion of the media viewer user interface is displayed with a first amount of a visual characteristic; and when the media item is HDR content and no portion of the media item is configured to be displayed with a brightness above the first level of brightness, the second portion of the media viewer user interface is displayed with a second amount of the visual characteristic (e.g., level of brightness, opacity, color (e.g., whiteness)) that is different from the first amount of the visual characteristic. Dynamically updating a portion of the media viewer user interface (e.g., a chrome) differently based on the brightness of HDR content for different media items makes the user interface less visually distracting when displaying a respective media item (e.g., when the HDR content of the media is brighter, the portion of the media viewer user interface is brighter). Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, as a part of updating the second portion of the media viewer user interface (e.g., 820) to have the second visual appearance that is different from the first visual appearances and in accordance with a determination that the media item (e.g., 824c) has been displayed for a first amount of time, the computer system displays the second portion (e.g., 822 and/or 826 in FIG. 8D) of the media viewer user interface (e.g., 820) with a third amount of a visual characteristic (e.g., level of brightness, opacity, color (e.g., whiteness)). In some embodiments, as a part of updating the second portion of the media viewer user interface (e.g., 820) to have the second visual appearance that is different from the first visual appearance and in accordance with a determination that the media item (e.g., 824c) has been displayed for a second amount of time that is different from the first amount of time, the computer system displays the second portion (e.g., 822 and/or 826 in FIG. 8E) of the media viewer user interface (e.g., 820) with a fourth amount of the visual characteristic (e.g., level of brightness, opacity, color (e.g., whiteness)) that is different from the third amount of the visual characteristic. In some embodiments, the second portion of the media viewer user interface is updated to have the second visual appearance based on an amount of time that the media item has been displayed. In some embodiments, while displaying the media item, the visual appearance of the second portion can change (e.g., gradually, multiple times) over a period time (e.g., over a period of 0.5, 1, 2, 5, or 10 seconds, then optionally stops changing while the same media item continues to be displayed). In some embodiments, when the media item is displayed for the second amount of time that is longer (or, alternatively, shorter) than the first amount of time, the fourth amount of the visual characteristic is higher than the third amount of the visual characteristic. In some embodiments, the second portion of the media viewer user interface is displayed with an amount (or degree) of the visual characteristic, wherein the amount of the visual characteristic is based on an amount of elapsed time (e.g., amount of time that the first previously captured media item was displayed, amount of time that the second previously capture media item has been displayed). Dynamically updating a portion of the media viewer user interface (e.g., a chrome) differently based on the time that the HDR media is displayed makes the user interface less visually distracting (e.g., changes less when the media is displayed for less time) when displaying media and reduces the amount of different levels of brightness to which the portion of the media viewer user interface is updated. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, as a part of displaying the representation of the second previously captured media item (e.g., 824*c*-824*f*), the computer system replaces the representation of the first previously captured media item with the representation of the second previously captured media. In some embodiments, as a part of updating the second portion of the media viewer user interface to have the second visual appearance that is different from the first visual appearance and in accordance with a determination that the representation of the first previously captured media item was displayed for at least a first amount of time before being replaced with the representation of the second previously captured media, the computer system displays the second portion of the media viewer user interface (e.g., 820) with a fifth amount of a visual characteristic (e.g., level of brightness, opacity, color (e.g., whiteness)). In some embodiments, as a as a part of updating the second portion of the media viewer user interface (e.g., 820) to have the second visual appearance that is different from the first visual appearance and in accordance with a determination that the representation of the first previously captured media item or content has been replaced with the representation of the second previously captured media in a second amount of time that is different from the first amount of time, the computer system displays the second portion of the media viewer user interface (e.g., 820) with a sixth amount of the visual characteristic (e.g., level of brightness, opacity, color (e.g., whiteness)) that is different from the fifth amount of the visual characteristic. In some embodiments, the second portion of the media viewer user interface is updated to have the second visual appearance based on the duration of transitioning between previously displayed representations. In some embodiments, when the duration of transitioning between representations is smaller (bigger), the amount of change in the visual appearance is smaller (bigger). Dynamically updating a portion of the media viewer user interface (e.g., a border, a chrome) differently based on the time of transitioning between two media items makes the user interface less visually distracting (e.g., change less when the media is transitioned quicker) when displaying media and reduces the abruptness in the change in the amount of brightness when quickly transitioning between media. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, as a part of updating the second portion of the media viewer user interface (e.g., 820) to have the second visual appearance that is different from the first visual appearance and in accordance with a determination that an average rate of requests (e.g., 850*f*, 850*g*) (e.g., the previous 5 requests) to display previously captured media items is below a first threshold (e.g., or a first number of a plurality of request to display a plurality of representations of the previously captured media items were received within a predetermined time before displaying the representation of the second previously captured media item), the computer system displays the second portion of the media viewer user interface (e.g., 820) with a seventh amount of a visual characteristic (e.g., level of brightness, opacity, color (e.g., whiteness)). In some embodiments, as a part of updating the second portion of the media viewer user interface (e.g., 820) to have the second visual appearance that is different from the first visual appearance and in accordance with a determination that an average rate of requests to display previously captured media items is not below the first threshold (e.g., a second number of a plurality of request to display a plurality of representations of the previously captured media items were received within a predetermined time before displaying the representation of the second previously captured media item), the computer system displays the second portion of the media viewer user interface (e.g., 820) with an eighth amount of the visual characteristic (e.g., level of brightness, opacity, color (e.g., whiteness)) that is different from the seventh amount of the visual characteristic. In some embodiments, the second number is different from the first number. In some embodiments, the second portion of the media viewer user interface is updated to have the second visual appearance based the average rate of inputs (e.g., swipe rate or speed). In some embodiments, when the average rate of inputs is higher, the second portion changes less than when the average rate of subsequent inputs is lower. In some embodiments, the second portion of the media viewer user interface is displayed with an amount (or degree) of the visual characteristic, wherein the amount of the visual characteristic is based on the rate at which content has been displayed (e.g., number of images per unit of time) in the first portion of the media browser interface. Dynamically updating a portion of the media viewer user interface (e.g., a border, a chrome) differently based on rate of transitioning between media items makes the user interface less visually distracting (e.g., change less when the rate is quicker) when displaying media and reduces the abruptness in the change in the amount of brightness when quickly transitioning between media. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying, via the display generation component, the media viewer user interface that includes the second portion of the media viewer user interface (e.g., 820) that has the first visual appearance (and the first portion that includes a representation of a first previously captured media item), the computer system receives a request to display a representation of a third previously captured media item that is different from the first previously captured media item and the second previously captured media item. In some embodiments, in response receiving the request to display the representation of the third previously captured media item and in accordance with a determination that the first set of criteria is met, the computer displays the representation of the third previously captured media item (e.g., by replacing the representation of the second previously captured media item) and updates the second portion (e.g., 822 and/or 826) of the media viewer user interface (e.g., 820) to have a third visual appearance that is different from the first visual appearance and the second visual appearance. In some embodiments, the first set of criteria includes a criterion that is met when the representation of the third previously media is an HDR media item. In some embodiments, when the third media item has a higher level of brightness (e.g., level of brightness may include the respective brightness of certain elements in image that can be based on a number of bright elements in image, and/or can be based on overall brightness of image) content than the previously displayed media item, the second portion (e.g., 822 and/or 826) of the media viewer user interface (e.g., 820) is brighter (or has more white) while the third media item is displayed than when the previous media item was displayed. Dynamically updating a portion of the media viewer user interface (e.g., a chrome) differently based on the brightness of HDR content for different media items makes the user interface less visually distracting when displaying a respective media item (e.g., as HDR content of the media is brighter, the portion of the media viewer user interface gets brighter). Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the second previously captured media item is an HDR media item (e.g., 824c-824f). In some embodiments, the representation of the second previously captured media item is displayed with HDR. In some embodiments, for a media item (e.g., an image or video) that has at least a portion that is intended to be displayed with a particular brightness level that is above the standard dynamic range for brightness, the representation of the media item is displayed with a brightness level (e.g., the particular brightness level) that is above the standard dynamic range.

In some embodiments, the first set of criteria includes a criterion that is met when the second portion (e.g., 822 and/or 826) is (or within a threshold value (e.g., an red-blue-green value, a hex value)) a first color (e.g., a color (e.g., white or light colored) that is not a second color (e.g., black or dark colored), a bright color (e.g., a color with more white than black)). In some embodiments, the first set of criteria includes a criterion that is met when the second portion (e.g., 822 and/or 826) is not a second color (e.g., black or dark colored). In some embodiments, the computer system receives a user input selecting among two or more options for color range of the second portion (e.g., 822 and/or 826), and the first set of criteria includes a criterion that is met when the current color range selection for the second portion (e.g., 822 and/or 826) is a first color range (and not a second color or second color range).

In some embodiments, as a part of updating the second portion (e.g., 822 and/or 826) of the media viewer user interface to have the second visual appearance, the computer system displays an animation that gradually (e.g., fading over a period of time (e.g., 1, 2, 3 seconds)) transitions the second portion (e.g., 822 and/or 826) of the media viewer user interface from having the first visual appearance to the second visual appearance. Dynamically updating a portion of the media viewer user interface (e.g., a chrome) gradually when an HDR media item is displayed makes the user interface less visually distracting when display the HDR media item and reduces the abruptness of the change in the portion of the media view interface. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the representation of the previously captured media item (e.g., first previously captured media item, second previously captured media item, etc.) includes an amount of brightness (e.g., average brightness, percentage of bright areas). In some embodiments, the representation of the previously captured media item is displayed with, in accordance with a determination that the amount of brightness (e.g., average brightness, percentage of bright areas) exceeds a brightness threshold, a modified amount (e.g., reduced) of brightness (e.g., reduced average brightness, reduced brightness in some portions while maintaining brightness of other portions, reduced brightness equally across the image). In some embodiments, the representation of the previously captured media item is displayed with, in accordance with a determination that the amount of brightness does not exceed the brightness threshold, the amount of brightness (e.g., without reducing the average brightness, without reducing brightness equally across the image). In some embodiments, the underlying content of the media item remains the same (e.g., has the amount of brightness that exceeds the brightness threshold), but the media item is displayed with the modified (e.g., reduced) amount of brightness. Dynamically changing the displayed HDR media item differently based on the brightness of HDR content for different media items makes the user interface less visually distracting when displaying a respective media item (e.g., as HDR content of the photo is brighter, the photo is displayed darker reduce the visual different between the chrome and the photo). Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first previously captured media item (e.g., 824a-824b, 824g) is not the HDR media item. In some embodiments, the second previously captured media item (e.g., 824c-824f) is the HDR media item. In some embodiments, before displaying, via the display generation component, the media viewer user interface that includes the first portion and the second portion (e.g., 822 and/or 826), the computer system displays, via the display generation component, a user interface (e.g., 810) that includes a plurality of representations (e.g., 812a-812g) of media items. In some embodiments, the plurality of representations of media items includes display of a second representation (e.g., 812a-812b, 812g) (e.g., a thumbnail) of the first previously captured media item without HDR content and a second representation (e.g., 812c-812f) (e.g., a thumbnail) of the second previously captured media item without HDR content. In some embodiments, thumbnails of media items (e.g., images) are displayed using the standard dynamic range brightness, regardless of whether the media items are intended to be displayed with a particular brightness level that is above the standard dynamic range for brightness. In some embodiments, while displaying the plurality of representations of media items, the computer system receives a request to display the first (or, alternatively, second or any of the other plurality of representations) previously captured media item (e.g., a selection of (e.g., a tap on) the second representation of the first (or, alternatively, second or any of the other plurality of representations) previously captured media item) and, in response to receiving the request to display the first representation (or, alternatively, second or any of the other plurality of representations), the electronic displays the media interface which includes the first portion (e.g., having the representation of the first ((or, alternatively, second or any of the other plurality of representations) previously captured media item) previously captured media item) and the second portion (e.g., 822 and/or 826) (e.g., with the first visual appearance (or, alternatively, the second visual appearance when the second previously captured media item is displayed in the first portion)).

In some embodiments, in response to (906) receiving the request to display the representation of the second previously captured media item and in accordance with a determination that the first set of criteria is not met, the computer system forgoes (914) updating the second portion (e.g., 822 and/or 826) of the media viewer user interface (e.g., 820) to have the second visual appearance that is different from the first visual appearance (e.g., displaying (or continuing to display) the second portion (e.g., 822 and/or 826) of the media viewer user interface (e.g., 820) with the first visual appearance). In some embodiments, the first set of criteria is not met when the representation of the second previously captured media item is not an HDR media item. In some embodiments, the chrome (area surrounding images displayed) does not change when a non-HDR photo is displayed. In some embodiments, in accordance with a determination that the first set of criteria is not met, the computer system transitions display of the second portion (e.g., 822 and/or 826) to a predefined (e.g., independent of the brightness of the second previously captured media item) visual appearance. Thus, as long as the image is not an HDR image, the second portion (e.g., 822 and/or 826) is displaying using the predefined appearance, regardless of the amount of brightness/darkness of the non-HDR image.

Dynamically forgoing the change of the portion of the media user interface when the media is not HDR media makes the user interface less visually distracting when displaying the non-HDR respective media item. Performing an operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the representation of the second previously captured media item and the second portion (e.g., 822 and/or 826) has the second visual appearance, the computer system receives (e.g., 850g, 850i) a request to display the representation of a fourth previously captured media item. In some embodiments, in response to receiving (e.g., 850g, 850i) the request to display the third previously captured media item and in accordance with a determination that the first set of criteria is met, the computer system displays the representation of the fourth previously captured media item (e.g., by replacing display of the second previously captured media item) without updating the visual appearance of the second portion (e.g., 822 and/or 826) and updates the second portion (e.g., 822 and/or 826) of the media to have a visual appearance (e.g., 822 and/or 826 in FIGS. 8E-8I) based on that is different from the first visual appearance and the second visual appearance. In some embodiments, in response to receiving the request to display the third previously captured media item and in accordance with a determination that the first set of criteria is not met (e.g., the fourth previously captured media item is not an HDR media item) the computer system displays the representation of the fourth previously captured media item and updates the second portion (e.g., 822 and/or 826) of the media to have a predefined (e.g., independent of the brightness of the second previously captured media item) visual appearance (e.g., 822 and/or 826 in FIGS. 8C-8D and 8J) that is different from the second visual appearance. In some embodiments, as long as the fourth previously captured media item is not HDR, the second portion (e.g., 822 and/or 826) is displaying using the predefined visual appearance, regardless of how bright/dark the non-HDR image is. In some embodiments, when a non-HDR image is requested to be displayed, the second portion (e.g., 822 and/or 826) is displayed using a predefined visual appearance (e.g., the same color and/or brightness for all non-HDR images), regardless of how bright/dark the non-HDR image is; and when an HDR image is requested to be displayed, the second portion (e.g., 822 and/or 826) is displayed using a variable visual appearance that is based on how bright/dark the HDR image is.

Note that details of the processes described above with respect to method 900 (e.g., FIG. 9) are also applicable in an analogous manner to the methods described below/above. For example, methods 700 and 1100 optionally includes one or more of the characteristics of the various methods described above with reference to method 900. For example, method 900 can display media that has been captured using a computer system that is configured to capture media with a particular exposure compensation value using one or more steps of method 700 (discussed above). For brevity, these details are not repeated below.

FIGS. 10A-10AC illustrate exemplary user interfaces for displaying a status indicator using an electronic device in accordance with some embodiments. The user interfaces in these figures are used to illustrate the processes described below, including the processes in FIG. 11.

Figure 10D:
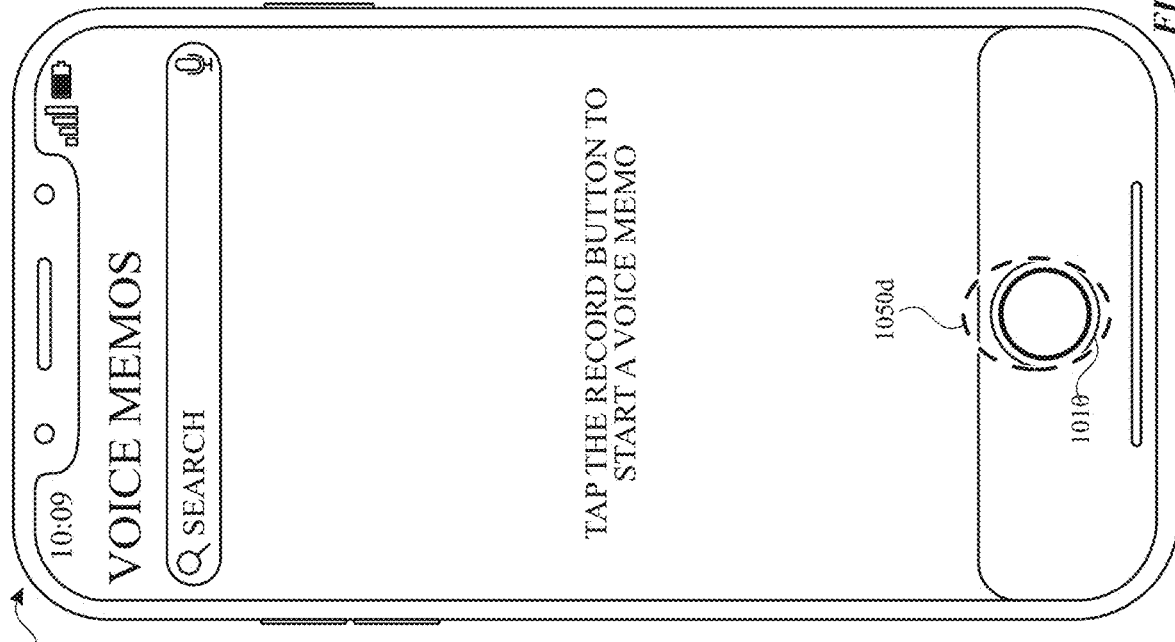
Figure 10C:
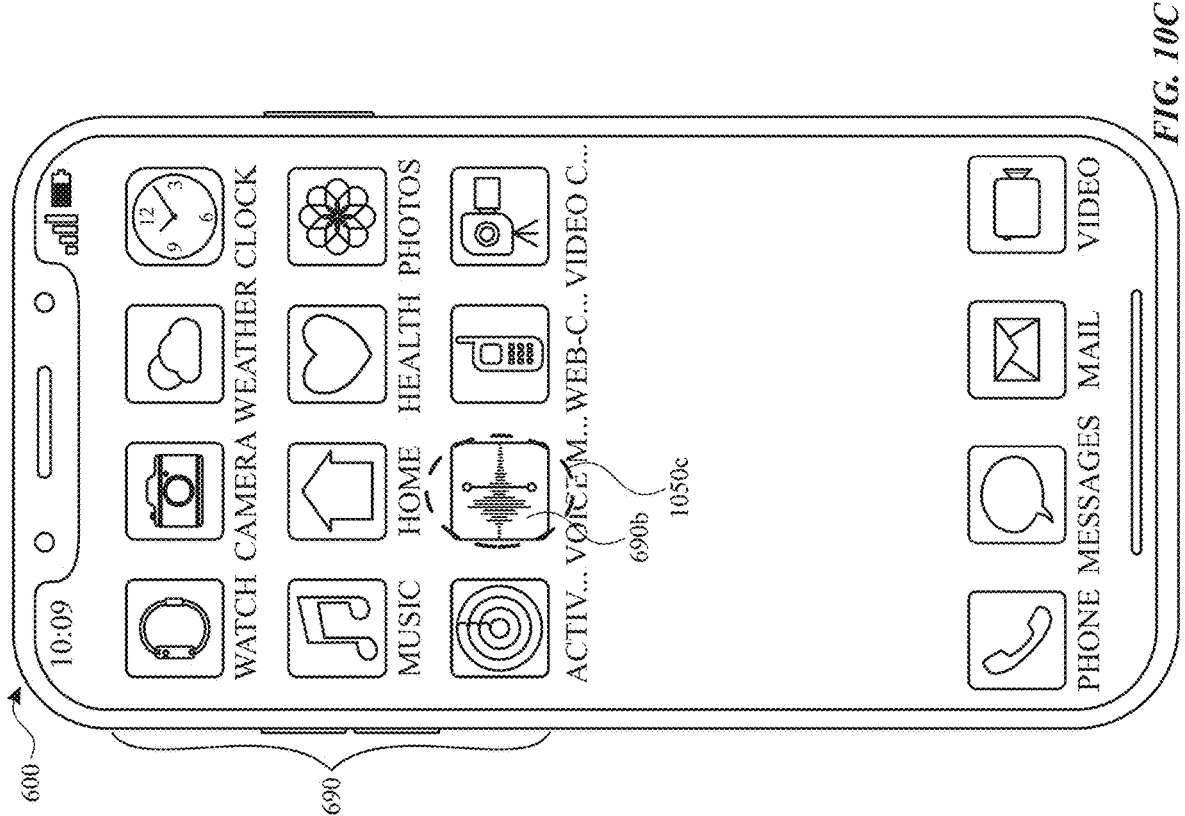
Figure 10F:
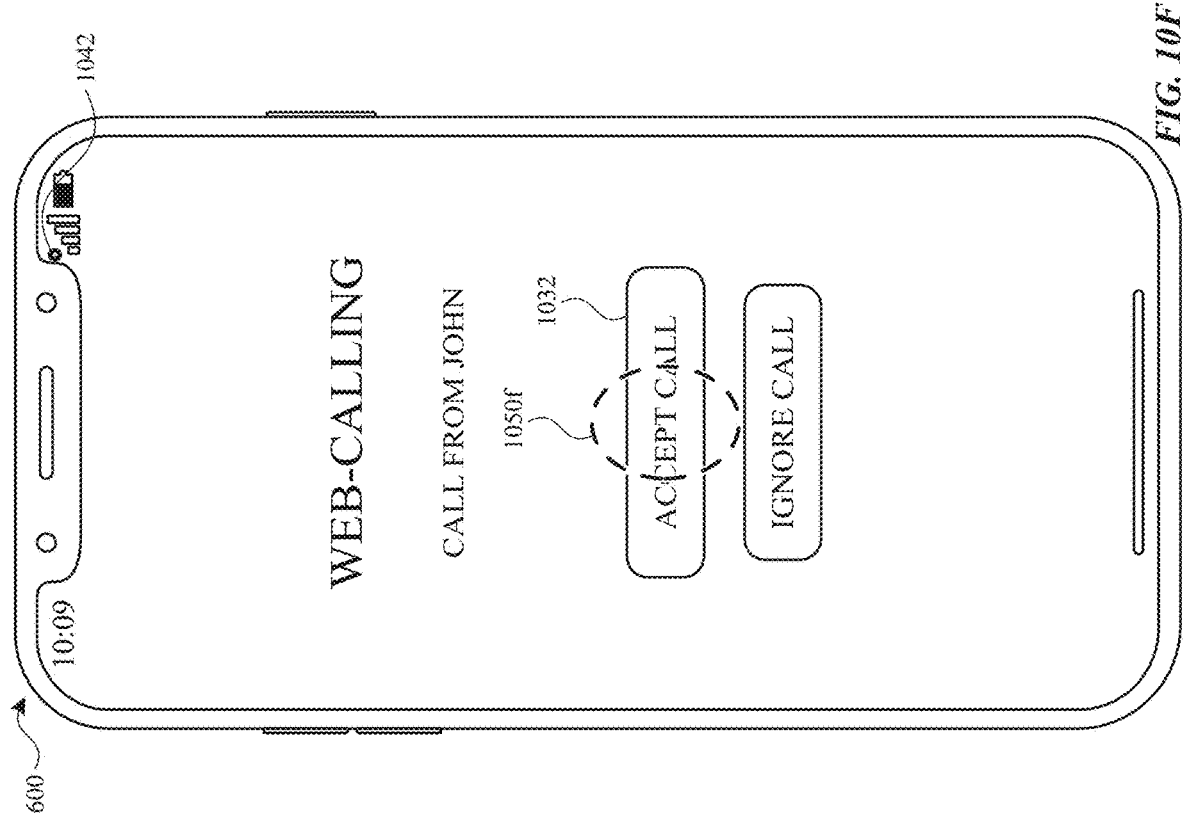
Figure 10E:
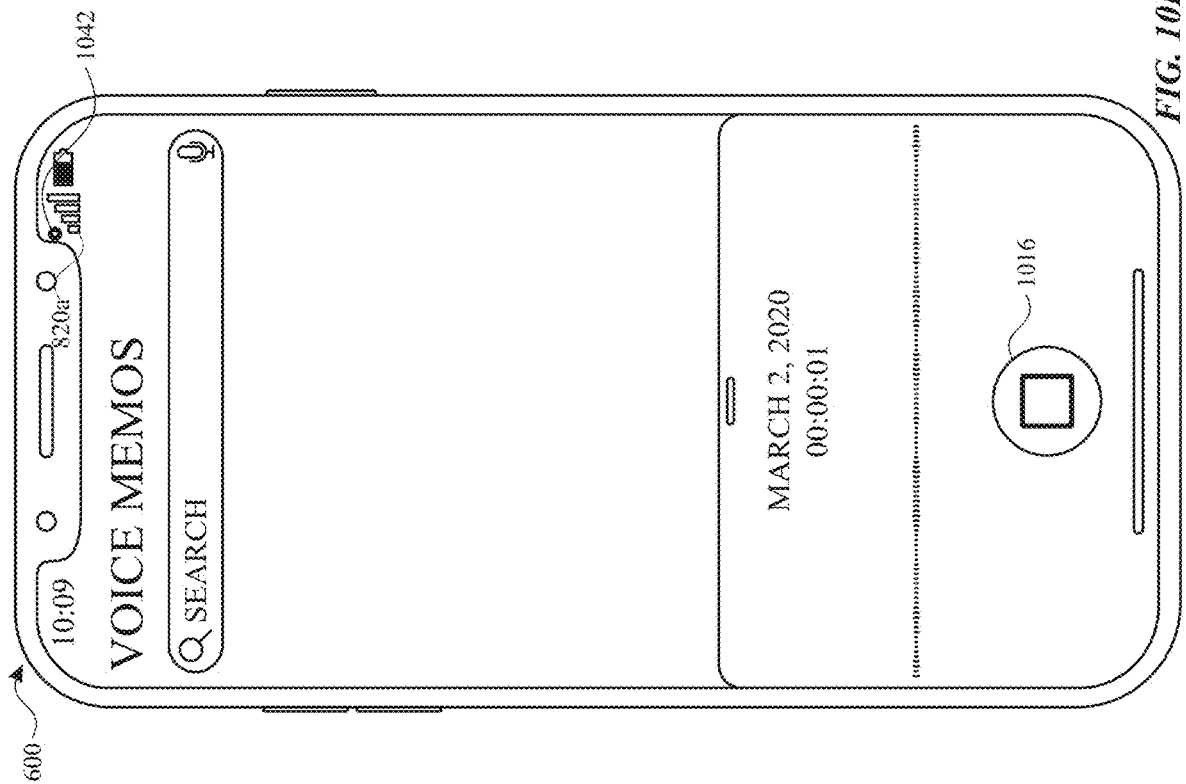
Figure 10L:
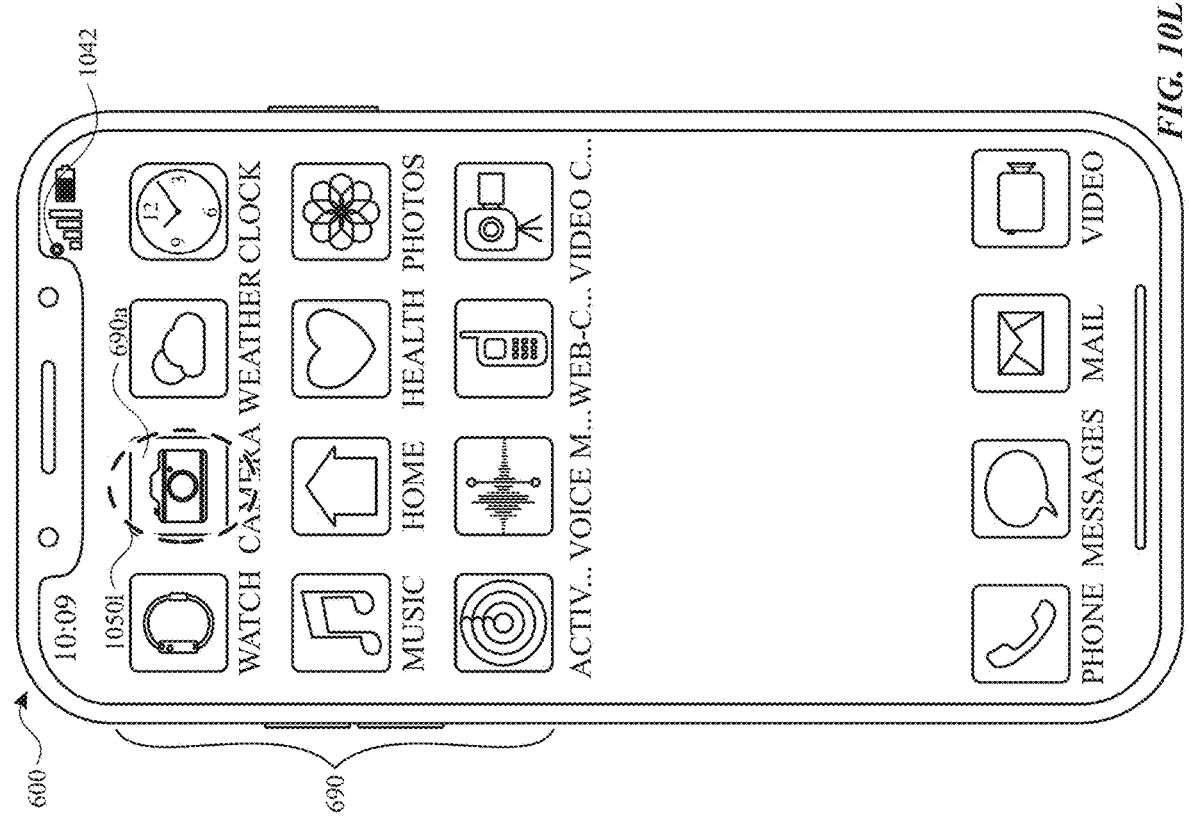
Figure 10K:
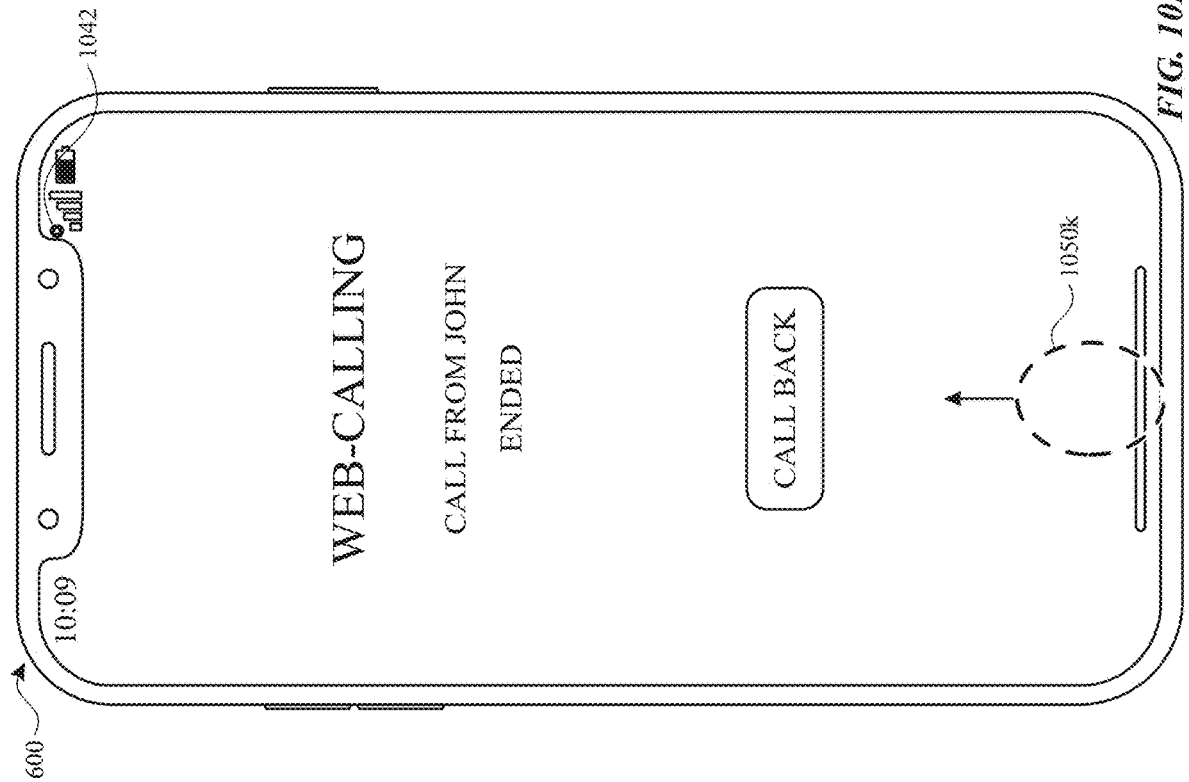
Figure 10N:
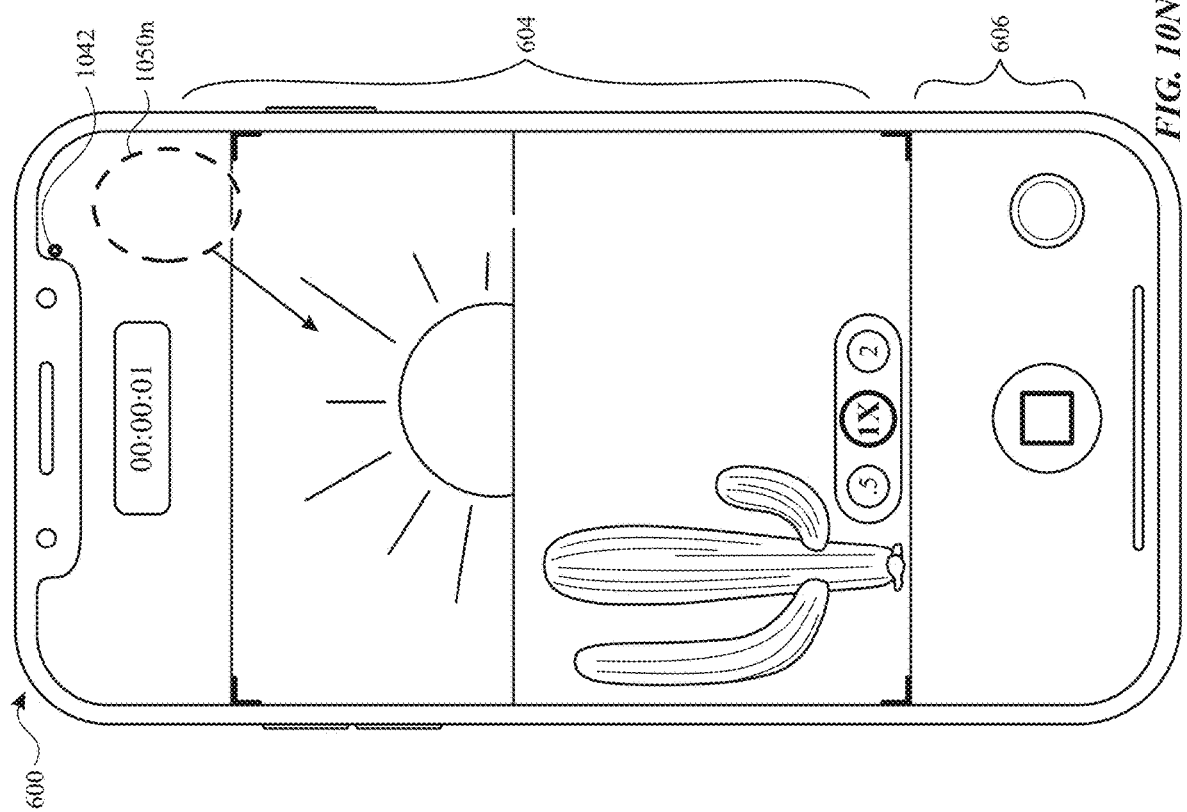
Figure 10M:
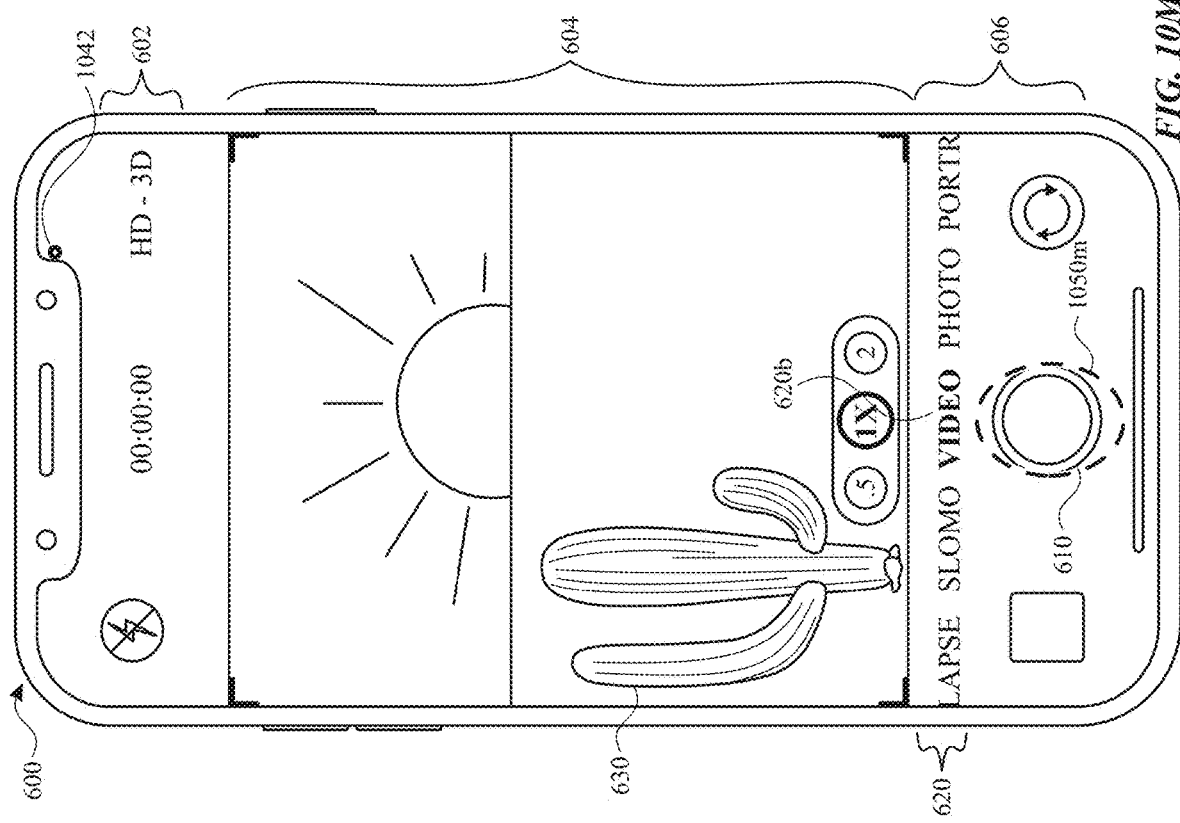
Figure 10O:
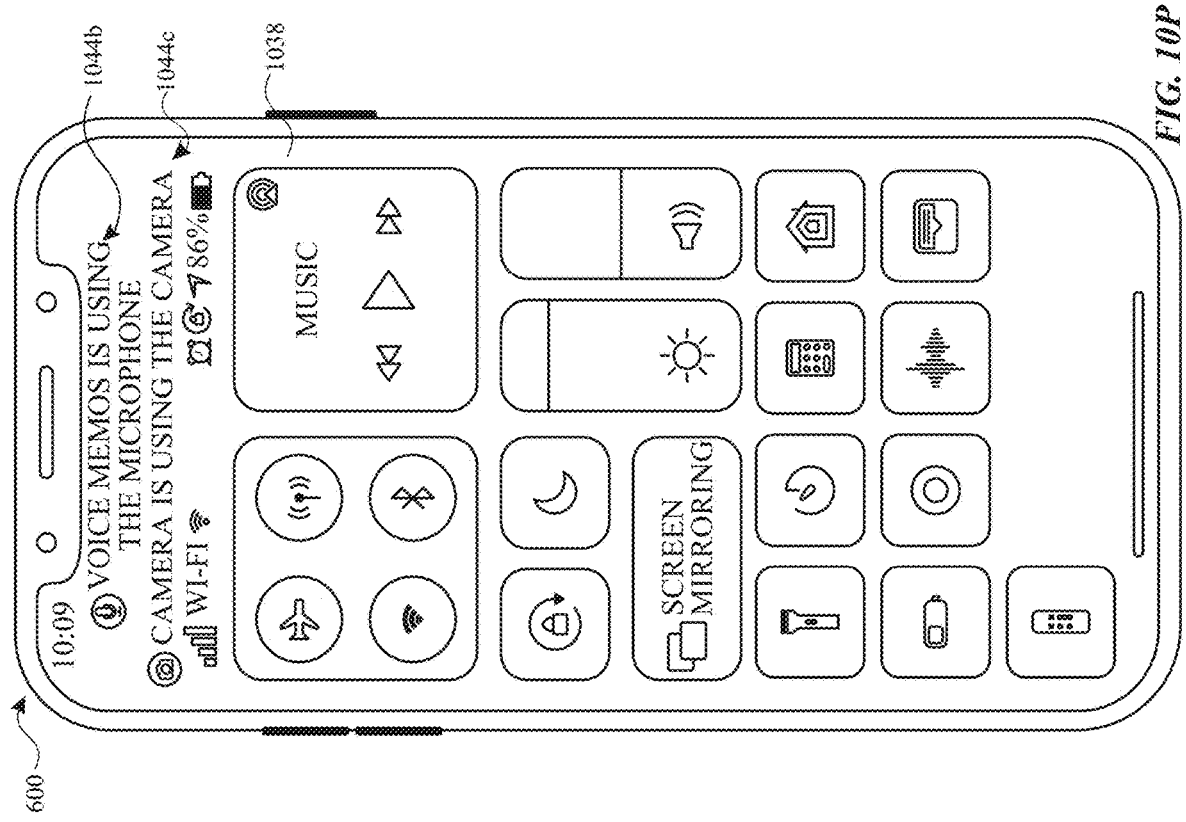
Figure 10P:
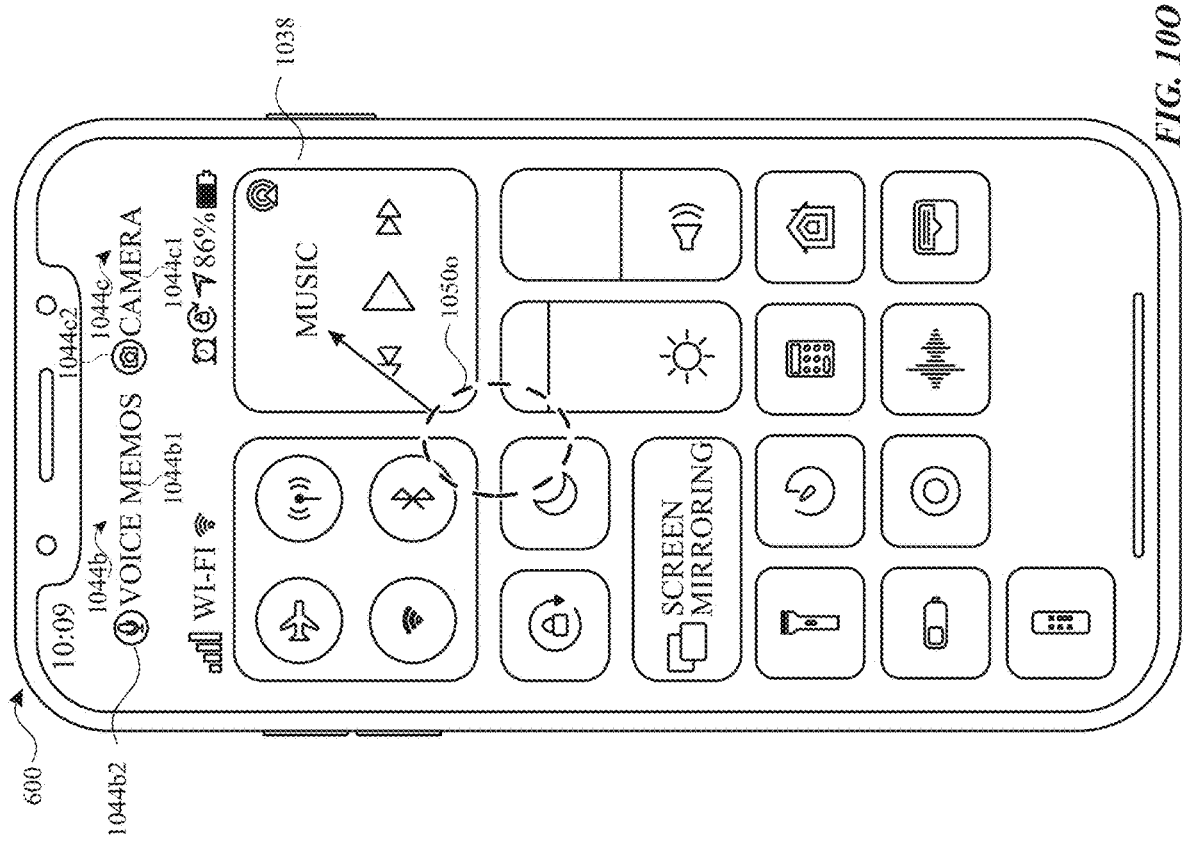
Figure 10R:
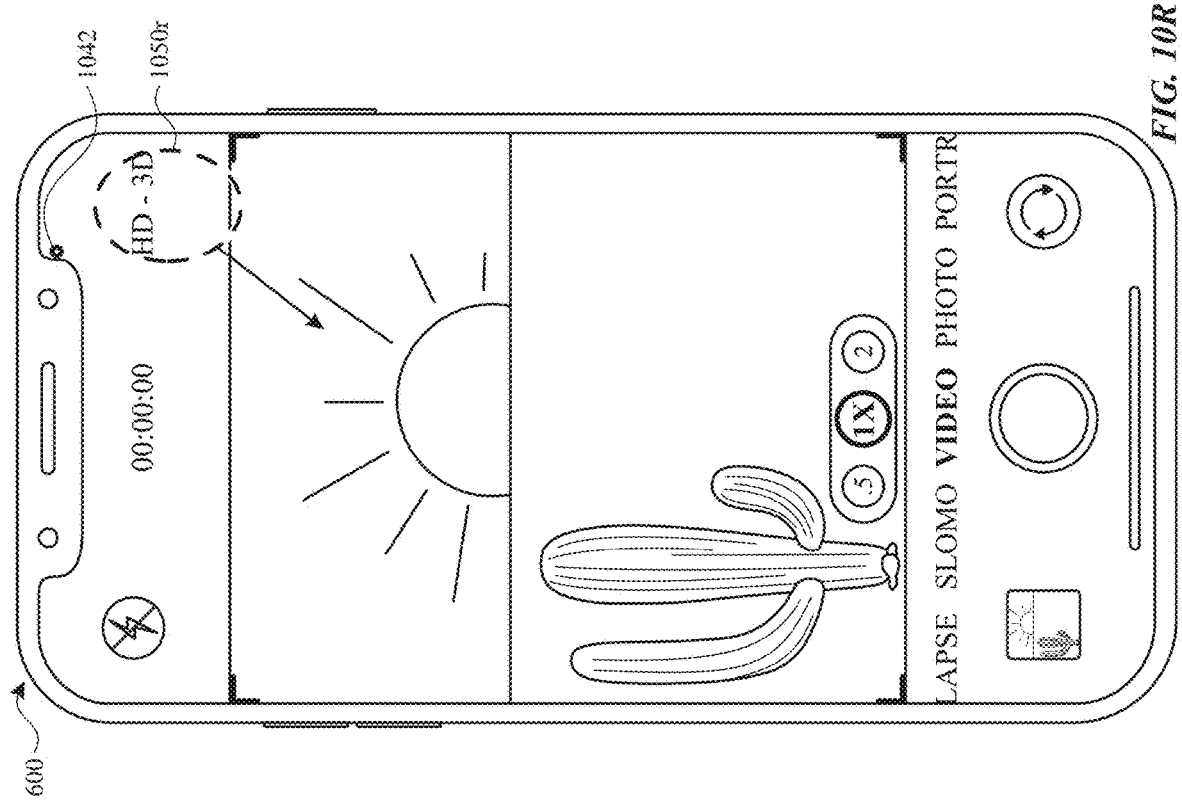
Figure 10Q:
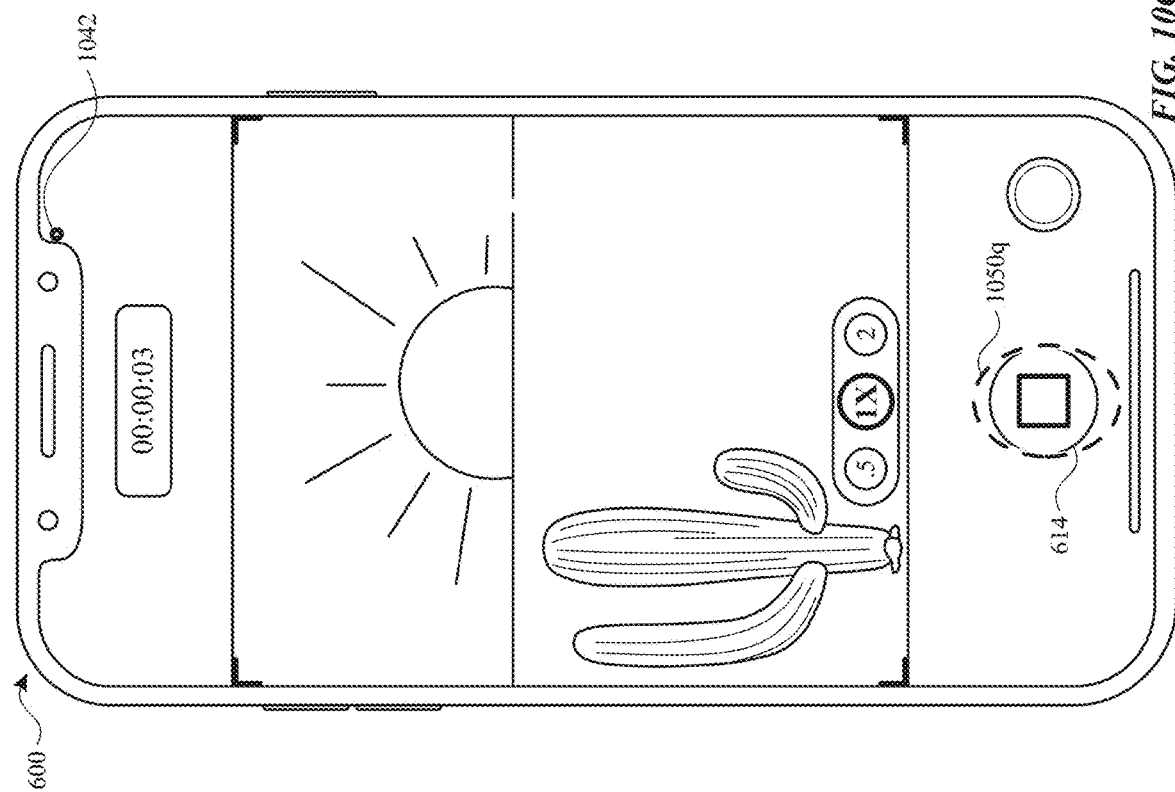

In FIGS. 10A-10AC, device 600 can record (or capture) media using one or more media-capturing devices, such as a microphone (e.g., at FIGS. 10B, 10E) and/or a camera (e.g., at FIGS. 10Q, 10W). FIGS. 10A-10AC illustrate exemplary scenarios where device 600 displays or does not display a recording status indicator based on the type of data that is being recorded by at least one of the media-capturing devices. As used in relation to FIGS. 10A-10C, the type of data refers to how the data will be used (e.g., whether the data is available for playback; whether the data is passed to a trusted application or a non-trusted application) and not the format of the data. As used herein in relation to FIGS. 10A-10AC, a first type of data (e.g., the type of data for which a capture status indicator is displayed) refers to data that is determined to be used (or potentially used) in a first manner, and a second type of data (e.g., the type of data for which a capture status indicator is not displayed) refers to data that is determined not to be used in the first manner. In some embodiments, the first type of data (e.g., the type of data for which a capture status indicator is displayed) corresponds to data that is available for (e.g., stored) later playback and the second type of data (e.g., the type of data for which a capture status indicator is not displayed) corresponds to data that is not available for playback. In some embodiments, the first type of data (e.g., the type of data for which a capture status indicator is displayed) corresponds to data that is passed to a non-trusted application (e.g., a non-first-party voice-assistant application, a non-first-party authentication application) and the second type of data (e.g., the type of data for which a capture status indicator is not displayed) corresponds to data that is used to control various features of the device by one or more trusted applications (e.g., components of the operating system or trusted first-party and/or third-party applications) without being passed to a non-trusted application (e.g., a non-first-party voice-assistant application, a non-first-party authentication application) and without being retained as media that can be played back at a later time (e.g., either by the device or by another device). Thus, the determination is based on whether or not a non-trusted application has access to the recorded data (e.g., audio or video content). In some embodiments, the recording status indicator is displayed independent of whether an indicator of recording is displayed by the application that is recording the data.

FIG. 10A illustrates device 600 displaying a user interface with icons 690. At FIG. 10A, device 600 detects voice input 1050*a* (e.g., "Hey Assistant") via a microphone of device 600. As illustrated in FIG. 10B, in response to detecting voice input 1050*a*, device 600 displays user interface 1004. User interface 1004 is a user interface for a voice assistant application. User interface 1004 includes the phrase "WHAT CAN I HELP YOU WITH," which indicates that device 600 is waiting to receive voice input corresponding to a command.

Notably, at FIGS. 10A-10B, device 600 is recording data, via the microphone of device 600, in order to identify commands (e.g., that are uttered by a user of device 600). However, at FIGS. 10A-10B, device 600 does not display a recording status indicator (e.g., recording status indicator 1042 as illustrated in FIG. 10E) because a determination is made that device 600 is not recording the first type of data. In FIGS. 10A-10B, device 600 is not recording the first type of data because the data that is being recorded is determined to be data that will not be available for later playback. In particular, the data being recording at FIGS. 10A-10B is being passed to a trusted application and is not available for later playback because device 600 is recording the data to identify voice commands that will allow a native assistant (or trusted) voice application to cause device 600 to perform one or more operations (e.g., provide directions to a location, provide an answer to a query from a user).

At some point in time after displaying user interface 1010, device 600 re-displays the user interface with application icons 690, including voice memos application icon 690*b*. At FIG. 10C, device 600 detects tap gesture 1050*c* on voice memos application icon 690*b*. As illustrated in FIG. 10D, in response to detecting tap gesture 1050*c*, device 600 launches a voice memos application that corresponds to voice memo application icon 690*b* and displays a recording initiation user interface (e.g., for the voice memos application) that includes audio recording affordance 1010. Because a determination is made that data of the first type is not being recorded, device 600 does not display recording status indicator 1042 at FIG. 10C. At FIG. 10D, device 600 detects tap gesture 1050*d* on audio recording affordance 1010.

As illustrated in FIG. 10E, in response to detecting tap gesture 1050*d*, device 600 displays an audio recording user interface that includes stop affordance 1016, which indicates that device 600 is recording data (e.g., audio recording affordance 1010 has ceased to be displayed). At FIG. 10E, in response to detecting tap gesture 1050*d*, device 600 causes one or more of microphones of device 600 to record data (e.g., audio data). The data recorded at FIG. 10E (e.g., in response to detecting tap gesture 1050*d*) is data that is being recorded for the voice memos application (e.g., can be accessed by the voice memos application and/or was initiated by the voice memos application). At FIG. 10E, a determination is made that the data being recorded for the voice memos application is the first type of data. The data being recorded for the voice memos application is determined to be the first type of data because a determination is made that the data is being recorded to be available for later playback.

As illustrated in FIG. 10E, because the determination is made that the data being recorded for the voice memos application is the first type of data, device 600 displays recording status indicator 1042 at a location of cellular signal status indicator 820*a*. Thus, in some embodiments, recording status indicator 1042 indicates to a user that one or more media-capturing devices (e.g., a microphone, a camera) of device 600 is recording the first type of data, such that a user can stop device 600 from recording the data if desired. In some embodiments, the user may otherwise be unaware that the first type of data is being recorded, such as if the application initiating the recording does not provide an appropriate indication. Thus, in some embodiments, displaying recording status indicator 1042 can provide the user with information that is relevant to the user's privacy (e.g., whether the user's voice or a photo or image of the user is recorded and available for later playback on one or more devices). While continuing to record the first type of data for the voice memos application, device 600 receives an indication of an incoming call via a web-calling application.

As illustrated in FIG. 10F, in response to receiving the indication of the incoming call, device 600 displays a web-calling user interface that includes accept affordance 1032 and an indication that the incoming call is being received from an external device associated with "John." As illustrated in FIG. 10F, device 600 continues to display recording status indicator 1042 while displaying the web-calling user interface. Device 600 continues to display recording status indicator 1042 because device 600 is continuing to record audio data for the voice memos application, as discussed above in relation to FIG. 10E (e.g., the audio recording was not stopped in FIGS. 10E-10F). At FIG. 10F, device 600 detects tap gesture 1050*f* on accept affordance 1032.

As illustrated in FIG. 10G, in response to detecting tap gesture 1050*f*, device 600 causes the incoming call to be answered and displays a user interface with end affordance 1034. At FIG. 10G, after the incoming call is answered, device 600 causes a microphone (e.g., the same or different microphone than the microphone that is currently recording data for the voice memos application) of device 600 to record data for the web-calling application. At FIG. 10G, device 600 is concurrently (e.g., via a microphone of device 600) recording data for the voice memos application and data for the web-calling application. At FIG. 10G, device 600 determines that the data being recorded for the web-calling application is the first type of data (e.g., because the data being recorded for the web-calling application is available to be played back by John's device), using one or more similar techniques to those discussed above. As illustrated in FIG. 10G, device 600 does not display an additional recording status indicator. Device 600 does not display an additional recording status indicator because recording status indicator 1042 is already displayed (e.g., or a predetermined number of recording status indicators are displayed) due to the first type of data being recording for the voice memos application. In some embodiments, when device 600 is not displaying recording status indicator 1042 before data is recorded for the web-calling application, device 600 displays the recording status indicator 1042 in response to detecting tap gesture 1050f At FIG. 10G, device 600 detects downward swipe gesture 1050g.

As illustrated in FIG. 10H, in response to detecting downward swipe gesture 1050g, device 600 displays control user interface 1038. Control user interface 1038 includes device controls 1046 for modifying a state of device 600, such as a connectivity setting (e.g., wireless, cellular, Bluetooth setting). In addition, control user interface 1038 includes web-calling recording status indicator 1044a and voice memos recording status indicator 1044b because device 600 is concurrently capturing the first type of data for the web-calling application (e.g., a third-party application) and the voice memos application. Web-calling recording status indicator 1044a and voice memos recording status indicator 1044b are displayed because device 600 is displaying control user interface 1038. The recording status indicators of FIG. 10H each include more visual content more content than recording status indicator 1042 illustrated in FIG. 10G. In addition, device 600 displays multiple recording status indicators on control user interface 1038 while only displaying one recording status indicator when the control user interface 1038 was not displayed (e.g., in FIG. 10G). In some embodiments, in response to detecting downward swipe gesture 1050g, device 600 displays an animation of recording status indicator 1042 transitioning into one or both of recording status indicator 1044a and voice memos recording status indicator 1044b.

Web-calling recording status indicator 1044a includes application indication 1044a1, device indication 1044a2, and configuration indication 1044a3. Application indication 1044a1 indicates the application for which device 600 is recording the first type of data (e.g., web-calling application). Device indication 1044a2 indicates that a microphone of device 600 is being used to record the first type of data for the web-calling application. Moreover, configuration indication 1044a3 indicates that web-calling recording status indicator 1044a is selectable. Voice memos recording status indicator 1044b includes similar indications, such as application indication 1044b1 (e.g., that indicates that the first type of data is being recorded for the voice memos application) and device indication 1044b2 (e.g., that indicates that a microphone of device 600 is being used to record the first type of data for the voice memos application). However, as illustrated in FIG. 10H, voice memos recording status indicator 1044b does not include a configuration indication.

At FIG. 10H, voice memos recording status indicator 1044b does not include a configuration indication because a determination is made that the voice memos application is not the type of application that is configurable (e.g., does not have configurable permission for enabling/disabling access to a media-capturing device) via control user interface 1038. On the other hand, web-calling recording status indicator 1044a includes configuration indication 1044a3 because a determination is made that web-calling application is the type of application that is configurable via control user interface 1038. In some embodiments, device 600 detects tap gesture 1050h1 on voice memos recording status indicator 1044b. In some embodiments, in response to detecting tap gesture 1050h1, device 600 continues to display control user interface 1038 without displaying any additional content because voice memos recording status indicator 1044b is not selectable. At FIG. 10H, device 600 detects tap gesture 1050h2 on web-calling recording status indicator 1044a.

As illustrated in FIG. 10I, in response to detecting tap gesture 1050h2, device 600 ceases to display control user interface 1038 and displays a permission management user interface for the web-calling application that includes permission controls 1052. Notably, because control user interface 1038 has ceased to be displayed, device 600 also ceases to display separate recording status indicators for the web-calling and voice memos applications (e.g., web-calling recording status indicator 1044a and voice memos recording status indicator 1044b) and displays a single or combined recording status indicator (e.g., recording status indicator 1042) for the applications.

As illustrated in FIG. 10I, permission controls 1052 includes microphone access affordance 1052a and camera access affordance 1052b, which are both active (e.g., "ON"). In some embodiments, in response to detecting a tap gesture on microphone access affordance 1052a, device 600 ceases to allow data to be recorded for, via the microphone of device 600, the web-calling application and also ceases to record the first type of data for the web-calling application that begin being recording in response to detecting input gesture 1050f In some embodiments, in response to detecting a tap gesture on camera access affordance 1052a, device 600 ceases to allow data to be recorded for, via the camera of device 600, the web-calling application. At FIG. 10I, device 600 detects rightward swipe gesture 1050i on the bottom of the permission management user interface.

As illustrated in FIG. 10J, in response to detecting rightward swipe gesture 1050i, device 600 re-displays the user interface with end affordance 1034. At FIG. 10J, device 600 detects tap gesture 1050j on end affordance 1034.

As illustrated in FIG. 10K, in response to detecting tap gesture 1050j, device 600 stops recording the first type of data for the web-calling application (e.g., via the microphone of device 600) and displays a user interface of the web-calling application that indicates that the call has ended. Notably, in FIG. 10K, device 600 continues to display recording status indicator 1042 because the first type of data has continued to be recorded for the voice memos application, although the first type of data has stopped being recorded for the web-calling application. At FIG. 10K, device 600 detects upward swipe gesture 1050k on the user interface of the web-calling application that indicates that the call has ended.

As illustrated in FIG. 10L, in response to detecting upward swipe gesture 1050k, device 600 displays the user interface with icons 690 while continuing to display recording status indicator 1042, using one or more similar techniques as discussed above (e.g., in FIG. 10E). As illustrated in FIG. 10L, icons 690 include camera application icon 690a. At FIG. 10L, device 600 detects tap gesture 1050l on camera application icon 690a.

As illustrated in FIG. 10M, in response to detecting tap gesture 1050l, device 600 displays a camera user interface. The camera user interface illustrated in FIG. 10M is displayed using one or more similar techniques as described above in relation to the camera user interface of FIG. 6A. For example, the camera user interface of FIG. 10M includes indicator region 602, camera display region 604, and control region 606. Camera display region 604 includes live preview 630, and control region 604 includes camera mode affordances 620 and shutter affordance 610. As illustrated in FIG. 10M, video camera mode affordance 620b is centered (e.g., and "Video" is bolded), which indicates that device 600 is configured to record data representative of video media in response to receiving a selection of shutter affordance 610. At FIG. 10M, device 600 detects tap gesture 1050*m* on shutter affordance 610.

As illustrated in FIG. 10N, in response to detecting tap gesture 1050*m*, device 600 starts recording data for the camera application via one or more cameras of device 600. At FIG. 10N, a determination is made that the data being recorded for the camera application is a first type of data (e.g., because the data being recorded is available for later playback), using one or more similar techniques discussed above. At FIG. 10N, device 600 does not display an additional recording status indicator (e.g., in addition to recording status indicator 1042) because device 600 is not currently displaying control user interface 1038 (e.g., and for similar reasons, as discussed above in relation to FIG. 10G). At FIG. 10N, device 600 detects downward swipe gesture 1050*n* that starts near the top of the camera user interface.

As illustrated in FIG. 10O, in response to detecting downward swipe gesture 1050*n*, device 600 re-displays control user interface 1038. Control user interface 1038 includes voice memos recording status indicator 1044*b* and camera recording status indicator 1044*c*. Camera recording status indicator 1044*c* includes device identifier 1044*c*2, which is different from device identifier 1044*b*2 (e.g., of voice memos recording status indicator 1044*b*) because device 600 is using one or more cameras to record the first type of data for the camera application as opposed to using the microphone to record the first type of data. Voice memos recording status indicator 1044*b* and camera recording status indicator 1044*c* are concurrently displayed because device 600 is concurrently recording the first type of data for both applications (e.g., using one or more similar techniques as discussed above in relation to FIG. 10H).

FIG. 10P illustrates a different version of control user interface 1038 that can be displayed in response to detecting downward swipe gesture 1050*n*. Control user interface 1038 of FIG. 10P includes additional indications (e.g., "IS CURRENTLY USING") of the current state of each respective applications use (e.g., voice memos application, camera application) of a respective device (e.g., microphone, camera). However, control user interface 1038 does not include the additional indications. In some embodiments, because the additional indications take up more space in the control user interface, device 600 can display the additional indications when the first type of data is being recorded for less than a threshold number (e.g., 1, 2) of applications (and/or devices) or when a threshold number of recording status indicators are concurrently displayed. Turning back to FIG. 10O, device 600 detects upward swipe gesture 1050*o* on control user interface 1038.

As illustrated in FIG. 10Q, in response to detecting swipe gesture 1050*o*, device 600 re-displays the camera user interface that includes stop affordance 614. At FIG. 10Q, device 600 detects tap gesture 1050*q* on stop affordance 614. As illustrated in FIG. 10R, in response to detecting tap gesture 1050*q*, device 600 ceases to record data representing video media. At FIG. 10R, device 600 detects swipe gesture 1050*r* on the camera user interface.

Figure 10T:
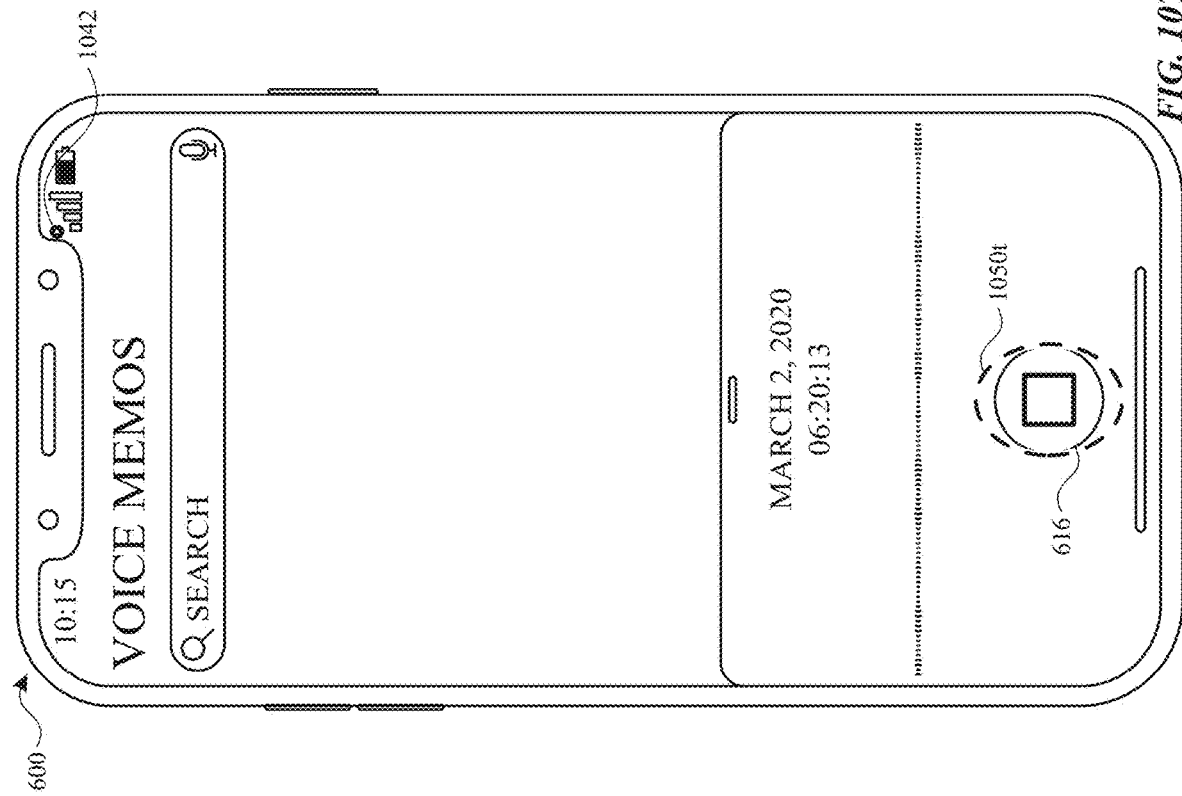
Figure 10S:
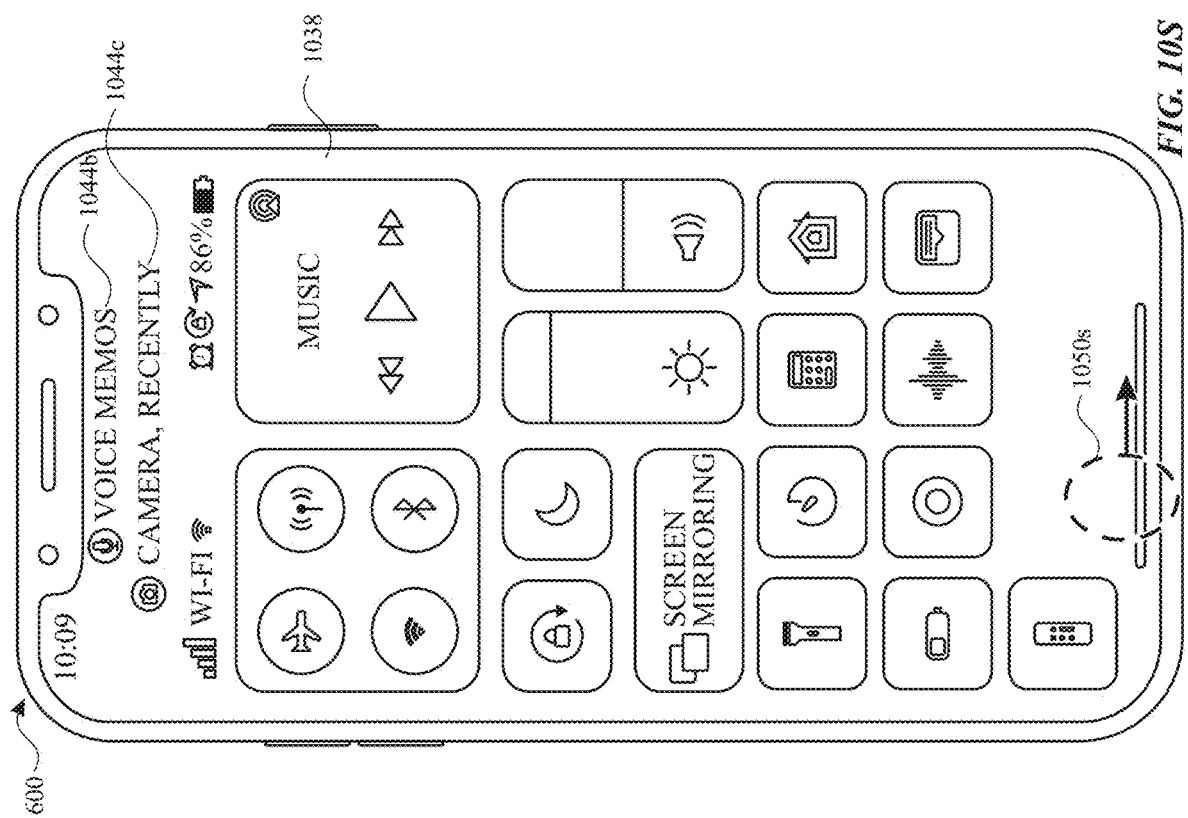
Figure 10A:
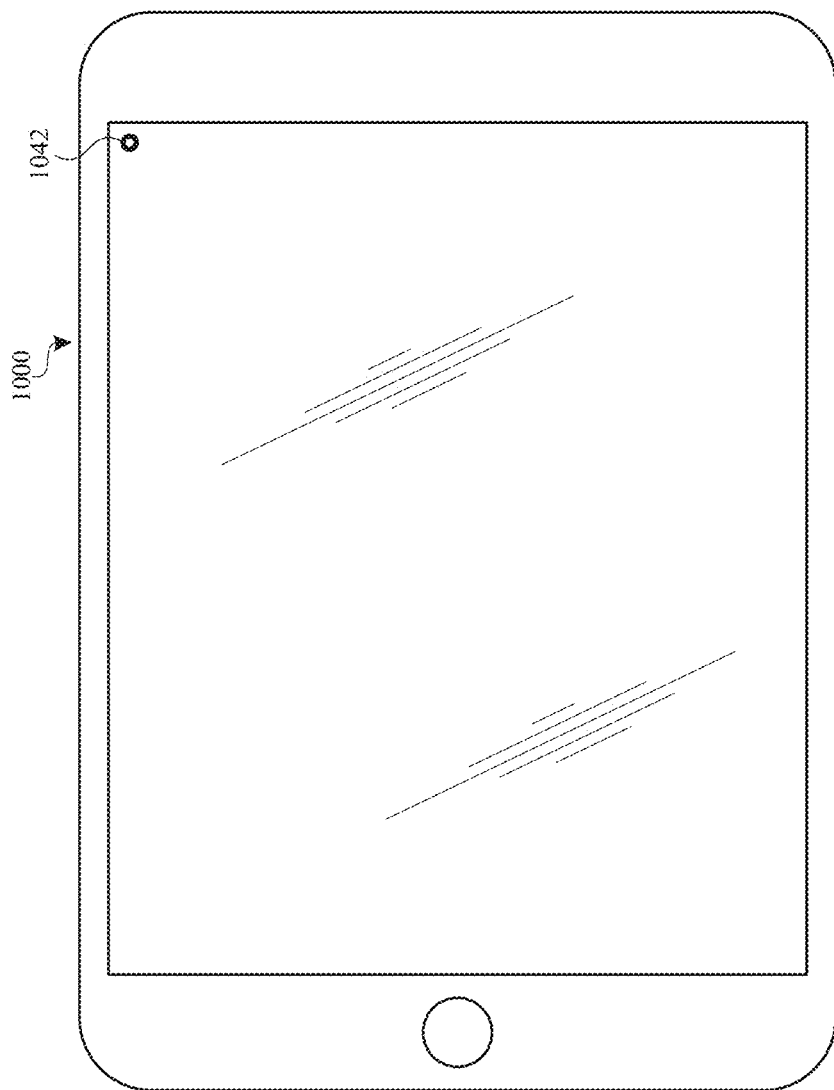

As illustrated in FIG. 10S, in response to detecting swipe gesture 1050*r*, device 600 displays control user interface 1038. As shown in FIG. 10S, control user interface 1038 continues to display camera recording status indicator 1044*c*, although device 600 is no longer recording the first type of data for the camera application. In FIG. 10S, device 600 updates camera recording status indicator 1044*c* to indicate that the camera application was recently used (e.g., "Recently" in FIG. 10S), as opposed to camera recording status indicator 1044*c* being displayed without an additional indication in FIG. 10O and/or with an additional indication ("is currently using") in FIG. 10P. Moreover, in FIG. 10S, device 600 continues to display voice memos recording status indicator 1044*b* because device 600 is still recording the first type of data for the voice memos application (e.g., using one or more techniques and/or for similar reasons as described above). At FIG. 10S, device 600 detects rightward swipe gesture 1050*s* on the bottom of control user interface 1038.

As illustrated in FIG. 10T, in response to detecting rightward swipe gesture 1050*s*, device 600 displays the audio recording user interface that includes stop affordance 1016. At FIG. 10S, device 600 detects tap gesture 1050*t* on stop affordance 1016. In some embodiments, in response to detecting tap gesture 1050*t*, device 600 stops recording the first type of data for the voice memos application. In some embodiments, after stopping to record the first type of data for the voice memos application, device 600 ceases to display recording status indication 1042 because device 600 is no longer recording the first type of data.

As illustrated in FIG. 10U (e.g., at some period of time after displaying the audio recording user interface), device 600 displays the camera user interface. At FIG. 10U, device 600 is operating in a "photo" camera mode, which is indicated by photo camera mode affordance 620*c* being centered and "Photo" being bolded.

As discussed above in relation to FIG. 6A, device 600 displays live preview 630 by recording data in the field-of-view of one or more cameras of device 600 ("the FOV"). Thus, at FIG. 10U, device 600 makes a determination that the data that device 600 is recording to display live preview 630 is the first type of data (e.g., because the data being recorded to display live preview 630 can be available for later playback as shown by live preview 630), using one or more techniques as discussed above. As illustrated in FIG. 10U, device 600 displays recording status indicator 1042 because the determination is made that the data that device 600 is recording to display live preview 630 is the first type of data. In some embodiments, device 600 does not display recording status indicator 1042 at FIG. 10U. In some embodiments device 600 does not display recording status indicator 1042 because a different determination is made— that the data being recording to display live preview 630 is not the first type of data (e.g., because the data being recorded is not available for playback at a later time), using one or more similar techniques to those discussed above. At FIG. 10U, device 600 detects tap gesture 1050*u* on shutter affordance 610.

As illustrated in FIG. 10V, in response to detecting tap gesture 1050*u*, device 600 records an image that is representative of live preview 630 and updates media collection 612 to show a representation of an imaged that was recorded (e.g., see the difference between media collection 612 of FIG. 10U and FIG. 10V). At FIG. 10V, device 600 detects upward swipe gesture 1050*v* on the camera user interface.

As illustrated in FIG. 10W, in response to detecting swipe gesture 1050*v*, device 600 displays the user interface with icons 690. While displaying the user interface of FIG. 10W, device 600 continues to display recording status indicator 1042, although device 600 is not concurrently capturing the first type of data for the camera application. At FIG. 10W, device 600 displays recording status indicator 1042 because recording status indicator 1042 is displayed for at least a minimum period of time after device 600 has recorded the first type of data for the camera application (e.g., data corresponding to the photo that was recorded in FIG. 10W).

In other words, because recording data corresponding to the recorded photo activated the camera (e.g., caused the camera to recorded media) for less than a predetermined period of time, device 600 displays recording status indicator 1042 for a minimum period of time and/or after the camera has ceased to record the first type of data. This a user recognize that an application has recorded the first type of data even when the application only records the first type of data for a short period of time. As shown by FIG. 10W, recording status indicator 1042 is displayed near (or adjacent to) one of the cameras (e.g., 1008) of device 600. At FIG. 10W, device 600 detects downward swipe gesture 1050w on the user interface with icons 690.

As illustrated in FIG. 10X, in response to detecting downward swipe gesture 1050w, device 600 displays control user interface 1338. As shown in FIG. 10X, control user interface 1338 includes camera recording status indicator 1044c, which indicates that the camera was recently used to record the first type of data. In FIG. 10X, control user interface 1338 includes camera recording status indicator 1044c because control user interface 1338 was displayed within a predetermined period of time (e.g., 1-45 seconds) after recording the first type of data (e.g., the photo recorded in response to detecting tap gesture 1050u) for the camera application. Thus, in some embodiments, control user interface 1338 does not include camera recording status indicator 1044c when control user interface 1338 is not displayed within a predetermined period of time after the end of recording the first type of data for the camera application.

FIG. 10Y illustrates device 600 displaying device 600 in a locked state, which is indicated by lock icon 1078a. At FIG. 10Y, device 600 detects (e.g., via a camera with a FOV) a scene (e.g., a scene that includes a face of a user, a particular object) in the FOV that corresponds to data that will unlock device 600. As illustrated in FIG. 10Z, in response to detecting the scene in the FOV that corresponds to data that will unlock device 600, device 600 changes from the locked state to an unlocked state, which is indicated by unlock icon 1078b.

Notably, at FIGS. 10Y-10Z, device 600 is recording data (e.g., using a first-party trusted application), via a camera of device 600, in order to identify a portion of a scene that will allow device 600 to change to an unlocked state. However, at FIGS. 10Y-10Z, device 600 does not display recording status indicator 1042 because a determination is made that the data being recorded by device 600 is not the first type of data. In FIGS. 10A-10B, device 600 is not recording the first type of data because the data that is being recorded is determined to be data that will not be available for later playback. In particular, the data being recording in FIGS. 10Y-10Z is not available for later playback because device 600 is recording data to identify a portion of a scene in the FOV that will allow device 600 to change to an unlocked state.

FIGS. 10AA-10AC illustrate device 1000 displaying user interface that includes capture status indicator 1042. Device 1000 optionally includes one or more components of device 100, device 300, and device 500 described above.

As illustrated in FIG. 10AA, device 1000 is displaying a user interface that includes status bar 1022. At FIG. 10AA, because device 1000 is displaying a user interface that includes status bar 1022, device 1000 displays capture status indicator 1042 in the status bar 1022 along with status indicators 1022a-1022e. Capture status indicator 1042 is the leftmost status indicator 1022a-1022e. In some embodiments, when a status indicator is removed from status bar 1022, such as status bar indicator 1022c, the remaining status bar indicator moves to the right to fill in the space vacated by the removed status indicator and capture status indicator 1042 remains the leftmost status indicator in status bar. In some embodiments, when a status indicator is added to status bar 1022, capture status indicator 1042 moves to the left and remains the leftmost status indicator in status bar 1022.

FIG. 10AB illustrates device 1000 displaying a user interface that does not include a status bar. At FIG. 10AA, because device 1000 is not displaying a status bar, device 1000 displays capture status indicator 1042 in the upper right of the user interface, which is a different location from which capture status indicator 1042 was displayed in 10AA (e.g., when status bar 1022 was displayed).

FIG. 10AC illustrates device 1000 displaying a user interface that does not include a status bar while device 1000 is in a different orientation than device 1000 in FIG. 10AB. As illustrated in FIG. 10AC, device 1000 capture status indicator 1042 in the upper right of the user interface although device 600 is in a different orientation in FIG. 10AC as compared to device 1000 in FIG. 10AB. Thus, when looking at FIGS. 10AB-10AC, when no status bar is displayed device 1000 displays the capture status indicator at the same position, irrespective device 600's orientation.

FIG. 11 is a flow diagram illustrating a method for providing a status indicator using a computer system in accordance with some embodiments. Method 1100 is performed at a computer system (e.g., 100, 300, 500, 600) having a first media-capturing device (e.g., one or more cameras (e.g., dual cameras, triple camera, quad cameras, etc.) on the same side or different sides of the computer system (e.g., a front camera, a back camera), and/or one or more microphones, etc.) and is in communication with a display generation component (e.g., a display controller, a touch-sensitive display system) and one or more input devices (e.g., a touch-sensitive surface). Some operations in method 1100 are, optionally, combined, the orders of some operations are, optionally, changed, and some operations are, optionally, omitted.

As described below, method 1100 provides an intuitive way for providing a status indicator to a user of a computer system. The method reduces the cognitive burden on a user for determining the status of one or more media capturing devices, thereby creating a more efficient human-machine interface. For battery-operated computing systems, enabling a user to manage the one or more media capturing devices faster and more efficiently conserves power and increases the time between battery charges.

The computer system (e.g., 600) (e.g., a smartphone, a smartwatch) receives (1102) an indication that the first media-capturing device has been activated (e.g., recently activated (e.g., activated within a predetermined time (e.g., 1 or 2 seconds) before receiving the indication)). In some embodiments, the computer system receives an indication that the first media-capturing device has been activated by detecting that the first media-capturing device is actively or has been actively recording data (e.g., data that is representative of one or more different types of media (e.g., audio, video, images (e.g., still images))). In some embodiments, the computer system receives an indication that the first media-capturing device (e.g., a video camera) by detecting that one or more applications are currently (or has been using) a camera or a microphone to capture or record media.

In response to (1104) receiving the indication that the first media-capturing device has been activated and in accordance with (1106) a determination that, while activated, the first media-capturing device recorded data of a first type (e.g., within a first predetermined period of time) (e.g., regardless of (e.g., independent of, without consideration to) whether the media-capturing device recorded data of a second type), the computer system displays (1108), via the display generation component, a graphical indicator (e.g., 1042, 1044a-1044d) that indicates activation of the first media-capturing device. In some embodiments, data of a first type is data that is recorded, stored, retained, or is available (e.g., available to one or more applications that caused the media-capturing device to record the data) as a media item to be played back at a later time. In some embodiments, data of the first type is data that is readably accessible (e.g., via one or more programs or applications on the system) to be selected and played back by the user through one or more user inputs on a touch-sensitive display of the computer system. In some embodiments, in accordance with a determination that, while activated, the first media-capturing device recorded data of the first type (e.g., regardless of (e.g., independent of, without consideration to) whether the media-capturing device recorded data of a second type), the computer system ceases display of a graphical indicator that indicates that another media-capturing device has been activated. In some embodiments, the computer system replaces a graphical indicator that indicates that another media-capturing device has been activated with the graphical indicator that indicates activation of the first media-capturing device in accordance with a determination that, while activated, the first media-capturing device recorded data of the first type. In some embodiments, data of the first type is data that is not being obtained and/or processed to determine whether one or more triggering events (e.g., an audible phrase, presents/non-presents of a gaze of a user) has occurred. In some embodiments, the first type of data (e.g., the type of data for which a capture status indicator is displayed) corresponds to data that is passed to a non-trusted application (e.g., a non-first-party voice-assistant application, a non-first-party authentication application). In some embodiments, the recording status indicator is displayed independent of whether an indicator of recording is displayed by the application that is recording the data. Displaying the graphical indicator when prescribed conditions are met (e.g., when a media-capturing device records data of a first type (e.g., multimedia data)) allows the user to quickly recognize when a particular type of data is being (or has been) recorded and enables the user to take certain actions based on whether the type of data is being (or has been) recorded. Performing an optimized operation when a set of conditions has been met without requiring further user input enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying the graphical indicator when a media-capturing device records data of a first type (e.g., multimedia data) provides the user with feedback about the first media-capturing device being active and recording data of the first type, which allows a user to be alerted to the recording of data of the first type. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first media-capturing device is a second type of media-capturing device. In some embodiments, the computer system displays (1110), concurrently with the graphical indicator, a third graphical indicator (e.g., 1044c) that is different from the graphical indicator (e.g., 1044b). In some embodiments, the graphical indicator includes an indication of the second type of media-capturing device; and the third graphical indicator includes an indication of a third type of media-capturing device that is different from the second type of media-capturing device. In some embodiments, a fourth graphical indicator is displayed with the graphical indicator. In some embodiments, the fourth graphical indication is associated with same media-capturing device (e.g., media-capturing device of the second type) as the graphical indication. In some embodiments, the graphical indicator includes content that indicates that a first application is using or has used the media-capturing device of the first type while the graphical indicator includes content that indicates that a second application that is different from the first application is using or has used the media-capturing device of the first type. In some embodiments, in accordance with a determination that (or while) the computer system is displaying a first user interface (e.g., a settings configuration user interface), the third graphical indicator includes is displayed. In some embodiments, in accordance with a determination that (or while) the computer system is displaying a second user interface that is not the first user interface (e.g., the settings configuration user interface), the third graphical indicator is not displayed. In some embodiments, the graphical indicator and the third graphical indicator are displayed concurrently (e.g., in response to receiving a first input (e.g., a dragging input) and/or when displaying a user interface that includes a plurality of settings (e.g., for controlling one or more settings of the computer system)). Displaying a graphical indicator that shows that a first type of media-capturing device (e.g., microphone) is capturing data of the first and a graphical indication that shows that a second type of media capture device (e.g., camera) is capturing data of the second type provides the user with feedback concerning whether the first type of media-capturing device and the second type of media-capturing device are concurrently being used to capture data of the first type. Providing improved visual feedback to the user enhances the operability of the system and makes the user system interface more efficient (e.g., by helping the user to provide proper inputs and reducing user mistakes when operating/interacting with the system) which, additionally, reduces power usage and improves battery life of the system by enabling the user to use the system more quickly and efficiently.

In response to (1104) receiving the indication that the first media-capturing device has been activated and in accordance with a determination that, while activated, the first media-capturing device recorded data of a second type (e.g., FIGS. 10A-10B, 10Y-10Z) (e.g., that is different from the first type) without recording data of the first type (e.g., within the first predetermined period of time), the computer system forgoes (1112) display of the graphical indicator (e.g., 1042, 1044a-1044d) that indicates activation of the first media-capturing device. In some embodiments, data of the second type is data that is being obtained and/or processed to determine whether one or more triggering event (e.g., an audible phrase, presents/non-presents of a gaze of a user) has occurred. In some embodiments, data of the second type is data that is not stored as a media item (e.g., audio, video media) (and/or is not available) to be played back at a later time. In some embodiments, data of the second type is data that is not readably accessible (e.g., via one or more programs or application on the system) to be selected and played back by the user through one or more user inputs on a touch-sensitive display of the computer system. In some embodiments, the second type of data (e.g., the type of data for which a capture status indicator is not displayed) corresponds to data that is used to control various features of the device by one or more trusted applications (e.g., components of the operating system or trusted first party and/or third party applications) without being passed to a non-trusted application (e.g., a non-first party voice-assistant application, a non-authentication application) and without being retained as media that can be played back at a later time (e.g., either by the device or by another device). In some embodiments, in accordance with a determination that, while activated, the first media-capturing device has not recorded any data, the computer system forgoes display of the graphical indicator that indicates that the one or media-capturing devices have been activated. In some embodiments, in accordance with a determination that, while activated, the first media-capturing device recorded data of a second without recording data of the first type, the computer system ceases display of a graphical indicator that indicates that another media-capturing device has been activated. Not displaying the graphical indicator when a media-capturing device records data of a second type (e.g., metadata) provides the user with feedback that the first media-capturing device is not active and/or is not recording data of the first type, which allows the user to not be unnecessarily alerted to the recording of data of the second type. Providing improved visual feedback to the user enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the recorded data of the second type (e.g., FIGS. 10A-10B and FIGS. 10Y-10Z) (e.g., data captured by a native or trusted voice assistant application using a media-capturing device of the computer system, data captured by an application, using a media-capturing device of the computer system, that causes the computer system to perform a function, such as unlocking/locking the computer system (e.g., via capturing one or more features (e.g., voice, face, biometric data) associated with the user of the system or react (e.g., providing information in response to) to one or more voice commands) corresponds to data that is not available for playback (e.g., data that is not stored to be available for playback (e.g., output by one or more output devices (e.g., camera, microphones, displays (e.g., display generation components) at the computer system and/or another device)), transitory data that is, for example, data that is not transmitted to external devices and that is not stored locally for subsequent transmission to external devices (or for local user playback), data that is used to control various features of the device by one or more trusted applications (e.g., components of the operating system or trusted first-party and/or third-party applications) without being passed to a non-trusted application (e.g., a non-first-party voice-assistant application, a non-first-party authentication application) and without being retained as media that can be played back at a later time (e.g., either by the device or by another device).

In some embodiments, the recorded data of the first type (e.g., 10C-10V) (e.g., data associated with a third-party or a non-trusted social media application using a media-capturing device of the computer system, data captured by an audio/video capturing application, using a media-capturing device of the computer system, that provides audio/video for playback at the device or at an external device, an application that does not cause the computer system to perform a function, such as unlocking/locking the computer system (e.g., via capturing one or more features (e.g., voice, face, biometric data) associated with the user of the device), reacting (e.g., providing information in response to) to one or more voice commands) corresponds to data that is available (e.g., readily available (e.g., available via one or more user inputs received while displaying the application that associated with the first media-capturing is displayed)) for playback (e.g., data that is stored to be available for playback (e.g., output by one or more output devices (e.g., camera, microphones, displays (e.g., display generation components) at the computer system and/or another device)), data that is not transitory data, data that is transmitted to external devices and/or that is stored locally for subsequent transmission to external devices (or for local user playback), data that is passed to a non-trusted application (e.g., a non-first-party voice-assistant application, a non-first-party authentication application).

In some embodiments, the graphical indicator (e.g., 1042) (e.g., a circle (e.g., a circle with a solid color, a circle with hatching), a triangle, a square, any other suitable shape) is displayed irrespective of whether a status bar (e.g., user interface object that is aligned with the an edge of the displayable area, that includes a current time, that indicates a signal strength, and/or that includes a battery status) is displayed. In some embodiments, while a status bar is displayed, the graphical indicator is currently displayed in the status bar. In some embodiments, while the graphical indicator is currently displayed in the status bar, the computer system receives an indication to cease to display the status bar (e.g., full-screen display of an application); and in response to receiving the indication to cease to display the status bar, the computer system ceases to display the status bar while continuing to display the graphical indicator. In some embodiments, while the status bar is not displayed and the graphical indicator is displayed, the computer system receives an indication to display the status bar; and in response to receiving the indication to display the status bar, the computer system displays the status bar while continuing to display the graphical indicator. Displaying the graphical indicator irrespective of whether a status bar is displayed provides the user with consistent feedback, when applicable, regarding whether a media-capturing device is recording data of the first type (e.g., multimedia data) and independent of whether a particular user interface element is concurrently displayed. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the graphical indicator (e.g., 1042) is displayed at a position (e.g., of a displayable area, on a user interface (e.g., a user interface that is currently being displayed by the display generation component)) that is adjacent to at least one media-capturing device (e.g., a camera sensor, a microphone, at least one of the media-capturing devices of the one or more media-capturing devices of the computer system). Displaying the graphical indicator at a position that is adjacent to the media-capturing device provides the user with feedback allows the user to have a better understanding with respect to the functionality and purpose of the graphical indicator (e.g., the graphical indicator corresponds to the status (e.g., active status of capturing) of the media-capturing device that is it adjacent the graphical indicator). Further, displaying the graphical indicator at a position that is adjacent to the media-capturing device avoids unnecessarily obstructing other user interface objects and information displayed via the computer system. Providing improved visual feedback to the user enhances the operability of the system and makes the user-system interface more efficient (e.g., by helping the user to provide proper inputs and reducing user mistakes when operating/ interacting with the system) which, additionally, reduces power usage and improves battery life of the system by enabling the user to use the system more quickly and efficiently.

In some embodiments, the graphical indicator (e.g., 1042), in accordance with a determination that a status bar (e.g., 1022) (e.g., user interface object of a first type) is not currently displayed, is displayed at a first position (e.g., a position that is in (e.g., adjacent, at) a corner (e.g., upper left hand corner, upper right corner, lower left hand corner, lower right hand corner) of a user interface) (e.g., a user interface that is currently being displayed by the display generation component). In some embodiments, the graphical indicator (e.g., 1042), in accordance with a determination that the status bar (e.g., 1022) (e.g., user interface object of a first type) is not currently displayed, is displayed at a second position that is different from the first position (e.g., at a position that is not in or near the corner of the user interface). In some embodiments, the display position of the graphical indicator changes based on whether the status bar is displayed. Displaying the graphical indicator in different positions based on different prescribed conditions being met provides the user with feedback concerning whether the media-capturing device is recording data of the first type (e.g., multimedia data) in an unobtrusive manner such that other user interface objects and information are not obscured by display of the graphical indicator. Providing improved visual feedback to the user enhances the operability of the system and makes the user-system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, while displaying the graphical indicator (e.g., 1042), the computer system receives (e.g., via the one or more input devices) a first input (e.g., 1050g, 1050n, 1050v) (e.g., a first user input, a dragging gesture). In some embodiments, in response to receiving the first input (e.g., 1050g, 1050n, 1050v), the computer system displays a user interface (e.g., a settings configuration user interface (e.g., a user interface that includes a plurality of selectable user interface objects that, when selected, control a plurality of functions (e.g., modes) of the computer system (e.g., turn/off Wi-Fi, Blue-tooth, an airplane mode, a night mode, a screen lock mode, a flash light mode) (e.g., increase/ decrease a display screen brightness, a sound level))) that includes a second graphical indicator that indicates activation of the first media-capturing device. In some embodiments, the second graphical indicator is different from the graphical indicator. In some embodiments, in response to receiving the first user input, the graphical indicator ceases to be displayed. In some embodiments, the second graphical indicator is not displayed concurrently with the graphical indicator. In some embodiments, the second graphical indicator is displayed with a graphical indicator (or one or more other graphical indicator) that indicates activation of a media-capturing device that is different from the first media-capturing device or is a different type (e.g., a microphone, a camera) of media-capturing device than the first media-capturing device.

In some embodiments, the second graphical indicator (e.g., 1044a-1044d) includes displayed content that is different from (e.g., greater than (e.g., a greater number of characters, icons, and/or information)) displayed content of the graphical indicator (e.g., 1042). Displaying graphical indicators that indicates the same activation of the same media-capturing device that is recording the same data of the first type provides the user with a constant visual feedback with respect to whether the media-capturing device is actively recording data of the first type and provides the user with greater flexibility with respect to how the user operates the computer system while the media-capturing device is actively recording data of the first type (e.g., when different user interfaces are displayed). Providing improved visual feedback to the user enhances the operability of the system and makes the user system interface more efficient (e.g., by helping the user to provide proper inputs and reducing user mistakes when operating/interacting with the system) which, additionally, reduces power usage and improves battery life of the system by enabling the user to use the system more quickly and efficiently. Displaying the second graphical indicator that includes displayed content that is different from displayed content of the graphical indicator provides the user with more information with respect to the recording state of the media-capturing device that is active which results in the user having an enhanced understanding of the operating status of the media-capturing devices. Providing improved visual feedback to the user enhances the operability of the system and makes the user system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the first media-capturing device is a first type (e.g., a microphone, a camera) of media-capturing device. In some embodiments, displayed content of the graphical indicator (e.g., 1044a-1044d) includes an indication (e.g., 1044a2, 1044b2, 1044c2) (e.g., images, text) of the first type of media-capturing device. In some embodiments, the first media-capturing device is a second type of media-capturing device and the content of the graphical indicator includes an indication of the second-type of media-capturing device. In some embodiments, in accordance with a determination that (or while) the computer system is displaying a first user interface (e.g., a settings configuration user interface), the graphical indicator includes an indication of the first type of media-capture device. In some embodiments, in accordance with a determination that (or while) the computer system is displaying a second user interface that is not the first user interface (e.g., the settings configuration user interface), the graphical indicator does not include the indication of the first type of media-capture device. In some embodiments, the graphical indicator includes a camera/ camcorder image when the first media-capturing device is a camera sensor and the graphical indicator includes a microphone image when the first media-capturing device is an audio microphone. Displaying a graphical indicator that includes an indication of the type of media capturing device provides the user with visual feedback as to the type (e.g., a microphone, a camera) of media-capturing device that is recording data, which allows the user more accurately determine the type of data (e.g., audio data, visual data) that is being recorded by the media-capturing device. Providing improved visual feedback to the user enhances the operability of the system and makes the user system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, displayed content of the graphical indicator includes an indication (e.g., display of the graphical indicator includes a representation (e.g., a textual indication, graphical indication) of an application) of an application (e.g., 1044b, 1044c in FIG. 10P) (or process or function) that is currently recording data via (e.g., or that is currently using) the first media-capturing device. In some embodiments, in accordance with a determination that (or while) the computer system is displaying a first user interface (e.g., a settings configuration user interface), the graphical indicator includes an indication (e.g., name, shortcut icon) of an application that is currently recording data via the first media-capturing device. In some embodiments, in accordance with a determination that (or while) the computer system is displaying a second user interface that is not the first user interface (e.g., the settings configuration user interface), the graphical indicator does not include an indication of the application that is currently recording data via the first media-capturing device. Displaying a graphical indicator that includes an indication of the application that is currently recording data of the type via the first media-capturing device provides the user with information, which allows the user to determine the application that activated the first media-capturing device, the context as to why (e.g., functionality of the application) the first media-capturing device is recording data, and the type of data (e.g., audio data, image data) being recorded. Providing improved visual feedback to the user enhances the operability of the system and makes the user system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, displayed content of the graphical indicator includes an indication of an application that has previously recorded data (e.g., 1044c in FIG. 10S) (e.g., within a predetermined time threshold of the current time even if the application is not currently recording data) via the first media-capturing device. In some embodiments, in accordance with a determination that (or while) the computer system is displaying a first user interface (e.g., a settings configuration user interface), the graphical indicator includes an indication of an application that has previously recorded data via the first media-capturing device. In some embodiments, in accordance with a determination that (or while) the computer system is displaying a second user interface that is not the first user interface (e.g., the settings configuration user interface), the graphical indicator does not include an indication of an application that has previously recorded data via the first media-capturing device. In some embodiments, after a period of time, the graphical indicator ceases to be displayed (or the display of the graphical indicator times-out). In some embodiments, the graphical indicator can be replaced by a more recent graphical indicator. In some embodiments, a graphical indicator that indicates that a first application is using the camera (or microphone) can be replaced by a graphical indicator that a second application is using the camera (or microphone). Displaying a graphical indicator that includes an indication of the application that was recording data provides the user with visual feedback as to which application was recording data, which provides the user with information to determine the application that activated the media-capturing device and/or received the recorded data. Providing improved visual feedback to the user enhances the operability of the system and makes the user system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, in response to receiving the first user input and in accordance with a determination that the graphical indicator does correspond to an application of a first application type, the graphical indicator (e.g., 1044a) is selectable (e.g., 1044a3) (e.g., is available to be activated (e.g., initiates the computer system to perform an action in response) via one or more user inputs). In some embodiments, in response to receiving the first user input and in accordance with a determination that the graphical indicator does not correspond to an application of the first application type, the graphical indicator is not selectable (e.g., is not available to be activated (e.g., initiates the computer system to perform an action in response) via one or more user inputs). In some embodiments, while displaying the graphical indication that is selectable, receiving a user input (e.g., a tap) corresponding to (e.g., on) selection of the graphical indication and in response to receiving the user input corresponding to the selection of the graphical indication, displaying a third user interface for managing one or more permissions of the application of the first application type (e.g., increasing, reducing, or revoking permissions such as changing circumstances under which the application is permitted to use the camera and/or microphone). In some embodiments, the third user interface includes one or more selectable user interface objects, that when selected, stops the application from recording (e.g., in the future and/or currently) data using a media-capturing device. Having the graphical indicator be selectable when prescribed conditions are met (e.g., the graphical indicator corresponds to a first type of application) provides the user with more control over the system by allowing the user to more efficiently and easily adjust the settings (e.g., revoke the applications ability to access the first media capture device) when allowed (e.g., when the first type of application is capturing media via the media-capturing device). Providing additional control of the system without cluttering the UI with additional displayed controls enhances the operability of the system makes the user-system interface more efficient (e.g., by helping the user to provide proper inputs and reducing user mistakes when operating/interacting with the system) which, additionally reduces power usage and improves battery life of the system by enabling the user to use the system more quickly and efficiently.

In some embodiments, the computer system receives (e.g., via the one or more input devices) a third user input (e.g., a dragging gesture). In some embodiments, in response to receiving the third user input, the computer system displays a user interface that, (e.g., a settings configuration (e.g., a user interface that includes a plurality of selectable user interface objects that, when selected, control a plurality of functions (e.g., modes) of the system (e.g., turn/off Wi-Fi, Blue-tooth, an airplane mode, a night mode, a screen lock mode, a flash light mode) (e.g., increase/decrease a display screen brightness, a sound level))) in accordance with a determination that the third user input was received while the first media-capturing device continues to be activated or within a predetermined of time (e.g., 1 second, 3 seconds, 10 seconds, 20 seconds, 30 seconds) after the first media-capturing device has been active (e.g., the first media-capture device is currently deactivated), includes the graphical indication (e.g., 1044d) that indicates activation of the first media-capturing device. In some embodiments, in response to receiving the third user input, the computer system displays a user interface that, (e.g., a settings configuration (e.g., a user interface that includes a plurality of selectable user interface objects that, when selected, control a plurality of functions (e.g., modes) of the system (e.g., turn/off Wi-Fi, Blue-tooth, an airplane mode, a night mode, a screen lock mode, a flash light mode) (e.g., increase/decrease a display screen brightness, a sound level))), in accordance with a determination that the third user input was not received while the first media-capturing device continues to be activated or within a predetermined of time after the first media-capturing device has been active, does not include display of the graphical indicator that indicates activation of the first media-capturing device.

In some embodiments, the graphical indicator is displayed for at least a minimum (e.g., 1044d) (e.g., 1 seconds, 2 seconds, 3 seconds) period of time. In some embodiments, the graphical indicator is displayed for a minimum period of time even if the first media-capturing device has not been activated (e.g., while captured a photo) for the minimum period of time. In some embodiments, when the first media-capturing device has been activated for a period of time exceeding the minimum period of time, the graphical indicator is displayed for the period of time the first media-capturing device was active; and when the first media-capturing device has been activated for a period of time not exceeding the minimum period of time, the graphical indicator is displayed for the minimum period of time (e.g., the graphical indicator is displayed even after the application has stopped using the camera and/or microphone to ensure that the graphical indicator is displayed for at least the minimum period of time which provides the user with the opportunity to see the graphical indicator and prevents applications from using the camera and/or microphone for short periods of time to avoid the user noticing the graphical indicator). Displaying the graphical indicator for at least a minimum period of time provides the user with a greater opportunity to view the graphical indicator and decreases any confusion the user may have as to whether the graphical indicator was displayed or not displayed when the first media-capturing device was activated for less than the minimum period of time. Providing improved visual feedback to the user enhances the operability of the system and makes the user system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the graphical indicator (e.g., 1044a) is displayed for a length of time that is based on a length of time for which the first media-capturing device has been active. In some embodiments, the length of time that the graphical indicator is displayed is based on the length of time for which the first-media-capturing device has been active. In some embodiments, the graphical indicator is displayed for longer than the length of time that the first media-capturing device has been capturing a video (e.g., when the first media device has not been activated to capture the video for over a predetermined period of time (e.g., 1 second, 2 seconds)). Displaying the graphical indicator for at least a length of time that is based on the time for which the first media-capturing device has been active provides the user with a better understanding regarding the duration of how long the first media-capturing device has been recording data of the first type, which allows the user to more accurately ascertain what the first media-capturing device has recorded. Providing improved visual feedback to the user enhances the operability of the system and makes the user system interface more efficient (e.g., by helping the user to provide proper inputs and reducing user mistakes when operating/interacting with the system) which, additionally, reduces power usage and improves battery life of the system by enabling the user to use the system more quickly and efficiently.

In some embodiments, the display location of the graphical indicator (e.g., 1042) does not change, regardless of applications or functions that are running or are displayed. In some embodiments, the graphical indicator is displayed in multiple positions on a device that is not a tablet device, such as a smartphone (e.g., based on whether the settings configuration user interface is displayed or not). In some embodiments, the graphical indicator is displayed in the same position on a device that is a tablet device (e.g., regardless of whether the settings configuration user interface is displayed or not).

Note that details of the processes described above with respect to method 1100 (e.g., FIG. 11) are also applicable in an analogous manner to the methods described below/above. For example, method 1100 optionally includes one or more of the characteristics of the various methods described above with reference to methods 700 and 900. For example, method 1100 displays a status indicator that can alert a user that media is being captured that can be displayed via step 902 and/or step 910 of method 900. For brevity, these details are not repeated below.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to increase the operability of the computer system and/or to allow the computer system to perform various functions for the user, such as functions performed via a native or trusted voice assistant application using a media-capturing device of the computer system, unlocking/locking the computer system, reacting (e.g., providing information in response to) to one or more voice commands. The present disclosure contemplates that in some instances, this gathered data may include personal information data that uniquely identifies or can be used identify a specific person. Such personal information data can include facial features, biometric data, or any other identifying or personal information. The present disclosure recognizes that the use of personal information data, in the present technology, can be used to the benefit of users. For example, the personal information data can be used to provide various functions to the user and/or increase the operability of the computer system. Accordingly, use of such personal information data enables users to have control over the operability and/or functionality of the computer system. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of providing functionality that captures image data to unlock the device, the present technology can be configured to allow users to select to "opt in" or "opt out" of participation in the collection of personal information data during registration for services or anytime thereafter. In another example, users can select to not provide image data to unlock the device and, accordingly, the image data would not be collected. In other examples, it should be understood that the data that is captured, monitored, and/or processed to be used to provide one or more functions and/or or increase operability of the device is not stored to be played back by users of external devices in most instances. It should be also understood that the data that is captured, monitored, and/or processed to be used to provide one or more functions and/or increase operability of the device is treated carefully with regards to its security and sharing of the respective data and user privacy is preserved (e.g., the data is not shared with third-party applications). Moreover, in some examples, users can limit the amount of data that is captured, monitored, and/or processed to be used to provide one or more functions and/or or increase operability of the device. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, functionality can be provided to the user based on non-personal information data or a bare minimum amount of personal information, such as the content being requested by the device associated with a user, other non-personal information available to the, or publicly available information.

What is claimed is:

1. A computer system, comprising:
 a first media-capturing device, wherein the computer system is in communication with a display generation component and one or more input devices;
 one or more processors; and
 memory storing one or more programs configured to be executed by the one or more processors, the one or more programs including instructions for:
  receiving an indication that the first media-capturing device has been activated; and
  in response to receiving the indication that the first media-capturing device has been activated:
   in accordance with a determination that, while activated, the first media-capturing device recorded data of a first type, displaying, via the display generation component, a graphical indicator that indicates activation of the first media-capturing device; and
   in accordance with a determination that, while activated, the first media-capturing device recorded data of a second type without recording data of the first type, forgoing display of the graphical indicator that indicates activation of the first media-capturing device.

2. The computer system of claim 1, wherein the recorded data of the second type corresponds to data that is not available for playback.

3. The computer system of claim 1, wherein the recorded data of the first type corresponds to data that is available for playback.

4. The computer system of claim 1, wherein the graphical indicator is displayed irrespective of whether a status bar is displayed.

5. The computer system of claim 1, wherein the graphical indicator is displayed at a position that is adjacent to at least one media-capturing device.

6. The computer system of claim 1, wherein the graphical indicator:
in accordance with a determination that a status bar is not currently displayed, is displayed at a first position; and
in accordance with a determination that the status bar is not currently displayed, is displayed at a second position that is different from the first position.

7. The computer system of claim 1, wherein the one or more programs further include instructions for:
while displaying the graphical indicator, receiving a first input; and
in response to receiving the first input, displaying a user interface that includes a second graphical indicator that indicates activation of the first media-capturing device.

8. The computer system of claim 7, wherein the second graphical indicator includes displayed content that is different from displayed content of the graphical indicator.

9. The computer system of claim 1, wherein the first media-capturing device is a first type of media-capturing device, and wherein displayed content of the graphical indicator includes an indication of the first type of media-capturing device.

10. The computer system of claim 1, wherein displayed content of the graphical indicator includes an indication of an application that is currently recording data via the first media-capturing device.

11. The computer system of claim 1, wherein displayed content of the graphical indicator includes an indication of an application that has previously recorded data via the first media-capturing device.

12. The computer system of claim 1, wherein:
the first media-capturing device is a second type of media-capturing device; and
the one or more programs further including instructions for:
displaying, concurrently with the graphical indicator, a third graphical indicator that is different from the graphical indicator, wherein the graphical indicator includes an indication of the second type of media-capturing device; and the third graphical indicator includes an indication of a third type of media-capturing device that is different from the second type of media-capturing device.

13. The computer system of claim 1, wherein the graphical indicator:
in accordance with a determination that the graphical indicator corresponds to an application of a first application type, is selectable; and
in accordance with a determination that the graphical indicator does not correspond to an application of the first application type, is not selectable.

14. The computer system of claim 13, wherein the one or more programs further include instructions for:
while displaying the graphical indication that is selectable, receiving a user input corresponding to selection of the graphical indication; and
in response to receiving the user input corresponding to the selection of the graphical indication, displaying a third user interface for managing one or more permissions of the application of the first application type.

15. The computer system of claim 1, wherein the one or more programs further include instructions for:
receiving a third user input; and
in response to receiving the third user input, displaying a user interface that:
in accordance with a determination that the third user input was received while the first media-capturing device continues to be activated or within a predetermined of time after the first media-capturing device has been active, includes display of the graphical indication that indicates activation of the first media-capturing device; and
in accordance with a determination that the third user input was not received while the first media-capturing device continues to be activated or within a predetermined of time after the first media-capturing device has been active, does not include display of the graphical indicator that indicates activation of the first media-capturing device.

16. The computer system of claim 1, wherein the graphical indicator is displayed for at least a minimum period of time.

17. The computer system of claim 1, wherein the graphical indicator is displayed for a length of time that is based on a length of time for which the first media-capturing device has been active.

18. The computer system of claim 1, wherein a display location of the graphical indicator does not change, regardless of applications or functions that are running or are displayed.

19. A non-transitory computer-readable storage medium storing one or more programs configured to be executed by one or more processors of a computer system having a first media-capturing device, wherein the computer system is in communication with a display generation component and one or more input devices, the one or more programs including instructions for:
receiving an indication that the first media-capturing device has been activated; and
in response to receiving the indication that the first media-capturing device has been activated:
in accordance with a determination that, while activated, the first media-capturing device recorded data of a first type, displaying, via the display generation component, a graphical indicator that indicates activation of the first media-capturing device; and
in accordance with a determination that, while activated, the first media-capturing device recorded data of a second type without recording data of the first type, forgoing display of the graphical indicator that indicates activation of the first media-capturing device.

20. The non-transitory computer-readable storage medium of claim 19, wherein the recorded data of the second type corresponds to data that is not available for playback.

21. The non-transitory computer-readable storage medium of claim 19, wherein the recorded data of the first type corresponds to data that is available for playback.

22. The non-transitory computer-readable storage medium of claim 19, wherein the graphical indicator is displayed irrespective of whether a status bar is displayed.

23. The non-transitory computer-readable storage medium of claim 19, wherein the graphical indicator is displayed at a position that is adjacent to at least one media-capturing device.

24. The non-transitory computer-readable storage medium of claim 19, wherein the graphical indicator:
in accordance with a determination that a status bar is not currently displayed, is displayed at a first position; and
in accordance with a determination that the status bar is not currently displayed, is displayed at a second position that is different from the first position.

25. The non-transitory computer-readable storage medium of claim 19, wherein the one or more programs further include instructions for:
while displaying the graphical indicator, receiving a first input; and
in response to receiving the first input, displaying a user interface that includes a second graphical indicator that indicates activation of the first media-capturing device.

26. The non-transitory computer-readable storage medium of claim 25, wherein the second graphical indicator includes displayed content that is different from displayed content of the graphical indicator.

27. The non-transitory computer-readable storage medium of claim 19, wherein the first media-capturing device is a first type of media-capturing device, and wherein displayed content of the graphical indicator includes an indication of the first type of media-capturing device.

28. The non-transitory computer-readable storage medium of claim 19, wherein displayed content of the graphical indicator includes an indication of an application that is currently recording data via the first media-capturing device.

29. The non-transitory computer-readable storage medium of claim 19, wherein displayed content of the graphical indicator includes an indication of an application that has previously recorded data via the first media-capturing device.

30. The non-transitory computer-readable storage medium of claim 19, wherein:
the first media-capturing device is a second type of media-capturing device; and
the one or more programs further including instructions for:
displaying, concurrently with the graphical indicator, a third graphical indicator that is different from the graphical indicator, wherein the graphical indicator includes an indication of the second type of media-capturing device; and the third graphical indicator includes an indication of a third type of media-capturing device that is different from the second type of media-capturing device.

31. The non-transitory computer-readable storage medium of claim 19, wherein the graphical indicator:
in accordance with a determination that the graphical indicator corresponds to an application of a first application type, is selectable; and
in accordance with a determination that the graphical indicator does not correspond to an application of the first application type, is not selectable.

32. The non-transitory computer-readable storage medium of claim 31, wherein the one or more programs further include instructions for:
while displaying the graphical indication that is selectable, receiving a user input corresponding to selection of the graphical indication; and
in response to receiving the user input corresponding to the selection of the graphical indication, displaying a third user interface for managing one or more permissions of the application of the first application type.

33. The non-transitory computer-readable storage medium of claim 19, wherein the one or more programs further include instructions for:
receiving a third user input; and
in response to receiving the third user input, displaying a user interface that:
in accordance with a determination that the third user input was received while the first media-capturing device continues to be activated or within a predetermined of time after the first media-capturing device has been active, includes display of the graphical indication that indicates activation of the first media-capturing device; and
in accordance with a determination that the third user input was not received while the first media-capturing device continues to be activated or within a predetermined of time after the first media-capturing device has been active, does not include display of the graphical indicator that indicates activation of the first media-capturing device.

34. The non-transitory computer-readable storage medium of claim 19, wherein the graphical indicator is displayed for at least a minimum period of time.

35. The non-transitory computer-readable storage medium of claim 19, wherein the graphical indicator is displayed for a length of time that is based on a length of time for which the first media-capturing device has been active.

36. The non-transitory computer-readable storage medium of claim 19, wherein a display location of the graphical indicator does not change, regardless of applications or functions that are running or are displayed.

37. A method, comprising:
at a computer system having a first media-capturing device, wherein the computer system is in communication with a display generation component and one or more input devices:
receiving an indication that the first media-capturing device has been activated; and
in response to receiving the indication that the first media-capturing device has been activated:
in accordance with a determination that, while activated, the first media-capturing device recorded data of a first type, displaying, via the display generation component, a graphical indicator that indicates activation of the first media-capturing device; and
in accordance with a determination that, while activated, the first media-capturing device recorded data of a second type without recording data of the first type, forgoing display of the graphical indicator that indicates activation of the first media-capturing device.

38. The method of claim 37, wherein the recorded data of the second type corresponds to data that is not available for playback.

39. The method of claim 37, wherein the recorded data of the first type corresponds to data that is available for playback.

40. The method of claim 37, wherein the graphical indicator is displayed irrespective of whether a status bar is displayed.

41. The method of claim 37, wherein the graphical indicator is displayed at a position that is adjacent to at least one media-capturing device.

42. The method of claim 37, wherein the graphical indicator:
in accordance with a determination that a status bar is not currently displayed, is displayed at a first position; and
in accordance with a determination that the status bar is not currently displayed, is displayed at a second position that is different from the first position.

43. The method of claim 37, further comprising:
while displaying the graphical indicator, receiving a first input; and
in response to receiving the first input, displaying a user interface that includes a second graphical indicator that indicates activation of the first media-capturing device.

44. The method of claim 43, wherein the second graphical indicator includes displayed content that is different from displayed content of the graphical indicator.

45. The method of claim 37, wherein the first media-capturing device is a first type of media-capturing device, and wherein displayed content of the graphical indicator includes an indication of the first type of media-capturing device.

46. The method of claim 37, wherein displayed content of the graphical indicator includes an indication of an application that is currently recording data via the first media-capturing device.

47. The method of claim 37, wherein displayed content of the graphical indicator includes an indication of an application that has previously recorded data via the first media-capturing device.

48. The method of claim 37, wherein:
the first media-capturing device is a second type of media-capturing device; and
the method further comprising:
displaying, concurrently with the graphical indicator, a third graphical indicator that is different from the graphical indicator, wherein the graphical indicator includes an indication of the second type of media-capturing device; and the third graphical indicator includes an indication of a third type of media-capturing device that is different from the second type of media-capturing device.

49. The method of claim 37, wherein the graphical indicator:
in accordance with a determination that the graphical indicator corresponds to an application of a first application type, is selectable; and
in accordance with a determination that the graphical indicator does not correspond to an application of the first application type, is not selectable.

50. The method of claim 49, further comprising:
while displaying the graphical indication that is selectable, receiving a user input corresponding to selection of the graphical indication; and
in response to receiving the user input corresponding to the selection of the graphical indication, displaying a third user interface for managing one or more permissions of the application of the first application type.

51. The method of claim 37, further comprising:
receiving a third user input; and
in response to receiving the third user input, displaying a user interface that:
in accordance with a determination that the third user input was received while the first media-capturing device continues to be activated or within a predetermined of time after the first media-capturing device has been active, includes display of the graphical indication that indicates activation of the first media-capturing device; and
in accordance with a determination that the third user input was not received while the first media-capturing device continues to be activated or within a predetermined of time after the first media-capturing device has been active, does not include display of the graphical indicator that indicates activation of the first media-capturing device.

52. The method of claim 37, wherein the graphical indicator is displayed for at least a minimum period of time.

53. The method of claim 37, wherein the graphical indicator is displayed for a length of time that is based on a length of time for which the first media-capturing device has been active.

54. The method of claim 37, wherein a display location of the graphical indicator does not change, regardless of applications or functions that are running or are displayed.

* * * * *

UNITED STATES PATENT AND TRADEMARK OFFICE
CERTIFICATE OF CORRECTION

PATENT NO. : 11,054,973 B1
APPLICATION NO. : 17/027484
DATED : July 6, 2021
INVENTOR(S) : Behkish J. Manzari et al.

Page 1 of 1

It is certified that error appears in the above-identified patent and that said Letters Patent is hereby corrected as shown below:

In the Claims

In Claim 15, at Column 90, Line 19, after "predetermined" insert -- period --, therefor.

In Claim 15, at Column 90, Line 26, after "predetermined" insert -- period --, therefor.

In Claim 33, Column 92, Line 21, after "predetermined" insert -- period --, therefor.

In Claim 33, Column 92, Line 28, after "predetermined" insert -- period --, therefor.

In Claim 51, Column 94, Line 27, after "predetermined" insert -- period --, therefor.

In Claim 51, Column 94, Line 34, after "predetermined" insert -- period --, therefor.

Signed and Sealed this
Thirty-first Day of May, 2022

Katherine Kelly Vidal
*Director of the United States Patent and Trademark Office*